United States Patent [19]
Kanou et al.

[11] Patent Number: 6,088,062
[45] Date of Patent: Jul. 11, 2000

[54] PICTURE SIGNAL PROCESSING APPARATUS

[75] Inventors: Mamoru Kanou; Masuyoshi Kurokawa; Seiichiro Iwase, all of Kanagawa; Kenichiro Nakamura, Saitama, all of Japan

[73] Assignee: Sony Corporation, Tokyo, Japan

[21] Appl. No.: 08/958,545

[22] Filed: Oct. 27, 1997

[30] Foreign Application Priority Data

| Oct. 29, 1996 | [JP] | Japan | P08-287104 |
| Oct. 29, 1996 | [JP] | Japan | P08-287173 |
| Feb. 27, 1997 | [JP] | Japan | P09-044471 |
| Mar. 19, 1997 | [JP] | Japan | P09-067069 |

[51] Int. Cl.$^7$ .............. H04N 7/01; G09G 5/00
[52] U.S. Cl. .......... 348/441; 348/441; 348/445; 348/453; 348/459; 345/127; 345/507; 345/508; 345/524; 382/300
[58] Field of Search ............ 348/441, 453, 348/459, 448, 450, 446, 581, 445; 345/127, 132, 507, 508, 509, 502, 504, 505, 524; 382/298, 299, 300

[56] References Cited

U.S. PATENT DOCUMENTS

| 5,093,722 | 3/1992 | Miyaguchi et al. | 358/140 |
| 5,210,705 | 5/1993 | Chauvel et al. | 364/572 |
| 5,473,381 | 12/1995 | Lee | 348/441 |
| 5,583,575 | 12/1996 | Arita et al. | 348/451 |
| 5,742,348 | 4/1998 | Kuwahara et al. | 348/441 |
| 5,790,134 | 8/1998 | Lentz | 345/501 |
| 5,808,688 | 9/1998 | Sung | 348/441 |
| 5,841,447 | 11/1998 | Drews | 345/523 |
| 5,861,924 | 1/1999 | Pan et al. | 348/451 |

*Primary Examiner*—Michael H. Lee
*Assistant Examiner*—Paulos M. Natnael
*Attorney, Agent, or Firm*—Ronald P. Kananen; Rader, Fishman & Grauer

[57] ABSTRACT

A picture signal processing device for performing picture signal processing such as conversion of the number of pixels or conversion processing for the number of scanning lines. The picture signal processing device includes a plurality of element processors and a controller for performing common control of said element processors. The element processors arrayed in association with pixels arrayed in one-dimensional direction of a digitized two-dimensional picture. The pixels arrayed in one-dimensional direction are chronologically sequentially entered to the element processors. Each element processor includes a transient memory for transiently storing pixel data, an input pixel data memory for storing input pixel data for transfer to the transient memory, a pixel attribute information memory for storing the pixel attribute information representing the attribute of pixels, a pixel skip information memory for storing the pixel skip information for skipping pixel data, an arithmetic-logic device for carrying out pre-set calculations using the input pixel data or pixel data of near-by element processors based on the pixel attribute information, and an output pixel data memory for storing and outputting the pixel data taken out from the transient memory. The picture signal processing device can cope with conversion processing at an optional ratio.

45 Claims, 76 Drawing Sheets

| TIME INDICES | n | n+1 | n+2 | n+3 |
|---|---|---|---|---|
| Y(8BIT) | $Y_{07}$<br>$Y_{06}$<br>$Y_{05}$<br>$Y_{04}$<br>$Y_{03}$<br>$Y_{02}$<br>$Y_{01}$<br>$Y_{00}$ | $Y_{17}$<br>$Y_{16}$<br>$Y_{15}$<br>$Y_{14}$<br>$Y_{13}$<br>$Y_{12}$<br>$Y_{11}$<br>$Y_{10}$ | $Y_{27}$<br>$Y_{26}$<br>$Y_{25}$<br>$Y_{24}$<br>$Y_{23}$<br>$Y_{22}$<br>$Y_{21}$<br>$Y_{20}$ | $Y_{37}$<br>$Y_{36}$<br>$Y_{35}$<br>$Y_{34}$<br>$Y_{33}$<br>$Y_{32}$<br>$Y_{31}$<br>$Y_{30}$ |
| Cr(8BIT) | $Cr_{07}$<br>$Cr_{06}$<br>$Cr_{05}$<br>$Cr_{04}$<br>$Cr_{03}$<br>$Cr_{02}$<br>$Cr_{01}$<br>$Cr_{00}$ | $Cr_{17}$<br>$Cr_{16}$<br>$Cr_{15}$<br>$Cr_{14}$<br>$Cr_{13}$<br>$Cr_{12}$<br>$Cr_{11}$<br>$Cr_{10}$ | $Cr_{27}$<br>$Cr_{26}$<br>$Cr_{25}$<br>$Cr_{24}$<br>$Cr_{23}$<br>$Cr_{22}$<br>$Cr_{21}$<br>$Cr_{20}$ | $Cr_{37}$<br>$Cr_{36}$<br>$Cr_{35}$<br>$Cr_{34}$<br>$Cr_{33}$<br>$Cr_{32}$<br>$Cr_{31}$<br>$Cr_{30}$ |
| Cb(8BIT) | $Cb_{07}$<br>$Cb_{06}$<br>$Cb_{05}$<br>$Cb_{04}$<br>$Cb_{03}$<br>$Cb_{02}$<br>$Cb_{01}$<br>$Cb_{00}$ | $Cb_{17}$<br>$Cb_{16}$<br>$Cb_{15}$<br>$Cb_{14}$<br>$Cb_{13}$<br>$Cb_{12}$<br>$Cb_{11}$<br>$Cb_{10}$ | $Cb_{27}$<br>$Cb_{26}$<br>$Cb_{25}$<br>$Cb_{24}$<br>$Cb_{23}$<br>$Cb_{22}$<br>$Cb_{21}$<br>$Cb_{20}$ | $Cb_{37}$<br>$Cb_{36}$<br>$Cb_{35}$<br>$Cb_{34}$<br>$Cb_{33}$<br>$Cb_{32}$<br>$Cb_{31}$<br>$Cb_{30}$ |

FIG.12

| TIME INDICES | n | n+1 | n+2 | n+3 |
|---|---|---|---|---|
| Y(8BIT) | $Y_{07}$<br>$Y_{06}$<br>$Y_{05}$<br>$Y_{04}$<br>$Y_{03}$<br>$Y_{02}$<br>$Y_{01}$<br>$Y_{00}$ | $Y_{17}$<br>$Y_{16}$<br>$Y_{15}$<br>$Y_{14}$<br>$Y_{13}$<br>$Y_{12}$<br>$Y_{11}$<br>$Y_{10}$ | $Y_{27}$<br>$Y_{26}$<br>$Y_{25}$<br>$Y_{24}$<br>$Y_{23}$<br>$Y_{22}$<br>$Y_{21}$<br>$Y_{20}$ | $Y_{37}$<br>$Y_{36}$<br>$Y_{35}$<br>$Y_{34}$<br>$Y_{33}$<br>$Y_{32}$<br>$Y_{31}$<br>$Y_{30}$ |
| Cb/Cr(8BIT) | $Cr_{07}$<br>$Cr_{06}$<br>$Cr_{05}$<br>$Cr_{04}$<br>$Cr_{03}$<br>$Cr_{02}$<br>$Cr_{01}$<br>$Cr_{00}$ | $Cb_{07}$<br>$Cb_{06}$<br>$Cb_{05}$<br>$Cb_{04}$<br>$Cb_{03}$<br>$Cb_{02}$<br>$Cb_{01}$<br>$Cb_{00}$ | $Cr_{27}$<br>$Cr_{26}$<br>$Cr_{25}$<br>$Cr_{24}$<br>$Cr_{23}$<br>$Cr_{22}$<br>$Cr_{21}$<br>$Cr_{20}$ | $Cb_{27}$<br>$Cb_{26}$<br>$Cb_{25}$<br>$Cb_{24}$<br>$Cb_{23}$<br>$Cb_{22}$<br>$Cb_{21}$<br>$Cb_{20}$ |

FIG.13

| TIME INDICES | n | n+1 | n+2 | n+3 |
|---|---|---|---|---|
| Y(8BIT) | $Y_{07}$<br>$Y_{06}$<br>$Y_{05}$<br>$Y_{04}$<br>$Y_{03}$<br>$Y_{02}$<br>$Y_{01}$<br>$Y_{00}$ | $Y_{17}$<br>$Y_{16}$<br>$Y_{15}$<br>$Y_{14}$<br>$Y_{13}$<br>$Y_{12}$<br>$Y_{11}$<br>$Y_{10}$ | $Y_{27}$<br>$Y_{26}$<br>$Y_{25}$<br>$Y_{24}$<br>$Y_{23}$<br>$Y_{22}$<br>$Y_{21}$<br>$Y_{20}$ | $Y_{37}$<br>$Y_{36}$<br>$Y_{35}$<br>$Y_{34}$<br>$Y_{33}$<br>$Y_{32}$<br>$Y_{31}$<br>$Y_{30}$ |
| Cr(2BIT) | $Cr_{07}$<br>$Cr_{06}$ | $Cr_{05}$<br>$Cr_{04}$ | $Cr_{03}$<br>$Cr_{02}$ | $Cr_{01}$<br>$Cr_{00}$ |
| Cb(2BIT) | $Cb_{07}$<br>$Cb_{06}$ | $Cb_{05}$<br>$Cb_{04}$ | $Cb_{03}$<br>$Cb_{02}$ | $Cb_{01}$<br>$Cb_{00}$ |

FIG.14

| TIME INDICES | | n | n+1 | n+2 | n+3 |
|---|---|---|---|---|---|
| 4:1:1 | Cr(2BIT) | $Cr_{07}$<br>$Cr_{06}$ | $Cr_{05}$<br>$Cr_{04}$ | $Cr_{03}$<br>$Cr_{02}$ | $Cr_{01}$<br>$Cr_{00}$ |
| | Cb(2BIT) | $Cb_{07}$<br>$Cb_{06}$ | $Cb_{05}$<br>$Cb_{04}$ | $Cb_{03}$<br>$Cb_{02}$ | $Cb_{01}$<br>$Cb_{00}$ |
| 4:2:2 | $C_{422}$(8BIT) | $Cr_{07}$<br>$Cr_{06}$<br>$Cr_{05}$<br>$Cr_{04}$<br>$Cr_{03}$<br>$Cr_{02}$<br>$Cr_{01}$<br>$Cr_{00}$ | $Cb_{07}$<br>$Cb_{06}$<br>$Cb_{05}$<br>$Cb_{04}$<br>$Cb_{03}$<br>$Cb_{02}$<br>$Cb_{01}$<br>$Cb_{00}$ | $Cr_{07}$<br>$Cr_{06}$<br>$Cr_{05}$<br>$Cr_{04}$<br>$Cr_{03}$<br>$Cr_{02}$<br>$Cr_{01}$<br>$Cr_{00}$ | $Cb_{07}$<br>$Cb_{06}$<br>$Cb_{05}$<br>$Cb_{04}$<br>$Cb_{03}$<br>$Cb_{02}$<br>$Cb_{01}$<br>$Cb_{00}$ |

| Cr(2BIT) | Cr07<br>Cr06 | Cr05<br>Cr04 | Cr03<br>Cr02 | Cr01<br>Cr00 | Cr17<br>Cr16 |
|---|---|---|---|---|---|
| DECISION FLAG | ⎴ | | | | ⎴ |

FIG.40B

| REGISTER<br>WO1 | | | | | | |
|---|---|---|---|---|---|---|
| | WO1+7 | Cr07 | Cb05 | Cr03 | Cb01 | Cr17 |
| | WO1+6 | Cr06 | Cb04 | Cr02 | Cb00 | Cr16 |
| | WO1+5 | Cr05 | Cb03 | Cr01 | Cb17 | Cr15 |
| | WO1+4 | Cr04 | Cb02 | Cr00 | Cb16 | Cr14 |
| | WO1+3 | Cr03 | Cb01 | Cr07 | Cb05 | Cr13 |
| | WO1+2 | Cr02 | Cb00 | Cr06 | Cb04 | Cr12 |
| | WO1+1 | Cr01 | Cb17 | Cr15 | Cb13 | Cr11 |
| | WO1 | Cr00 | Cb16 | Cr14 | Cb12 | Cr10 |

FIG.40C

| REGISTER<br>WO1 | | | | | | |
|---|---|---|---|---|---|---|
| | WO1+7 | Cr07 | 0 | 0 | 0 | Cr17 |
| | WO1+6 | Cr06 | 0 | 0 | 0 | Cr16 |
| | WO1+5 | Cr05 | 0 | 0 | 0 | Cr15 |
| | WO1+4 | Cr04 | 0 | 0 | 0 | Cr14 |
| | WO1+3 | Cr03 | 0 | 0 | 0 | Cr13 |
| | WO1+2 | Cr02 | 0 | 0 | 0 | Cr12 |
| | WO1+1 | Cr01 | 0 | 0 | 0 | Cr11 |
| | WO1+1 | Cr00 | 0 | 0 | 0 | Cr10 |

FIG.40D

| REGISTER<br>WO1 | | | | | | |
|---|---|---|---|---|---|---|
| | WO1+7 | Cr07 | 0 | $\frac{Cb_{07}+Cb_{17}}{2}$ | 0 | Cr17 |
| | WO1+6 | Cr06 | 0 | $\frac{Cb_{06}+Cb_{16}}{2}$ | 0 | Cr16 |
| | WO1+5 | Cr05 | 0 | $\frac{Cb_{05}+Cb_{15}}{2}$ | 0 | Cr15 |
| | WO1+4 | Cr04 | 0 | $\frac{Cb_{04}+Cb_{14}}{2}$ | 0 | Cr14 |
| | WO1+3 | Cr03 | 0 | $\frac{Cb_{03}+Cb_{13}}{2}$ | 0 | Cr13 |
| | WO1+2 | Cr02 | 0 | $\frac{Cb_{02}+Cb_{12}}{2}$ | 0 | Cr12 |
| | WO1+1 | Cr01 | 0 | $\frac{Cb_{01}+Cb_{11}}{2}$ | 0 | Cr11 |
| | WO1 | Cr00 | 0 | $\frac{Cb_{00}+Cb_{10}}{2}$ | 0 | Cr10 |

PICTURE SIGNAL PROCESSING APPARATUS

BACKGROUND OF THE INVENTION

1. Field of the Invention

This invention relates to a picture signal processing device for picture signal processing, such as conversion of the number of pixels or conversion of the scanning lines.

2. Description of the Related Art

Recently, digital signal processing has come to be used in keeping up with recent progress in semiconductor technology and increased semiconductor processing speed. Also, recently, a fixed pixel display device typified by a liquid crystal display device or a plasma display device is in widespread use to take the place of a conventional CRT.

In addition, it has recently become a desideratum to be able to display not only the standard television broadcasting system, such as a so-called NTSC (national Television system Committee) signals, PAL (Phase Alternation by Line), but also signals of various formats, such as video graphic array (VGA) signals or SVGA (super VGA) signals or XVGA (Extended VGA) signals.

The numbers of pixels handled by these various formats differ from one format to another. For displaying picture signals of various different formats having different numbers of pixels by an analog display device, such as CRT, it suffices to change the speed of deflection of the electron beam depending on the number of pixels per scanning line.

However, since the number of pixels that can be handled by the above-mentioned fixed pixel display device is set, the conventional analog technique, such as the CRT, cannot be used. Thus, for displaying signals of the above-mentioned different formats on the fixed pixel display device, conversion of the number of pixels or conversion of scanning lines to optional values is mandatory.

The outline of the above-described processing for conversion of the number of pixels is hereinafter explained.

The processing for conversion of the number of pixels is the processing for increasing or decreasing the number of output pixels to a desired number with respect to the number of input pixels during one scanning line period. Supposing that the sampling frequency of the input is equal to that of the output, the increased number of the pixels or the decreased number of the pixels are tantamount to an enlarging processing or to a contracting processing of an input picture (processing of changing the number of pixels in an increasing direction or in a decreasing direction). If attention is directed to the sampling of the input and output pixels instead of to the number of pixels, the above technique is tantamount to creating data at points different from original sampling points or to generating interpolated pixels at these different points from the input pixel data.

The conversion processing for the number of scanning lines for interlaced and non-interlaced pictures is hereinafter explained.

The conversion of the numbers of scanning lines is a processing of changing the number of output lines to a desired value from the number of the input scanning lines during each vertical scanning period (processing of converting the number of lines in an increasing direction or in a decreasing direction). Supposing that the number of lines of the input is equal to that of the output, the increased number of the lines or the decreased number of the lines are tantamount to an enlarging processing or to a contracting processing of an input picture in the vertical direction. Thus, the conversion processing for the number of scanning lines means interpolation of line data.

There are a variety of interpolating methods, which may roughly be classified into the following three methods:

1. Nearest Neighbor Interpolation Method

This method consists in picking up data at the closest position to the pixels following pixel number conversion from pixel data of an input picture, and can be implemented by a logic processing using an extremely simple hardware structure. However, the the picture quality is seriously deteriorated after conversion. Specifically, after contraction, fine lines tend to disappear, or small-sized figures become distorted, whereas, after enlargement, jaggies tend to be produced in the peripheral portions.

2. Bi-linear Interpolation Method

This method, which picks out from pixel data of an input pixel data at two points closest to the position of the pixel following conversion of the number of pixels of an input picture to effect linear interpolation of the two points of data, undergoes picture quality deterioration to a lesser extent than the nearest neighbor method. However, on contraction to less than 2:1, the phenomenon known as pixel drop occurs to deteriorate the picture quality drastically. This technique is tantamount to moderate low-pass filtering so that the entire picture, in particular its edge portion, becomes blurred. The hardware structure is drastically complicated as compared with that for the nearest neighbor method.

3. Filter Switching Interpolation Method

This method, used for picture signal processing for high-quality pictures, converts the number of pixels using a digital filter of a FIR filter, such as a finite response filter, matched to the size conversion ratio. If this method is implemented by a hardware, the hardware structure is drastically complex and enlarged, so that the usual preference is the bi-linear interpolation method.

However, for accommodating the above-mentioned various formats, and under a situation in recent years in which new formats are proposed one after another, the above-mentioned ASIC cannot be designed as a product conforming to the market needs because of its circuit scale or because of poor flexibility such as flexibility in changing bit fineness after designing or addition of the design parameters of the new formats. That is, if desired to implement pixel number conversion by ASIC, the conversion ratio is low in the degree of freedom or remains fixed, or a number of conversion ratios need to be used in a switching manner. Also, with ASIC, bit fineness cannot be changed with ease once the circuit is completed. In addition, it is virtually impossible to cope with various formats including not only the above-mentioned various signal formats, such as VGA, SVGA, XVGA or HDTV, but also various other formats that will make their debut in future.

SUMMARY OF THE INVENTION

It is therefore an object of the present invention to provide a picture signal processing apparatus which can realize digital signal processing for pixel number or scanning line number conversion at an optional ratio, can flexibly cope with high definition television or conversion of the number of pixels with the conversion ratio that differs on one scanning line depending on the horizontal position and which can flexibly accommodate change of bit fineness after designing or addition of design parameters of new formats.

The present invention provides a picture signal processing device for performing picture signal processing such as conversion of the number of pixels or conversion processing for the number of scanning lines. The picture signal processing device includes a plurality of element processors and a controller for performing common control of the element processors, the element processors being arrayed in association with pixels arrayed in one-dimensional direction of a digitized two-dimensional picture, the pixels arrayed in one-dimensional direction being chronologically sequentially entered to the element processors. Each element processor includes a transient memory for transiently storing pixel data, an input pixel data memory for storing input pixel data for transfer to the transient memory, a pixel attribute information memory for storing the pixel attribute information representing the attribute of pixels, a pixel skip information memory for storing the pixel skip information for skipping pixel data, an arithmetic-logic device for carrying out pre-set calculations using the input pixel data or pixel data of near-by element processors based on the pixel attribute information and an output pixel data memory for storing and outputting the pixel data taken out from the transient memory. The picture signal processing device can cope with conversion processing at an optional ratio.

BRIEF DESCRIPTION OF THE DRAWINGS

FIG. 12 illustrates a 4:4:4 format structure.

FIG. 13 illustrates a 4:4:2 format structure.

FIG. 14 illustrates a 4:1:1 format structure.

FIG. 15 illustrates conversion from the 4:1:1 format to the 4:2:2 format.

FIGS. 40A to 40D illustrate the contents of a local memory at the time of conversion of the number of pixels of the 4:1:1 format.

DESCRIPTION OF THE PREFERRED EMBODIMENTS

Before proceeding to a description of preferred embodiments of the present invention, an interpolation method employing cubic interpolation coefficients is explained as an example of a filter switching interpolation method.

First, the principle of enlarging conversion of the number of pixels by 2:3 of creating three output pixels for two input pixels is explained.

Figure 1:
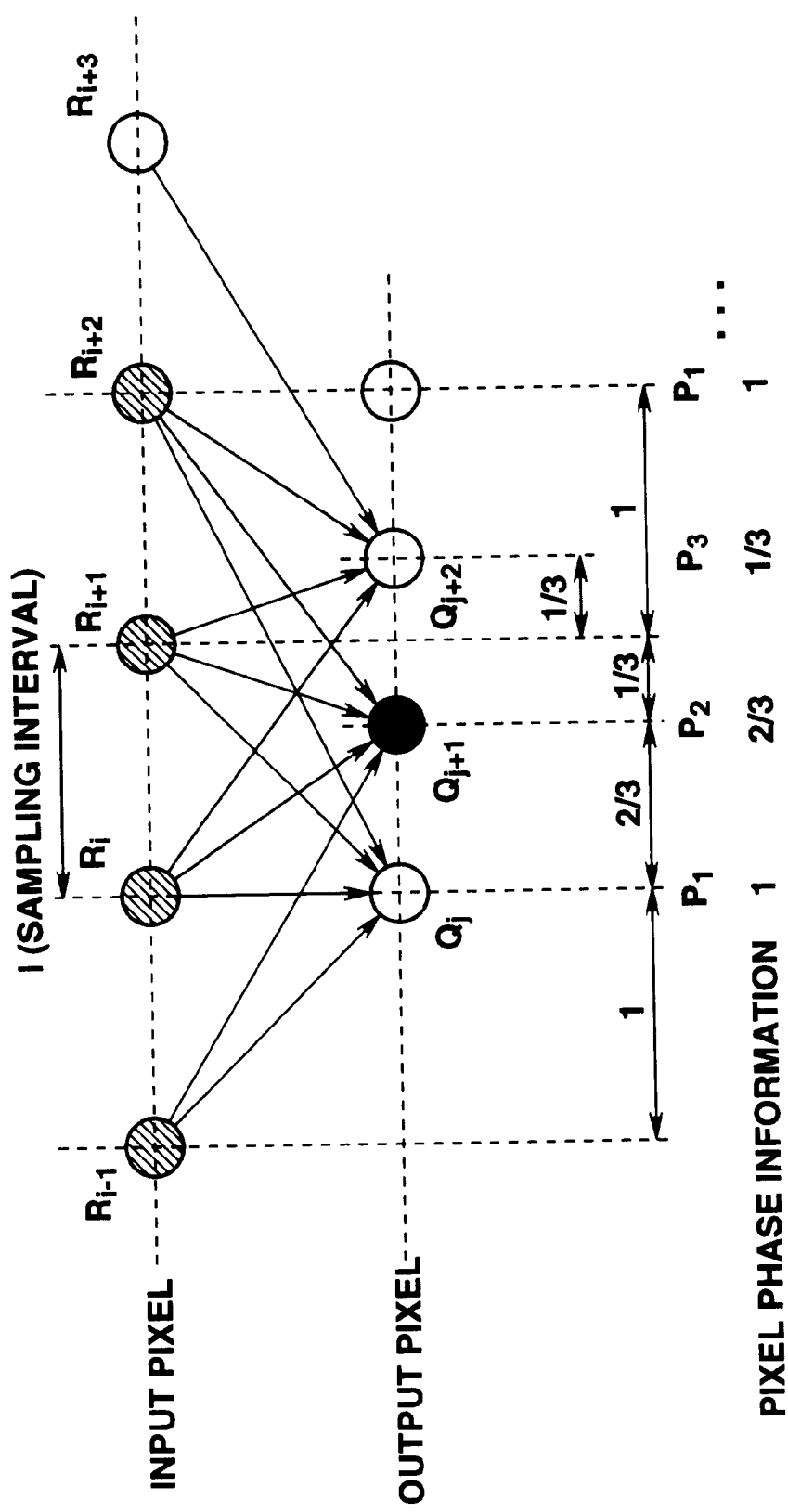
FIG. 1 illustrates the principle of enlarging conversion of the number of pixels by 2:3.

FIG. 1 illustrates the principle of the above-described enlarging conversion of the number of pixels by 2:3. In FIG. 1, the values of the input pixels are denoted by $R_{i-1}, R_i, R_{i+1}, R_{i+2}, R_{i+3}, \ldots$, whilst those of the output pixels are denoted by $Q_j, Q_{j+1}, Q_{j+2}, Q_{j+3}, \ldots$.

In FIG. 1, $P_1, P_2, P_3, P_1, \ldots$ denote phase deviation (phase information) between the input pixel and the output pixel.

In the enlarging conversion of the number of pixels by 2:3, three output pixels are created per two input pixels, as shown in FIG. 1. The relation between the input pixel and the output pixel is such that the value of an output pixel is calculated from a near-by input pixel. There exist a variety of interpolation methods depending on, for example, which range should be used as the near-by range for generating the output pixel or which values of coefficients should be used in calculating the output pixel by interpolation from the input pixel. In the following explanation, the cubic interpolation of interpolation from a range of four points (four pixels) as the near-by range is taken as an example.

Figure 2:
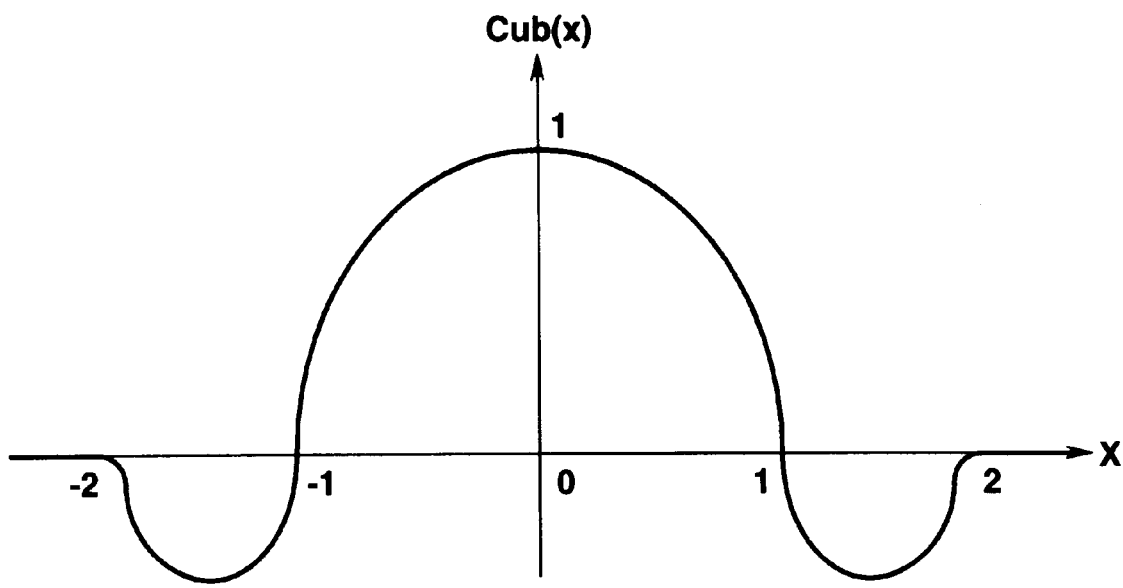
FIG. 2 illustrates the cubic function.

FIG. 2 shows a cubic interpolation function Cub(x) used for the cubic interpolation, while the equation (1) shows the equation of the function. It is assumed that the horizontal axis of the cubic interpolation function shown by the equation (1) is normalized at a sampling interval used at the time of sampling the original picture into digital signals.

$$\text{Cub}(x) = |x|^3 - 2|x|^2 + 1 \quad \text{for } |x| \leq 1 \tag{1}$$

$$\text{Cub}(x) = -|x|^3 + 5|x|^2 - 8|x| + 4 \quad \text{for } 1 < |x| \leq 2$$

$$\text{Cub}(x) = 0 \quad \text{for } 2 < |x|$$

In the case of the enlarging conversion of the number of pixels, the interpolation value of each output pixel is represented by convolution of the sampling values of the input pixel with the cubic function. The interpolation value of each output pixel is represented by the following equation (2):

$$Q_j = \text{Cub}(x11)^* R_{i-1} + \text{Cub}(x12)^* R_i + \text{Cub}(x13)^* R_{i+1} + \text{Cub}(x14)^* R_{i+2}$$

$$Q_{j+1} = \text{Cub}(x21)^* R_{i-1} + \text{Cub}(x22)^* R_i + \text{Cub}(x23)^* R_{i+1} + \text{Cub}(x24)^* R_{i+2}$$

$$Q_{j+2} = \text{Cub}(x31)^* R_{i-1} + \text{Cub}(x32)^* R_{i+2} + \text{Cub}(x33)^* R_{i+2} + \text{Cub}(x34)^* R_{i+3} \tag{2}$$

The coefficients Cu(x) of the equation (2) are values calculated from the above-mentioned cubic interpolation functions, and are calculated from the phase specifying how much the output pixel to be found is deviated from the input pixel. For example, in the case of the enlarging conversion of the number of pixels by 2:3 shown in FIG. 1, the phase of the output pixel of $Q_j$ is coincident with the phase of the near-by input pixel, such as an input pixel of $R_i$. Thus, the phase information $P_1$ thereof becomes equal to zero. Similarly, the phase of the output pixel of $Q_{j+1}$ is deviated by ⅔ from the phase of the near-by input pixel, such as the input pixel of $R_{i+1}$, so that the phase information thereof is ⅓, and hence the above equation (2) can be rewritten to the following equation (3):

$$Q_j = \text{Cub}(-1)^* R_{i-1} + \text{Cub}(0)^* R_i + \text{Cub}(1)^* R_{i+1} + \text{Cub}(2)^* R_{i+2}$$

$$Q_{j+1} = \text{Cub}(-\tfrac{5}{3})^* R_{i-1} + \text{Cub}(-\tfrac{2}{3})^* R_i + \text{Cub}(\tfrac{1}{3})^* R_{i+1} + \text{Cub}(\tfrac{4}{3})^* R_{i+2}$$

$$Q_{j+2} = \text{Cub}(-\tfrac{4}{3})^* R_i + \text{Cub}(-\tfrac{1}{3})^* R_{i+} + \text{Cub}(\tfrac{2}{3})^* R_{i+2} + \text{Cub}(\tfrac{5}{3})^* R_{i+3} \tag{3}$$

Since Cub(x) and $R_{i-1}$, $R_{i+}$ and $R_{i+2}$ of the input pixel are of known values, interpolation data of respective output pixels can be calculated from this equation (3). For example, since Cub(-1)=0, Cub(0)=1, Cub(1)=0 and Cub(2)=0, the output pixel of $Q_j$ is:

$$Q_j = 0^* R_{i-1} + 1^* R_{i+1} + 0^* R_{i+1} + 0^* R_{i+2} = R_i \tag{4}$$

such that the output pixel of $Q_j$ is no other than the value of the input pixel.

Although the case of the enlarging conversion of the number of pixels by 2:3 has been taken as an example, the same holds for an arbitrary enlarging ratio. If only the phase of the output pixel is known, it suffices if the coefficients of the cubic function are found from the phase thus found from the equation (1) and to execute convolution of the coefficients with four input pixels in the vicinity of the interpolation pixel.

The principle of 3:2 contracting conversion of the number of pixels of creating two output pixels from three input pixels is hereinafter explained.

Figure 3:
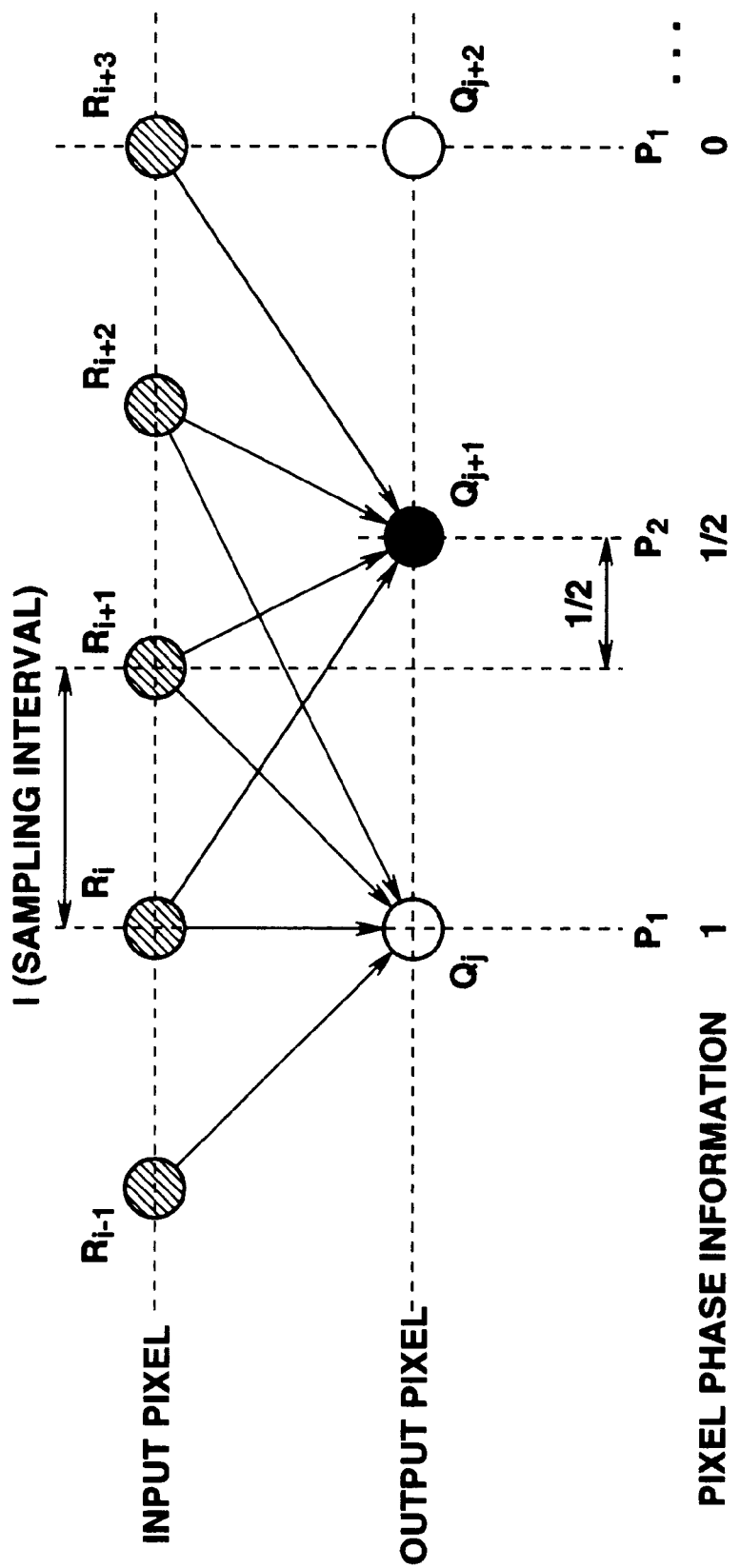
FIG. 3 illustrates the principle of contracting conversion of the number of pixels by 3:2.

FIG. 3 illustrates the principle of 3:2 contracting conversion of the number of pixels by 3:2. In this figure, the values of the input pixels are set to $R_{i-1}$, $R_i$, $R_{i+1}$, $R_{i+2}$, $R_{i+3}$, ..., while the values of the output pixel are set to $Q_j$, $Q_{j+1}$, $Q_{j+2}$, ..., as in FIG. 1. Also, in FIG. 3, $P_1$, $P_2$, $P_3$, ..., similarly represent phase deviation between the input pixel and the output pixel (picture phase information).

In the 3:2 contracting conversion of the number of pixels, the input pixel and the output pixel are related to each other so that the value of the output pixel is calculated from the value of its near-by input pixels. In this 3:2 contracting conversion of the number of pixels, cubic interpolation of calculating an output pixel (interpolated pixel) from its four near-by input pixels, as explained in the above, is taken as an example.

That is, in the case of the contracting conversion of the number of pixels, an interpolation equation for an interpolated value of each output pixel, such as $Q_j$ or $Q_{j+1}$, is as shown by the following equation (5):

$$Q_j = \text{Cub}(x11)^* R_{i-1} + \text{Cub}(x12)^* R_i + \text{Cub}(x13)^* R_{i+1} + \text{Cub}(x14)^* R_{i+2}$$

$$Q_{j+1} = \text{Cub}(x21)^* R_i + \text{Cub}(x22)^* R_{i+1} + \text{Cub}(x23)^* R_{i+2} + \text{Cub}(x24)^* R_{i+3} \tag{5}$$

The coefficients Cub(x) of the equation (5) are values calculated from the above-mentioned cubic interpolation finctions, and are calculated from the phase specifying how much the output pixel to be found is deviated from the input pixel. For example, in the case of the contracting conversion of the number of pixels by 3:2 shown in FIG. 3, the phase of the output pixel of $Q_j$ is coincident with the phase of the near-by input pixel, such as an input pixel of $R_i$. Thus, the phase information $P_1$ thereof becomes equal to zero. Similarly, the phase of the output pixel of $Q_{j+1}$ is deviated by ½ from the phase of the near-by input pixel, such as the input pixel of $R_{i+1}$, so that the phase information thereof is ½, and hence the above equation (5) can be rewritten to the following equation (6):

$$Q_j = \text{Cub}(-1)^* R_{i-1} + \text{Cub}(0)^* R_i + \text{Cub}(1)^* R_{i+1} + \text{Cub}(2)^* R_{i+2}$$

$$Q_{j+1} = \text{Cub}(-\tfrac{3}{2})^* R_i + \text{Cub}(-\tfrac{1}{2})^* R_{i+1} + \text{Cub}(\tfrac{1}{2})^* R_{i+2} + \text{Cub}(\tfrac{3}{2})^* R_{i+3} \tag{6}$$

Since Cub(x) and the values $R_{i-1}$, $R_{i+1}$, $R_{i+2}$, ... of the input pixels are known values, interpolation data of respective output pixels can be computed from the above equation (6). For example, since Cub(-1)=0, Cub(0)=1, Cub(1)=0 and Cub(2)=0, the output pixel of $Q_j$ is:

$$Q_j = 0^* R_{i-1} + 1^* R_i + 0^* R_{i+1} + 0^* R_i + 2 = R_i \tag{7}$$

such that the output pixel of $Q_j$ is no other than the value of the input pixel.

Although the case of the contracting conversion of the number of pixels by 3:2 has been taken as an example, the same holds for an arbitrary contraction ratio. If only the phase of the output pixel is known, it suffices if the coefficients of the cubic function are found from the phase thus found from the equation (1) and to execute convolution of the coefficients with four input pixels in the vicinity of the interpolation pixel.

Figure 4:
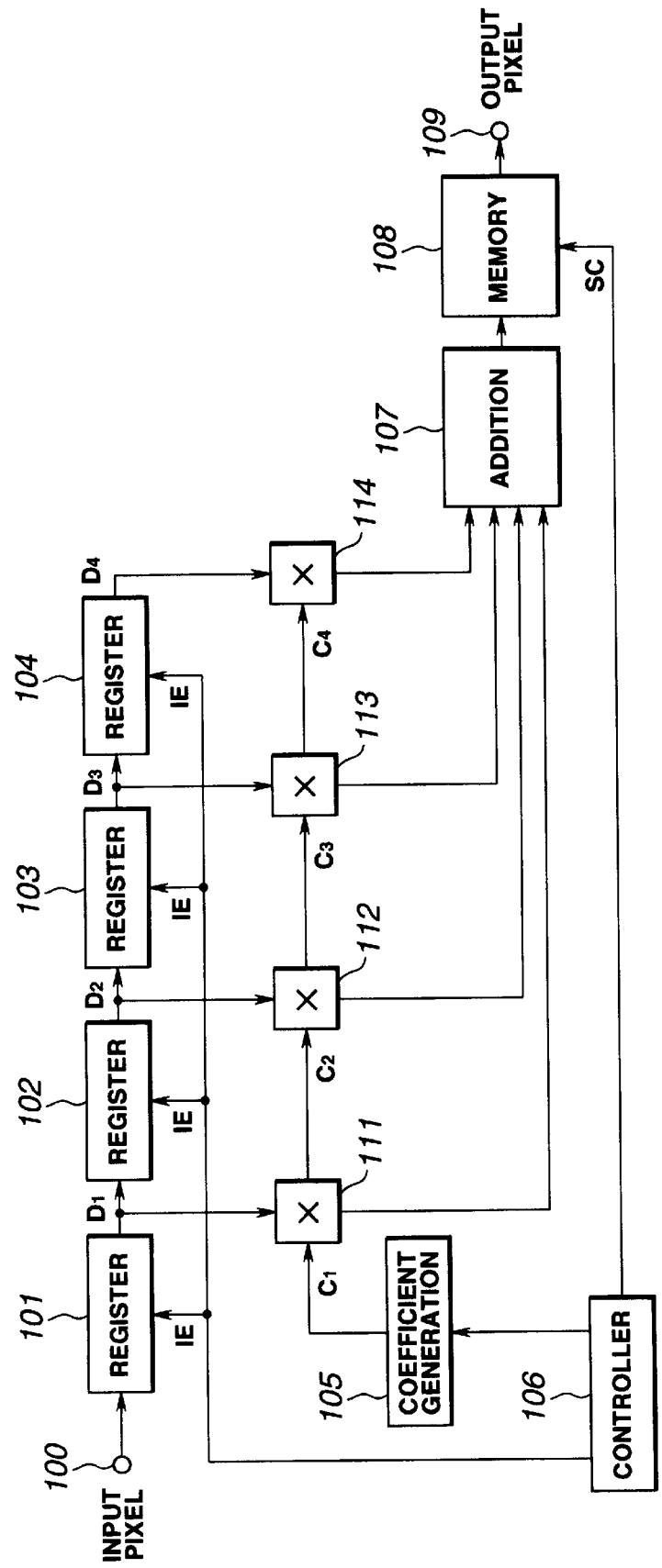
FIG. 4 is a block circuit diagram showing the hardware structure of a pixel number conversion device.

Conventionally, the above-described pixel number conversion is implemented by a hardware configuration as shown for example in FIG. 4. Meanwhile, the explanation is made only for luminance signals while chroma signals will be explained later.

In the configuration shown in FIG. 4, serially connected registers 101 to 104 delay supplied data by one sample each, thus constituting a four-stage shift register. If an input shift control signal IE is of "H" level, these shift registers 101 to 104 sequentially delay input pixel data supplied from an input terminal 100 to output picture data delayed by one sample. If the input shift control signal IE is of an L-level, the input pixel data is not shifted but maintains the previous value. The picture data obtained by shifting by the shift registers 101 to 104 are sent to corresponding multipliers 111 to 114.

A cubic coefficient generator 105 generates cubic coefficients $C_1$ to $C_4$ from pixel to pixel to send these cubic coefficients $C_1$ to $C_4$ to the associated multipliers 111 to 114. Thus, these multipliers 111 to 114 multiply the cubic coefficients generated by the cubic coefficient generator 105 with the input pixel data shifted by the shift registers 101 to 104. The products obtained by the multipliers 111 to 114 are summed together by an adder 107 so as to enter a first-in first-out memory (FIFO memory) 108. A one-dimensional pixel memory, such as a line memory, may be used in place of this FIFO memory.

The FIFO memory 108 is provided for outputting pixel data in a skipping fashion in case of contracting conversion for the number of pixels. In the case of the contracting conversion for the number of pixels, the FIFO memory skips pixel data based on an output skip pixel control signal SC supplied from the controller 106 to output the thinned-out pixel data to an output terminal 109. In the case of the enlarging conversion for the number of pixels, the FIFO memory 108 simply operates as a FIFO memory and thus operates simply as a delay device.

The controller 106 generates an output skip pixel control signal SC for the FIFO memory 108 as an output port memory and an input shift control signal IE for the shift registers 101 to 104 and performs timing control for the cubic coefficient generator 105 based on the conversion ratio for enlarging conversion processing or contracting conversion of the number of pixels.

Figure 5:
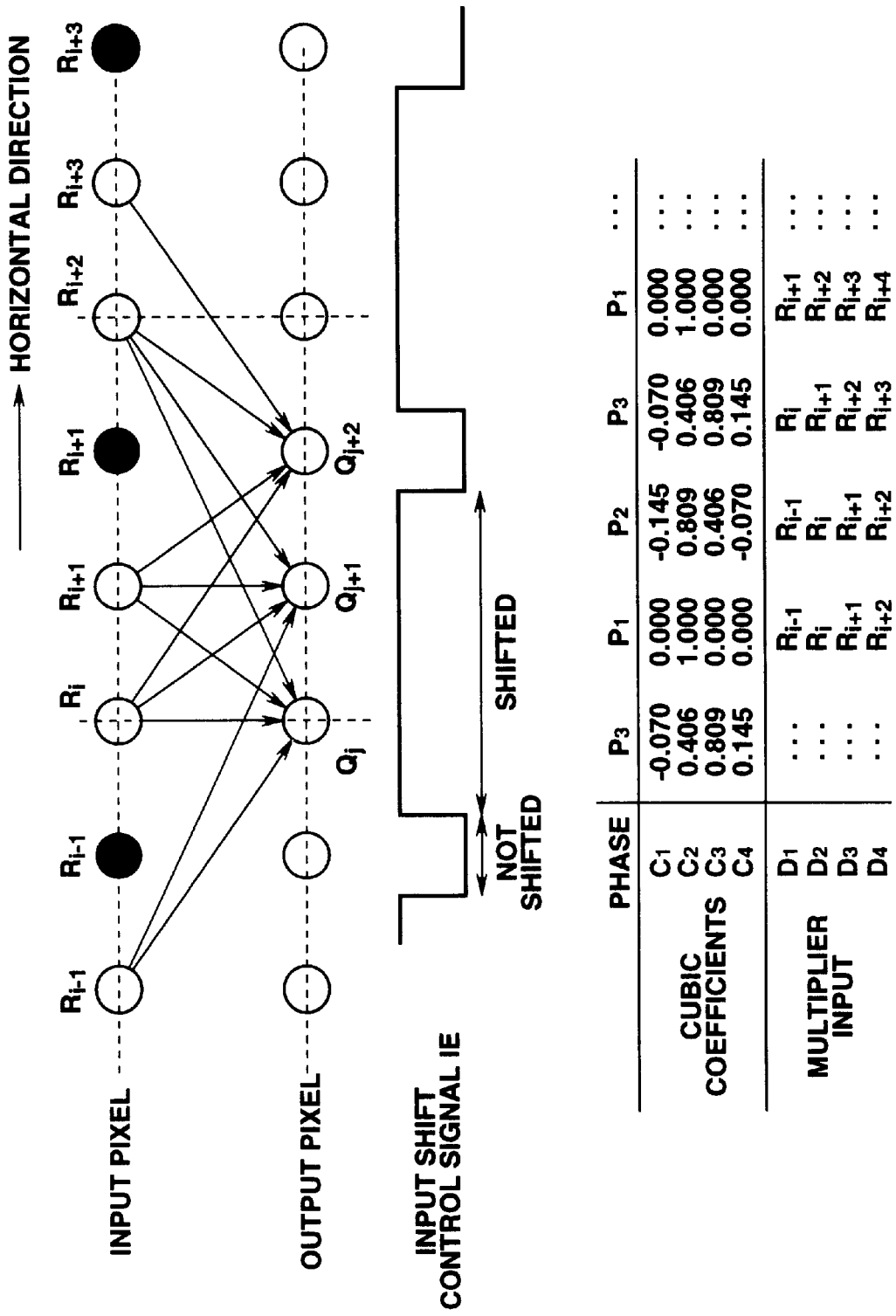
FIG. 5 illustrates the operation of the enlarging conversion of the number of pixels by 2:3 in the pixel number conversion device by a hardware structure.

FIG. 5 shows the relation between the pixel array and the cubic coefficients $C_1$, $C_2$, $C_3$ and $C_4$ at the time of 2:3 enlarging conversion of the number of pixels in the hardware configuration of FIG. 4. In carrying out the 2:3 enlarging conversion of the number of pixels, the operation of shifting three input pixel data by the input shift control signal IE without shifting directly previous pixel data is repeated. Input data $D_1$, $D_2$, $D_3$ and $D_4$ to the multipliers 111 to 114 of FIG. 4 are as multiplier inputs $D_1$, $D_2$, $D_3$ and $D_4$ shown in FIG. 40. The inputs to these multipliers are convolved with the cubic coefficients $C_1$ to $C_4$, as shown by the following equation (8):

$$Q = C_1 * D_1 + C_2 * D_2 + C_3 * D_3 + C_4 * D_4 \quad (8)$$

in order to obtain desired results.

Although an example of 3:3 enlarging pixel number conversion has been shown above, the principle of conversion remains the same for an arbitrary enlarging ratio, so that the corresponding description is not made for simplicity.

Figure 6:
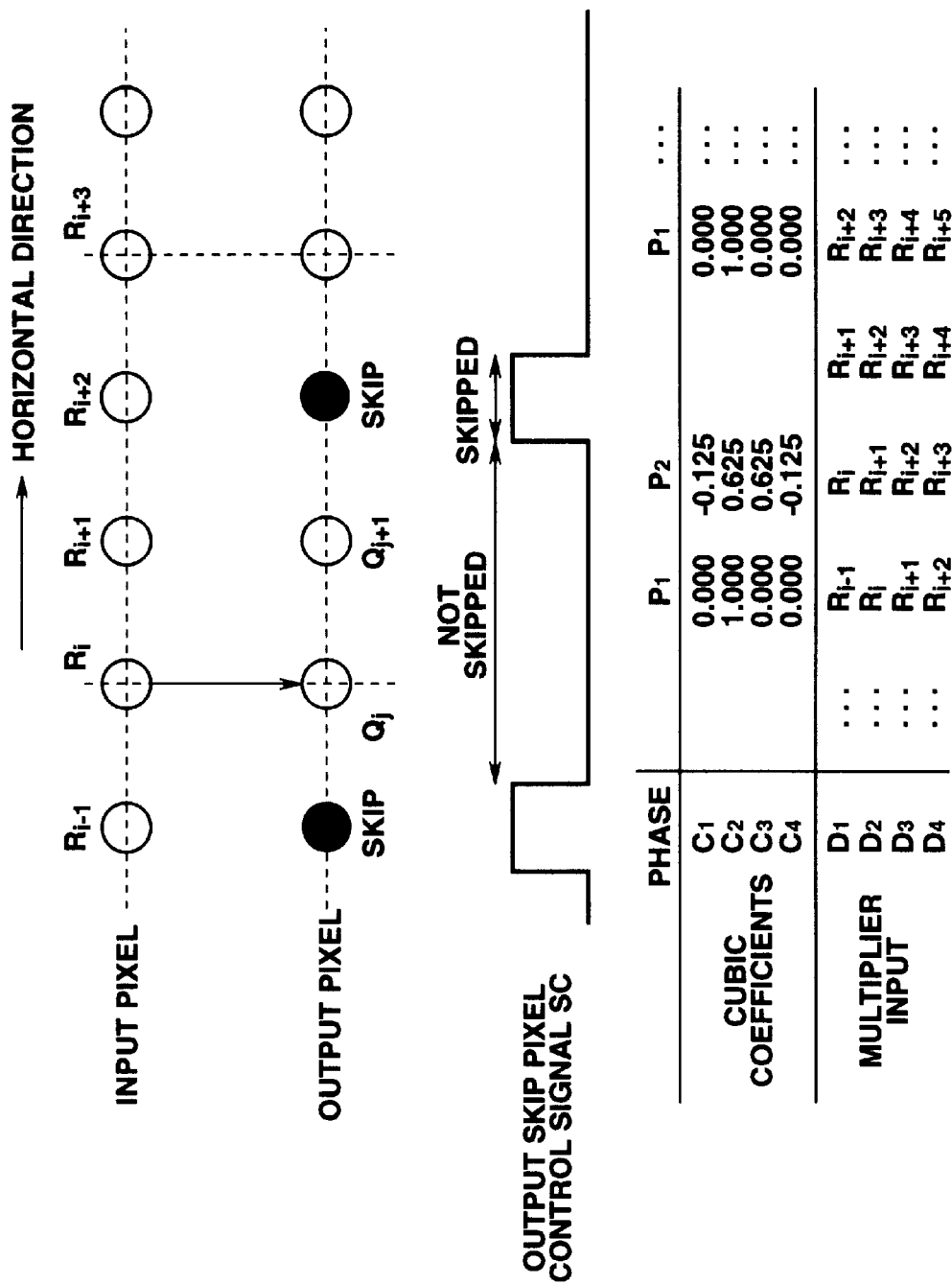
FIG. 6 illustrates the operation of the contracting conversion of the number of pixels by 3:2 in the pixel number conversion device by a hardware structure.

FIG. 6 shows the relation between the pixel array and the cubic coefficients $C_1$ to $C_4$ at the time of 3:2 contracting pixel number conversion in the hardware configuration of FIG. 4, in which Skip denotes a skipped output pixel. In the case of the contracting pixel number conversion, in distinction from the enlarging pixel number conversion, as described above, the input shift control signal IE is perpetually at an 'L' level. Since the input pixel data are directly entered at the registers 101 to 104, input data $D_1$ to $D_4$ at the multipliers 111 to 114 are multiplier inputs $D_1$ to $D_4$ shown in FIG. 6. These input data are convolved with the cubic coefficients $C_1$ to $C_4$ in accordance with the equation (8) to obtain desired results. However, in the case of the 3:2 contracting conversion of the number of pixels, an input one pixel becomes unnecessary for three output pixels. Therefore, the unneeded pixel is skipped by controlling the writing in the FIFO memory 108. A control signal used for this purpose is an output skip pixel control signal SC shown in FIG. 41. That is, this output skip pixel control signal SC is a signal for controlling the FIFO memory 108 so that a pixel is or is not skipped for the 'H' level or the 'L' level, respectively.

Although an example of 3:2 contracting conversion of the number of pixels has been described above, the principle of conversion remains the same for an optional contraction ratio but only the timing control differs. Therefore, the description for this case is not made to avoid redundancy.

Similarly to the conversion of the number of pixels, the conversion of the number of scanning lines will now be explained schematically.

For conversion of the number of scanning lines, the same concept as that for conversion of the number of pixels can be applied provided that the scanning lines are substituted for the pixels. Specifically, the conversion of the number of scanning lines is the processing of increasing or decreasing the number of output lines relative to the number of input lines during each vertical scanning period. If, when the number of input lines is equal to that of output lines, the number of lines is increased or decreased, the operation is the operation of increasing an input picture in the vertical direction (an operation of enlarging conversion of the number of lines) or the operation of decreasing an input picture in the vertical direction (an operation of contracting conversion of the number of lines), respectively.

There are a variety of the interpolation methods, as in the case of conversion of the number of pixels. Of these, an interpolation method employing a cubic interpolation function that can give high picture quality is explained.

First, the principle of 2:3 enlarging conversion of the number of lines of creating three output lines for two input lines, is explained.

Figure 7:
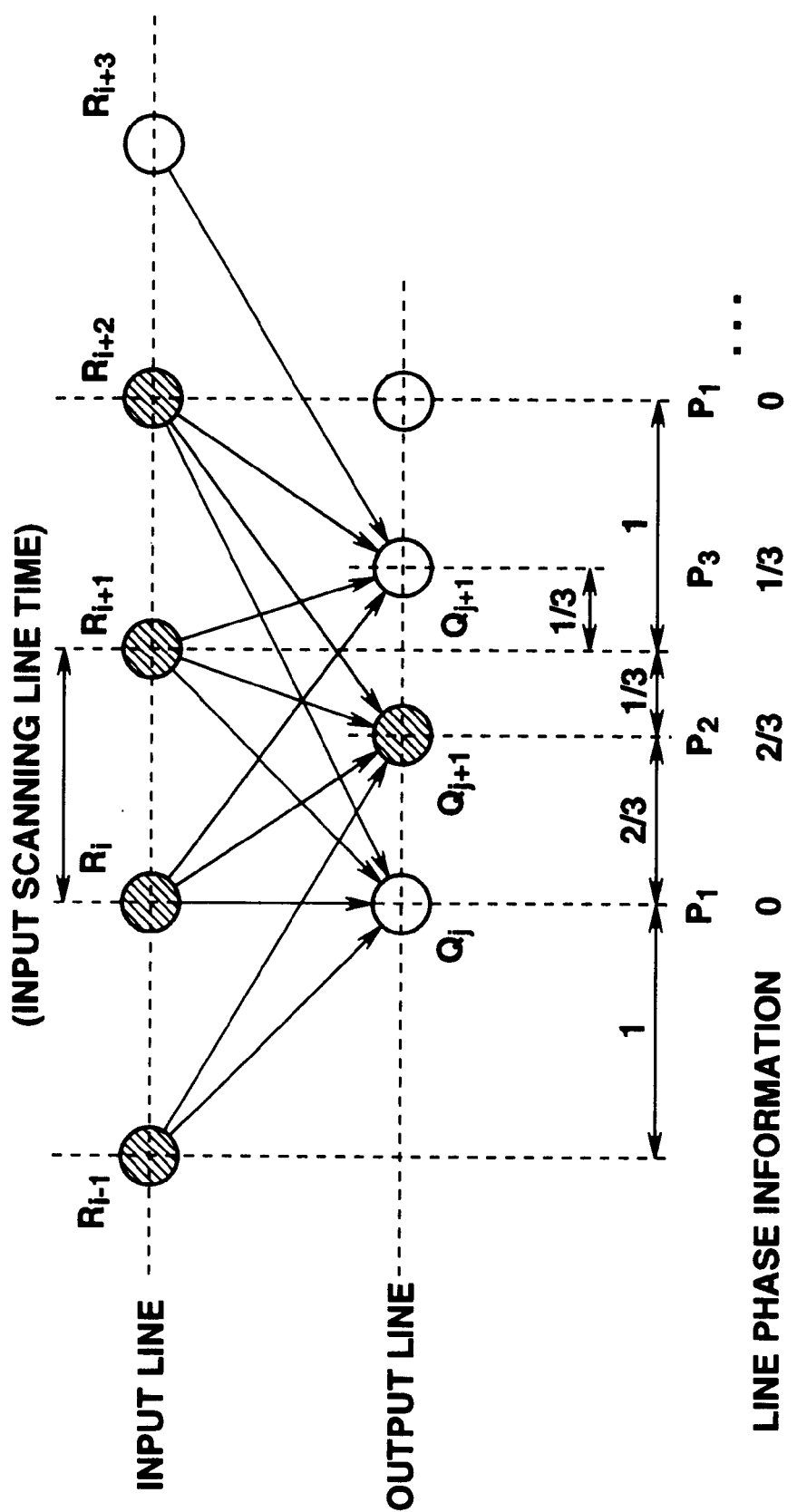
FIG. 7 illustrates the principle of enlarging conversion of the number of lines by 2:3.

FIG. 7 illustrates the principle of the 2:3 enlarging conversion of the number of lines. In this figure, the values of the input lines are denoted by $R_{i-1}$, $R_i$, $R_{i+1}$, $R_{i+2}$, $R_{i+3}$, ..., while the values of the output lines are denoted by $Q_j$, $Q_{j+1}$, $Q_{j+2}$, $Q_{j+3}$, .... In FIG. 7, $P_1$, $P_2$, $P_1$, ..., denote phase deviation (line phase information) between the input and output lines.

In the 3:2 enlarging conversion of the number of lines, three output lines are created for two input lines, as shown in FIG. 7. The relation between the input line and the output line is such that the value of an output line is calculated from a near-by input line. There exist a variety of interpolation methods depending on, for example, which range should be used as the near-by range for generating the output line or which values of coefficients should be used in calculating the output line by interpolation from the input line. In the following explanation, the cubic interpolation of interpolation from a range of four points (four lines) as the near-by range is taken as an example.

In the case of the enlarging conversion of the number of lines, an interpolation value of each output line is represented by the convolution of the four input lines and the cubic coefficients. The interpolation values of the output lines can be represented as shown by the following equation (9):

$$Q_j = \text{Cub}(x11)*R_{i-1} + \text{Cub}(x12)*R_i + \text{Cub}(x13)*R_{i+1} + \text{Cub}(x14)*R_{i+2}$$
$$Q_{j+1} = \text{Cub}(x21)*R_{i-1} + \text{Cub}(x22)*R_i + \text{Cub}(x23)*R_{i+1} + \text{Cub}(x24)*R_{i+2}$$
$$Q_{j+2} = \text{Cub}(x31)*R_{i-1} + \text{Cub}(x32)*R_{i+2} + \text{Cub}(x33)*R_{i+2} + \text{Cub}(x34)*R_i+3 \quad (9)$$

The coefficients Cub(x) of the equation (9) are values calculated from the above cubic interpolation function, and are calculated form the phase specifying how much the output pixel to be found is deviated from the input pixel. For example, in the case of the enlarging conversion of the number of pixels by 2:3 shown in FIG. 7, the phase of the output pixel of $Q_j$ is coincident with the phase of the near-by input pixel, such as an input pixel of $R_i$. Thus, the phase information $P_1$ thereof becomes equal to zero. Similarly, the phase of the output pixel of $Q_{j+1}$ is deviated by ⅔ from the phase of the near-by input pixel, such as the input pixel of $R_i$, so that the phase information thereof is ⅔. Thus, the phase of the output line $Q_{j+2}$ is deviated by ⅓ from the phase of the near-by input line, such as input line of $R_{i+1}$, and hence the above equation (9) can be rewritten to the following equation (10):

$$Q_j = Cub(-1)*R_{i-1} + Cub(0)*R_i + Cub(1)*R_{i+1} + Cub(2)*R_{i+2}$$

$$Q_{j+1} = Cub(-5/3)*R_{i-1} + Cub(-2/3)*R_i + Cub(1/3)*R_{i+1} + Cub(4/3)*R_{i+2}$$

$$Q_{j+2} = Cub(-4/3)*R_{i-1} + Cub(-1/3)*R_i + Cub(2/3)*R_{i+1} + Cub(5/3)*R_{i+3} \quad (10)$$

Since $Cub(x)$ and $R_{i-1}$, $R_{i+1}$, and $R_{i+2}$ of the input pixel are of known values, interpolation data of respective output lines can be calculated from this equation (10). For example, since $Cub(-1)=0$, $Cub(0)=1$, $Cub(1)=0$ and $Cub(2)=0$, the output pixel of $Q_j$ is:

$$Q_j = 0*R_{i-1} + 1*R_i + 0*R_{i+1} + 0*R_{i+2} = R_i \quad (4)$$

such that the output line of $Q_j$ is no other than the value of the input line.

Although the case of the enlarging conversion of the number of lines by 2:3 has been taken as an example, the same holds for an arbitrary enlarging ratio. If only the phase of the output line is known, it suffices if the coefficients of the cubic function are found from the phase thus found from the equation (1) and to execute convolution of the coefficients with four input lines in the vicinity of the interpolation line.

The principle of 3:2 reducing conversion of the number of lines of creating two output lines from three input lines is hereinafter explained.

Figure 8:
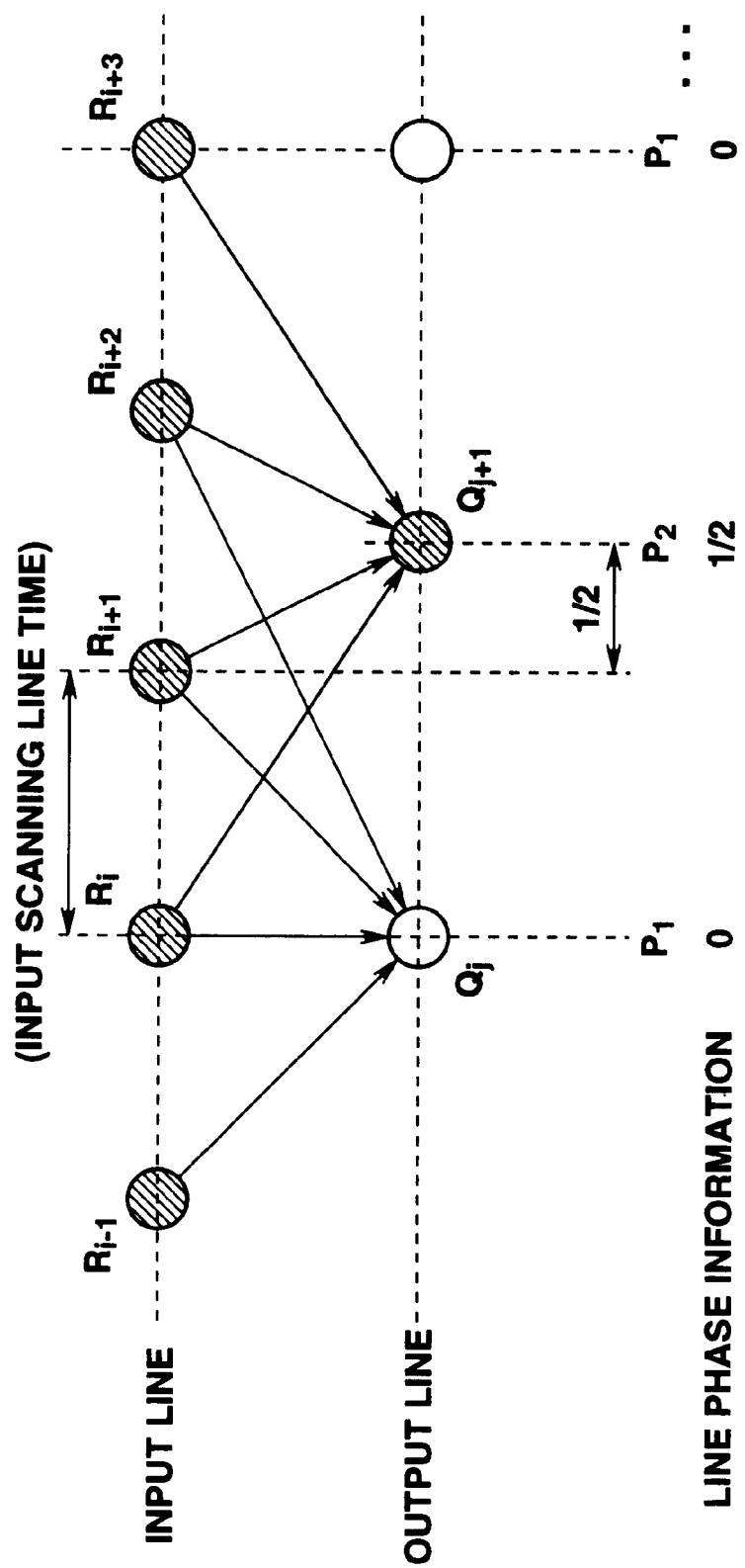
FIG. 8 illustrates the principle of contracting conversion of the lines by 3:2.

FIG. 8 illustrates the principle of 3:2 reducing conversion of the number of lines by 3:2. In this figure, the values of the input lines are set to $R_{i-1}$, $R_i$, $R_{i+1}$, $R_{i+2}$, $R_{i+3}$, ..., while the values of the output line are set to $Q_j$, $Q_{j+1}$, $Q_{j+2}$, ..., as in FIG. 7. Also, in FIG. 8, $P_1$, P2, P3, ..., similarly represent phase deviation between the input line and the output line (picture phase information).

In the 3:2 reducing conversion of the number of lines, the input line and the output line are related to each other so that the value of the output line is calculated from the value of its near-by input line. In this 3:2 reducing conversion of the number of lines, cubic interpolation of calculating an output line (interpolation line) from its four near-by input lines, as explained in the above, is taken as an example.

That is, in the case of the reducing conversion of the number of lines, an interpolation equation for an interpolated value of each output line, such as $Q_j$ or $Q_{j+1}$, is as shown by the following equation (12):

$$Q_j = Cub(x11)*R_{i-1} + Cub(x12)*R_i + Cub(x13)*R_{i+1} + Cub(x14)*R_{i+2}$$

$$Q_{j+1} = Cub(x21)*R_i + Cub(x22)*R_{i+1} + Cub(x23)*R_{i+2} + Cub(x24)*R_{i+3} \quad (12)$$

The coefficients $Cub(x)$ of the equation (12) are values calculated from the above-mentioned cubic interpolation functions, and are calculated from the phase specifying how much the output line to be found is deviated from the input line. For example, in the case of the reducing conversion of the number of lines by 3:2 shown in FIG. 8, the phase of the output line of $Q_j$ is coincident with the phase of the near-by input line, such as an input line of $R_i$. Thus, the phase information $P_1$ thereof becomes equal to zero. Similarly, the phase of the output line of $Q_{j+1}$ is deviated by ½ from the phase of the near-by input line, such as the input line of $R_{i+1}$, so that the phase information thereof is ½, and hence the above equation (12) can be rewritten to the following equation (13):

$$Q_j = Cub(-1)*R_{i-1} + Cub(0)*R_i + Cub(1)*R_{i+1} + Cub(2)*R_{i+2}$$

$$Q_{j+1} = Cub(-3/2)*R_i + Cub(-1/2)*R_{i+1} + Cub(1/2)*R_{i+2} + Cub(3/2)*R_{i+3} \quad (13)$$

Since $Cub(x)$ and the values $R_{i-1}$, $R_{i+1}$, $R_{i+2}$, ... of the input lines are known values, interpolation data of respective output lines can be computed from the above equation (13). For example, since $Cub(-1)=0$, $Cub(0)=1$, $Cub(1)=0$ and $Cub(2)=0$, the output line of $Q_j$ is:

$$Q_j = 0*R_{i-1} + 1*R_i + 0*R_{i+1} + 0*R_{i+2} = R_i \quad (14)$$

such that the output line of $Q_j$ is no other than the value of the input line.

Although the case of the reducing conversion of the number of lines by 3:2 has been taken as an example, the same holds for an arbitrary contraction ratio. If only the phase of the output line is known, it suffices if the coefficients of the cubic function are found from the phase thus found from the equation (1) and to execute convolution of the coefficients with four input lines in the vicinity of the interpolation line.

Figure 9:
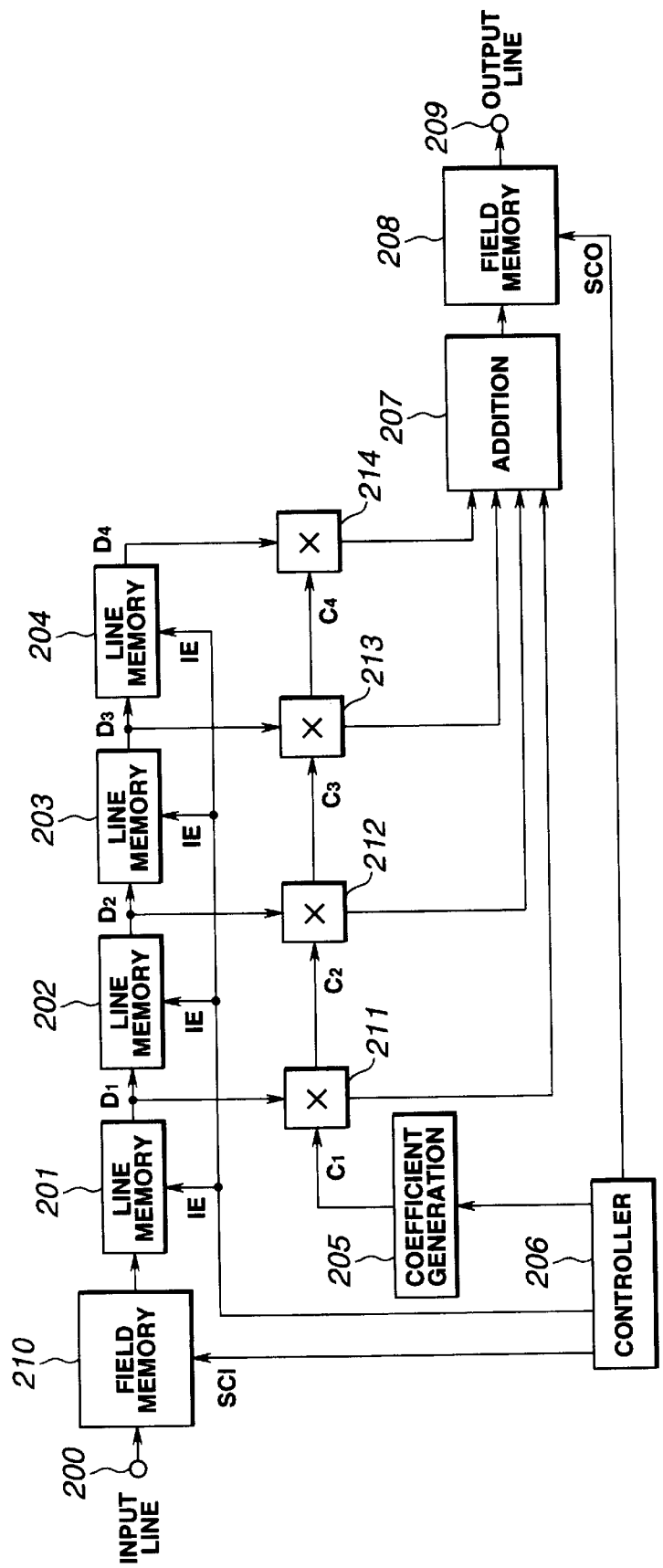
FIG. 9 is a block circuit diagram showing the hardware structure of a line number conversion device.

The above-described conversion of the number of lines is implemented by the hard-wired structure shown, for example, in FIG. 9. Meanwhile, in the conversion of the number of lines, there is no necessity of demarcating luminance signals from the chroma signals as in the case of conversion of the number of pixels, but the same circuit may be used for these signals.

In the configuration shown in FIG. 9, the serially connected line memories 201 to 204 delay data each by one scanning line and thus make up a four-stage shift register. If the input shift control signal IE is at a "H" level, the line memories 201 to 204 sequentially delay input data for the input line supplied from an input terminal 200 to output picture data delayed sequentially by one scanning line. If the input shift control signal is at an "L" level, the line memories 201 to 204 hold the line values without shifting. The picture data, obtained on line shifting by the line memories 201 to 204, are sent to associated multipliers 211 to 214.

On the other hand, the cubic coefficient generator 205 generates cubic coefficients $C_1$ to $C_4$ to send these cubic coefficients $C_1$ to $C_4$ as multiplication coefficients to associated multipliers 211 to 214, respectively. Thus, the multipliers 211 to 214 multiply the cubic coefficients generated by the cubic coefficient generator 205 with input line data line-shifted by the cubic coefficient generator 205. The products obtained by these multipliers 211 to 214 are summed by an adder 207 so as to enter a first-in first-out (FIFO) field memory 208.

This FIFO field memory 210 is provided for outputting line data required in the case of enlarging conversion of the number of lines in a skipping manner. The FIFO field memory 210 switches between holding and not holding the line value prevailing before outputting the line data, based on the input skip line control signal SCI supplied from a controller 206 in case of the enlarging conversion of the number of lines, to output the result to the line memory 201. In the case of the contracting conversion for the number of pixels, the FIFO field memory 210 operates as a FIFO memory and thus operates simply as a delay device.

This FIFO field memory 208 is provided for outputting line data required in the case of reducing conversion of the number of lines in a skipping manner. The FIFO field memory 208 switches between holding and not holding the line value prevailing before outputting the line data, based on the output skip line control signal SCO supplied from a controller 206 in case of the enlarging conversion of the number of lines, to output the result to the output terminal 209. In the case of the contracting conversion for the number of pixels, the FIFO field memory 208 operates as a FIFO memory and thus operates simply as a delay device.

The controller 206 generates the output skip line control signal SCO of the FIFO field memory 208 as an output port memory and the input shift line control signal IE of the line memories 201 to 204, based on the conversion ratio for enlarging or contacting line number conversion, and performs timing control for the cubic coefficient generator 205.

Figure 10:
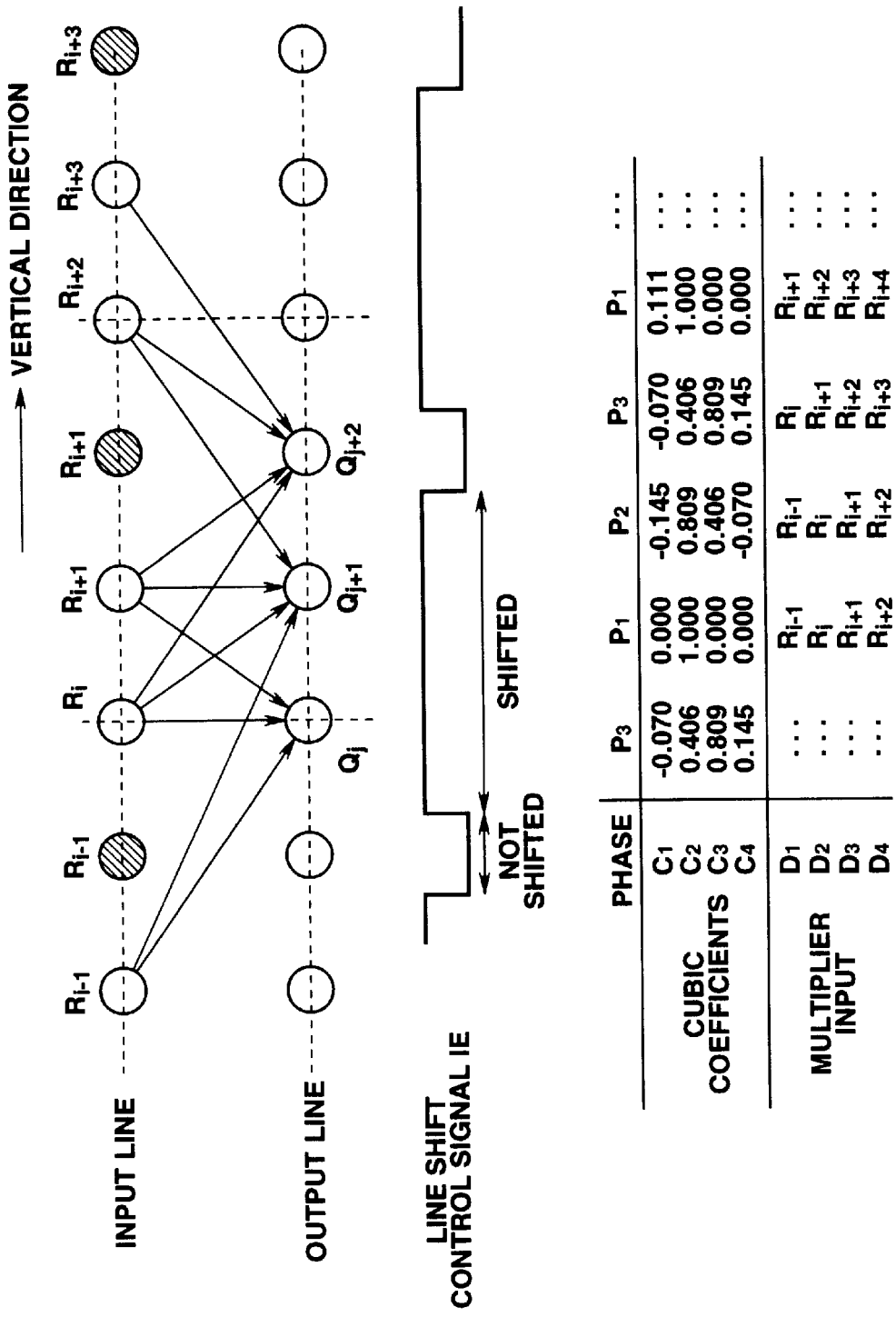
FIG. 10 illustrates the operation of the enlarging conversion of the number of lines by 2:3 in the line number conversion device by a hardware structure.

FIG. 10 shows the relation between the line array and the cubic coefficients $C_1$, $C_2$, $C_3$ and $C_4$ at the time of 2:3 enlarging conversion of the number of lines in the hardware configuration of FIG. 9. In carrying out the 2:3 enlarging conversion of the number of lines, the operation of shifting three input line data by the input shift control signal IE without shifting directly previous line data is repeated. Input data $D_1$, $D_2$, $D_3$ and $D_4$ to the multipliers 111 to 114 of FIG. 9 are as multiplier inputs $D_1$, $D_2$, $D_3$ and $D_4$ shown in FIG. 9. The inputs to these multipliers are convolved with the cubic coefficients $C_1$ to $C_4$, as shown by the following equation (15):

$$Q = C_1 * D_1 + C_2 * D_2 + C_3 * D_3 + C_4 * D_4 \tag{8}$$

in order to obtain desired results.

Although an example of 2:3 enlarging line number conversion has been shown above, the principle of conversion remains the same for an arbitrary enlarging ratio, so that the corresponding description is not made for simplicity.

Figure 11:
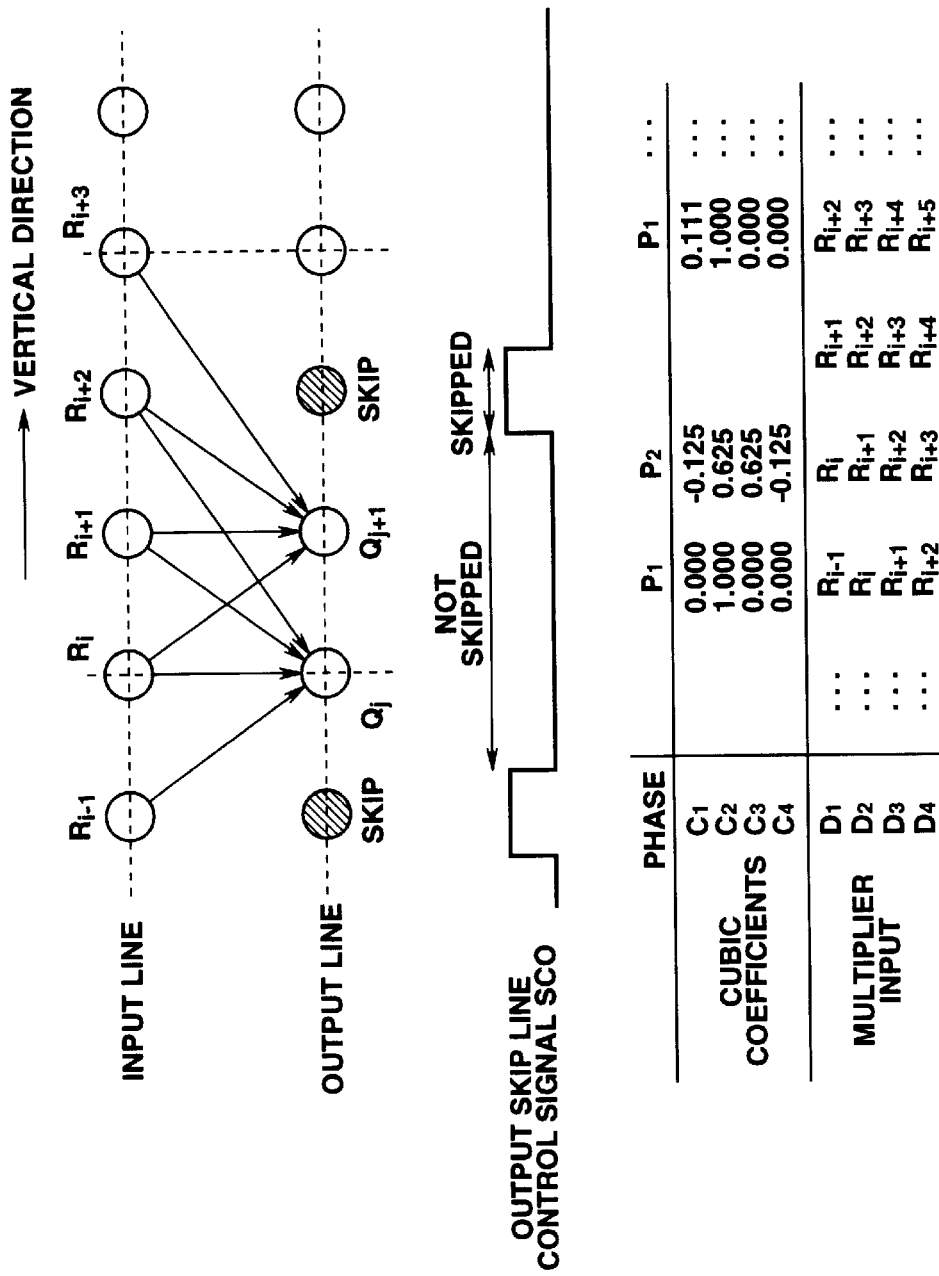
FIG. 11 illustrates the operation of the contracting conversion of the number of lines by 3:2 in the line number conversion device by a hardware structure.

FIG. 11 shows the relation between the line array and the cubic coefficients $C_1$ to $C_4$ at the time of 3:2 reducing line number conversion in the hardware configuration of FIG. 9, in which Skip denotes a skipped output line. In the case of the reducing line number conversion, in distinction from the enlarging line number conversion, described above, the input shift control signal IE is perpetually at an 'L' level. Since the input line data are directly entered at the registers 201 to 204, input data $D_1$ to $D_4$ at the multipliers 111 to 114 are multiplier inputs $D_1$ to $D_4$ shown in FIG. 11. These input data are convolved with the cubic coefficients $C_1$ to $C_4$ in accordance with the convolution equation (15) to obtain desired results. However, in the case of the 3:2 reducing conversion of the number of lines, an input one line becomes unnecessary for three output lines. Thereofre, the unneeded line is skipped by controlling the writing in the FIFO field memory 208. A control signal used for this purpose is an output skip line control signal SCO shown in FIG. 11. That is, this output skip line control signal SCO is a signal for controlling the FIFO field memory 208 so that a line is or is not skipped for the 'H' level or the 'L' level, respectively.

Although an example of 3:2 reducing conversion of the number of lines has been described above, the principle of conversion remains the same for an optional contraction ratio but only the timing control differs. Therefore, the description for this case is not made to avoid redundancy.

As described above, the conversion of the number of pixels or the conversion of the number of scanning lines is implemented using a high-speed product-sum circuit such as the above-mentioned so-called application specific integrated circuit (ASIC).

It is however practically impossible with ASIC to vary horizontal and vertical conversion on the real time basis by the above-described filter switching interpolation method which is complicated in circuit configuration.

In particular, for scanning line number conversion, an external field memory needs to be provided for storing picture signals. However, if desired to read/write only data necessary for interpolation from the field memory and to take out only the in-phase interpolation line, it is difficult to realize timing synchronization with an external memory control except at a fixed ratio.

In the above description, only the processing of the luminance signals (Y signals) of the input signals has been explained. The processing for the chroma signals (C signals) differs depending on the input format.

As digital picture signals, the so-called 4:4:4 format structure, 4:2:2 format structure and the 4:1:1 format structure are shown in FIGS. 12, 13 and 14, respectively. Since these format structures for the digital picture signals are well-known, these formats are not explained herein in detail.

In the case of the 4:4:4 format, such as the so-called $D_1$ component format signals shown in FIG. 12, since the two chroma signals R-Y(Cr) signal and B-Y(Cb) are of the same format as the luminance signals (Y signals), these two chroma signals can be processed in the same manner as the above-mentioned luminance signals.

However, in the case of the 4:2:2 format, such as the so-called D2 component format, the input chroma signals are switched between Cr and Cb every sample, as shown in FIG. 13, so that the input chroma signals cannot be processed in the same manner as the luminance signals (Y signals).

The reason is that two chroma signals Cr and Cb in the 4:2:2 format are multiplexed so that Cr, Cb, Cr, Cb, ... occur repeatedly every sample so that Cr and Cb need to be repeated every sample both on the input side and on the output side.

However, if, in the above-described enlarging or reducing conversion of the number of pixels, a pixel is skipped by shift control for input pixel data at a shift register or by skip control of output pixel data, Cr and Cb are interchanged depending on the pixel position so that Cr and Cb are interchanged in the resulting picture. For maintaining the correct array of Cr and Cb, it suffices if a set of Cr and Cb are skipped at an input unit. However, it becomes difficult to realize coincidence of the numbers of pixels of luminance and chroma signals after conversion.

Assuming that only one of Cr and Cb is processed, only every other sample of the input Cr and Cb are present, so that, if such every other data is processed with pixel number conversion by some technique, such as skipping data at an input unit for padding, it becomes necessary to reconstruct the pixels after the pixel number conversion for matching the luminance signals (Y signals) to the pixel positions.

Thus, as a technique for simplest pixel number conversion in the 4:2:2 format, inclusive of the chroma signals, it is known to convert the 4:2:2 format into the above-mentioned 4:4:4 format and again convert the format to the 4:4:4 format at an output unit.

Also, since the 4:1:1 format, frequently used for a picture signal processing device for household use, is of a format structure shown in FIG. 14, so that the chroma signals cannot be directly handled for processing. In this case, the conventional practice has been to first convert the 4:1:1 format to the 4:2:2 format for conversion to the same format as that for the luminance signals. The conversion of the number of pixels is then carried out and, after the conversion of the number of pixels, the format is reverted to the format type for the input signal (4:2:2 format or the 4:1:1 format).

If the above-described pixel number conversion is realized by a hard-wired configuration, such as ACSI described above, the circuit scale is at least thrice that for the pixel number conversion configuration for the luminance signals for coping with all of possible chroma formats, namely the 4:4:4 format, 4:2:2 format or the 4:1:1 format. Thus, if the above-described pixel number conversion is implemented by the ASCI described above, there is no alternative but to use a system of switching between a fixed conversion ratio and a few conversion ratios at most, because of limitation on the practical circuit scale, thus significantly reducing the degree of freedom in pixel number conversion.

An embodiment of the present invention possible overcoming the above-mentioned problem is hereinafter explained.

In the present embodiment of the picture signal processing device, the digital signal processing is realized by a software program, using a digital signal processor, instead of by the hard-wired configuration, as exemplified by the above-mentioned ASIC, for overcoming the problem inherent in the digital signal processing for pixel number or scanning line number conversion by the above-mentioned hardware configuration.

By carrying out digital signal processing by the software program, changes in design parameters can be coped with flexibly, such that various different signal processing operations can be selected n switching and executed simply on rewriting the software program. If the design parameters are changed, there is no necessity of changing the hardware, thus significantly reducing the time-axis transform system (TAT) period.

The basic internal structure and the basic operation of a linear array type multi-parallel processor, as a DSP for executing the pixel number conversion and the scanning line number conversion by a software program, is hereinafter explained.

Figure 16:
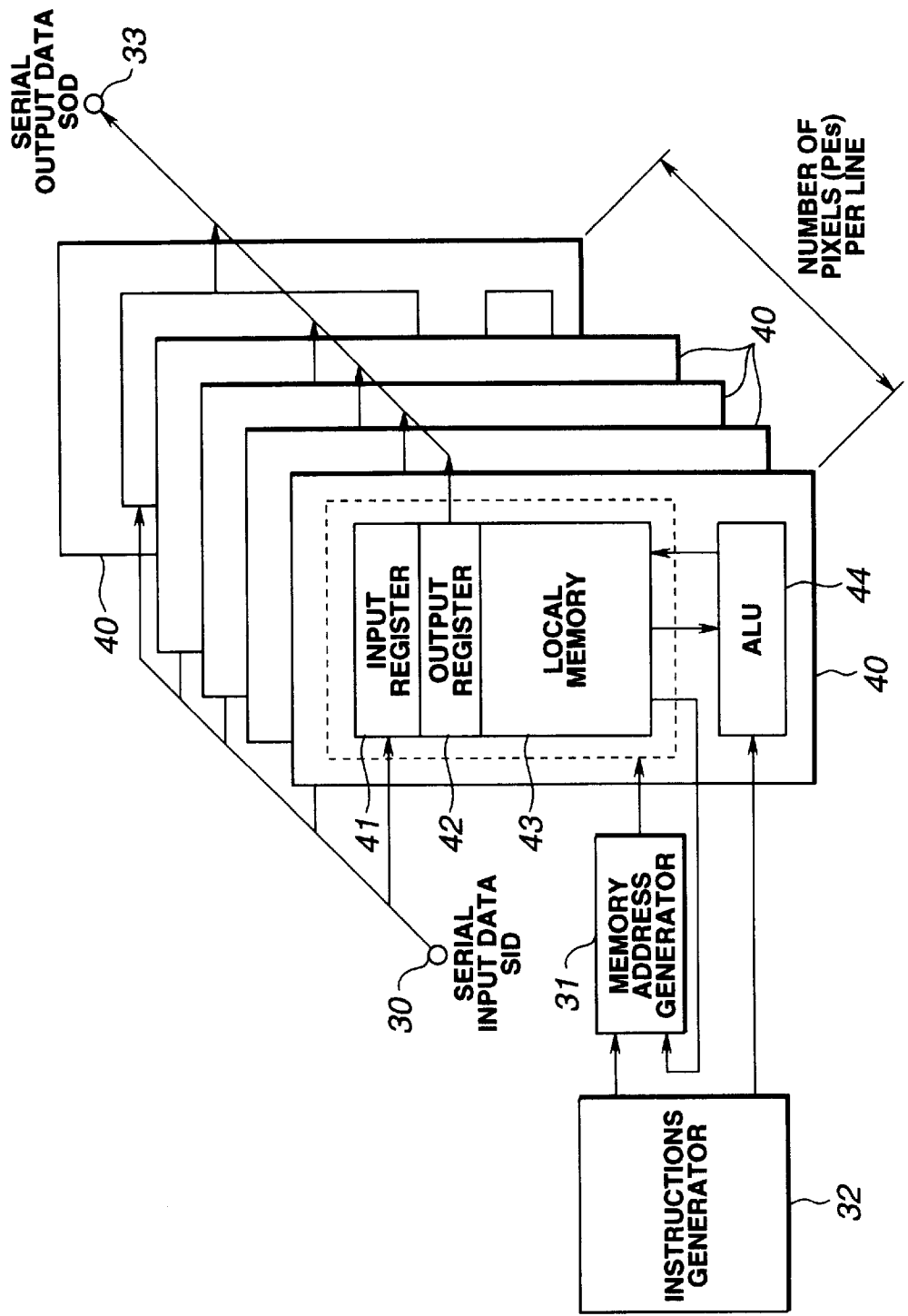
FIG. 16 is a block circuit diagram showing the basic structure of a linear array type multi-parallel processor.

The linear array type multi-parallel processor includes a number of element processors 40, each associated with a pixel of an input picture, in a one-dimensional pattern to cover a scanning line, for processing the pixels in parallel from one scanning line to another, as shown in FIG. 16.

Referring to FIG. 16, serial input data SID, as time-domain input picture data supplied to an input terminal 30, are entered to an input register 41 of each element processor 40, and thence routed to a local memory 43 designed for transient data storage. A memory address generator 31, generating memory addresses for the local memory 43, and an instruction generator 32, perform common control for all of the element processors 40, that is a so-called single instruction multiple data stream (SIMD) control.

In this manner, data taken into the DSP undergo the same processing by all of the element processors 40 corresponding to one scanning line. Specifically, the data transferred to the local memory 43 of each element processor 40 undergoes arithmetic-logical operations necessary for interpolation by data exchange with an arithmetic-logic unit (ALU) 44 before being routed to an output register 42 for being ultimately outputted at each output register 42 of the element processor 40. This outputs interpolated pixel data for one scanning line from the DSP as output pixel data (serial output data SOD).

On the other hand, each element processor 40 is associated with each pixel of a scanning line and is adapted for accessing data in the local memory 43 of each of left and right neighboring elementary processors 40 neighboring the firstly stated elementary processor 40 (element processors 10 under consideration). By having such a structure, the DSP can load near-by data, that is left-side and right-side data, on pixel data written in the local memory 43 of each element processor 40 for making up a scanning line. By arithmetic-logical processing on these data exchanged with the ALU 44 of each element processor 40, the DSP constitutes a so-called finite impulse response (FIR) filter for the horizontal direction.

It is also possible with DSP to discretely store pixel data for one scanning line in the local memories of the element processors 40 such that pixel data can be stored in every second element processor 40 at the time of entering the pixel data. It is similarly possible with the DSP to discretely output pixel data corresponding on the whole to one scanning line, stored in the local memories 40 of the element processors 40.

The pixel number conversion and the scanning line number conversion can be realized simultaneously in the DSP. Basically, the pixel number conversion and the scanning line number conversion represent different processing operations, and can be conceptualized separately. Specifically, the pixel number conversion can precede the scanning line number conversion or vice versa. Of course, the pixel number conversion and the scanning line number conversion can be carried out simultaneously. In the following explanation, the processing for pixel number conversion is carried out independently of that for the scanning line number conversion. First, the processing for the conversion of the number of pixels for the luminance signals and the chroma signals is explained.

In the linear array type multi-parallel processor, performing the above-described SIMD control, the technique of realizing the processing for pixel number conversion with an optional conversion ratio of not less than two or not more than ½ and the technique of realizing pixel number conversion in the chroma signals of various formats not possible in the above-mentioned hard-wired structure, are explained. Although the structure of FIG. 17 is basically SIMD controlled as in FIG. 16, only main portions are shown in FIG. 17 for simplicity.

The technique of implementing the pixel number conversion at an optional ratio is explained.

Figure 17:
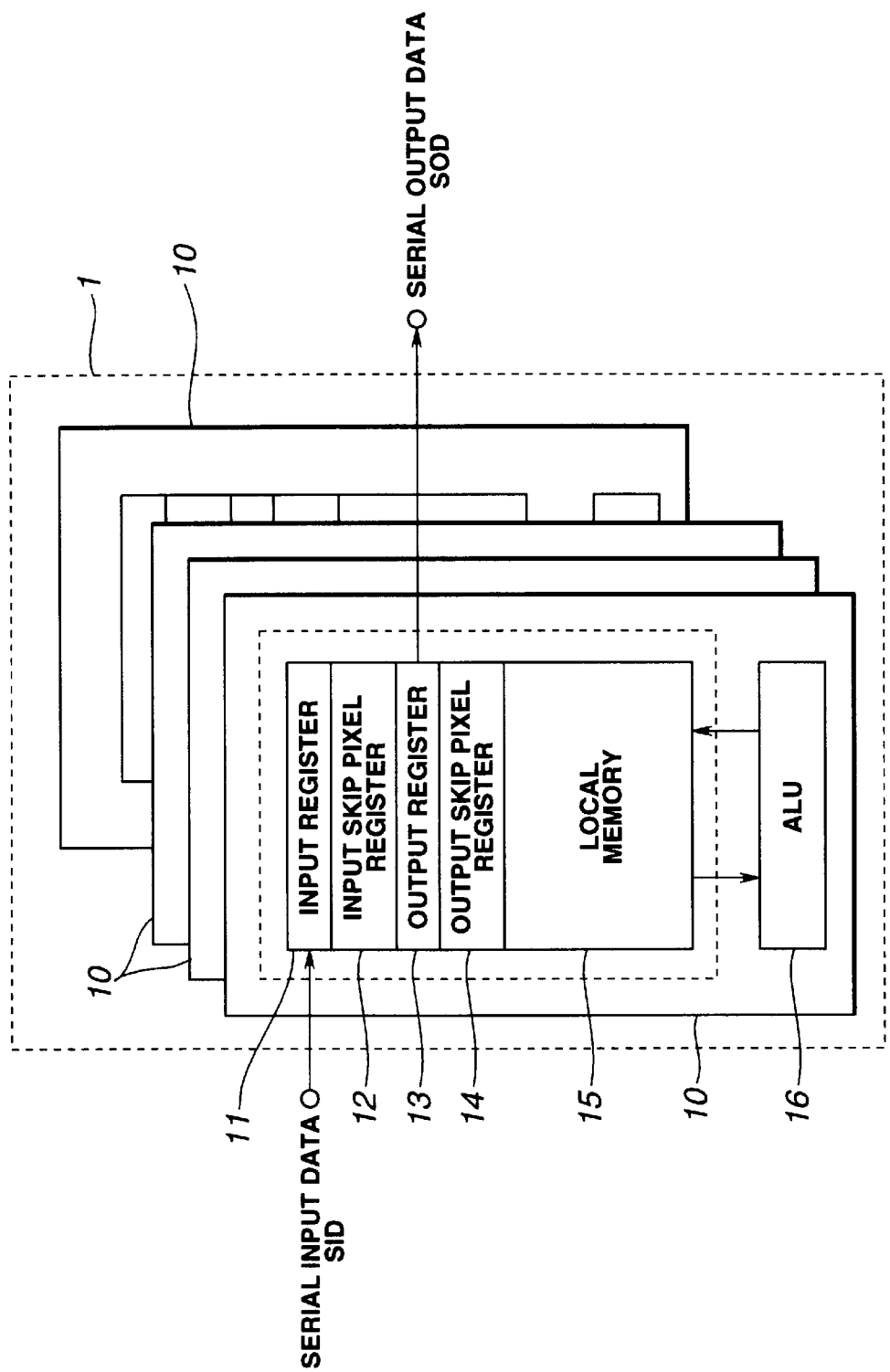
FIG. 17 is a schematic block circuit diagram showing a linear array type multi-parallel processor embodying the present invention.

In the linear array type multi-parallel processor embodying the present invention, shown in FIG. 17, each element processor 10 includes, as main components, an input register 11 and an output register 13, as described above, an input skip register 12 and an output skip register 14, a local memory 15 having a working area, and an arithmetic-logic unit (ALU) 16 for exchanging data with the local memory 15 or the local memory 15 of a neighboring element processor 10 for executing necessary calculations (filter calculations). Each element processor 10 corresponds to an input pixel. A number of these element processors 10 corresponding to a scanning line are arrayed one-dimensionally. The linear array type multi-parallel processor 1 processes the element processors 10 in parallel on the scanning line basis.

The internal structure of the processor 1 shown in FIG. 17 is substantially the same as that shown in FIG. 16 and hence the explanation on the various functions thereof is omitted. The configuration of FIG. 17 shows two elements, namely the input skip register 12 and an output skip register 14, in distinction from the configuration of FIG. 16. The operation of the input skip register 12 and the output skip register 14 will hereinafter be explained in connection with other components.

In the linear array type multi-parallel processor 1, shown in FIG. 17, each element processor 10 can discretely or continuously store or output one scanning line of input pixel data.

In the element processor 10 of the linear array type multi-parallel processor 1, if desired to input or output pixel data discretely, that is in a skip fashion, it suffices to allocate to the input or output side of the element processor 10 the pixel skip information specifying skip and non-skip by, for example, "1" and "0", respectively. In the processor of the instant embodiment, the input skip register 12 and the output skip register 14 are provided on the input side and on the output side, respectively, as storage means for storing the 1-bit pixel skip information, in order for the 1-bit pixel skip information to be allocated to the input and output sides of each element processor 10. If the pixel skip information is pre-stored in the input skip register 12 and in the output skip register 14, it becomes possible to set whether or not a pixel is skipped at the input or output time for each element processor 10. That is, each element processor 10 can refer to the pixel skip information pre-stored in the input skip register 12 and in the output skip register 14 to decide whether or not the input pixel data or the output pixel data should be skipped.

More specifically, the pixel skip information stored in the input skip register 12 is the information for skipping pixel data at the time of enlarging conversion processing for the number of pixels. For the enlarging conversion processing for the number of pixels, an input register 11 of each element processor 10 discretely stores the supplied input pixel data based on the pixel skip information to transfer the stored input pixel data to the local memory 15. For the enlarging conversion processing for the number of pixels, the input register 11 of each element processor 10 stores the input pixel data if the pixel skip information is "0", while it does not store, that is skips, the input pixel data or alternatively stores dummy data not having a specified value, if the pixel skip information is "1". Meanwhile, the pixel skip information stored in the output skip register 14 at the time of the enlarging conversion processing for the number of pixels becomes all "0", such that the output register 13 directly, that is continuously, outputs the pixel data.

On the other hand, the pixel skip information stored in the output skip register 14 is the information for skipping pixel data at the time of reducing conversion processing for the number of pixels. For the reducing conversion processing for the number of pixels, an output register 13 of each element processor 10 discretely stores the supplied input pixel data based on the pixel skip information to output the stored input pixel data. That is, for the reducing conversion processing for the number of pixels, the output register 13 of each element processor 10 stores the input pixel data if the pixel skip information is "0", while it does not store, that is skips, the input pixel data, if the pixel skip information is "1". Meanwhile, the pixel skip information stored in the input skip register 12 at the time of the reducing conversion processing for the number of pixels becomes all "0", such that the output register 13 directly, that is continuously, transfers the input pixel data to the local memory 15.

It should be noted that each element processor 10 is associated with each pixel of a scanning line, such that each element processor 10 can access not only data stored in its local memory 15 but also data stored in the local memory 15 of left and right side element processors 10. By this structure, the entire element processors 10 of the linear array type multi-parallel processor 1 can simultaneously load data stored in the local memories 15 of the left and right side element processors 10, thus allowing the ALU 16 of each element processor 10 to realize FIR filter processing as later explained, for example, with the aid of these data. The pixel data generated by the filtering processing by the ALU 16 is again stored in the original local memories 15.

It should also be noted that, by the SIMD control typical of the linear array type multi-parallel processor 1, all of the element processors 10 corresponding to a scanning line perform the same processing. That is, although not shown in FIG. 17, the instruction generator 32 generating command codes for the ALU 16 and a memory address generator 31 for generating the address data for the local memory 15 perform common control for all of the element processors 10. Meanwhile, accessing to the left and right side element processors 10 is a common operation to all of the element processors 10, by the above-mentioned SIMD control, such that accessing different from one element processor 10 to another is not possible.

The pixel data stored in the local memory 15 is routed to the output register 13 so that data corresponding to a scanning line is ultimately outputted as serial output data SOD from the output register 13.

In the case of the contracting conversion of the number of pixels, the pixel data read out from the local memory 15 is discretely stored in the output register 13, based on the pixel skip information stored in the output skip register 14. This stored pixel data is outputted from the output register 13.

The method for implementing the above-mentioned pixel number conversion employing the cubic interpolation function by the linear array type multi-parallel processor 1 shown in FIG. 17 is hereinafter explained. It should be noted that the pixel number conversion encompasses isometric conversion (1:1 conversion) in addition to the enlarging conversion processing and the contracting conversion for the number of pixels. This isometric conversion is the boundary condition between enlarging conversion and contracting conversion and can be included in one of the enlarging conversion and contracting conversion. Herein, the isometric conversion is included in the enlarging conversion.

An example of the enlarging conversion processing for the number of pixels is explained. In the enlarging conversion processing for the number of pixels, input pixel data need to be arrayed in a skipping manner depending on the conversion ratio, herein the enlarging ratio, at the time of the inputting of the pixel data.

In the present embodiment, the above-mentioned pixel skip information is used as the information for discretely arraying the input pixel data for enlarging conversion processing for the number of pixels. It should be noted that the output pixels are arrayed continuously. In the enlarging conversion processing for the number of pixels, output pixel data need to be generated by convolution of four-point input pixel data neighboring to the desired output pixel excluding pixels skipped at the input time with the four-point cubic coefficients calculated from the phase information corresponding to the respective pixels. Thus, for carrying out the enlarging conversion processing for the number of pixels, the above-mentioned pixel skip information, the phase information for each pixel, for calculating the cubic coefficients, and four-point pixel data for generating the desired output pixels, are required.

Figure 18:
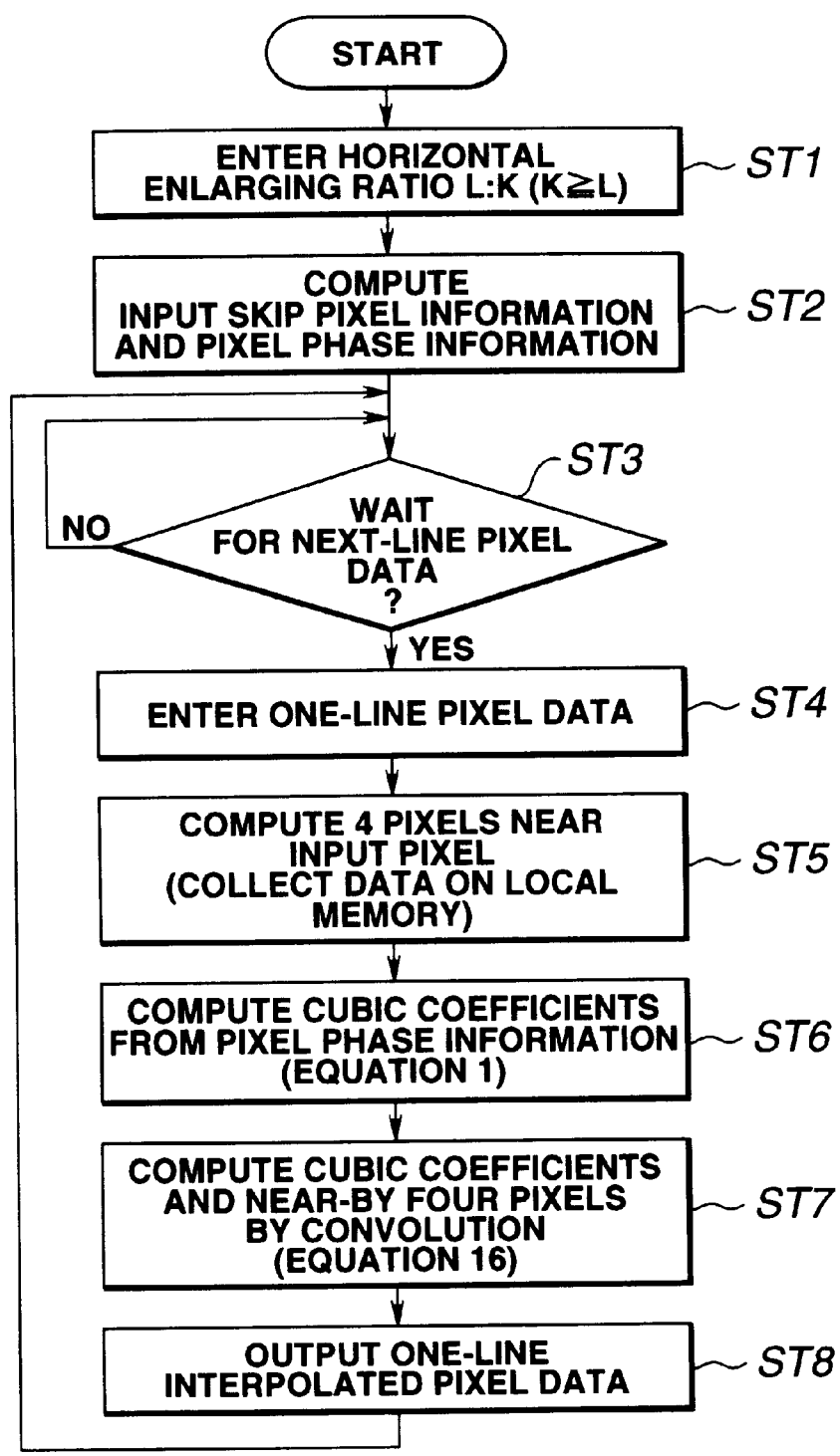
FIG. 18 is a flowchart showing the overall flow of enlarging conversion of the number of pixels for luminance signals.

FIG. 18 shows the overall flow of the enlarging conversion processing for the number of pixels. Herein, an example of enlarging the number of pixels by L:K, wherein K and L denote a positive integer, with K≧L, is shown. With K=L, the conversion is the isometric conversion.

In FIG. 18, the conversion ratio of L:K (enlarging ratio) is set at step ST1.

At the next step ST2, the pixel skip information and the phase information are calculated in all of the element processors 10. The manner of calculations of the pixel skip information and the phase information at step ST2 will be explained later in detail.

At step ST3, it is judged whether or not pixel data of the next line can be entered. This decision is repeated until the inputting of the pixel data of the next line becomes possible. If at step ST3 the inputting of the pixel data of the next line has become possible, pixel data of the next line is entered at the next step ST14.

At step ST5, input pixel data to an element processor 10 under consideration and pixel data of four element processors 10 neighboring to the element processor 10 under consideration (four near-by pixel data) are stored in the local memory of the element processor 10 under consideration. The processing at step ST5 will be explained later in detail.

At step ST6, the cubic coefficients are calculated from the phase information. That is, calculations of the equation (1) are carried out.

At step ST7, the cubic coefficients as found at step ST6 are convolved with the four near-by pixel data. The calculations of convolution will be explained later with reference to the equation (16) in detail.

At step ST8, calculations for one line are carried out to output interpolated pixel data before processing reverts to step ST3 ff.

The pixel skip information and the phase information in the above step ST2 can be calculated in advance in a pre-processor, such as a central processing unit (CPU) outside of the linear array type multi-parallel processor (DSP) and entered to the processor (DSP) via input register 11 before proceeding to convolution processing with the picture data. The pixel skip information is stored in the input skip register 12 and the output skip register 14, whilst the phase information is stored in a phase information storage register provided in the local memory 15. The pixel skip information and the phase information can be calculated in the inside of the SIMD-controlled linear array type multi-parallel processor 1 such as during the picture blanking period or on power up. That is, in case of the conversion of the number of pixels in which the conversion ratio remains constant during a scanning period without being changed with the horizontal pixel position, the pixel skip information and the phase information can be calculated easily n the processor (DSP). The overall system configuration can be simplified by having the entire processing inclusive of generation of the pixel skip information and the phase information realized in the processor (DSP). Again, the pixel skip information is stored in the input skip register 12 and the output skip register 14, whilst the phase information is stored in a phase information storage register provided in the local memory 15.

The method for calculating the pixel skip information and the phase information for the enlarging conversion processing for the number of pixels is hereinafter explained. The calculations for the pixel skip information and the phase information need not necessarily be executed simultaneously. However, there are many common calculation steps in the calculations for setting of the pixel skip information and the phase information so that these calculations are optimally rendered common calculations in connection with the resources of the register in the local memory 15 of the processor 1, program area and the number of steps for improving the processing efficiency. Herein, an illustrative algorithm for finding the pixel skip information and the phase information simultaneously is shown. These calculations are executed during the picture blanking period or on power up, as explained previously.

Figure 19:
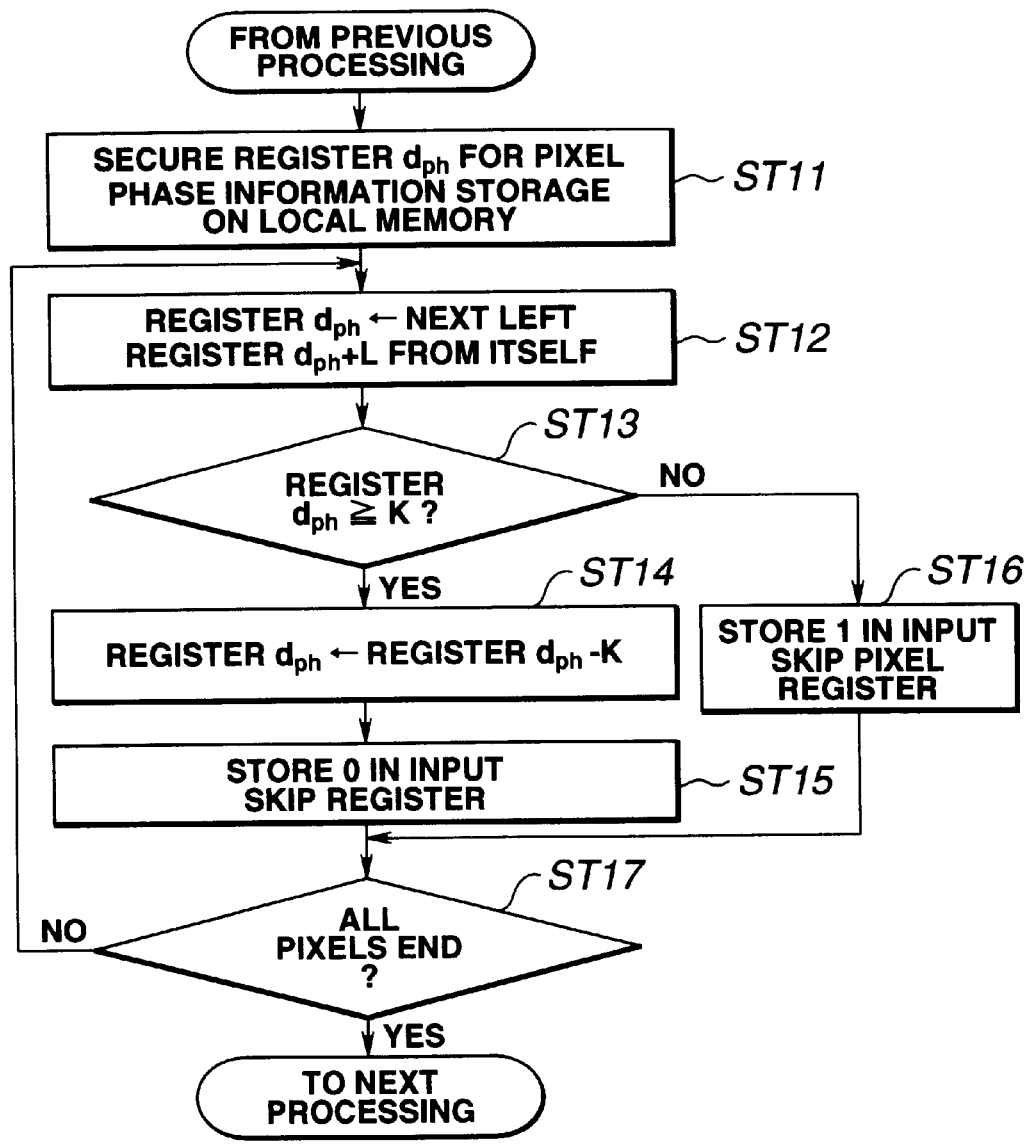
FIG. 19 is a flowchart showing the flow of calculations of the phase information and the pixel skip information of an input skip register in the enlarging conversion of the number of pixels for luminance signals.

FIG. 19 shows the sequence of calculating the pixel skip information and the phase information in the SIMD-controlled linear array type multi-parallel processor 1.

At step ST2, to which processing transfers after step ST1 of FIG. 18, the processing of steps ST11 ff shown in FIG. 19 is performed.

First, at step ST11, an area for holding the phase information in the local memory 16 (the above-mentioned phase information storage register dph) is secured.

At step St12, L is added in all element processor 10 the value (phase information) stored in the phase information storage registers dph of the local memories 15 of the next left element processors 10. The resulting values are stored in the phase information storage registers dph of the local memories of the element processors 10 under consideration.

At the next step ST13, it is judged whether or not the value stored in the phase information storage registers dph after addition of L exceeds the value K. If the stored value is found at step ST13 to exceed the value K, processing transfers to step ST14. If the stored value is found not to exceed the value K, processing transfers to step ST16.

At step ST14, K is subtracted from the value stored in the phase information storage register dph to store the resulting value again in the phase information storage register dph. At the next step ST15, "0" is stored in the input skip register 12. That is, the pixel data entered to the element processor 10 is directly entered without skipping.

At the step ST16, to which processing transfers when the value stored in the phase information storage register dph is judged to be less than the value K, "1" is stored in the input skip register 11. That is, every other pixel data entering the element processor 10 is skipped as it is inputted.

After the steps ST15 and ST16, processing transfers to step ST17. At this step ST17, it is judged whether or not the above processing has come to a close for one-line pixels the number of which is at least larger than that of the entire pixels. If the processing is judged to have not come to a close, processing reverts to step ST12 to repeat the above processing. If the processing is judged to have come to a close, processing reverts to the next processing, that is to step ST3 of FIG. 18.

It should be noted that, in the algorithm shown in FIG. 19, the element processors 10 performs the processing of storing the values stored in the phase information storage registers dph of the left side element processors 10 of the element processors 10 under consideration. However, the leftmost element processor 10 has no left side neighboring element processor 10 so that its value remains unfixed. Thus, "0" is stored at all times in the phase information storage register dph of the leftmost element processor 10.

Figure 20:
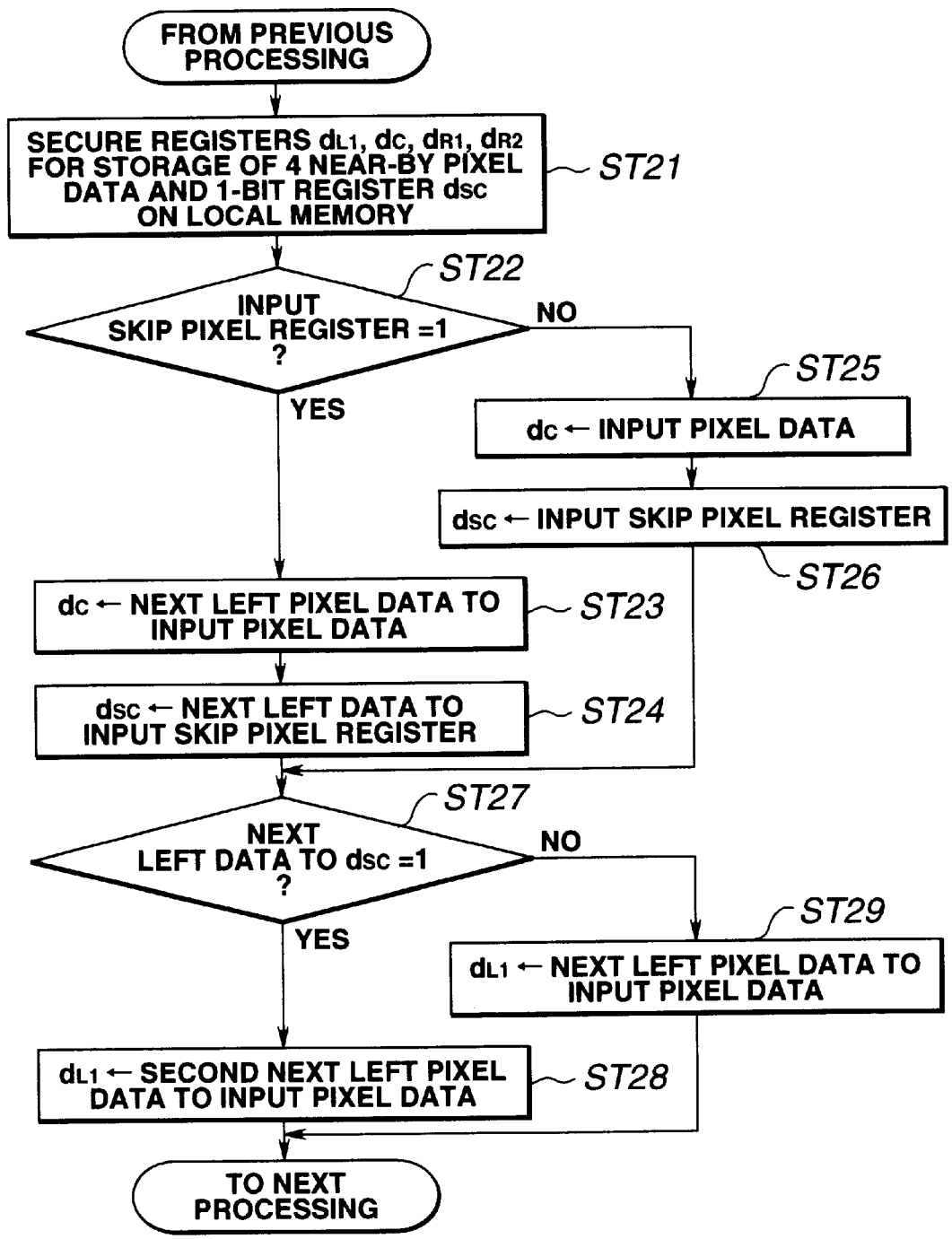
FIG. 20 is a flowchart showing the flow of a former portion of calculations of four near-by pixels of an input pixel in the enlarging conversion of the number of pixels for luminance signals.
Figure 21:
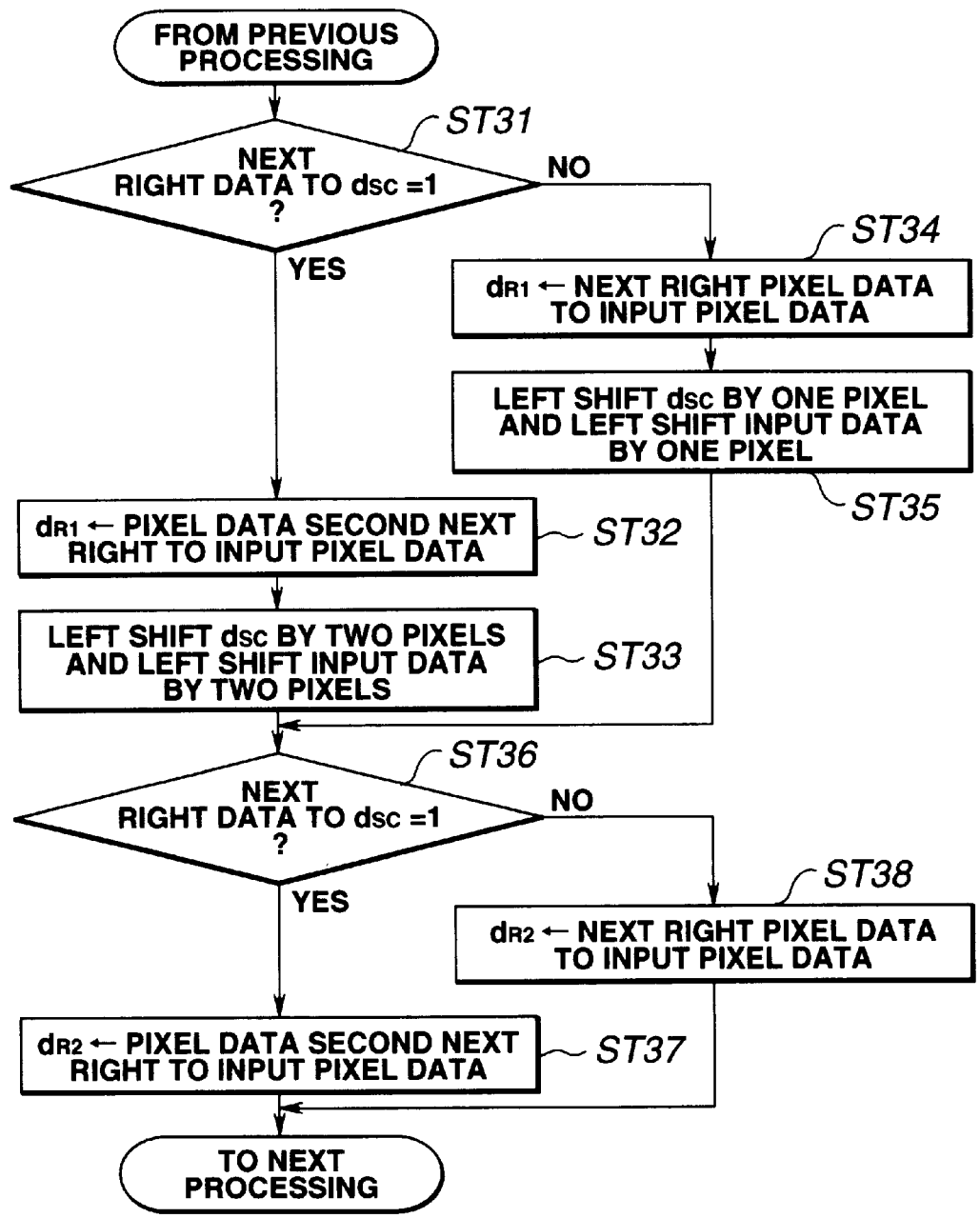
FIG. 21 is a flowchart showing the flow of a latter portion of calculations of four near-by pixels of an input pixel in the enlarging conversion of the number of pixels for luminance signals.

Next, the processing at step ST5 of the flowchart of FIG. 8, that is the sequence of operations of storing pixel data of four neighboring element processors 10, that is pixel data of four neighboring points, in the element processor 10 under consideration, is explained by referring to the flowchart of FIGS. 20 and 21.

At step ST5, to which processing transfers after step ST4 of FIG. 8, the processing as from step ST21 shown in FIG. 20 is performed. It should be noted that, as a result of processing shown in the flowchart of FIG. 19, the input pixel data entered discretely based on the pixel skip information stored in the input skip register 12 and the phase information corresponding to each pixel are stored in the local memory 19 of each element processor 10.

First, at step ST21, an area for storage of four neighboring pixel data excluding the pixel skipped at the inputting time by the four neighboring element processors 10 (registers $d_{L1}$, dc, $d_{R1}$ and $d_{R2}$) and a 1-bit register dsc are secured in each element processor 10. If the conversion ratio (enlarging ratio) is set to, for example, 1 to 2, pixel data from the next left neighboring element processor 10 from the element processor 10 under consideration is stored in the register dL1, while the pixel data from the element processor 10 under consideration is stored in the register dc. The pixel data from the second next right element processor of the element processor 10 under consideration is stored in the register dR1, while the pixel data from the second right element processor 10 of the element processor 10 under consideration 10 is stored in the register dR2. Since the pixel skip information is stored in the register disc, it is termed the skip information storage register dsc.

At the next step ST22, it is judged whether or not the pixel skip information stored in the input skip register 11 in each element processor 10 is "1". If the result is YES, processing transfers to step S23 ff and, if otherwise, processing transfers to step to step S25 ff.

If the pixel skip information stored in the input skip register 11 is found at step ST22 is found to be "1", the input pixel data of the next left neighboring element processors 10 are stored at step ST23 in the register dc of the element processor 10 under consideration. At the next step ST24, the values of the input skip registers 11 of the next left neighboring element processors 10 are stored in the skip information storage registers dsc in the local memories 15 of the element processors 10 under consideration.

If the pixel skip information stored in the input skip register 11 at step ST22 is found to be not "1", that is found to be "0", the values of the input pixel data of the element processors 10 under consideration are stored in the registers dc of the element processors 10 under consideration. At the next step ST26, the value of the input skip register 11 of the element processor 10 under consideration is stored in the skip information storage register dsc in the local memory 15 of the element processor 10 under consideration.

Next, at step ST27, it is judged whether or not the values of the registers disc (bits) of the local memories 15 of the next left neighboring element processors 10 are "1". If the result is YES, processing transfers to step S28 ff and, if otherwise, processing transfers to step to step S29 ff.

Then, at step ST27, the value of the register disc is found to be "1", the pixel data on the local memories 15 of the second left neighboring element processors 10 are stored in the registers dL1 of the local memories 15 of the element processors 10 under consideration.

If the value of the register disc is found at step ST27 to be not "1", pixel data on the local memories 15 of the next left element processors 10 are stored in the registers dL1 of the local memories 15 of the element processors 10 under consideration.

Processing then transfers to step ST31 of the flowchart of FIG. 21. At this step ST31, it is judged whether or not the values of the skip information storage registers dsc on the local memories of the next right element processors 10 (bits) are "1". If the values are found to be "1", processing transfers to step ST32 ff and, if otherwise, to step ST34 ff.

If, at step ST31, the values of the registers are found to be "1", pixel data on the local memories 15 of the second next right element processors 10 are stored in the registers dR1 of the local memories of the element processors 10 under consideration. At step ST33, the values of the registers dsc are shifted two towards left. That is, the values are shifted sequentially to the registers dsc of the second next left element processors 10.

If, at step ST31, the values of the registers are found to be not "1", pixel data on the local memories 15 of the next right element processors 10 are stored in the registers dR1 of the local memories of the element processors 10 under consideration. At step ST35, the values of the registers dsc are shifted two towards left. That is, the values are shifted sequentially to the registers dsc of the next left element processors 10.

At the next step ST36, it is judged whether or not the values of the registers dsc (bits) on the local memories 15 of the next right neighboring element processors 10 are "1". If the result is YES, processing transfers to step S137 ff and, if otherwise, processing transfers to step to step S38 ff.

If the register values are judged at step ST36 to be "1", pixel data on the local memories 15 of the second next right element processors 10 are stored at step ST37 in the registers dR2 of the local memories of the element processors 10 under consideration.

If the register values are judged at step ST36 to be not "1", pixel data on the local memories 15 of the next right element processors 10 are stored at step ST38 in the registers dR2 of the local memories of the element processors 10 under consideration.

Then, processing transfers to step ST6 of FIG. 18.

The next processing in the linear array type multi-parallel processor 1 is simply to instruct repetition of the processing of moving or not moving data by a flag, and hence the processing comes to a close with an extremely small number of steps. The enlarging ratio is limited to 1 to 2 for simplifying the concept. If the enlarging ratio is more than 2, simply the range of having communication of pixel data between neighboring element processors is increased. The corresponding explanation is omitted because the concept remains basically the same.

Figure 22:
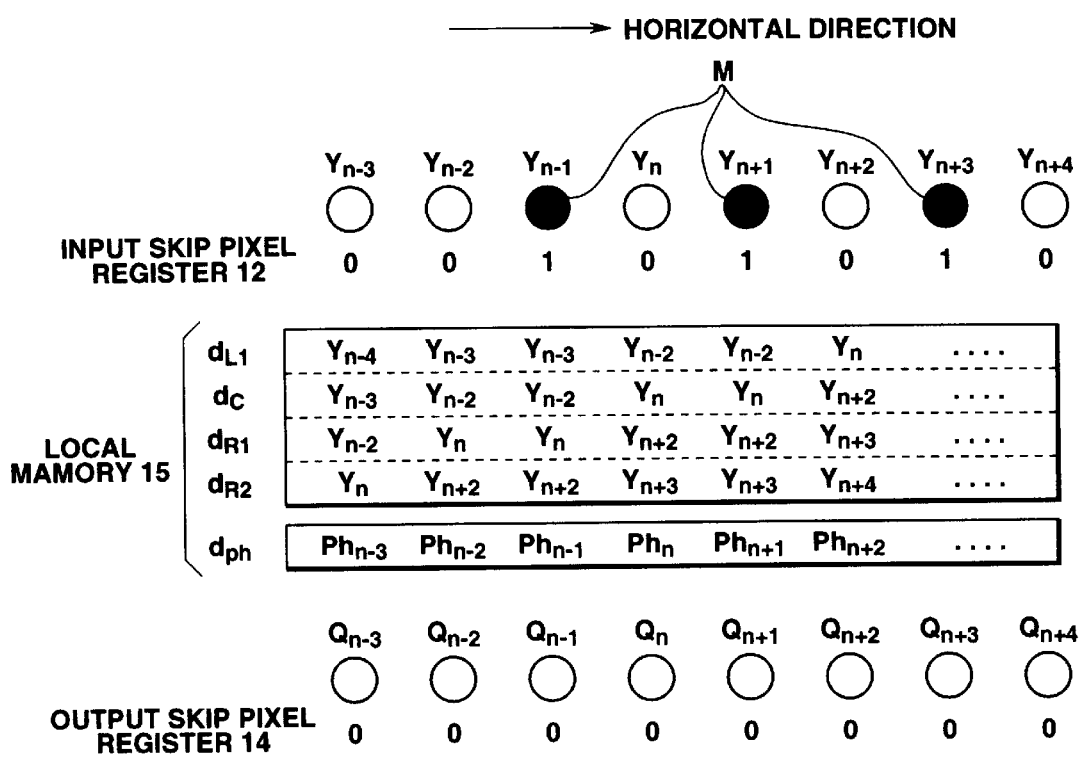
FIG. 22 illustrates the operation of the enlarging conversion of the number of pixels for luminance signals.

By carrying out the step ST2 of FIG. 18 (flowchart of FIG. 4) and the step ST5 of FIG. 18 (flowcharts of FIGS. 20 and 21), the four pixel data stored in the registers dL1, dc, dR1 and dR2 of the local memory 15 and the phase information corresponding to the pixels stored in the phase information storage register dph of the local memory 15 are related to each other in a manner shown in FIG. 22. In FIG. 22, there is also shown the pixel skip information stored separately in the input skip register 12 and in the output skip register 14. In the embodiment shown in FIG. 22, each element processor 10 corresponds to a longitudinal row of FIG. 22, in which Y and Q specify pixel data and Ph specifies the phase information. In FIG. 22, if the conversion is the enlarging conversion processing for the number of pixels, dummy data M is entered in data portions where the pixels have been skipped by the pixel skip information for equating the total number of pixels to the number of output pixels at the inputting stage. Meanwhile, the dummy data M is used for increasing the number of pixels at the inputting time to provide data array suited to the SIMD control and hence is not used for actual convolution. Therefore, the dummy data M may be of any arbitrary value. Only one bit suffices to determine whether or not the dummy data string is to be used, in other words, whether or not input pixel data is to be skipped. For example, the dummy data M is inserted (input pixel data is skipped) or is not inserted (input pixel data is not skipped) if the bit is "1" or "0", respectively. The information specifying whether or not the dummy data M is inserted is the above-mentioned skip information.

The processing at step ST7 of the flowchart of FIG. 8, that is the convolution processing of the cubic coefficients and the four near-by pixel data for enlarging conversion processing for the number of pixels is explained.

After the four near-by pixel data stored in the registers $d_{L1}$, dc, $d_{R1}$ and $d_{R2}$ on the local memory 15 and the phase information stored in the phase information storage register dph have been acquired, the cubic coefficients corresponding to these pixels are found to execute convolution processing.

The cubic coefficients are calculated from the above equation (1). In actuality, there are two cases depending on the magnitude of |x|, and an ultimate output is given by the following equation (16). In the case of the enlarging conversion processing for the number of pixels, the pixel skip information in the output skip register 14 is al set to "0" such that output pixel data is not skipped. Thus, the values of the following equation (9) directly become output pixel data.

$$Q=C_1((K+Ph)/K*d_{L1}+C_2(Ph/k)*dc+C_2((k-Ph)K)*d_{R1}+C_1((2K-Ph)/K*d_{R2} \quad (16)$$

where $C1(x)=-|x|^3+5|x|^2-8|x|+4$
$C2(x)=|x|^3-|x|^2+1$

Next, contracting conversion of the number of pixels is explained.

In contracting conversion of the number of pixels, in distinction to enlarging conversion processing for the number of pixels, as described previously, input pixel data is not arrayed discretely at the pixel data inputting time depending on the conversion ratio (contracting ratio). However, at the pixel data outputting time, the output pixel data are outputted discretely, that is in a skipping fashion, depending on the conversion ratio (contracting ratio). In the present embodiment, the above pixel skip information is used as the information of arraying the output pixel data in a skipping fashion at the time of contracting conversion of the number of pixels. It should be noted that the input pixels are arrayed continuously. The interpolation pixel data for contracting conversion of the number of pixels are generated by convolution processing of four-point input pixel data neighboring to the desired output pixel and fur-point cubic coefficients calculated from the phase information corresponding to the respective pixels. For this contracting conversion of the number of pixels, the pixel skip information, the phase information corresponding to the pixels for calculating the cubic coefficients and the four near-by pixel data for generating the desired output pixel, are required.

Figure 23:
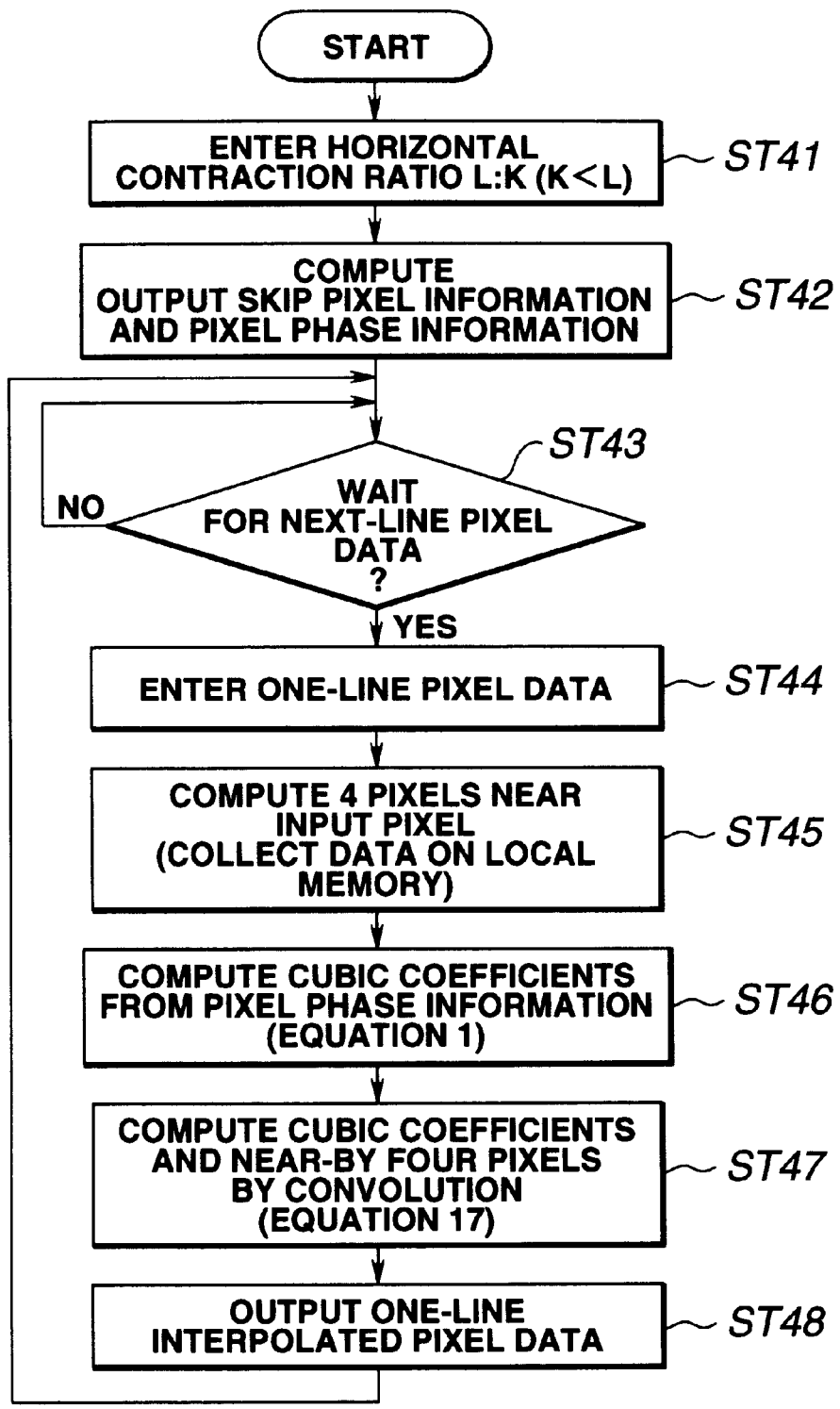
FIG. 23 is a flowchart showing the overall flow of contracting conversion of the number of pixels for luminance signals.

FIG. 23 shows the overall flow of the contracting conversion processing for the number of pixels. Herein, an example of contracting the number of pixels by L:K, wherein K and L denote a positive integer, with K<L, is shown.

In FIG. 23, the conversion ratio of L:K (enlarging ratio) is set at step ST41.

At the next step ST42, the pixel skip information and the phase information are calculated in all of the element processors 10. The manner of calculations of the pixel skip information and the phase information at step ST42 will be explained later in detail.

At step ST43, it is judged whether or not pixel data of the next line can be entered. This decision is repeated until the inputting of the pixel data of the next line becomes possible. If at step ST43 the inputting of the pixel data of the next line has become possible, pixel data of the next line is entered at the next step ST44.

At step ST45, input pixel data to an element processor 10 under consideration and pixel data of four element processors 10 neighboring to the element processor 10 under consideration (four near-by pixel data) are stored in the local memory of the element processor 10 under consideration. The processing at step ST45 will be explained later in detail.

At step ST46, the cubic coefficients are calculated from the phase information. That is, calculations of the equation (1) are carried out.

At step ST47, the cubic coefficients as found at step ST46 are convolved with the four near-by pixel data. The calculations of convolution will be explained later with reference to the equation (17) in detail.

At step ST48, calculations for one line are carried out to output interpolated pixel data before processing reverts to step ST3 ff.

In the contracting conversion of the number of pixels, similarly to enlarging conversion processing for the number of pixels described previously, the pixel skip information and the phase information at step ST42 can be previously calculated in a pre-processor, such as a central processing unit (CPU) outside of the linear array type multi-parallel processor (DSP), and entered to the processor (DSP) via input register 11, before proceeding to convolution processing with the picture data. The pixel skip information is stored in the input skip register 12 and the output skip register 14, whilst the phase information is stored in a phase information storage register provided in the local memory 15. The pixel skip information and the phase information can be calculated in the inside of the SIMD-controlled linear array type multi-parallel processor 1 such as during the picture blanking period or on power up. That is, in case of the conversion of the number of pixels in which the conversion ratio remains constant during a scanning period without being changed with the horizontal pixel position, the pixel skip information and the phase information can be calculated easily n the processor (DSP). The overall system configuration can be simplified by having the entire processing inclusive of generation of the pixel skip information and the phase information realized in the processor (DSP). Again, the pixel skip information is stored in the input skip register 12 and the output skip register 14, whilst the phase information is stored in a phase information storage register provided in the local memory 15.

The method for calculating the pixel skip information and the phase information for the enlarging conversion processing for the number of pixels is hereinafter explained. The calculations for the pixel skip information and the phase information need not necessarily be executed simultaneously. However, there are many common calculation steps in the calculations for setting of the pixel skip information and the phase information so that these calculations are optimally rendered common calculations in connection with the resources of the register in the local memory 15 of the processor 1, program area and the number of steps for improving the processing efficiency. Herein, an illustrative algorithm for finding the pixel skip information and the phase information simultaneously is shown. These calculations are executed during the picture blanking period or on power up, as explained previously.

Figure 24:
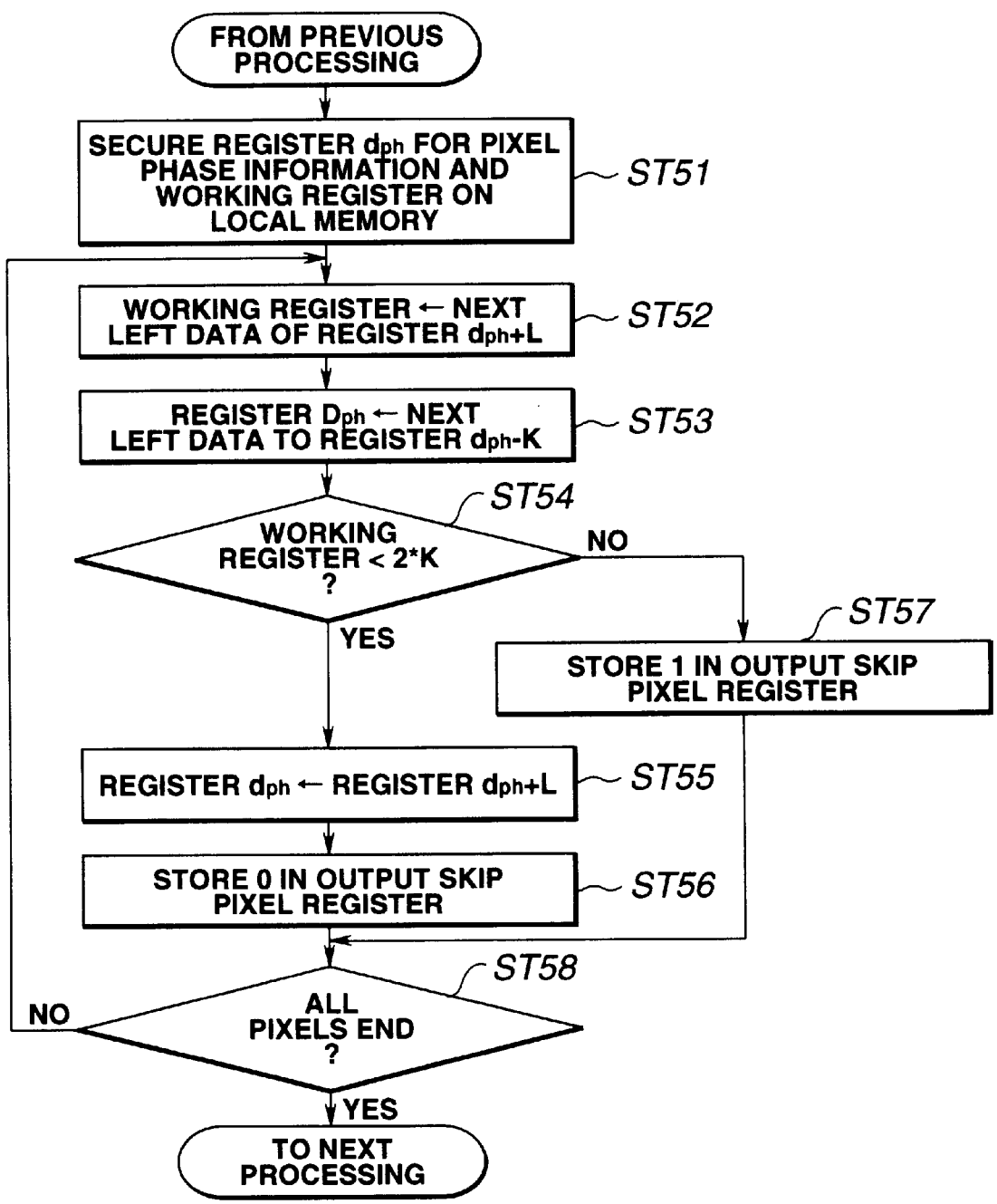
FIG. 24 is a flowchart showing the flow of calculations of the phase information and the pixel skip information of an input skip register in the contracting conversion of the number of pixels for luminance signals.

FIG. 24 shows the sequence of calculating the pixel skip information and the phase information in the SIMD-controlled linear array type multi-parallel processor 1.

At step ST42, to which processing transfers after step ST41 of FIG. 23, the processing of steps ST51 ff shown in FIG. 24 is performed.

First, at step ST51, an area for holding the phase information in the local memory 15 (the above-mentioned phase information storage register dph) and a working area are secured.

At step ST52, the values (phase information) stored in the phase information storage registers dph of the local memories 15 of the next left element processors 10 are incremented by L and the resulting values are stored in the working registers of the local memories 15 under consideration.

At the next step ST53, the values stored in the phase information storage registers dph of the next left element processors 10 under consideration less K are stored in the phase information storage registers dph in the local memories 15 of the element processors 10 under consideration.

At step ST55, the values stored in the phase information storage registers dph incremented by L are again stored in the phase information storage registers dph. That is, the pixel data taken out from the local memories 15 of the element processors lo under consideration are stored directly and outputted without skipping.

At step ST57, to which processing transfers when the value stored in the working register at step ST54 is judged to exceed twice or more as large as K, "1" is stored in the output skip register 14. That is, the pixel data taken out from the local memory 15 of the element processor 10 is outputted at the output register 13 as it is skipped by one.

After the steps ST56 and ST57, processing transfers to step ST58. At this step ST58, it is judged whether or not the above processing has come to a close for all one-line pixels, the number of which is at least larger than the number of the entire element processors 10. If the processing is judged to have not come to a close, processing reverts to step ST52 to repeat the above processing. If the processing is judged to have come to a close, processing reverts to the next processing, that is to step ST43 of FIG. 23.

It should be noted that, in the algorithm shown in FIG. 24, the element processors 10 performs the processing of storing the values stored in the phase information storage registers dph of the left side element processors 10 in the element processors 10 of the element processors 10 under consideration. However, the leftmost element processor 10 has no left side neighboring element processor 10 so that its value remains unfixed. Thus, "0" is stored at all times in the phase information storage register dph of the leftmost element processor 10.

Figure 25:
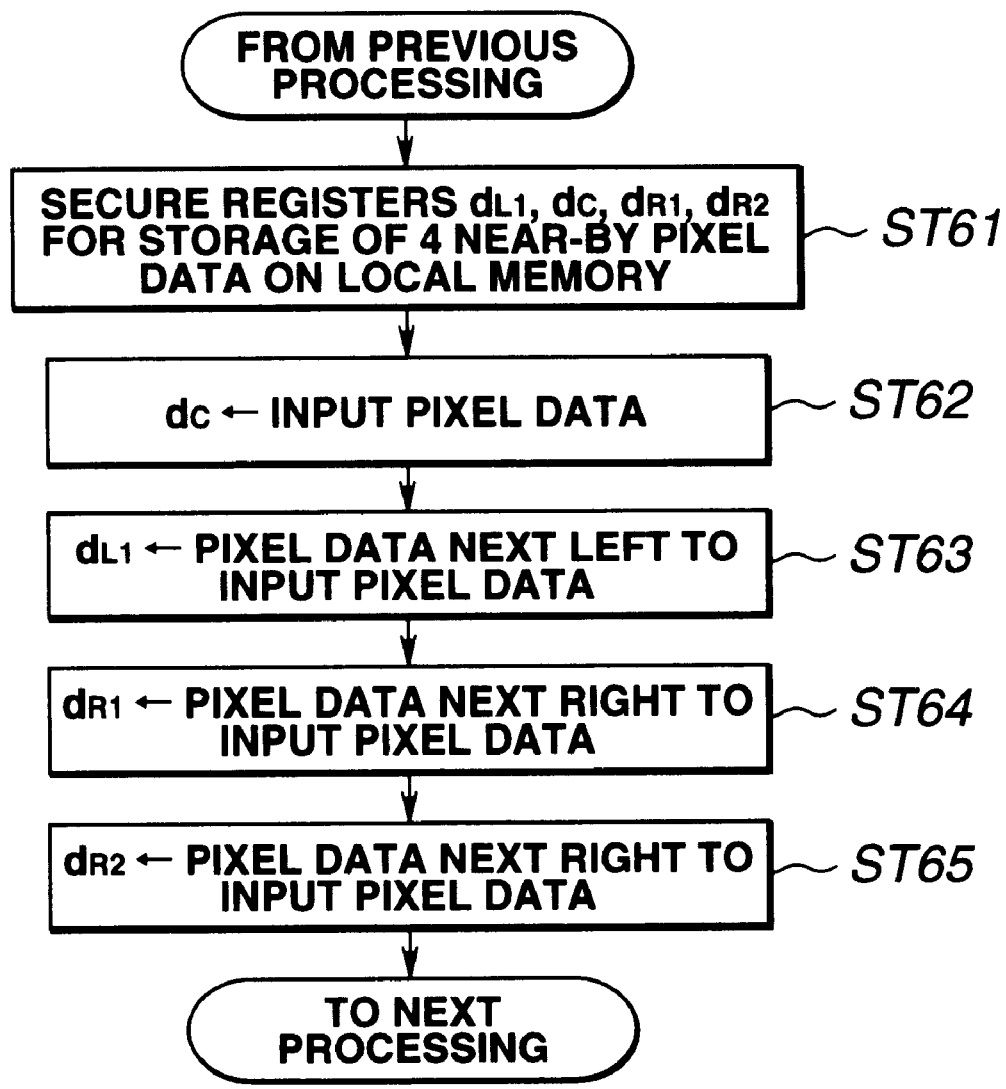
FIG. 25 is a flowchart showing the flow of a former portion of calculations of four near-by pixels of an input pixel in the contracting conversion of the number of pixels for luminance signals.

Next, the processing at step ST45 of the flowchart of FIG. 23, that is the sequence of operations of storing pixel data of four neighboring element processors 10, that is pixel data of four neighboring points, in the element processor 10 under consideration, is explained by referring to the flowchart of FIG. 25.

At step ST45, to which processing transfers after step ST44 of FIG. 25, the processing as from step ST61 shown in FIG. 20 is performed. It should be noted that, as a result of processing shown in the flowchart of FIG. 25, the input pixel data entered discretely based on the pixel skip information stored in the input skip register 12 and the phase information corresponding to each pixel are stored in the local memory 15 of each element processor 10.

First, at step ST61, an area for storage of four neighboring pixel data excluding the pixel skipped at the inputting time by the four neighboring element processors 10 (registers $d_{L1}$, dc, $d_{R1}$ and $d_{R2}$) and a 1-bit register dsc are secured in each element processor 10. The pixels skipped at the inputting time are excluded. If the conversion ratio (enlarging ratio) is set to, for example, 1 to 2, pixel data from the next left neighboring element processor 10 from the element processor 10 under consideration is stored in the register $d_{L1}$, while the pix data from the element processor 10 under consideration is stored in the register dc. The pixel data from the next right element processor of the element processor 10 under consideration is stored in the register dR1, while the pixel data from the second right element processor 10 of the element processor 10 under consideration 10 is stored in the register dR2, as in the case of the enlarging conversion processing for the number of pixels explained previously.

At the next step ST62, the values of input pixel data are stored in the registers dc of the local memories 15.

At the next step ST63, the input pixel data stored in the registers dc of the next left neighboring element processors 10 of the element processors 10 under consideration are stored in the registers dL1 of the element processors 10 under consideration.

At the next step ST64, the input pixel data stored in the registers dc of the next right neighboring element processors 10 of the element processors 10 under consideration are stored in the registers dR1 of the element processors 10 under consideration.

At the next step ST65, the input pixel data stored in the registers dc of the next right neighboring element processors 10 of the element processors 10 under consideration are stored in the registers dR2 of the element processors 10 under consideration.

Then, processing transfers to step ST46 of FIG. 23.

The above processing is completed with an extremely small number of steps of using the communication functions of near-by pixel data of each element processor 10 of the linear array type multi-parallel processor 1.

Figure 26:
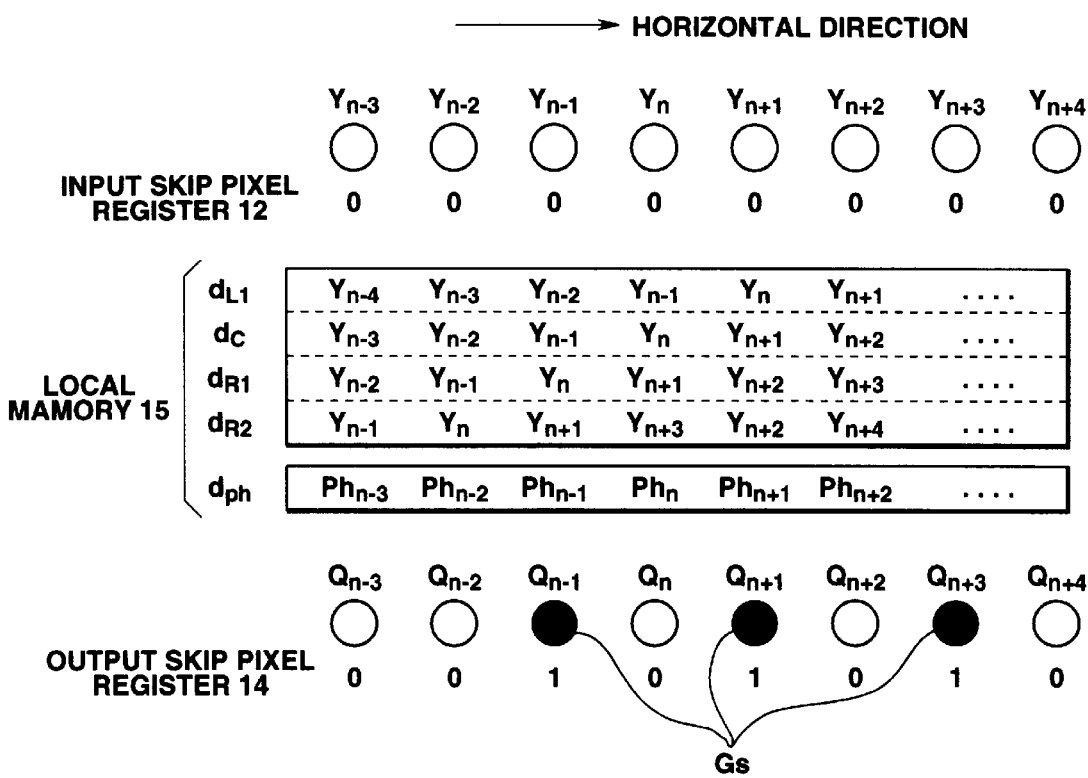
FIG. 26 illustrates the operation of the contracting conversion of the number of pixels for luminance signals.

By carrying out the processing of FIGS. 23 to 25, the four pixel data stored in the registers $d_{L1}$, dc, $d_{R1}$ and $d_{R2}$ of the local memory 15 and the phase information for each pixel stored in the phase information storage register dph of the local memory 15 are related to one another as shown in FIG. 26. Meanwhile, in FIG. 26, which is similar to FIG. 22, Gs denotes output pixel data.

Next, the processing at step ST47 of the flowchart of FIG. 23, that is the convolution processing of the cubic coefficients and the four near-by pixel data at the time of contracting conversion of the number of pixels, is explained.

After the data of the four near-by pixels stored in the registers $d_{L1}$, dc, $d_{R1}$ and $d_{R2}$ of the local memory 15 and the phase information stored in the phase information storage register dph have been obtained, the cubic coefficients for the pixels are found to carry out the convolution processing.

The cubic coefficients can be calculated from the above equation (1). In actuality, there are two cases depending on the magnitude of |x|, and an ultimate output is given by the following equation (17). In the case of the contracting conversion of the number of pixels, the pixel data obtained by the interpolation processing are the values of the following equation (10) discretely outputted based on the psi stored in the output skip register 14.

$$Q=C_1((K+Ph)/K^*d_{L1}+C_2(Ph/k)^*dc+C_2((k-Ph)K)^*d_{R1}+C_1((2K-Ph)/K^*d_{R2} \qquad (17)$$

where $C1(x)=-|x|^3+5|x|^2-8|x|+4$ $C2(x)=|x|^3-|x|^2+1$

In the SIMD controlled linear array type multi-parallel processor 1, output pixel data for all pixels can be simultaneously calculated by one step of calculations at most in accordance with the above equations. Thus, with the linear array type multi-parallel processor 1 of the present invention, conversion of the number of pixels is possible by exploiting SIMD control.

The foregoing description id based entirely on luminance signals. An illustrative example for converting the number of pixels for chroma signals in the SIMD-controlled linear array type multi-parallel processor 1 is explained.

In the conversion of the number of pixels for chroma signals in the above-described 4:4:4 format, since the format for chroma signals is the same as that for luminance signals, the processing similar to that for the conversion of the number of pixels for the luminance signals suffices. In the linear array type multi-parallel processor 1, there is no necessity of adding the hardware, but it is only necessary to add the software for chroma signals, so that there is no fear of adding new circuits.

The conversion of the number of pixels for chroma signals in the above-mentioned 4:2:2 format is explained.

Figure 48:
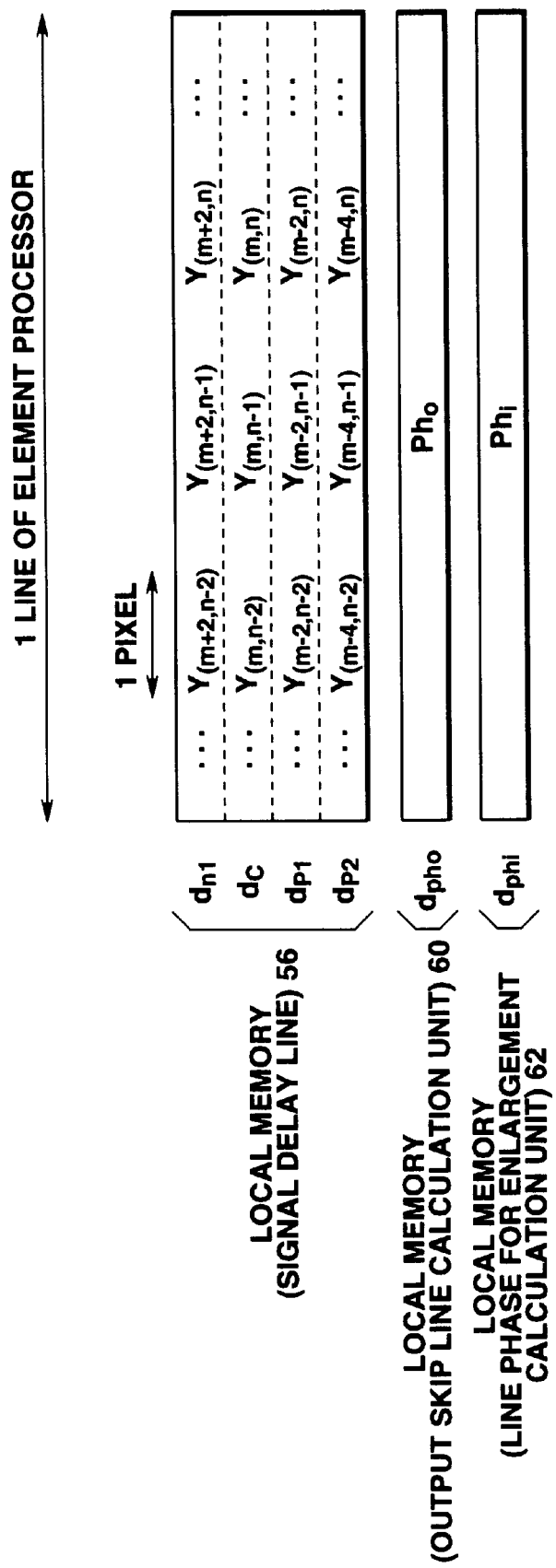
FIG. 48 illustrates the contents of a local memory in the illustration of the operation for enlarging conversion of the number of lines for luminance signals.

In the 4:2:2 format, Cr and Cb are arrayed alternately for each pixel, as shown in FIG. 48. The chroma signals are present for every other pixel. For matching the positions and the number of pixels of the luminance and the color, as described above, Cr and Cb are skipped at the time of inputting pixel data. However, since the arraying sequence of the chroma signals is interchanged at this time instant, it is not possible to use the same processing as that for the luminance signals.

Therefore, in the present embodiment, such technique is used in which cubic interpolation is applied to luminance signals and linear interpolation from data neighboring to the interpolation pixel is applied to chroma signals.

Figure 27:
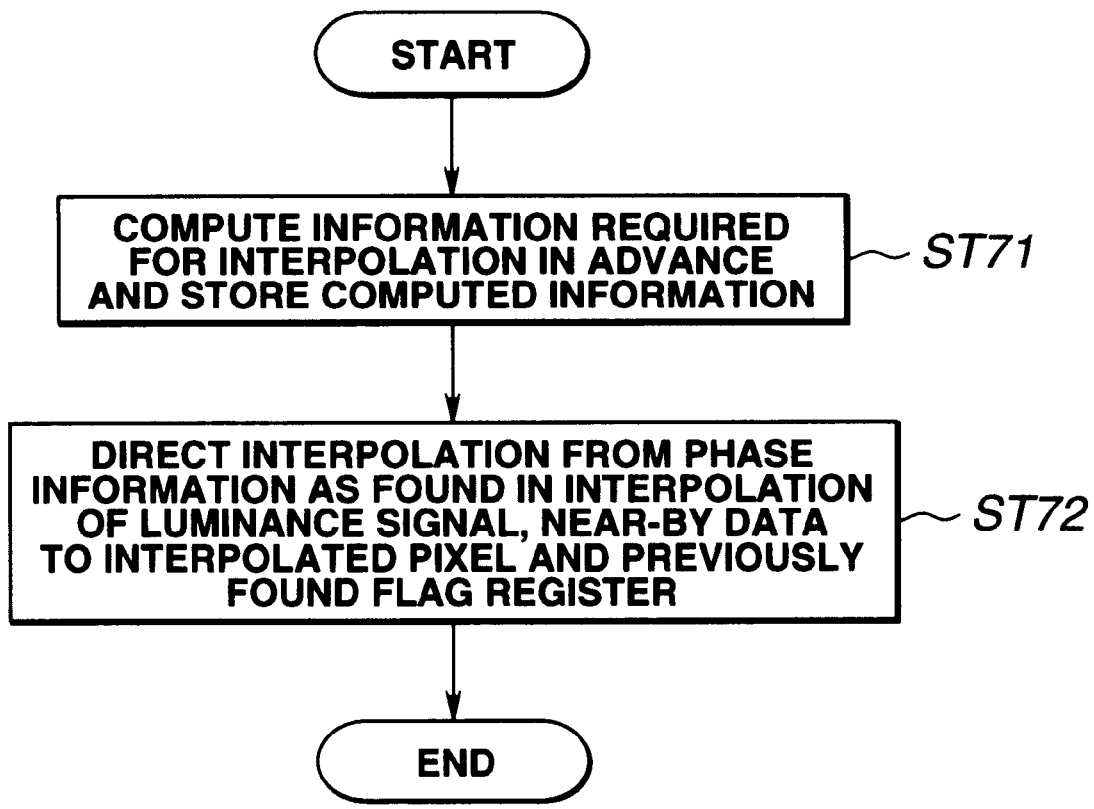
FIG. 27 is a flowchart showing the overall flow of pixel number conversion processing for chroma signals of the 4:2:2 format.

FIG. 27 shows the overall flow of the processing for converting the number of pixels of the chroma signals of the 4:2:2 format by this technique.

Referring to FIG. 12, an area for a flag register as later explained is procured at step ST71 on the local memory 15 for carrying out the conversion of the number of pixels based on the SIMD control. The information necessary for interpolation for enlarging conversion processing for the number of pixels or contracting conversion of the number of pixels is calculated, and the resulting value is stored in the flag register. The enlarging conversion processing for the number of pixels or contracting conversion of the number of pixels at step ST71 will be explained later in detail.

At the next step ST72, linear interpolation of chroma signals is carried out using the value of the flag register as found at step ST71, data in the neighborhood of the pixel of interpolation and the phase information as found at the time of interpolation of luminance signals. The processing at this step ST72 will be explained subsequently.

Figure 28:
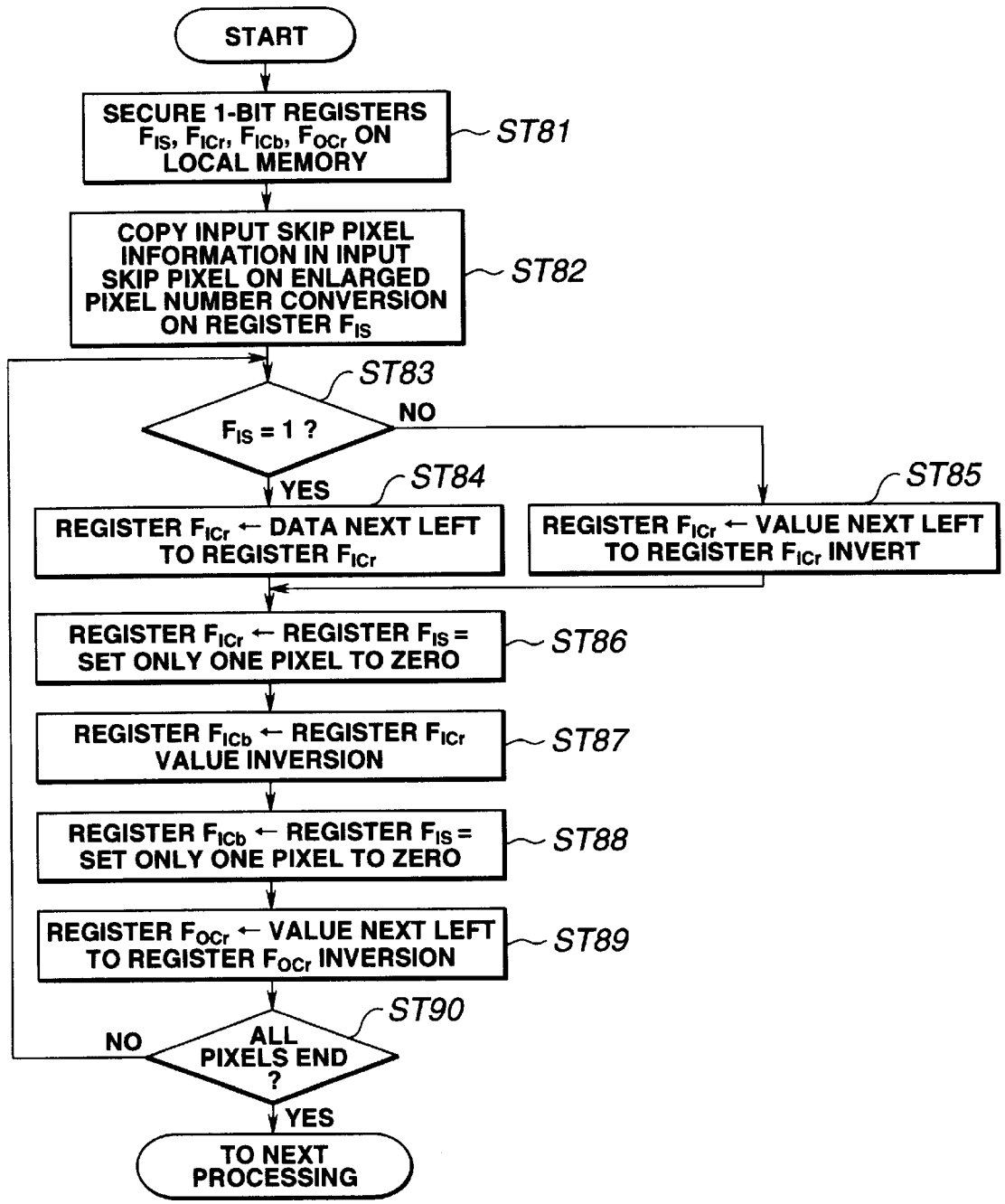
FIG. 28 is a flowchart showing the flow of flag register calculations in the enlarging conversion of the number of pixels for chroma signals of the 4:2:2 format.

FIG. 28 shows the sequence of operations of calculating the information to be stored in a flag register at step ST71 in FIG. 27.

In FIG. 28, 1-bit flag registers FIS, FICr, FICb and FOCr are secured previously at step ST81 on the local memory 15 in all of the element processors 10 for carrying out the conversion of the number of pixels based on the SIMD control. Meanwhile, the flag registers FICr and FICb are registers for holding on memory a flag specifying with which of the Cr signal or the Cb signals is associated data entering the element processor 10 under consideration. If for example given data is the Cr (R-Y signal), '1' is set and stored in the flag register FICr, whereas, if the data is the Cb (B-Y signal), '1' is set and stored in the flag register FICb. In the following explanation, the flag registers are referred to as the Cr input flag register FICr and as the Cb input flag register FICb, respectively. If these Cr or Cb signals are skipped, '0' is set and stored in the Cr input flag register FICr and as the Cb input flag register FICb, respectively. It is noted that '1' and '0' are alternately repeatedly stored in the flag adapted for storage in the flag register FOCr in meeting with the pixel which is to output Cr. In the following explanation, the flag register FOCr is termed is termed an output flag register FOCr, if '1' or '1' is stored in the Cr output flag register FOCr, Cr or Cb is outputted, respectively.

At the next step ST82, the pixel skip information at the time of enlarging conversion processing for the number of pixels by the processing of FIG. 19 as described above (the pixel skip information stored in the input skip register 12) is copied in the flag register FIS of the local memory 15. In the following explanation, the flag register FIS on the local memory 15 to which the pixel skip information from the input skip register 12 is copied is termed the input skip flag register FIS.

Next, at step ST83, it is judged whether or not the value stored in the input skip flag register FIS is '1'. If the result is YES, processing transfers to step S84 and, if otherwise (that is if the value is '0', processing transfers to step to step S85.

At step ST84, to which processing transfers if the value stored in the input skip flag register FIS is found to be '1' at step ST83, the values stored in the Cr input flag registers FICr of the element processors 10 next left to the element processors 10 under consideration are stored in the Cr input flag registers FICr of the element processors 10 under consideration.

At step ST85, to which processing transfers if the value stored in the input skip flag register FIS is found to be '0' at step ST83, the values stored in the Cr input flag registers FICr of the element processors 10 next left to the element processors 10 under consideration are complemented and stored in the Cr input flag registers FICr of the element processors 10 under consideration.

After these steps ST84 and ST85, processing transfers to step ST86. At this step ST86, the values of the Cr input flag registers FICr of the element processors 10 are set to '0' for the element processors 10 for which the values of the input skip flag registers FIS obtained at the steps ST84 and ST85 are set to '1'.

At the next step ST87, the values of the Cr input flag registers FICr of the element processors 10 are complemented and stored in the Cb input flag registers FICb.

At the next step ST88, the values of the Cb input flag registers FICb of the element processors 10 where the values of the input skip flag registers FIS of the element processors 10 under consideration are '1' are set to '0'.

At the next step ST89, the values stored in the Cr output flag registers FOCr of the element processors 10 next left to the element processors 10 under consideration are complemented and stored in the Cr output flag registers FICr.

At the next step ST90, it is judged whether or not the above processing for all pixels for one line, at least more in number than all element processors 10, has come to a close. If the result is NO, processing reverts to step S83 to repeat the above processing and, if otherwise, processing transfers to step to step S72 of FIG. 27, that is to the processing of the flowchart of FIG. 29 now explained.

Meanwhile, the leftmost element processor 10 has left neighbor so that the values of the respective flag registers are not set. Therefore, the value of '0' is always stored in each flag register for the leftmost element processor 10.

Figure 29:
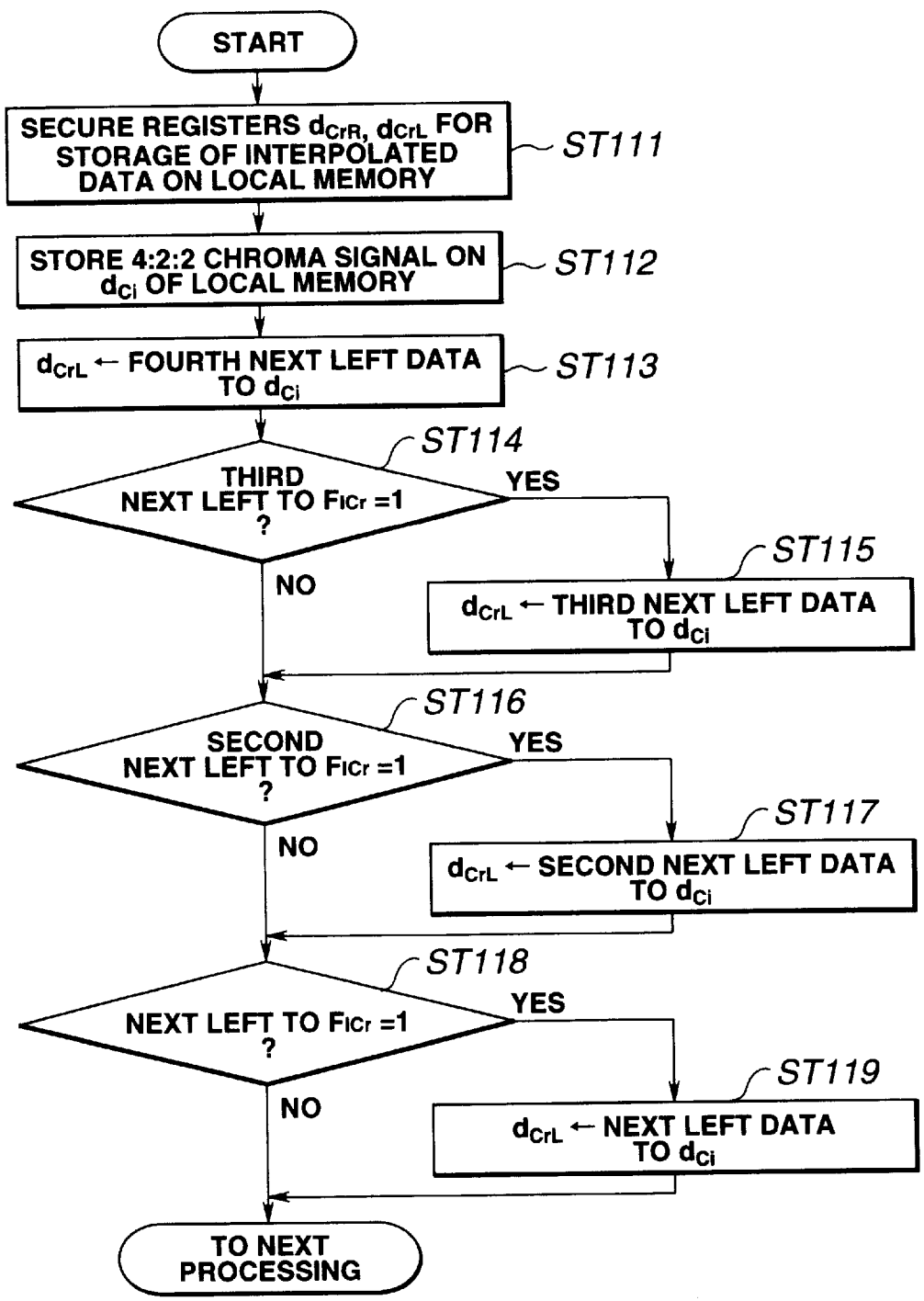
FIG. 29 is a flowchart for illustrating the flow of a former portion of linear interpolation processing for chroma signals in the enlarging (contracting) conversion of the number of pixels for chroma signals of the 4:2:2 format.

The linear interpolation at step ST72 of the flowchart of FIG. 27 at the time of enlarging conversion processing for the number of pixels is explained in detail by referring to the flowchart of FIG. 29.

In this enlarging conversion processing for the number of pixels, input chroma signals are skipped with the same pixel skip information as that for the luminance signals for taking in data in the local memory 15. The linear interpolation processing is carried out from the values of the input chroma signals on the local memory 15 and from the values stored in the flag registers. For this linear interpolation, data of two points on the left and right side neighboring of a desired point of interpolation are searched and interpolation is carried out by linear addition in accordance with the phase information as found by the calculations at the time of processing of the luminance signals.

The sequence of operations for this interpolation is shown in the flowchart of FIG. 29. Herein the conversion ratio is set to two or less for simplicity of explanation. If the conversion ratio is more than two, the extent of communication with neighboring element processors is simply enlarged, with the algorithm remaining basically the same. Although the following explanation is centered on the processing for Cr signals, the processing for Cb signals is also the same. It this case, it suffices if, in the flowchart of FIG. 29, the Cb right register dcbR in each step as now explained is substituted for the Cr right register dcrR in each step as now explained and the Cb left register dcrL is substituted for the Cb left register dcrL while the Cb flag register FICb is substituted for the Cr input flag registers FICr.

At step ST111 in FIG. 29, the Cr right register dcrR and the Cr left register dcrL are secured on the local memory 15 as areas for storing the leftmost pixel value and the rightmost pixel value for each pixel of interpolation, respectively. For the Cb signal, the Cb right register dcbR and the Cb left register dcbL are secured on the local memory 15 as areas for storing the leftmost pixel value and the rightmost pixel value for each pixel of interpolation, respectively.

At step ST112, chroma signals of the 4:2:2 format are stored in chroma input registers dci are stored in chroma input register dci secured on the local memory 15.

At step ST113, the values stored in the chroma input register dci of the fourth left element processors 10 are stored in the Cr left registers dcrL of the element processors 10 under consideration.

At the next step ST114, it is judged whether or not the values of the Cr input flag registers FICr of the third left element processors 10 are '1'. If the values of the Cr input flag registers FICr of the third left element processors 10 are '1', processing transfers to step ST115 and, if otherwise, processing directly transfers to step ST116.

At the step ST115, to which processing transfers if the values of the Cr input flag registers FICr of the third left element processors 10 are found at step ST114 to be '1', the values stored in the Cr input flag registers FICr of the third left element processors 10 are stored in the Cr left registers dcrL of the element processors 10 under consideration.

At step ST116, to which processing transfers when it is judged at step ST114 that the value of the Cr input flag registers FICr of the third left element processors 10 is found at step ST114 to be zero, or after the processing at step ST115, it is judged whether or not the values of the Cr input flag registers FICr of the second left element processors 10 are equal to '1'. If, at step ST116, the values of the Cr input flag registers FICr of the second left element processors 10 are equal to '1', processing transfers to step ST117 and, if otherwise, processing transfers to step ST118.

At step ST117, to which processing transfers when the values of the Cr input flag registers FICr of the second left element processors 10 are found at step ST116 to be '1', the values stored in the chroma input registers dci of the second left element processors 10 are stored in the Cr left registers dcrL of the element processors 10 under consideration.

At step ST118, to which processing transfers when it is judged at step ST116 that the value of the Cr input flag registers FICr of the second left element processors 10 is found at step ST116 to be zero or after the processing at step ST117, it is judged whether or not the values of the Cr input flag registers FICr of the left adjacent element processors 10 are equal to '1'. If, at step ST118, the values of the Cr input flag registers FICr of the left adjacent element processors 10 are equal to '1', processing transfers to step ST119 and, if otherwise, processing directly transfers to next processing shown in FIG. 30.

At step ST119, to which processing transfers when the values of the Cr input flag registers FICr of the left adjacent element processors 10 are found at step ST118 to be '1', the values stored in the chroma input registers dci of the second left element processors 10 are stored in the Cr left registers dcrL of the element processors 10 under consideration.

Figure 30:
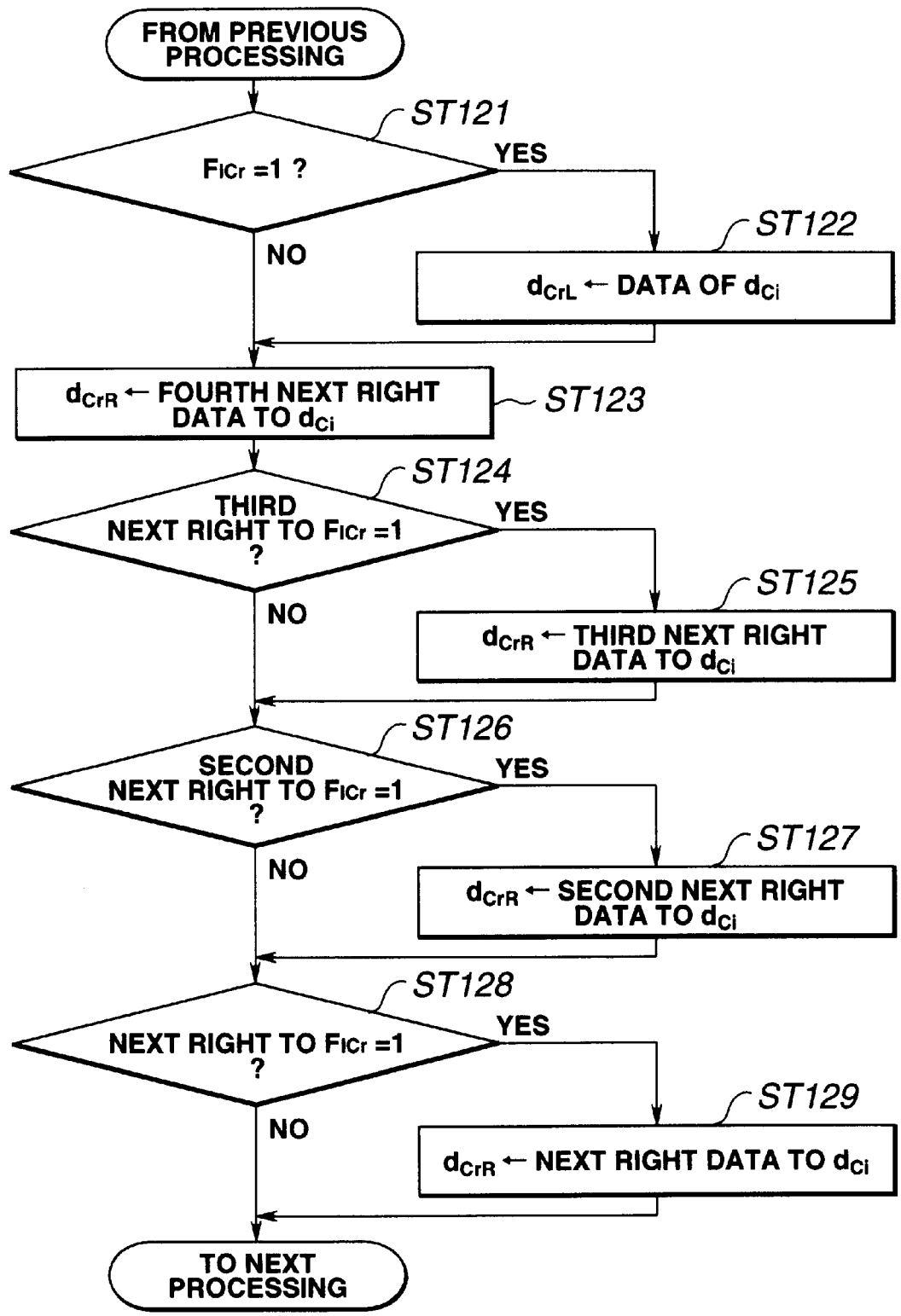
FIG. 30 is a flowchart for illustrating the flow of a mid portion of linear interpolation processing for chroma signals in the enlarging (contracting) conversion of the number of pixels for chroma signals of the 4:2:2 format.

At step ST121 of the flowchart of FIG. 30, to which processing transfers when it is judged at step ST118 that the values of the Cr input flag registers FICr of the left adjacent element processors 10 are found at step ST118 to be zero or after the processing at step ST119, it is judged whether or not the values of the Cr input flag registers FICr of the element processors 10 under consideration are equal to '1'. If, at step ST121, the values of the Cr input flag registers FICr of the element processors 10 under consideration are equal to '1', processing transfers to step ST122 and, if otherwise, processing directly transfers to step ST123.

At step ST122, to which processing transfers when the values of the Cr input flag registers FICr of the element processors 10 under consideration are found at step ST121 to be '1', the values stored in the chroma input registers dci of the element processors 10 under consideration are stored in the Cr left registers dcrL of the element processors 10 under consideration.

At step ST123, to which processing transfers when the values of the Cr input flag registers FICr of the element processors 10 under consideration are found at step ST122 to be '0', or after processing at step ST122, the values stored in the chroma input registers dci of the fourth right element processors 10 are stored in the Cr right registers dcrR of the element processors 10 under consideration.

At the next step ST124, it is judged whether or not the values of the Cr input flag registers FICr of the third right element processors 10 are equal to '1'. If the values of the Cr input flag registers FICr of the third right element processors 10 are found at step ST124 to be equal to '1', processing transfers to step ST125 and, if otherwise, processing directly transfers to step ST126.

At step ST125, to which processing transfers when the values of the Cr input flag registers FICr of the third right element processors 10 are found at step ST124 to be '1', the values stored in the chroma input registers dci of the third right element processors 10 are stored in the Cr right registers dcrR of the element processors 10 under consideration.

At step ST126, to which processing transfers when the values of the Cr input flag registers FICr of the element processors 10 under consideration are found at step ST124 to be '0', or after processing at step ST125, it is judged whether or not the values of the Cr input flag registers FICrR of the second right element processors 10 are equal to 1. If the values of the Cr input flag registers FICr of the second right element processors 10 are found at step ST126 to be equal to '1', processing transfers to step ST127 and, if otherwise, processing directly transfers to step ST128.

At step ST127, to which processing transfers when the values of the Cr input flag registers FICr of the second right element processors 10 are found at step ST126 to be '1', the values stored in the chroma input registers dci of the second right element processors 10 are stored in the Cr right registers dcrR of the element processors 10 under consideration.

At step ST128, to which processing transfers when the values of the Cr input flag registers FICr of the second right element processors 10 are found at step ST126 to be '0', or after processing at step ST128, to which processing transfers after processing at step ST127, it is judged whether or not the values of the Cr input flag registers FICr of the next right element processors 10 are equal to 1. If the values of the Cr input flag registers FICr of the second right element processors 10 are found at step ST128 to be equal to '1', processing transfers to step ST129 and, if otherwise, processing directly transfers to next processing shown in FIG. 31.

At step ST129, to which processing transfers when the values of the Cr input flag registers FICr of the next right element processors 10 are found at step ST126 to be '1', the values stored in the chroma input registers dci of the next right element processors 10 are stored in the Cr right registers dcrR of the element processors 10 under consideration.

Figure 31:
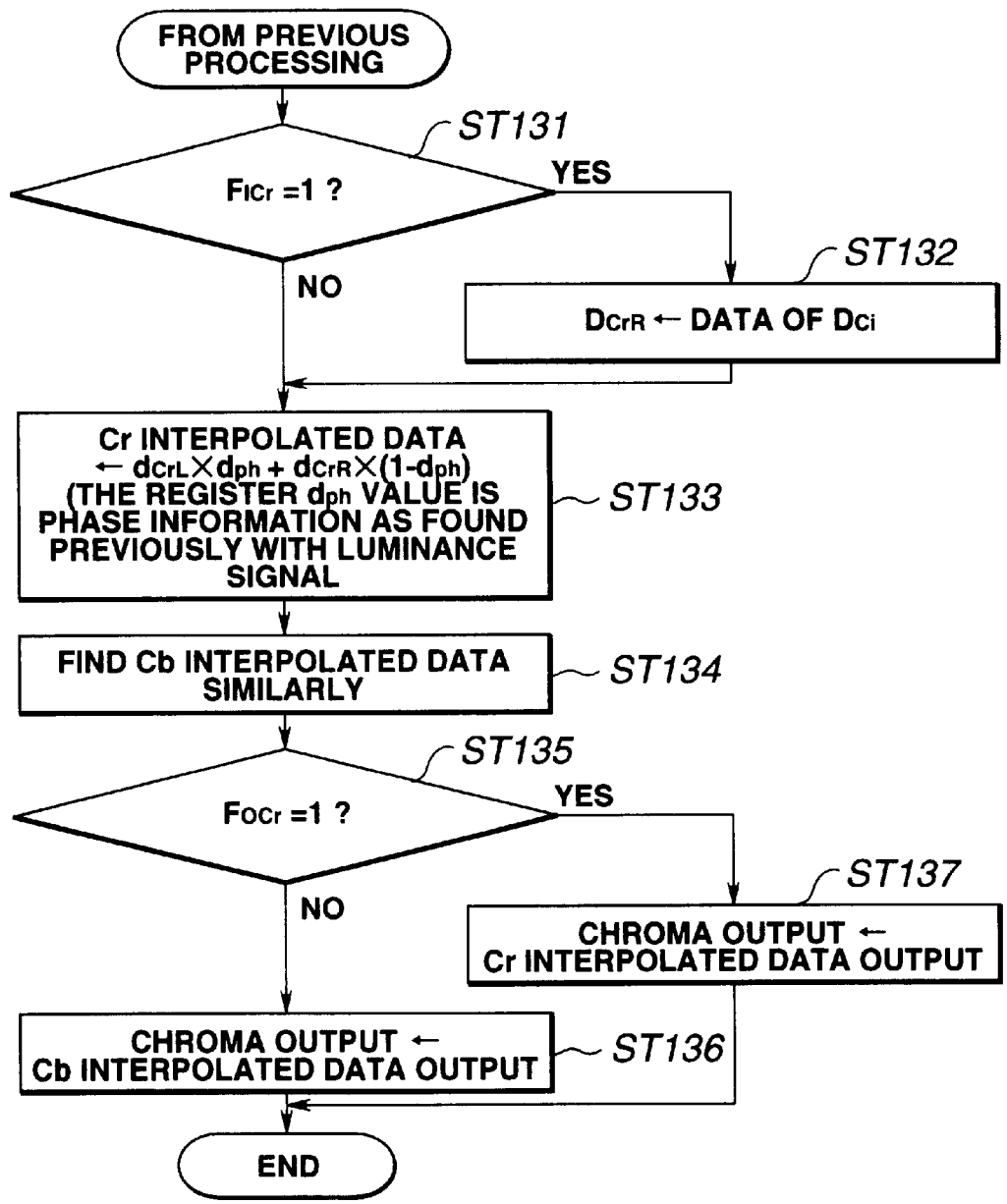
FIG. 31 is a flowchart for illustrating the flow of a latter portion of linear interpolation processing for chroma signals in the enlarging (contracting) conversion of the number of pixels for chroma signals of the 4:2:2 format.

At step ST131 of the flowchart of FIG. 31, to which processing transfers when the values of the Cr input flag registers FICr of the next right element processors 10 are found at step ST128 to be '0', or after processing at step ST129, it is judged whether or not the values of the Cr input flag registers FICr of the element processors 10 under consideration are equal to '1'. If the values of the Cr input flag registers FICr of the element processors 10 under consideration are found at step ST131 to be equal to '1', processing transfers to step ST132 and, if otherwise, processing directly transfers to step ST133.

At step ST132, to which processing transfers when the values of the Cr input flag registers FICr of the element processors 10 under consideration are found at step ST131 to be '1', the values stored in the chroma input registers dci of the element processors 10 under consideration are stored in the Cr right registers dcrR of the element processors 10 under consideration.

At step ST133, to which processing transfers when the values of the Cr input flag registers FICr of the element processors 10 under consideration are judged at step ST132 to be '0' or after processing at step ST132, the interpolation processing by linear addition is carried out by linear addition in accordance with the phase information as found by calculations of the luminance signals on the Cr left registers dcrL and on the Cr right registers dcrR configured for storage of the leftmost pixel values and rightrnost pixel values of thee interpolation data for the Cr signals, respectively.

At the next step ST134, processing for the Cb signals is carried out. That is, the Cb signals are processed in a similar manner to that described above in order to find interpolation data by the interpolation processing by linear addition for the Cb signals. In this case, a Cb right registers dcbR is substituted for the Cr right register dcrR and a Cb left register is substituted for the Cr left registers dcrL whilst a Cb input register FICb is substituted for the Cb input flag register FICb. At the next step ST135, it is judged whether or not the value of the Cr input flag registers FICr of the element processors 10 are '1'. If the result is YES, processing transfers to step S137 and, if otherwise, that is if the value is '0', processing transfers to step to step S136.

At step ST137, to which processing transfers if the value of the Cr output flag register FOCr is '1', interpolation data for the Cr signals as found at step ST133 is outputted, whereas, at step ST136, to which processing transfers if the value of the Cr output flag register FOCr is '0', interpolation data for the Cb signals as found at step ST134 is outputted. The interpolation data for the Cr signals and the interpolation data for the Cb signals are selected from pixel to pixel and stored in the output registers for the Cr and Cb signals of the 4:2:2 format provided on the local memory 15.

In the above-described enlarging conversion processing for the number of pixels, pixel data are discretely stored in the input registers 11 at the inputting time of pixel data and straightly outputted from the output registers 13 at the outputting time. In the contracting conversion of the number of pixels, pixel data are straightly entered to the input registers 11 at the data inputting time, while being discretely outputted form the output register 13 at the outputting time.

Since the interpolation processing for the contracting conversion of the number of pixels is similar to that for the enlarging conversion processing for the number of pixels, the explanation therefor is omitted and only the pre-processing portion of the interpolation calculations is explained.

For this contracting conversion of the number of pixels, the Cr input flag registers FICr and the Cb input flag registers FICb similar to those described above are secured on the local memory 15 for storing the pixel skip information stored in the output skip register 14. These flag registers are each 1-bit registers.

The input Cr flag registers FICr and the input Cb flag registers FICb are registers for storing flags for storing the flags specifying to which of the Cr signals and the Cb signals correspond data entering the element processors 10 under consideration, as explained previously. If given data is Cr or Cb, '1' is set and stored in the flag register FICr or '0' is set and stored in the flag register FICb, respectively. In contracting conversion of the number of pixels, '1' or '0' is alternately stored from pixel to pixel in the in the flag register FICr or in the flag register FICb, in the flag register FICb and in the flag register FICr, with the pixels of the flag register FICr being reversed from those flag register FICb. In the Cr output flag register FOCr, alternate '1's and '0's are stored in association with pixels which should output Cr, such that Cr and Cb are outputted when '1' and '0' are stored in the Cr output flag register FOCr, respectively.

Figure 32:
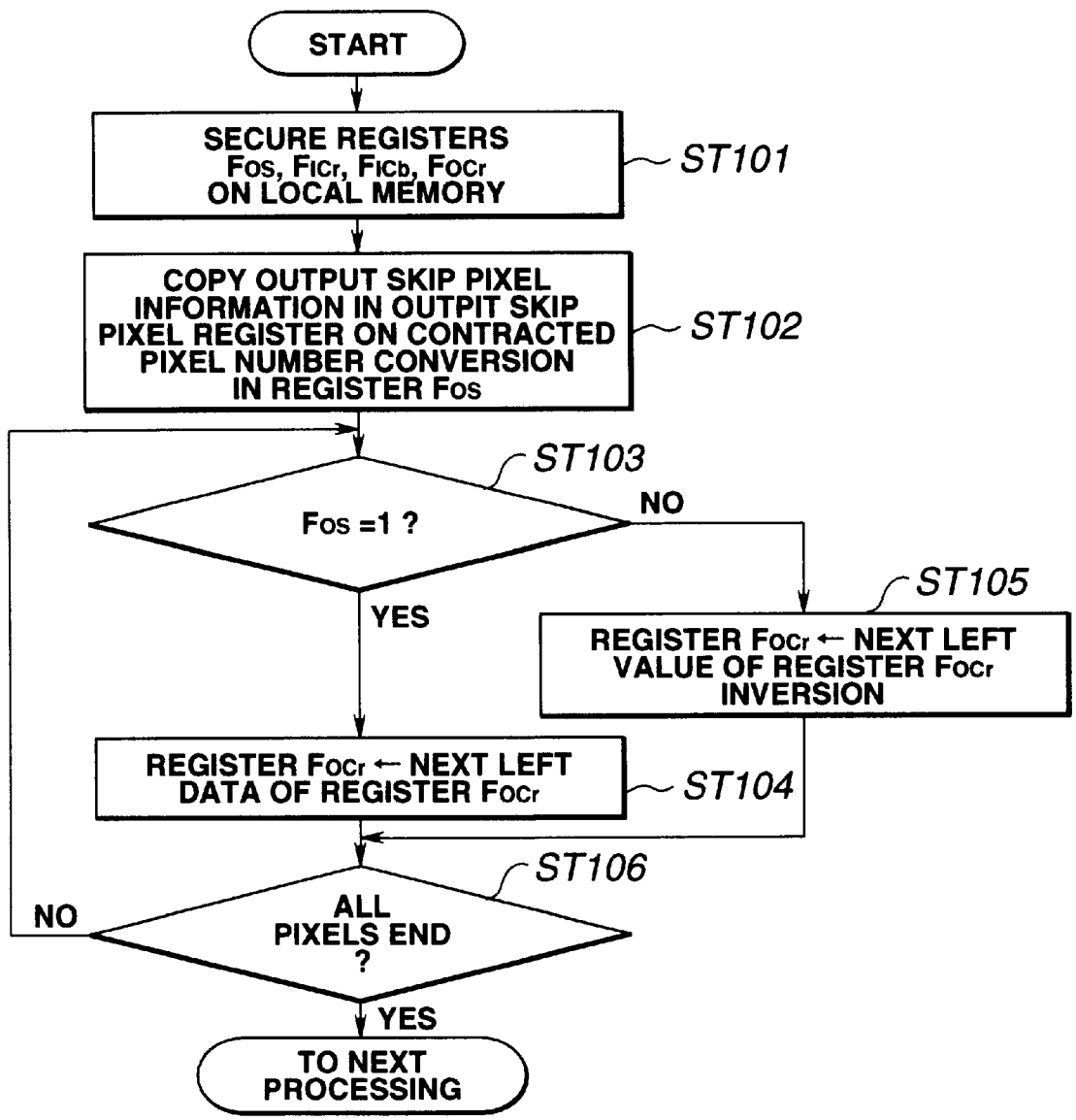
FIG. 32 is a flowchart showing the flow of flag register calculations in the enlarging conversion of the number of pixels for chroma signals of the 4:2:2 format.

If processing for contracting conversion of the number of pixels is carried out by SIMD control, the sequence of operations for processing the information which should be stored in the flag register at step ST71 is as shown n the flowchart of FIG. 32.

At step ST101 of FIG. 32, an output skip flag register Fos, a Cr input flag registers FICr and a Cb input flag registers FICb, each being of a 1-bit, are previously secured on the local memory 15 for each of the element processors 10.

At the next step ST102, the pixel skip information at the time of contracting conversion of the number of pixels as found by the processing of FIG. 24, that is the pixel skip information stored in the output skip register 14, is copied in the output skip flag register FOS of the local memory 15 of each of the element processors 10. This pixel skip information represents '1' being skipped and '0' not being skipped, as explained previously.

At step ST103, it is judged whether or not the value stored in the output skip flag register FOS in each of the element processors 10 is '1'. If the result is YES, processing transfers to step S104 and, if otherwise, that is if the value is not 1, that is '0', processing transfers to step ST105.

At step ST104, to which processing transfers if the values stored in the Cr output flag registers FOS is judged to be '1', the values stored in the next left element processors 10 are stored in the Cr output flag registers FOCr of the element processors 10 under consideration.

At step ST105, to which processing transfers if the values stored in the output flag registers FOS is judged to be '0', the values stored in the next left element processors 10 are complemented and stored in the Cr output flag registers FOCr of the element processors 10 under consideration.

After these steps ST104 and ST105, processing transfers to step ST106. At this step ST106, it is judged whether or not the above processing has come to a close for the total pixels for one line (at least more in number than the total element processors 10). If the processing is judged not to have come to a close, processing reverts to step ST103 to repeat the above processing. If the processing is judged to have come to a close, processing proceeds to the flowcharts shown in FIGS. 29 to 31 similar to those described above. In the flowcharts shown in FIGS. 29 to 31, the processing similar to that described above is carried out using the values of the Cr input flag registers FICr, Cb input flag registers FICb and the Cr output flag register as found by the processing of FIG. 32 to obtain chroma signal outputs of the 4:2:2 format for the contracting conversion of the number of pixels.

In the present contracting conversion of the number of pixels, the leftmost element processor 10 finds no left neighbor so that the value of each flag register is not fixed. Thereofre, in the case of the leftmost element processor 10, '0's are stored at all times in the flag registers.

In addition to the enlarging conversion processing for the number of pixels and contracting conversion of the number of pixels by the 4:2:2 format by the above technique, it is possible to convert the chroma signals of the 4:2:2 format into those of the 4:4:4 format for carrying out enlarging conversion processing for the number of pixels or contracting conversion of the number of pixels.

Figure 33:
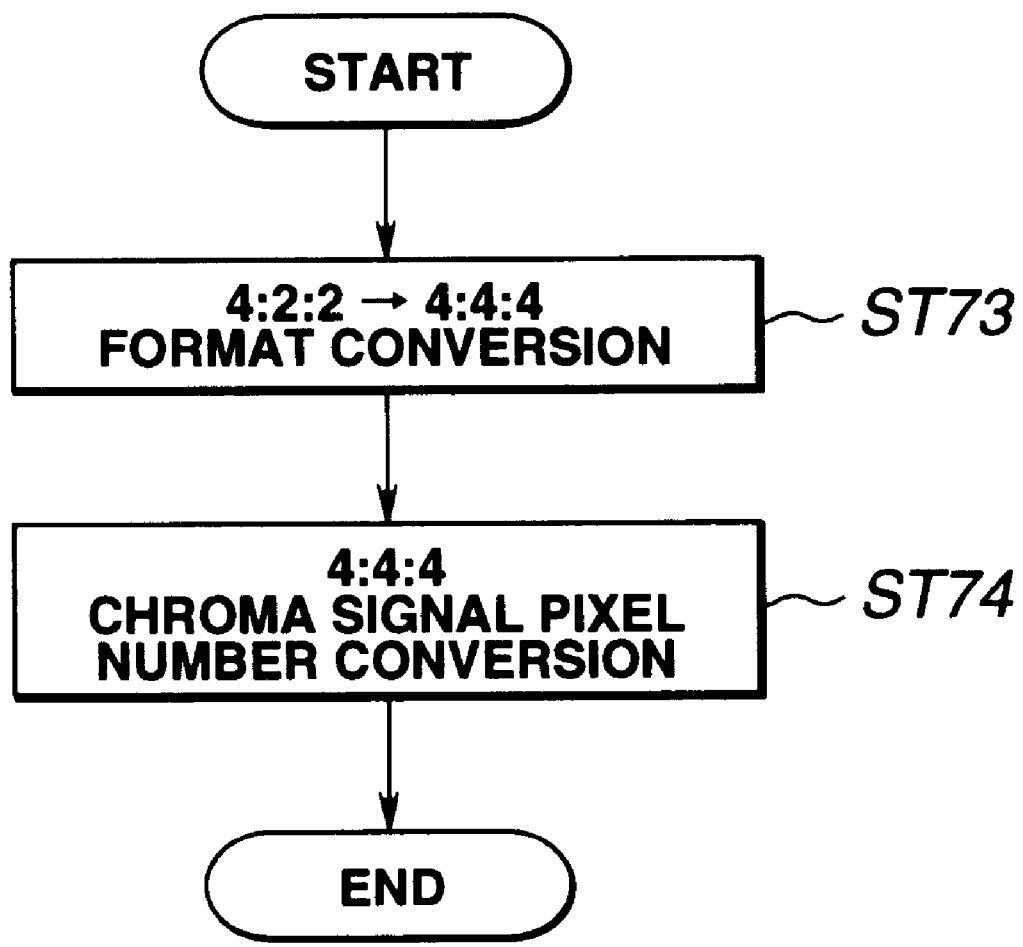
FIG. 33 is a flowchart showing the overall flow of conversion from the 4:2:2 format to the 4:4:4 format and for pixel number conversion of chroma signals.

The flow of format conversion from the 4:2:2 format to the 4:4:4 format is as shown for example in FIG. 33.

In FIG. 33, chroma signals of the 4:2:2 format are converted at step ST73 to the 4:4:4 format. At the next step ST74, the 4:4 format chroma signals are converted by enlarging conversion processing for the number of pixels or contracting conversion of the number of pixels, as explained previously.

Figure 34:
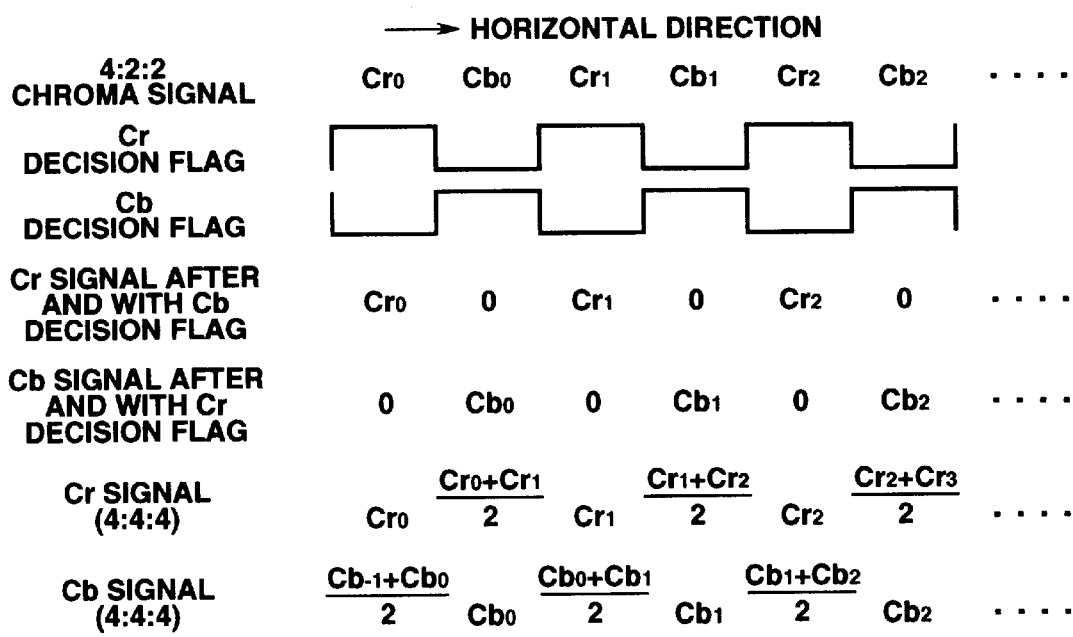
FIG. 34 specifically illustrates conversion from the 4:2:2 format to the 4:4:4 format.

The technique shown in FIG. 34 may be conceived as an example of format conversion from the 4:2:2 format to the 4:4:4 format at step ST73. That is, in FIG. 34, the Cr discrimination flag and the Cb discrimination flag are used, the Cr signal after calculating the logical product of the Cb discrimination flag and the 4:2:2 chroma signals and the Cb signal after calculating the logical product of the Cr discrimination flag and the 4:2:2 chroma signals are found and, from the Cr signals and the Cb signals after these logical sum operations, the 4:4:4 format Cr and Cb signals are found by corresponding operations.

Figure 35:
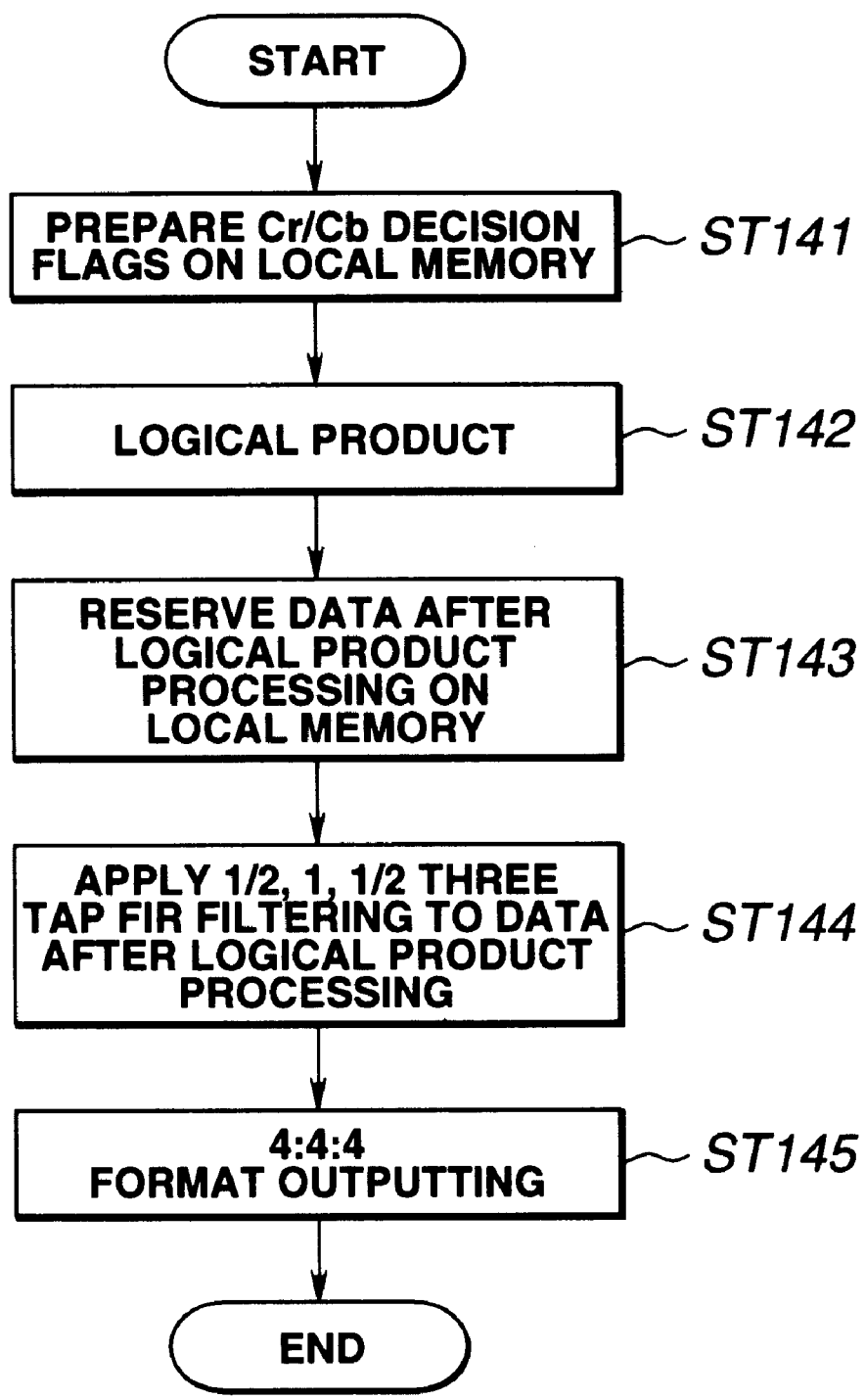
FIG. 35 is a flowchart for illustrating the flow of format conversion from the 4:2:2 format to the 4:4:4 format.

If, in the above-described SIMD-controlled linear array type multi-parallel processor 1, format conversion shown in FIG. 34 is realized, the sequence of operations shown in the flowchart of FIG. 35 is used.

At step ST141 n FIG. 35, the Cr discrimination flag for discriminating the 4:2:2 format Cr signal and the Cb discrimination flag for discriminating the Cb signal are provided at step ST141 on the local memory 15. These Cr discrimination flag and the Cb discrimination flag may be generated within the linear array type multi-parallel processor 1 and provided on the local memory 15, or may also be generated by the numbering technique similar to that explained in connection with generation of the Cr and Cb flags.

At the next step ST142, logical sum (AND) operation is carried out for each of the Cr and Cb discrimination flags with the 4:2:2 format chroma signals of FIG. 34.

At step ST143, a signal comprised of alternate repetition of the Cr signal obtained by the logical product operation and 0 is saved on the local memory 15.

At the next step ST144, the signals from the steps ST142 and ST143 are processed with FIR filtering with three taps of ½, 1 and ½. Although this is simply average interpolation, there is no problem rased since the frequency range is narrow from the outset with chroma signals of the 4:2:2 format relative to the luminance signals.

The 4:4:4 format chroma signals, thus obtained, are outputted at step ST145.

The conversion of the number of pixels of the 4:1:1 format chroma signals is now explained.

Figure 36:
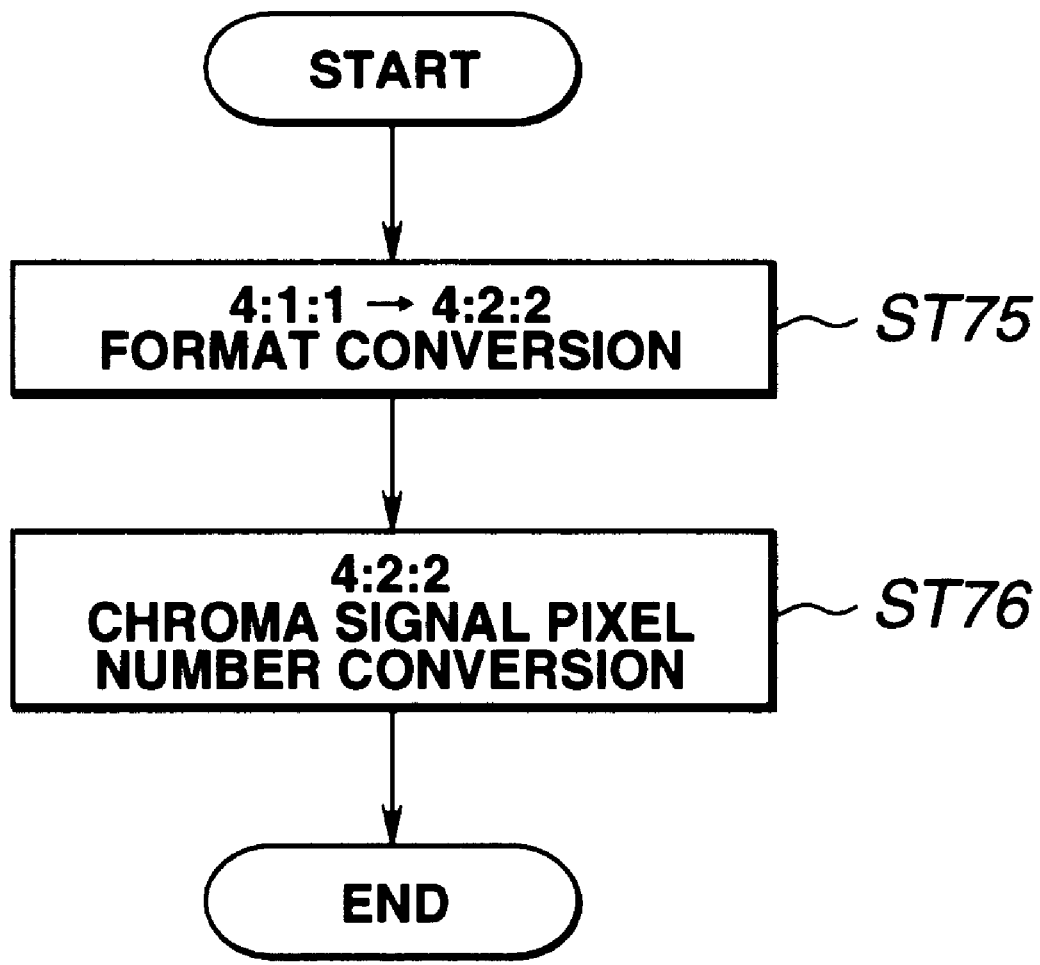
FIG. 36 is a flowchart for illustrating the overall flow of conversion of the number of pixels from the 4:1:1 format to the 4:4:4 format.

For conversion of the number of pixels for the 4:1:1 chroma signals, the 4:1:1 chroma signals are transiently converted at step ST75 in the flowchart shown in FIG. 36 in the linear array type multi-parallel processor 1 into 4:2:2 format chroma signals and, at the next step ST76, the 4:2:2 format chroma signals, obtained at step ST75, are processed with the conversion of the number of pixels such as is described in the foregoing.

Figure 37:
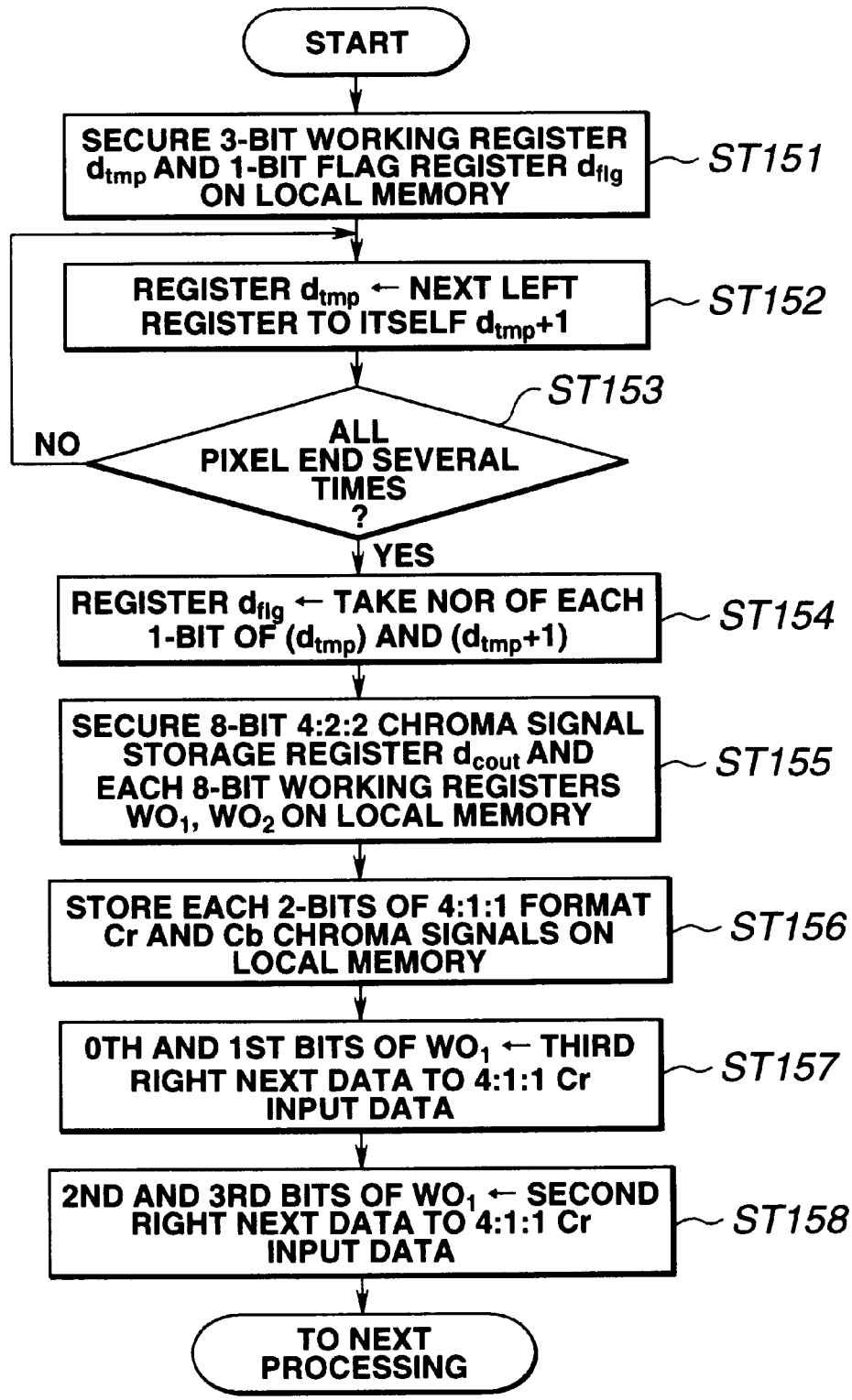
FIG. 37 is a flowchart for illustrating a former portion of the flow of format conversion from the 4:2:2 format to the 4:4:4 format.
Figure 38:
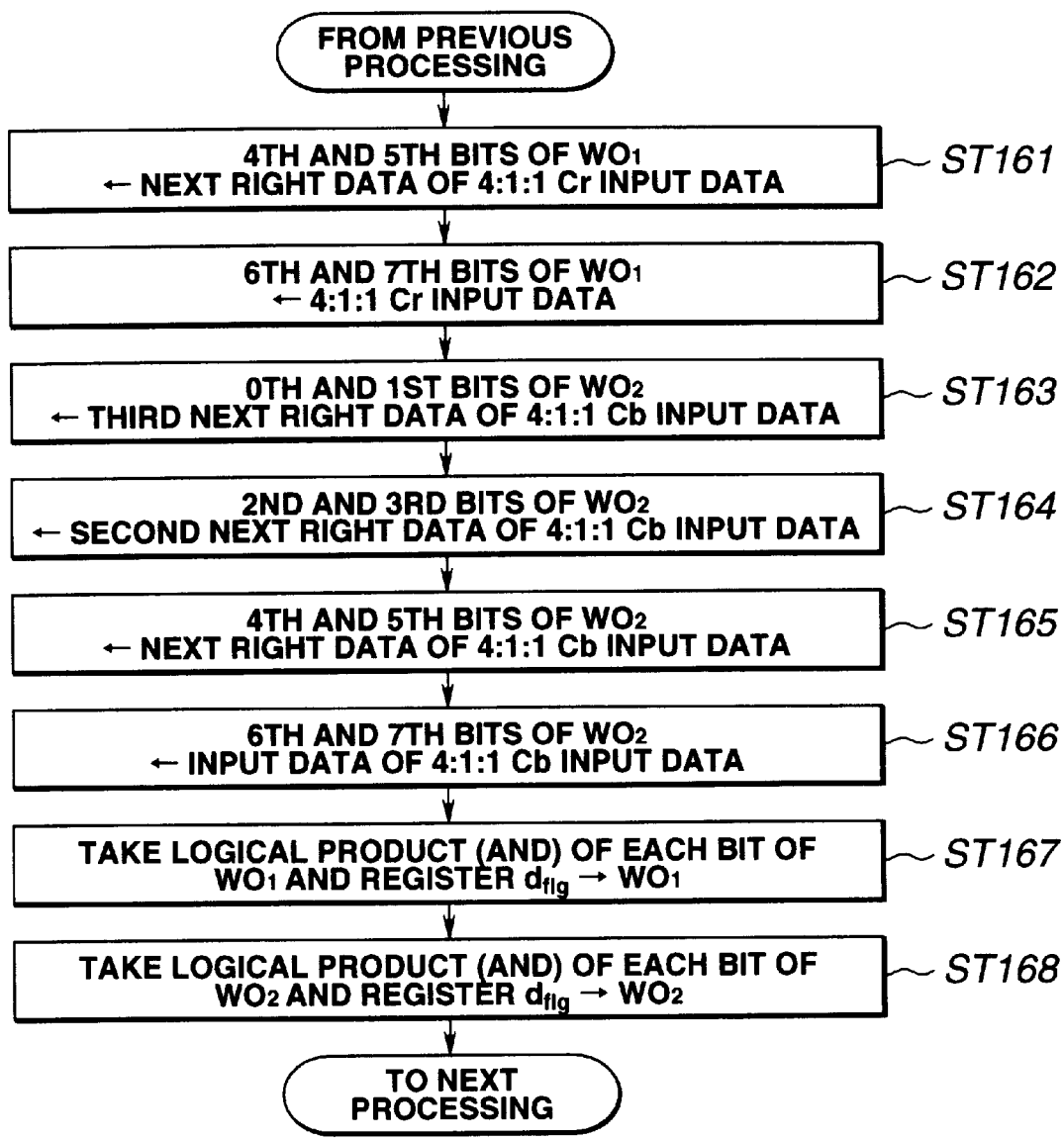
FIG. 38 is a flowchart for illustrating a mid portion of the flow of format conversion from the 4:2:2 format to the 4:4:4 format.
Figure 39:
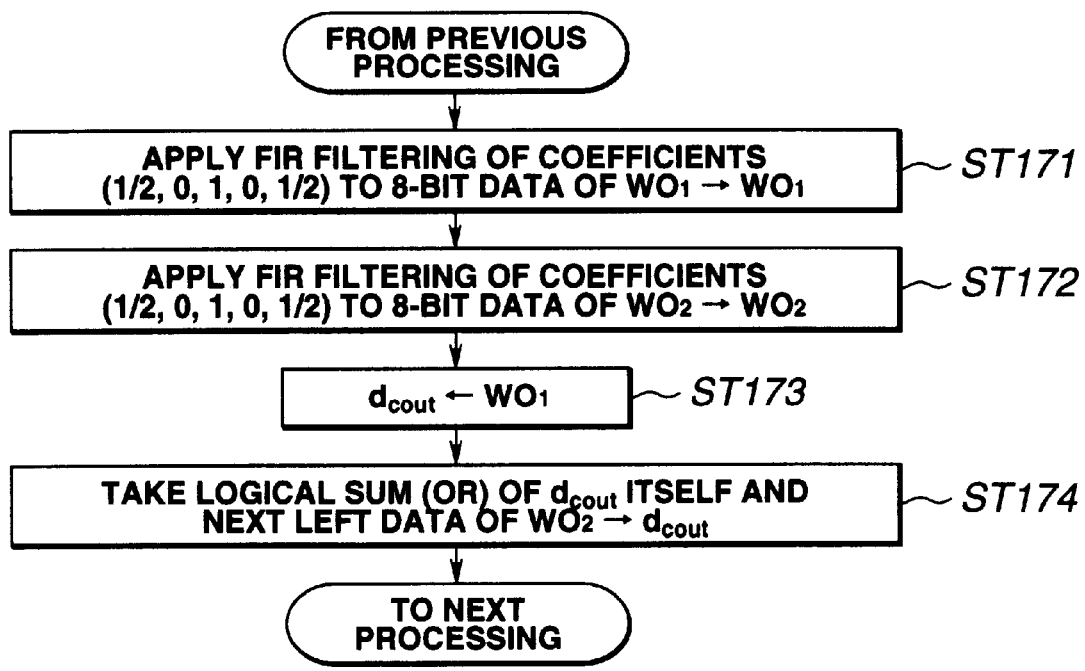
FIG. 39 is a flowchart for illustrating a latter portion of the flow of format conversion from the 4:2:2 format to the 4:4:4 format.
Figure 41:
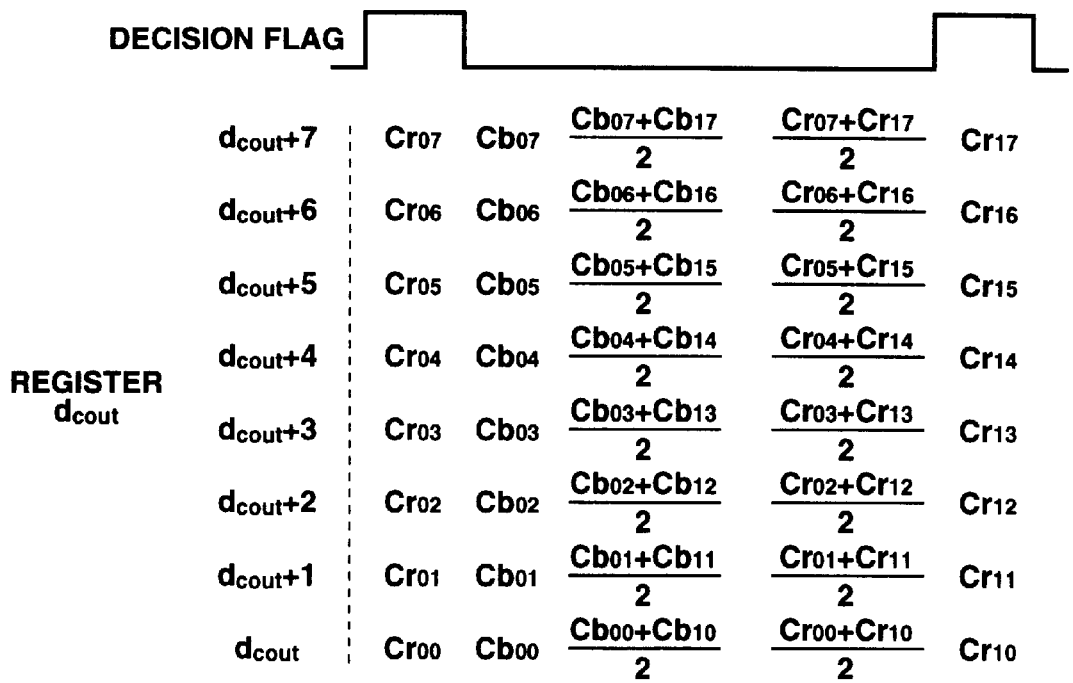
FIG. 41 illustrate, in continuation from FIGS. 40A to 40D, the contents of the local memory at the time of conversion of the number of pixels of the 4:1:1 format.

The flow of conversion processing from the 4:1:1 format to the 4:2;2 format at step ST75 in FIG. 36 is shown in the flowchart of FIGS. 37 to 39. The contents of the local memory 15 in the processing of FIGS. 37 to 39 are as shown in FIGS. 40 and 41. Although FIGS. 40 and 41 should be represented as a sole figure comprised of FIGS. 40 and 41 arrayed in this order, the figure is represented by two figures of FIGS. 40 and 41 for convenience in illustration. The processing of FIGS. 37 to 39 is explained by referring to FIGS. 40 and 41.

First, at step ST151, a discrimination flag register dflag for storing a 1-bit discrimination flag for representing the most significant bit (MSB) position of the 4:1:1 format chroma signals is secured on the local memory 15 of each of the element processors 10. This discrimination flag is a 4-cycle periodic signal shown in FIG. 40A as a discrimination flag signal and may be generated outside the linear array type multi-parallel processor 1 or within the processor 1 by the above-described numbering processing. If the discrimination flag is generated by the numbering processing within the linear array type multi-parallel processor 1, the discrimination flag register dflag is communicated between the element processors 10 in the processor 1 and moved towards left and right for coincidence with the MSB positions of the 4:1:1 format chroma signals. At step ST151, a 3-bit register, termed herein occasionally a working register dtemp, is also secured on the local memory 15.

At the next step ST152, the value of the working register dtemp on the local memory 15 of a next left element processor 10 of each element processor 10 plus 1 is stored in the working register dtemp of the element processors 10 under consideration.

At the next step ST153, it is judged whether or not the above processing has come to a close for all of the one-line pixels, which are at least more in number than the entire element processors 10. If the processing is judged to have not come to a close, processing reverts to step ST152 to repeat the above processing and, if otherwise, processing transfers to step ST154.

At the next step ST154, a NAND operation is carried out on each of lower two bits of the 3-bit working register dtemp as the value of the discrimination flag. The resulting value is stored as the above discrimination flag in the discrimination flag register dflag secured on the local memory 15. If the processing for determining the discrimination flag at this step ST154 is explained more specifically, it is judged whether or not the value of the lower two bits of the three-bit working register dtemp is '00'. If the value of the lower two bits is '00', the value of the discrimination flag is set to '1'. If the value of the lower two bits is not '00', the discrimination flag is set to '0'. However, since the leftmost element processor 10 has no left side neighbor, the value of the discrimination flag is not fixed, so that '0' is always set as a discrimination flag for the leftmost element processor 10.

At the next step ST155, an 8-bit chroma register dcout for the 4:2:2 format chroma signals and working registers WO1 and WO2 each of 8 bits are secured on the local memory 15 of each element processor 10.

At the next step ST156, the 4:1:1 format input Cr and Cb signals, each of 4:1:1 format, are stored in the local memory 15 of each element processor 10.

That is, at step ST157, two bits of the 4:1:1 format input Cr signal, stored in the local memory 15 of each third next right element processor 10, are stored in the 0th bit and the first bit of the 8-bit working register WO1 of the element processors 10 under consideration, respectively. These 0th bit and first bit are shown in FIGS. 40 as WO1 and WO1+1, respectively.

At the next step ST158, two bits of the 4:1:1 format input Cr signal, stored in the local memory 15 of each second next right element processor 10, are stored in the second bit and the third bit of the 8-bit working register WO1 of the element processors 10 under consideration, respectively. These second bit and third bit are shown in FIGS. 40 as WO1+2 and WO1+3, respectively. After processing of step ST158, processing transfers to step ST161 of the flowchart of FIG. 38.

At the next step ST161 of FIG. 38, two bits of the 4:1:1 format input Cr signal, stored in the local memory 15 of each next right element processor 10 are stored in the fourth bit and the fifth bit of the 8-bit working register WO1 of the element processors 10 under consideration, respectively. These third bit and fourth bit are shown in FIGS. 40 as WO1+4 and WO1+5, respectively.

At the next step ST162 of FIG. 38, two bits of the 4:1:1 format input Cr signal, stored in the local memory 15 of each element processor 10 under consideration, are stored in the sixth bit and the seventh bit of the 8-bit working register WO1 of the element processors 10 under consideration, respectively. These sixth bit and seventh bit are shown in FIGS. 40 as WO1+6 and WO1+7, respectively.

By the above processing, values of the input Cr signals as shown in FIG. 40B are stored in the working register WO1 within the local memory 15.

On the working register WO2, similar processing is carried out. Specifically, at step ST163, two bits of the 4:1:1 format input Cb signal, stored in the local memory 15 of each third next right element processor 10, are stored in the 0th bit and the first bit of the 8-bit working register WO2 of the element processors 10 under consideration, respectively.

At the next step ST164, two bits of the 4:1:1 format input Cb signal, stored in the local memory 15 of each second next right element processor 10, are stored in the second bit and the third bit of the 8-bit working register WO2 of the element processors 10 under consideration, respectively.

At the next step ST165, two bits of the 4:1:1 format input Cb signal, stored in the local memory 15 of each second next right element processor 10, are stored in the fourth bit and the fifth bit of the 8-bit working register WO2 of the element processors 10 under consideration, respectively.

At the next step ST166, two bits of the 4:1:1 format input Cr signal, stored in the local memory 15 of each element processor 10 under consideration, are stored in the sixth bit and the seventh bit of the 8-bit working register WO2 of the element processors 10 under consideration, respectively.

At step ST267, the bits of the working register WO1 stored as described above are ANDed the decision flag bit stored in the decision flag register dflag. The resulting value is returned to the working register WO1.

By this processing, the values shown for example in FIG. 40C are stored in, for example, the working register WO1 in the local memory 15.

At the next step ST169, each of 8 bits of the working register WO2 stored as described above is ANDed with the discrimination flag bit stored in the discrimination flag register dflag. The resulting logical sum value is returned to the working register WO2.

Then, at step ST1171 of the flowchart of FIG. 39, FIR filtering with three taps of ½, 1 and ½ is carried out on the eight bits of the working register WO2 for each of the element processors 10.

By the above processing, values as shown in FIG. 40D are stored in, for example, the working register WO1 within the local memory 15.

Then, at step ST172, FIR filtering with three taps of ½, 1 and ½ is carried out on the eight bits of the working register WO2 for each of the element processors 10.

At the next step ST173, the values of the working register WO1 are stored in the 4:2:2 format chroma register dcout.

Finally, the value of the working register WO2 of each next left element processor is ORed with the value of the chroma register dcout of the element processors 10 under consideration 10. The resulting value is returned to the chroma register dcout of the element processors 10 under consideration 10.

By the above processing, the values shown in FIG. 41 are stored in the 4:2:2 format chroma register dcout in the local memory 15. Meanwhile, in this chroma register dcout, the 0th bit, first bit, second bit and so forth up to the seventh bit are indicated as dcout, dcout+1, dcout+2, . . . , dcout+7.

Then, processing transfers to step ST76 of FIG. 36.

Figure 42:
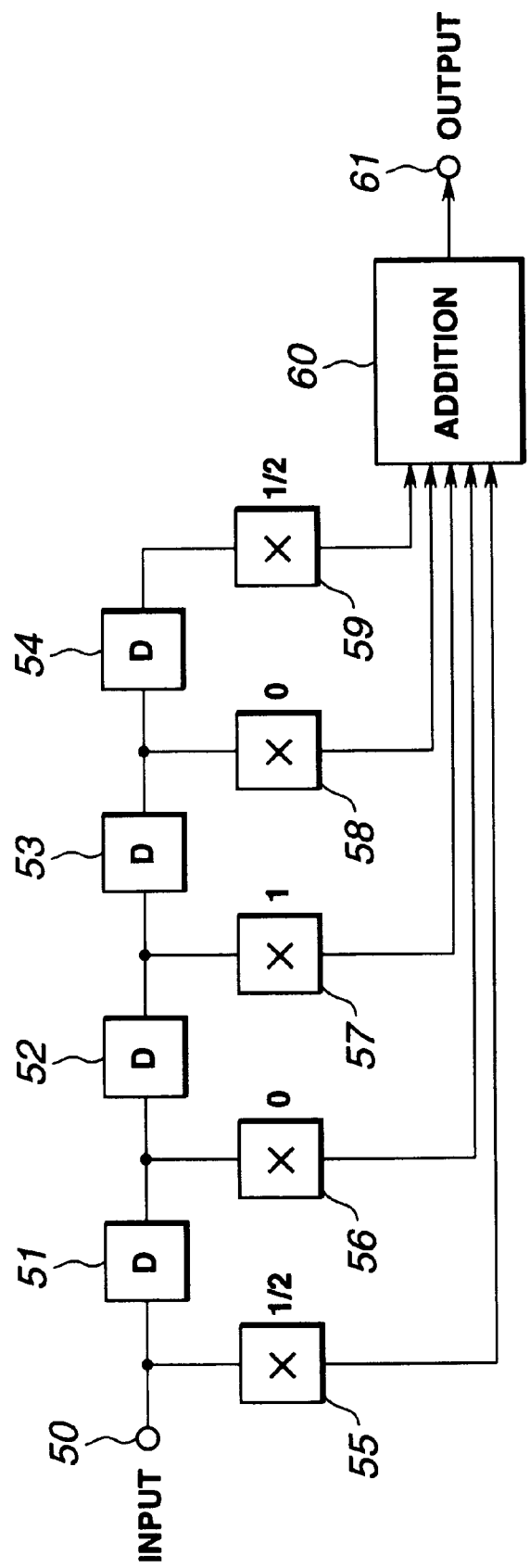
FIG. 42 illustrates the structure of a FIR filter used for format conversion from the 4:1:1 format to the 4:2:2 format.

The FIR filter at steps ST171 and ST172 in FIG. 39 may be configured as shown in FIG. 42.

In FIG. 42, chroma data are sent to an input terminal 50 and thence sequentially supplied to serially connected one-sample delay units 51 to 54. The delay units 51 to 54 delay the supplied data by one sample. The input data at the input terminal 50 and the output data of the delay units 51 to 54 are sent to associated multipliers 55 to 59.

In these multipliers 55 to 59, multiplication coefficients (filter coefficients) of ½, 0, 1, 0 and ½ are set, respectively. Thus, the multipliers 55 to 59 multiply the multiplication coefficients by output data of the delay units 51 to 54. The results of multiplication by the multipliers 55 to 59 are summed together by the adder 60 and taken out as FIR filter output at an output terminal 61.

Such FIR filter, shown in FIG. 42, can be easily realized by near-by communication between element processors 10.

If the 4:1:1 format chroma signals are converted to the 4:2:2 format chroma signals as described above, the conversion of the number of pixels of the 4:1:1 format then becomes feasible by using the above-described algorithm for conversion of the number of pixels in the 4:2:2 format or by converting the 4:2:2 format into the 4:4:4 format and using the above-described algorithm for conversion of the number of pixels in the 4:4:4 format.

Although the foregoing description has been made of enlarging conversion processing for the number of pixels and contracting conversion of the number of pixels, these techniques can be directly adapted to conversion processing for the sampling frequency by independently controlling the input rate and the output rate of pixel data.

The conversion processing for the number of scanning lines is now explained.

In the conversion processing for the number of scanning lines, according to the present invention, real-time conversion of the number of scanning lines, characteristic of the present invention, is also feasible.

If sampling points in the horizontal direction of video signals are viewed in the vertical direction and each pixel is replaced by a line, the conversion is that of the number of scanning lines. Thus, the concept of the conversion of the number of pixels can be directly applied. In this case, the input/output skip function can be adjusted by, for example, an external field FIFO memory. The control signal can be found simultaneously with those of the line attribute information based on this line attribute information.

The same operation can be performed for the luminance signals and chroma signals without it being necessary to make distinction between the two signals.

In the conversion of the number of pixels, the operation is carried out on the pixel basis. The conversion processing for the number of scanning lines can be handled in the same manner provided that the operation is performed on the line basis instead of on the pixel basis. Specifically, a line to be interpolated is calculated by cubic processing of the 4-line data near the input line and the line phase information. It is noted that, while calculations of the pixel skip information and the pixel phase information for the conversion of the number of pixels shown at step ST2 of FIG. 18 are performed during the blanking period or on power up, the conversion processing for the number of scanning lines differs significantly from that for the number of pixels in that the input skip line information, output skip line information and the line phase information are calculated from line to line and in that a register is provided for two sorts of the line phase information, namely the phase information for enlarging and that for contraction. By having these two sorts of the line phase information, it becomes possible to realize conversion at an optional ratio from contraction to enlargement. Moreover, by controlling the processing programming of the DSP itself and the external field memory by the above-mentioned skip line control signal and the input skip line control signal as found from these two sorts of the phase information, it becomes possible to reduce the volume of the local memory in the DSP as required for interpolation.

Figure 43:
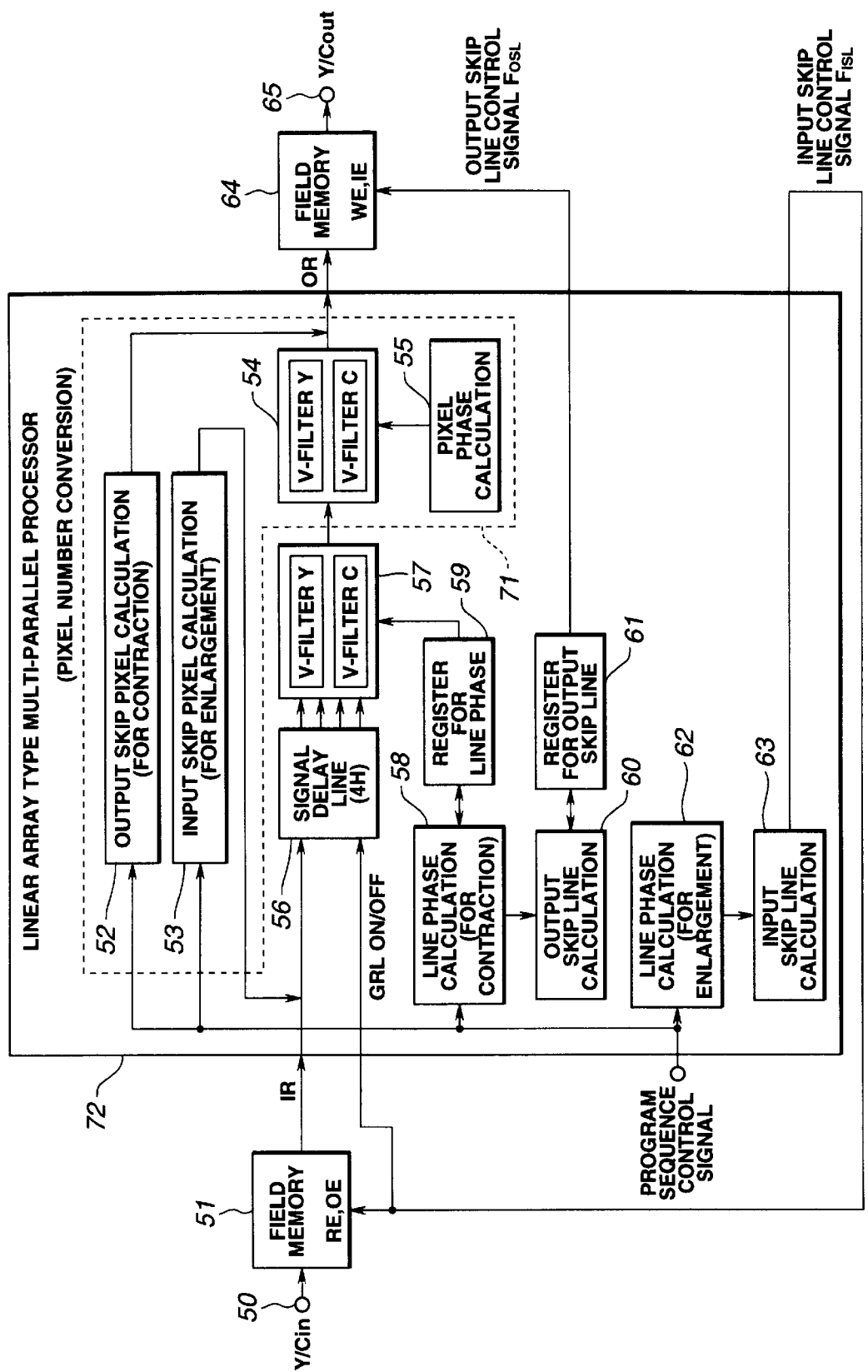
FIG. 43 illustrates the structure for conversion of the number of scanning lines and the number of pixels at an optional ratio.

FIG. 43 shows a typical block structure for conversion of the number of pixels and conversion processing for the number of scanning lines using the DSP. In this case, in a linear array type multi-parallel processor 72, conversion of the number of pixels and conversion processing for the number of scanning lines are carried out in an area encircled by a broken line (unit for conversion of the number of pixels 71) and in the remaining area, respectively. Since the DSP is inherently not hardware, but is software, the method of actual realization differs. However, the internal signal processing is shown blocked as in FIG. 43 such that the unit for conversion of the number of pixels 71 can be demarcated from the remaining unit for conversion processing for the number of scanning lines. Since the conversion of the number of pixels has already been explained in the foregoing, the structure and the operation of conversion processing for the number of scanning lines is hereinafter explained.

The recipe for realizing actual conversion processing for the number of scanning lines is explained. However, since the concrete structure is the same as that used for the conversion of the number of pixels, only brief explanation is given for the structure of the linear array type multi-parallel processor.

Referring to FIG. 43, the unit for conversion of the number of pixels 71 of the linear array type multi-parallel processor 72 includes an output skip pixel calculating unit 52 for calculating output skip pixels, an input skip pixel calculating unit 72 for calculating the input skip pixels, a filter for luminance and chroma 54 and a pixel phase calculating unit 55.

The unit for conversion processing for the number of scanning lines in the linear array type multi-parallel processor 72 includes a contracting line phase calculating unit 58, an enlarging line phase calculating unit 62, an output skip line calculating unit 60, an input skip line calculating unit 63, a line phase register 59, an output skip line register 61, a signal delay line 56 and a filter unit 57. The contracting line phase calculating unit 58, enlarging line phase calculating unit 62, output skip line calculating unit 60, input skip line calculating unit 63, line phase register 59 and the output skip line register 61 signal correspond to those for conversion of the number of pixels described above. However, these components perform line-based processing.

To a data input terminal 50 are entered luminance signals and chroma signals IR which are then supplied via an external field memory 51 to the linear array type multi-parallel processor 72. The signals IR supplied from the field memory 51 are supplied to the signal delay line 56 of the unit for conversion processing for the number of scanning lines. The signal delay line delays the signal by 4H (4 horizontal periods) to output the delayed signal on the line basis. These line-based signals are sent to the filter unit 57 similar in structure to the filter unit 54. An output of the filter unit 57 are sent via filter unit 54 of the unit for conversion of the number of pixels 71 to an external field memory 64 as an output signal OR. It is these luminance signals and chroma signals from the field memory 64 that are outputted at a data output terminal 65 as a converted number of pixels data or as a converted number of scanning lines data.

The input skip line calculating unit 63 outputs an input skip line control signal FISL as a control signal for the field memory 51 as later explained. The output skip line register 61 outputs an output skip line control signal FOSL as a control signal for the field memory 64 as later explained. The line phase register 59 outputs a control signal for the filter unit 57.

Figure 44:
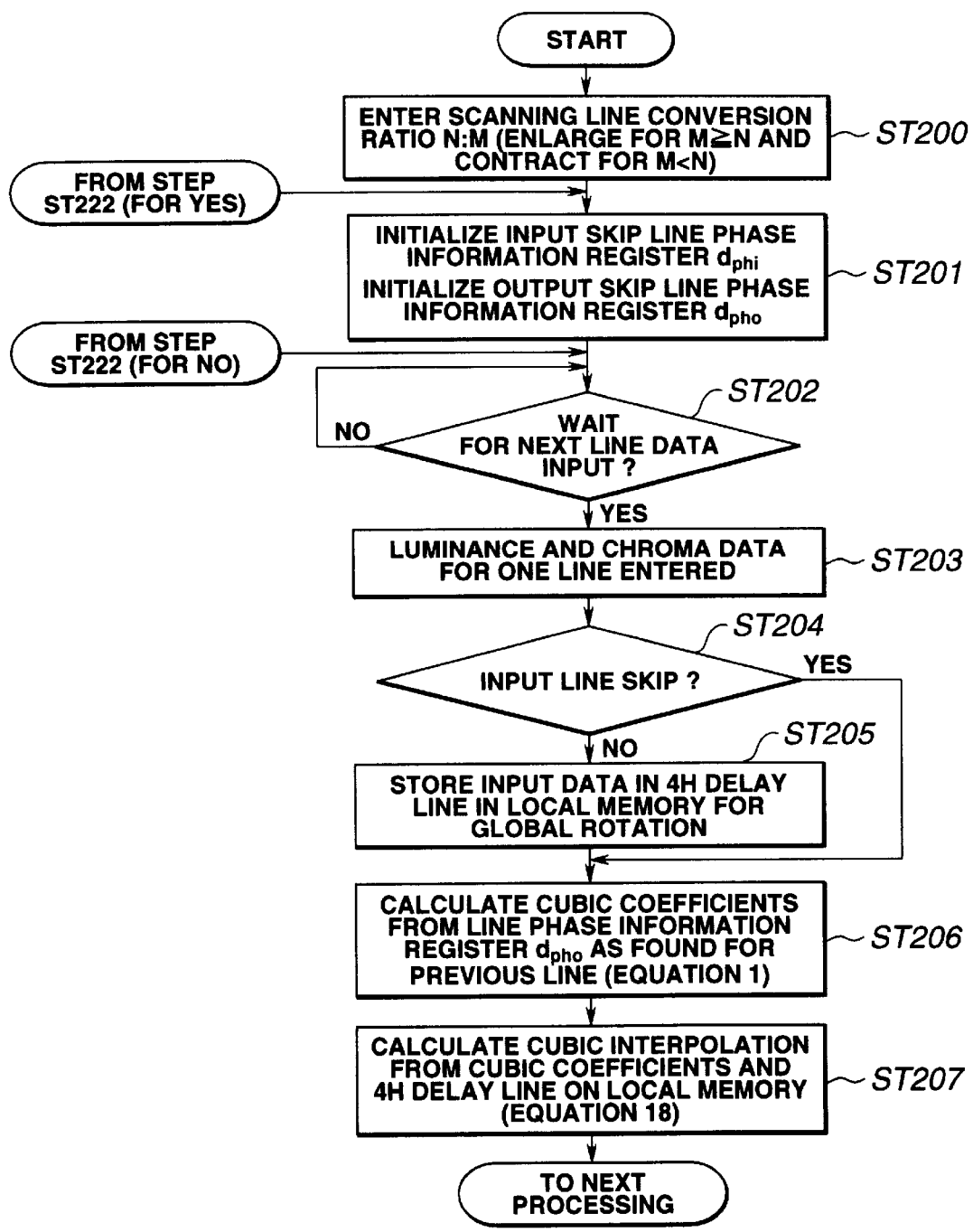
FIG. 44 is a flowchart for illustrating the flow of a former portion of the conversion processing for the number of scanning lines.
Figure 45:
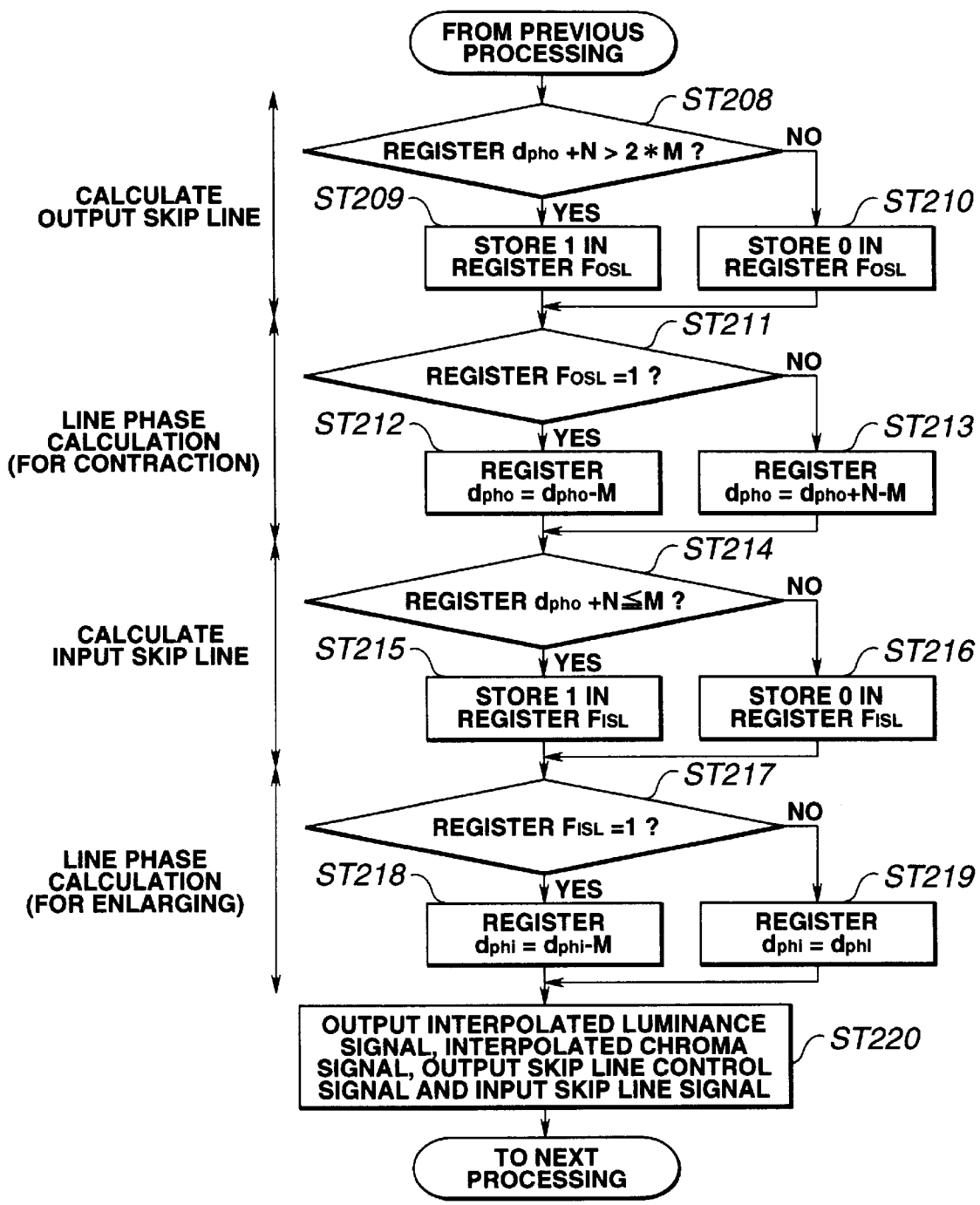
FIG. 45 is a flowchart for illustrating the flow of a mid portion of the conversion processing for the number of scanning lines.
Figure 46:
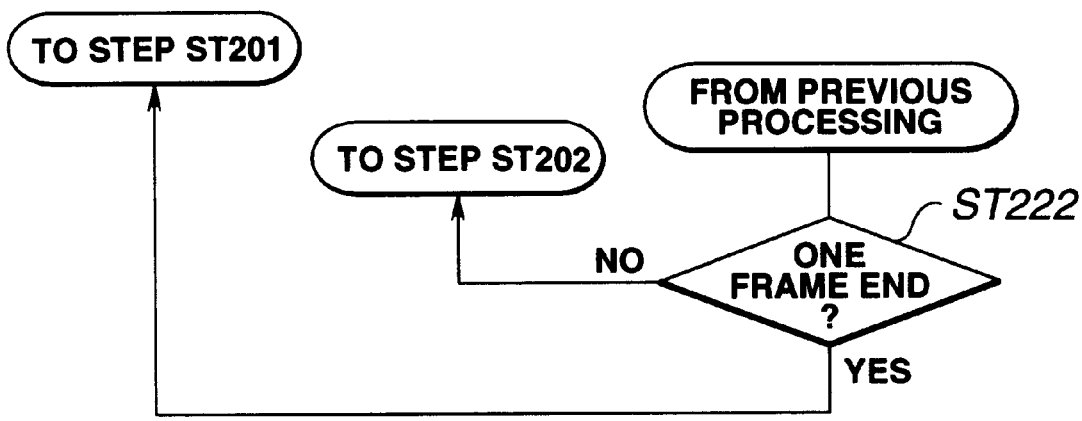
FIG. 46 is a flowchart for illustrating the flow of a latter portion of the conversion processing for the number of scanning lines.

Referring to FIGS. 44, 45 and 46, the overall processing flow in the unit for conversion processing for the number of scanning lines is explained.

In FIG. 44, the conversion ratio N:M for conversion processing for the number of scanning lines is set at step ST200. It is noted that N and M are positive integers and M≧N specifies enlarging conversion processing for the number of lines while M<N specifies contracting conversion of the number of lines. The isomultiple conversion with the conversion ratio of 1:1 is included in the enlarging conversion.

At the next step ST201, the first line of a picture frame is processed. Specifically, the line phase information dphi used for calculating the input skip line, and the line phase information dpho used for calculating the output skip line, are initialized. However, since delay is caused in the processing in the linear array type multi-parallel processor, the line phase information dphi is given an offset phase corresponding to the delay time, for compensating the delay, with the line phase information dpho being set to zero.

At step ST202, it is judged whether or not data inputting of one-line pixel data for the next line is possible. This judgment is repeated until inputting of the next line of the pixel data becomes possible. If the inputting of the next line of the pixel data becomes possible at step ST202, one-line pixel data is entered at the next step ST203.

At the next step ST204, the input skip line control signal FISL as later explained is referred to such that, if the input skip line control signal FISL is zero, the one-line data entered at step ST203 is stored in the 4h delay line 56 on the local memory 56. If the input skip line control signal FISL is 1, this line is deemed to be unnecessary and is destructed without being stored in the 4H delay line 56. Then, processing transfers to step ST206.

Figure 47:
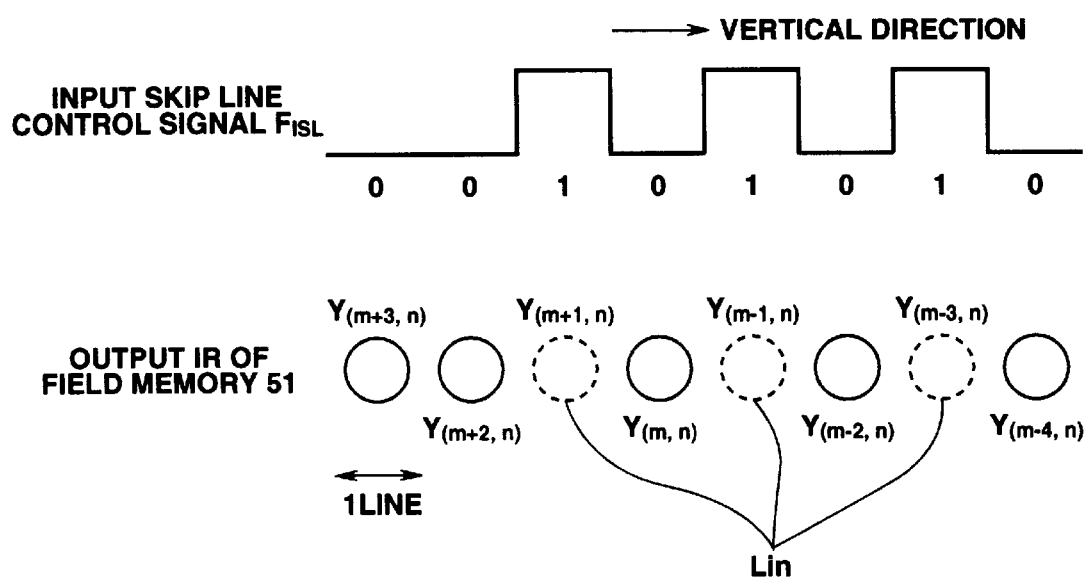
FIG. 47 illustrates the operation of the enlarging conversion of lines for luminance signals.

This input skip line control signal FISL becomes meaningful at the time of enlarging conversion processing for the number of scanning lines. FIG. 47 shows the relation between the input skip line control signal FISL and data of the field memory 51 at the time of enlarging conversion.

In FIG. 47, Lin denotes a skipped line. Specifically, if the input skip line control signal FISL is 1, the field memory 51 ceases to output data and refrains from taking in data, whereas, if the input skip line control signal FISL is 0, data from the memory is taken in and stored in a 4H delay line 56 required for interpolation. Although the polarity of the input skip line control signal FISL of 1 and 0 denote skip and non-skip, respectively, this needs to be reversed f the field memory control signal is of opposite polarity.

In FIG. 43, the control signal GRL of the 4H delay line 56 specifies the so-called global rotation. Specifically, the control signal GRL equal to 1 or 0 denotes delaying or not delaying the respective line data by one line, respectively. Since the processing is line-based and data in the local memory is shifted in the DSP so that instructions as small as tens of steps suffices.

By the above processing, 4-line data necessary for cubic interpolation is obtained in the signal delay line 56. In FIG. 47, for example, the line shown in FIG. 48 is stored in the local memory 15 of the signal delay line 56.

Figure 49:
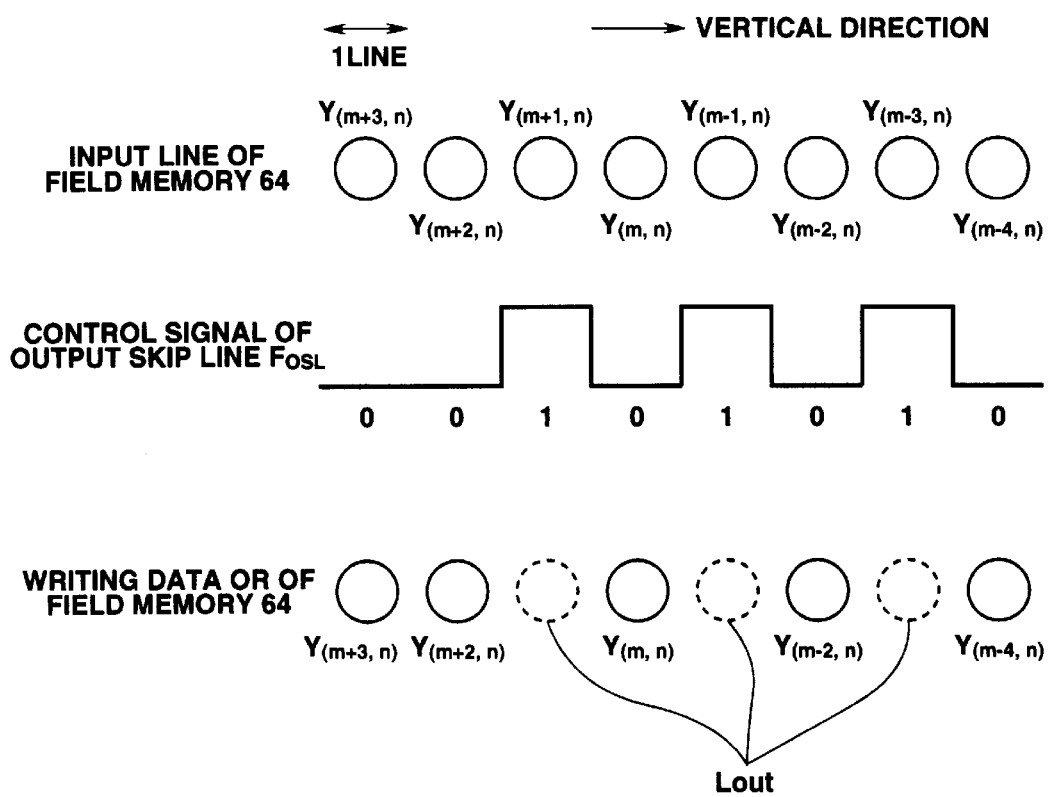
FIG. 49 illustrates the operation for contracting conversion of the number of lines for luminance signals.

This output skip line control signal FOSL becomes meaningful at the time of reducing conversion processing for the number of scanning lines. FIG. 49 shows the relation between the output skip line control signal FOSL and data of the field memory 51 at the time of reducing conversion.

Figure 50:
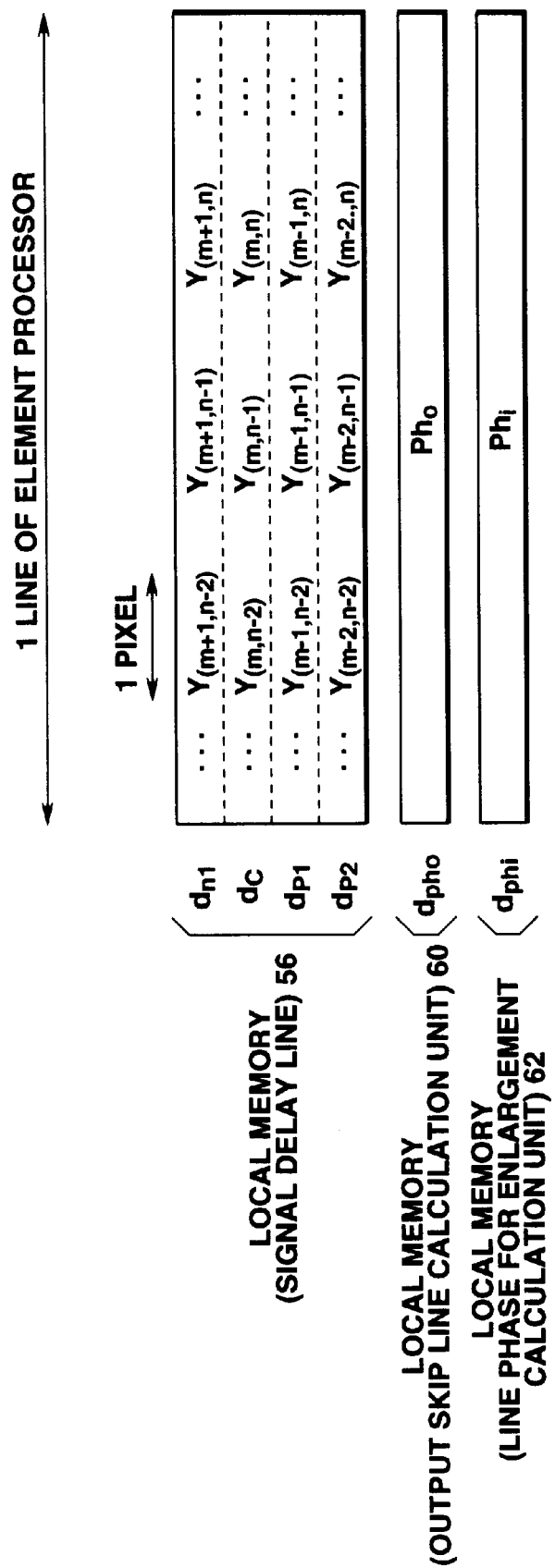
FIG. 50 illustrates the contents of a local memory in the illustration of the operation for contracting conversion of the number of lines for luminance signals.

In FIG. 49, Lout denotes a skipped line. Specifically, if the output skip line control signal FOSL is 1, the field memory 51 refrains from taking in data, whereas, if the output skip line control signal FOSL is 0, the field memory 64 takes in data of the output signal OR. Although the polarity of the output skip line control signal FOSL of 1 and 0 denote skip and non-skip, respectively, this needs to be reversed if the field memory control signal is of opposite polarity. FIG. 50 shows the contents of the local memory at this time.

At step ST206, the cubic coefficients are computed from the output skip line phase information dpho using the equation (1). Not only the output skip line phase information dpho but also the skip line phase information dphi denotes the line phase information. The input skip line phase information dphi is, however, not used for actual interpolation calculations but is used for determining the input skip line as later explained. Thus, there are two sorts of the line phase information, namely dphi and dpho. However, by using only output skip line phase information dpho for actual interpolation calculations, it becomes possible to realize conversion at an optional ratio from reduction to enlargement.

At step ST207, a line Qv interpolated by convolution calculations of the cubic coefficients as found at step ST206 and pixel data of the four near-by lines is represented by the following equation (18):

$$Qv = C_1((M+dpho)/M)*dp2 + C_2(dpho/M)*dp1 + C_2(M-dpho)/M)*dc + C_1((2M-dpho)/K)*dn1 \qquad (18)$$

where $C1(x) = -|x|^3 + 5|x|^2 - 8|x| + 4$
$C2(x) = |x|^3 + 2|x|^2 + 1$

The output skip line phase information dpho denotes the register 60 having stored therein the output skip line phase information dpho of the previous line (register of the output skip line calculating unit 60), as will be explained subsequently. Meanwhile, dp2, dp1, dc and dn1 denote input lines delayed by 3H, 2H, 1H and 0H, respectively.

FIG. 48 shows the state of each register of the local memory of each constituent device. The output skip line phase information dpho is of a fixed value in each pixel in a given line.

At steps ST208 to 210, it is judged whether or not the line is the output skip line of the next line. Specifically, the value stored in the output skip line phase register dph0 of the previous line is added to with N. If the resulting value is larger than M times 2, '1' is stored in the 1-bit register FOSL to skip the output line. If otherwise, '0' is stored in the register FOSL so as not to skip the output line.

At the next steps ST211 to 213, the output skip line phase register dph0 of the next line is calculated in accordance with the register FOSL specifying the output skip line. If the register FOSL as calculated at steps ST209 and ST210 is 1, the output skip line phase register dpho is set to the output skip line phase register dpho of the current line dph0 less M and, if otherwise, it is set to the output skip line phase register dpho of the current line dph0 plus (N−M).

At steps ST214 to 216, it is judged whether or not the next line is the input skip line. Specifically, the value stored in the output skip line phase register dph1 of the previous line is added to with N. If the resulting value is equal to or less than the value of M, '1' is stored in the 1-bit register FISL to skip the input line. If otherwise, '0' is stored in the register FISL so as not to skip the input line.

At the next steps ST217 to ST219, the input skip line phase register dph1 of the next line is calculated in accordance with the register FISL specifying the input skip line. If the register FISL calculated at steps ST214 to ST216 is 1, the input skip line phase register dph1 of the next line is set to the input skip line phase register dph1 of the current line less M and, if otherwise, it is not changed.

At step ST220, data following the cubic interpolation calculations as described above, the output skip line control signal FOSL and the input skip line control signal FISL are outputted.

The sequence of operations up to step ST220, representing calculations for one line, is repeated for one frame duration. That is, it is judged at step ST222 whether or not one frame has come to a close. If the result is YES, processing reverts to step S201 of FIG. 44 and, if otherwise, processing reverts to step S202.

In the above-described embodiment of the present invention, the conversion of the number of pixels and conversion processing for the number of scanning lines at an optional ratio may be realized solely by software processing by a linear array type multi-parallel processor DSP using a filter switching interpolation system (cubic filter interpolation system) which has been difficult to implement by hardware because of the circuit scale and complex structure. It is moreover possible to cope with conversion of the number of pixels which has been difficult to implement with a hard-wired system, such as ASIC, and to cope with optional chroma formats, such as the 4:4:4, 4:2:2 or 4:1:1 formats. Moreover, in contradistinction from the conventional hard-wired circuit, a variety of formats or bit fineness can be coped with solely by changing the software, so that there is no necessity of providing a new external circuit.

Moreover, with the embodiment of the present invention, it becomes possible to convert the number of pixels or the number of scanning lines to an optional size on the real-time basis.

In accordance with the present invention, digital signal processing for conversion of the number of pixels or conversion processing for the number of scanning lines at an optional ratio can be realized by software processing employing the SIMD-controlled linear array type multi-parallel processor such that the conversion ratio for the number of pixels or the number of scanning lines can be independently set on the real-time basis. As for the conversion processing for the number of scanning lines, a memory control circuit becomes unnecessary by calculating the control signal for the field memory by a linear array type multi-parallel processor. According to the present invention, not only the 4:4:4 format but also any optional chroma format, such as the 4:2:2 or 4:1:1 format, can be coped with.

Referring to the drawings, a preferred modified embodiments of the present invention will be explained in detail. The basic internal structure and the basic operation of the linear array type multi-parallel processor are similar to those of the above-described linear array type multi-parallel processor and hence are not explained specifically.

First, enlarging conversion of the number of pixels is explained.

Figure 51:
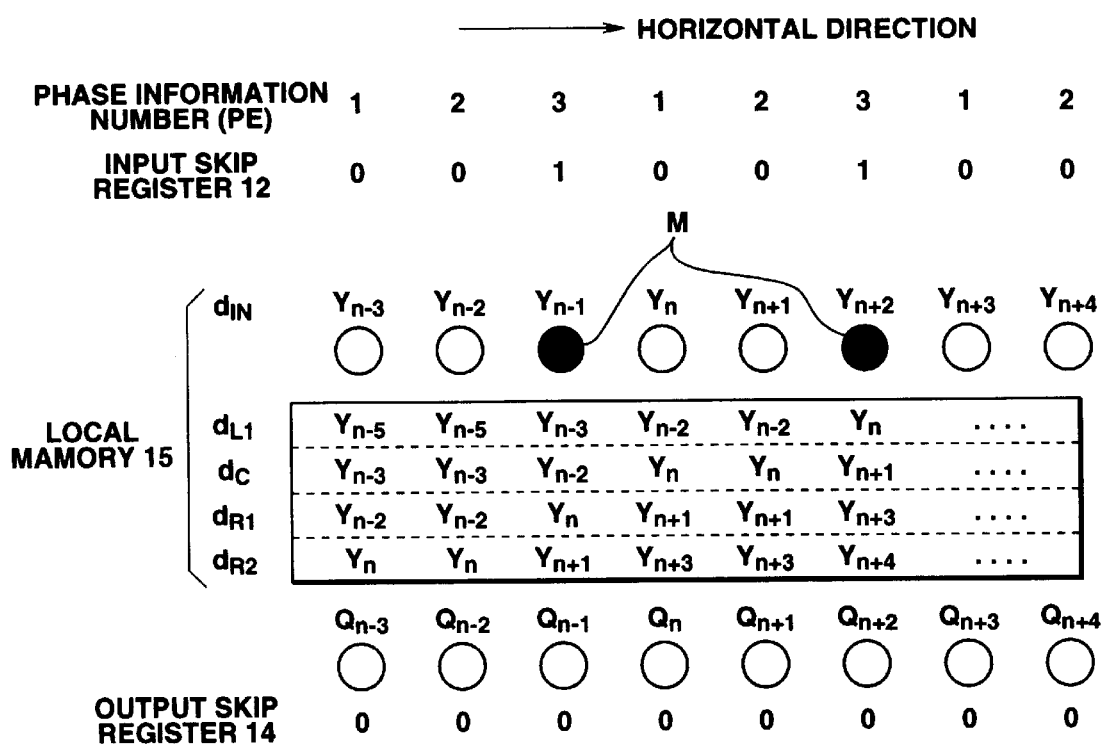
FIG. 51 illustrates the operation of enlarging conversion of the number of pixels by 2:3 embodying the present invention.

Here, 2:3 enlarging conversion processing for the number of pixels is taken as an example for an illustrative conversion ratio and explained with reference to FIG. 51. The concept is basically the same for any other optional ratio. Since it has been explained that the conversion of the number of pixels is convolution calculations of the 4-point input pixel data in the neighborhood of the pixel to be interpolated and the cubic interpolation function, it is shown here how convolution calculations are carried out under SIMD control. Meanwhile, FIG. 51 shows the relation between the phase information number stored in the phase information storage register of the local memory 15, the pixel skip information stored in the input skip register 12 and in the output skip register 14 and each pixel data stored in the local memory 15. In the example of FIG. 51, a given element processor 10 is associated with a vertical column in FIG. 51. Also, in FIG. 51, Y and Q specify pixel data, and dIN, dL1, dc, dR1 and dR2 specify storage areas (registers) for separate storage of pixel data and on the local memory 15. In the registers dL1, dc, dR1 and dR2, pixel data of the four near-by points corresponding to the phase information number are stored. Meanwhile, input pixel data are stored in the register dIN.

In the above-described 2:3 enlarging conversion processing for the number of pixels, since the number of output pixels is ⅔ times the number of the input pixels, dummy data M is entered as every other pixel at the time of inputting data, so that, at the inputting stage, the total number of pixels is set so as to be equal to the number of output pixels. FIG. 51 shows the state in which the dummy data M is used for previously increasing the number of pixels at the inputting time for providing a data array suited for SIMD control and is not actually used in the convolution calculations. Therefore, the dummy data M may of any suitable value. For setting whether or not dummy data M is to be inserted, in other words, whether or not input pixel data should be skipped, only one bit suffices. That is, a bit '1' specifies that a dummy data M is to be inserted, that is the input pixel data is to be skipped, while a bit '0' specifies that a dummy data M is not to be inserted, that is the input pixel data is not to be skipped. The information specifying whether or not the dummy information is to be inserted is the above-mentioned pixel skip information. For implementing the 2:3 enlarging conversion processing for the number of pixels, it suffices if the periodic signal of inserting '1' every two bits (pixel skip information) is inserted and stored, as shown in FIG. 51.

In the 2:3 enlarging conversion processing for the number of pixels, the cubic coefficients used in the interpolation calculations are also of a three-pixel period pattern. The cubic coefficients themselves can be found from the equation (1) for the cubic coefficients if only the conversion ratio is found. The cubic coefficients thus found are stored during, for example, the programming, on the local memory 15 (the register for cubic coefficients). For 2:3 enlarging conversion processing for the number of pixels, the number of the cubic coefficients is (4 patterns×3). It is noted that, if viewed in the horizontal direction, the cubic coefficients are of the same value in any local memory 15 of the element processor 10, so that, in case of, for example, polyphase filtering with different filter coefficients from pixel to pixel, it is necessary to perform re-arraying so that the coefficient sets will be switched from pixel to pixel, that is from one element processor 10 to another. This method will be explained subsequently. In the 2:3 enlarging conversion processing for the number of pixels, there are three coefficient sets.

As for the convolution calculations, it suffices to execute three sorts of calculations repeatedly for the 2:3 enlarging conversion processing for the number of pixels. For each input pixel, it is necessary to determine in advance which phase pixel data should be used for calculations. This information is the phase information number PE. In the enlarging conversion processing for the number of pixels in the SIMD-controlled linear array type multi-parallel processor 1 of the present embodiment, the phase information number PE specifying phase points of the cubic interpolation is initially allocated to all of the element processors 10.

In the 2:3 conversion of the number of pixels, in which the number of input pixels being multiplied by 3/2, the number of phases of the FOR filter is 3, as explained previously, with the phase information number PE being a periodic pattern, such as 1, 2, 3, 1, 2, 3, . . . . In actually carrying out interpolation filter calculations by the SIMD-controlled linear array type multi-parallel processor 1, it is necessary to hold one scanning line of the periodic patterns in advance. In the linear array type multi-parallel processor 1 of the present embodiment, the periodic pattern of the phase information number PE is calculated, such as during the blanking period of video signals, and the calculated periodic pattern is stored in the phase information storage register allocated in the local memory 15 of each element processor 10.

Figure 52:
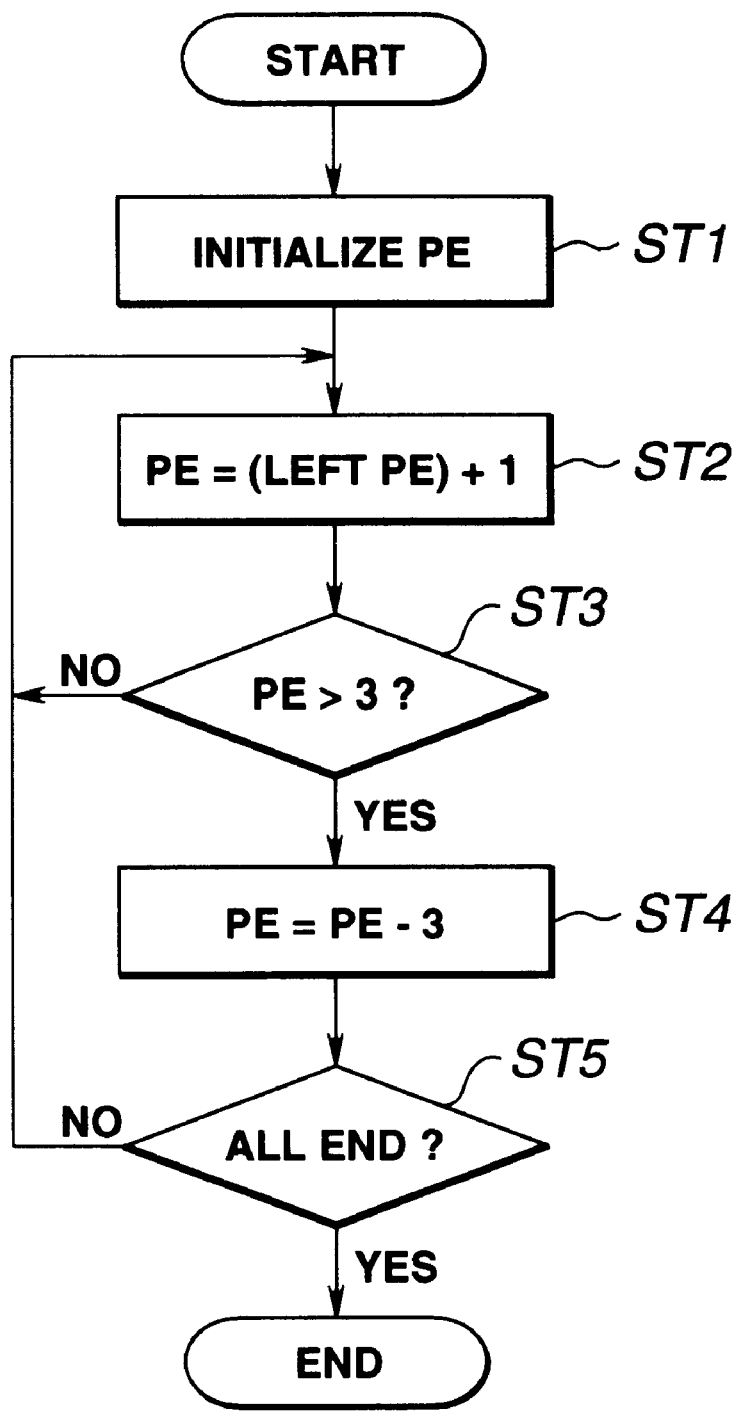
FIG. 52 is a flowchart for illustrating the sequence of numbering of the phase information.

FIG. 52 shows a flowchart for calculating the periodic pattern of the phase information number PE in case of calculations in the linear array type multi-parallel processor 1. In FIG. 52, PE denotes the one-line phase information number as explained above. The phase information number PE 1, 2, 3, . . . , is stored in the phase information storage register of the local memory 15.

As the hypothesis for flowchart processing of FIG. 52, the one-line pixel data is referred to under SIMD control and the values of the left and right neighboring pixels can be referred to for any pixel in a line, with the values of both end pixels of the line being zero at all times.

In the flowchart of FIG. 52, showing the sequence of calculations of the phase information number PE, the value of the phase information number PE represented by two bits is initialized to zero. Specifically, the value of the phase information storage register in which to store the phase information number PE on the local memory 15 is cleared.

At the next step ST2, the value stored in the phase information storage register of the local memory 15 of each left adjacent element processor 10, that is the value of the phase information number PE associated with the left adjacent pixel, is added to with 1, and the resulting value is stored in the phase information storage register of the element processors 10 under consideration.

At the next step ST3, if the value of the phase information number PE as found at step ST2 is not above 3, processing reverts to step ST2 and, if otherwise, 3 is deducted from the value of the phase information number PE stored in the phase information storage register of the local memory 15 under consideration.

Then, at step ST5, it is judged whether or not the processing from step ST1 to ST4 has come to a close in association with the number of pixels for one line. If the result is NO, processing transfers to step ST1 and, if otherwise, processing comes to a close.

The phase information numbering shown in FIG. 52 is calculated during the period when there is no image signal, such as on power up or during the blanking period.

The processing of selecting the cubic coefficients based on the phase information number as found as described above is explained. In the present explanation, the 2:3 enlarging conversion processing for the number of pixels is taken as an example.

Before selection of the cubic coefficients, three sorts of the phase of the output pixels and the associated cubic coefficients are previously calculated from the required conversion ratio by an external device, such as a central processing unit (CPU). The cubic coefficients, thus calculated in advance, are stored in the cubic coefficient storage register of the local memory 15 of each element processor 10 during programming. The cubic coefficients, stored in the cubic coefficient storage register on the local memory 15 during programming, are of the same value in all of the element processors 10, such that, for carrying out the convolution calculations, these coefficients need to be re-arrayed for each element processor 10, that is for each pixel, based on each phase information number.

Figure 53:
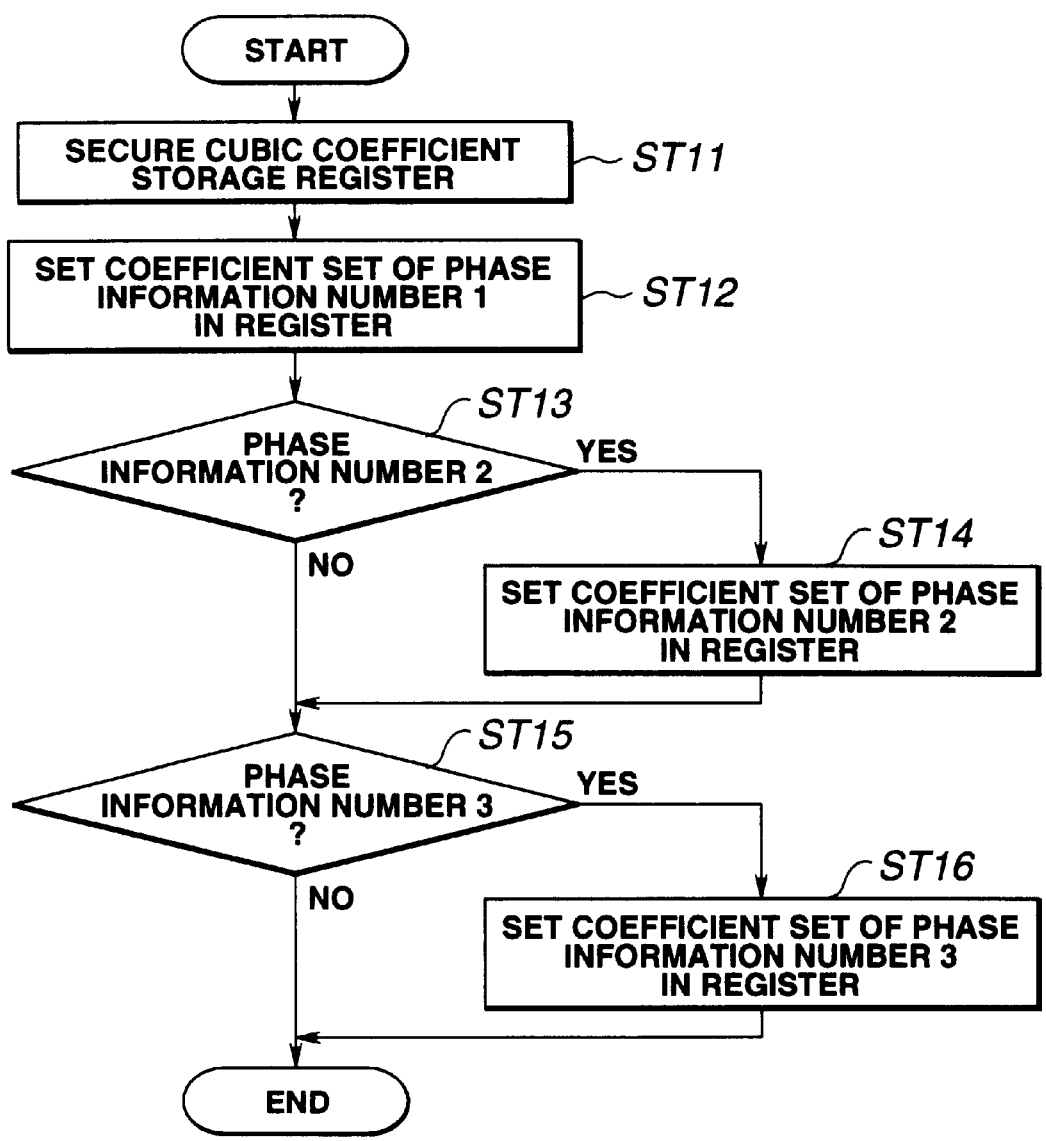
FIG. 53 is a flowchart for illustrating the sequence of re-arraying the cubic coefficients by the phase information number.

The sequence of operations for re-arraying the cubic coefficients based on the phase information number information and storing the re-arrayed cubic coefficients in the local memory 15 of each element processor 10 is explained using the flowchart shown in FIG. 53.

First, at step ST11, a register for storage of the cubic coefficients $C_1$ to $C_4$ on the local memory 15 (cubic coefficient storage register) is secured on the local memory 15.

At the next step ST12, the coefficient set of the phase information number PE=1 is set in the cubic coefficient storage register on the local memory 15.

At step ST13, it is judged whether or not the local memory 15 of the element processor 10 stored in the present invention number storage register is equal to 2. If the result is YES, processing transfers to step S14 to store the coefficient set of the phase information number PE=2 in the cubic coefficient storage register and, if otherwise, the former coefficient set is kept.

At step ST15, it is judged whether or not the local memory 15 of the element processor 10 stored in the present invention number storage register is equal to 3. If the result is YES, processing transfers to step S16 to store the coefficient set of the phase information number PE=3 in the cubic coefficient storage register and, if otherwise, the former coefficient set is kept.

Figure 54:
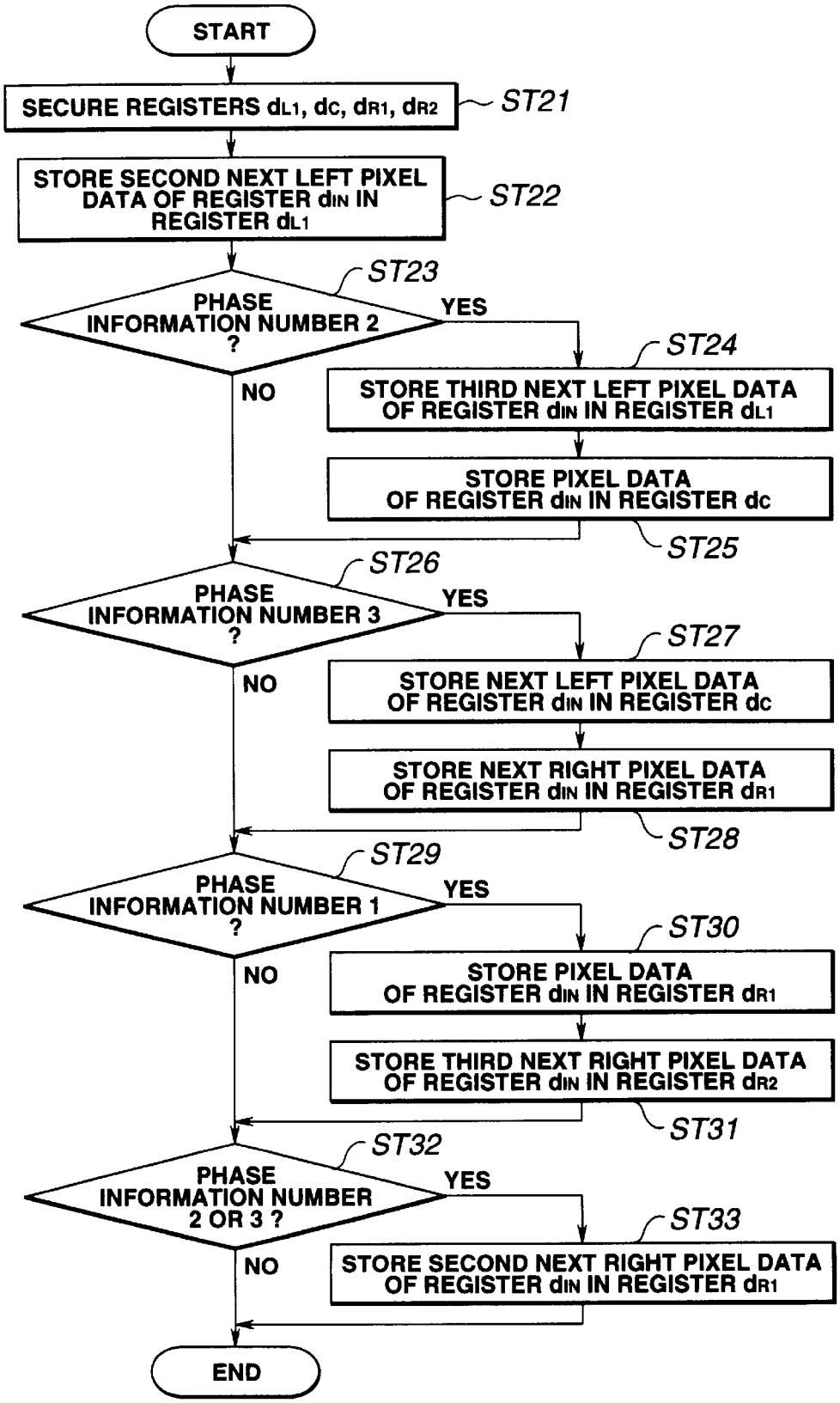
FIG. 54 is a flowchart illustrating the loading sequence of near-by pixel data at the time of enlarging conversion of the number of pixels by 2:3.

The processing flow for loading on the local memory 15 four near-by pixel data for convolution calculations in accordance with the above-mentioned phase information is explained using the flowchart shown in FIG. 54, in which the above-described 2:3 enlarging conversion processing for the number of pixels is taken as an example.

In the flowchart of FIG. 54, the registers dL1, dc, dR1 and dR2 are secured at step ST21 on the local memory 15 of each element processor 10.

At the next step ST22, pixel data of the register dIN, that is second left pixel data of an input pixel (input pixel data of the second left element processor 10), is stored in the register dL1.

At step ST23, it is judged whether or not the phase information number is equal to 2. If the result is YES, processing transfers to step S24 and, if otherwise, processing transfers to step to step S26.

At step ST24, to which processing transfers if the phase information number is found at step ST23 to be 2, pixel data of the register dIN, that is third next left pixel data of the input pixel data (input pixel data of the third next left element processor 10), are stored in the register dL1. Then, at step ST25, pixel data of the register dIN (input pixel data) are stored in the register dIN before processing transfers to step ST26.

At step ST26, it is judged whether or not the phase information number at that time is 3. If the result is YES, processing transfers to step S27 and, if otherwise, processing transfers to step to step S29.

At step ST27, to which processing transfers if the phase information number is found at step ST26 to be 3, pixel data of the register dIN, that is next left pixel data of the input pixel data (input pixel data of the next left element processor 10), are stored in the register dc. Then, at step ST28, pixel data of the register dIN (input pixel data of the next right element processor 10) are stored in the register dIN before processing transfers to step ST29.

At step ST29, it is judged whether or not the phase information number PE at that time is 1. If the result is YES, processing transfers to step S30 and, if otherwise, processing transfers to step to step S32.

At step ST30, to which processing transfers if the phase information number PE is found at step ST29 to be 1, pixel data of the register dIN, that is input pixel data, is stored in the register dR1. Then, at step ST31, pixel data third next right to the pixel data of the register dIN (input pixel data of the third next right element processor 10) is stored in the register dR2 before processing transfers to step ST32.

At this step ST32, it is judged whether or not the phase information number PE at that time is equal to 2 or 3. If the phase information number PE is 2 or 3, processing transfers to step ST33.

At step ST33, to which processing transfers if the phase information number is found at step ST32 to be 2 or 3, pixel data of the register dIN, that is second next right pixel data of the input pixel data (input pixel data of the second next right element processor 10) is stored in the register dR1.

Processing is then terminated.

By the above processing, cubic coefficients and four near-by pixel data are obtained on the local memory 15. These are used to perform convolution calculations shown by the equation (8) to find interpolated pixel data. FIG. 51 shows the above-mentioned data distribution on the local memory 15.

The contracting conversion of the number of pixels is no explained.

As an illustrative conversion ratio, 3:2 contracting conversion of the number of pixels is explained. The conversion ratio in this case is again not limited to 3:2 since the basic concept remains the same for an optional conversion ratio.

The contracting conversion of the number of pixels differs from the enlarging conversion processing for the number of pixels in that pixel data are directly entered at the input time and in that the pixel data read out from the local memory 15 are discretely stored in the output register 13 and outputted based on the pixel skip information stored in the output skip register 14 at the output time. The basic sequence of operations remains the same as that for the above-described enlarging conversion processing for the number of pixels.

Figure 55:
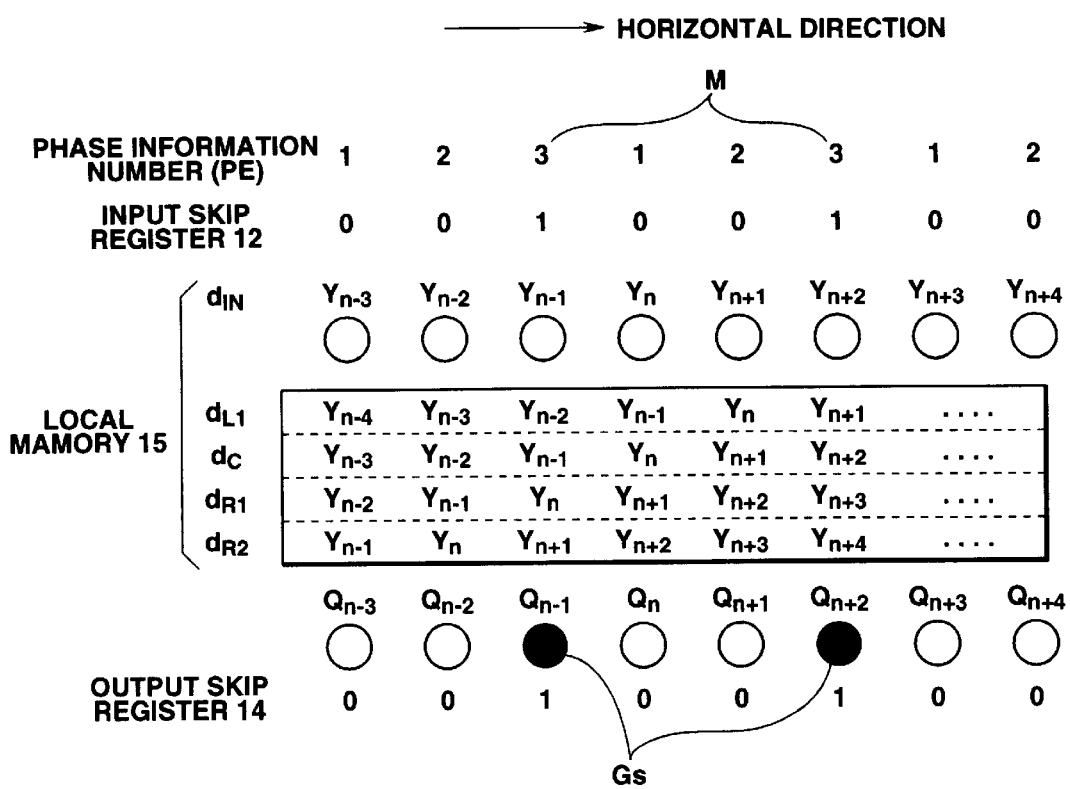
FIG. 55 illustrates the operation for contracting conversion of the number of pixels by 3:2 embodying the present invention.

In the above-described 3:2 contracting conversion of the number of pixels, since the number of output pixels is $\frac{2}{3}$ times the number of the input pixels, the input pixel data are directly entered at the data input time and outputted with skipping of two out of three pixels at the data output time. That is, it suffices if one of three pixels is skipped. This can be realized by providing a 1-bit output skip register 14 in the linear array type multi-parallel processor 1 of the preset embodiment and to give this register a periodic signal shown in FIG. 55 (pixel skip information). In FIG. 55, which is similar to FIG. 51, Gs denotes skipped output pixel data. The pixel skip information of '1' or '0' denotes skipping or not skipping output pixel data, respectively.

The cubic coefficients used for interpolation calculations in the 3:2 contracting conversion of the number of pixels are of a pattern with a cycle of two pixels. However, for processing by the SIMD-controlled linear array type multi-parallel processor 1, on out of three pixels is dummy phase m. Thus, in effect, the period is three pixels. That is, if, for example, the dummy phase m is the third phase (phase information number PN=3), this third dummy phase m is, in effect, skipped and not outputted. Therefore, the cubic coefficients may be of optional values. Here, the pixel skip information for this third phase of the input skip register 12 is set to zero. Since the cubic coefficients themselves can be known from the equation (1) for the cubic coefficients, if only the conversion ratio is known, it suffices to calculate the cubic coefficients by, for example, an external CPU, and to store the values thus found in the cubic coefficient storage register on the local memory 15. In the 3:2 contracting conversion of the number of pixels, the number of the cubic coefficients is (4 patterns×3). It is noted that, if viewed in the horizontal direction, the cubic coefficients are of the same value in any local memory 15 of the element processor 10, so that, in case of, for example, polyphase filtering with different filter coefficients from pixel to pixel, it is necessary to perform re-arraying so that the coefficient sets will be switched from pixel to pixel, that is from one element processor 10 to another. This method will be explained subsequently. In the 3:2 contracting conversion processing for the number of pixels, there are three coefficient sets.

As for the convolution calculations, it suffices to execute three sorts of calculations repeatedly for the 3:2 contraction conversion processing for the number of pixels. For each input pixel, it is necessary to determine in advance which phase pixel data should be used for calculations. This information is the phase information number PE. In the contracting conversion of the number of pixels in the SIMD-controlled linear array type multi-parallel processor, this phase information number PE is initially allocated to each element processor 10. For carrying out the contracting conversion of the number of pixels by the above-described linear array type multi-parallel processor 1, the phase information number PE specifying the phase point of cubic interpolation is required. This can be found by the sequence of operations shown in the flowchart of FIG. 52. In the contracting conversion of the number of pixels, the phase information number is stored in the phase information number register of the local memory 15.

The cubic coefficients are then selected based on the phase information number as found as shown in FIG. 52. In this contracting conversion of the number of pixels, the three sorts of the phase of output pixels and the associated cubic coefficients are found in advance, from the required conversion ratio, prior to selection of the cubic coefficients, using an external device, such as CPU. The cubic coefficients, stored in the cubic coefficient storage register on the local memory 15 during programming, are of the same value in all of the element processors 10, such that, for carrying out the convolution calculations, these coefficient sets need to be re-arrayed for each element processor 10, that is for each pixel, based on each phase information number. The sequence of operations for re-arraying and storing the coefficient sets is again realized by the flowchart shown in FIG. 53.

The processing flow of loading in the local memory 15 the above-mentioned four near-by pixel data for carrying out convolution calculations in accordance with the phase information number in the 3:2 contracting conversion of the number of pixels is now explained with reference to the flowchart of FIG. 56, in which dIN, dL1, dc, dR1 and dR2 denote registers on the local memory 15 as described above.

Figure 56:
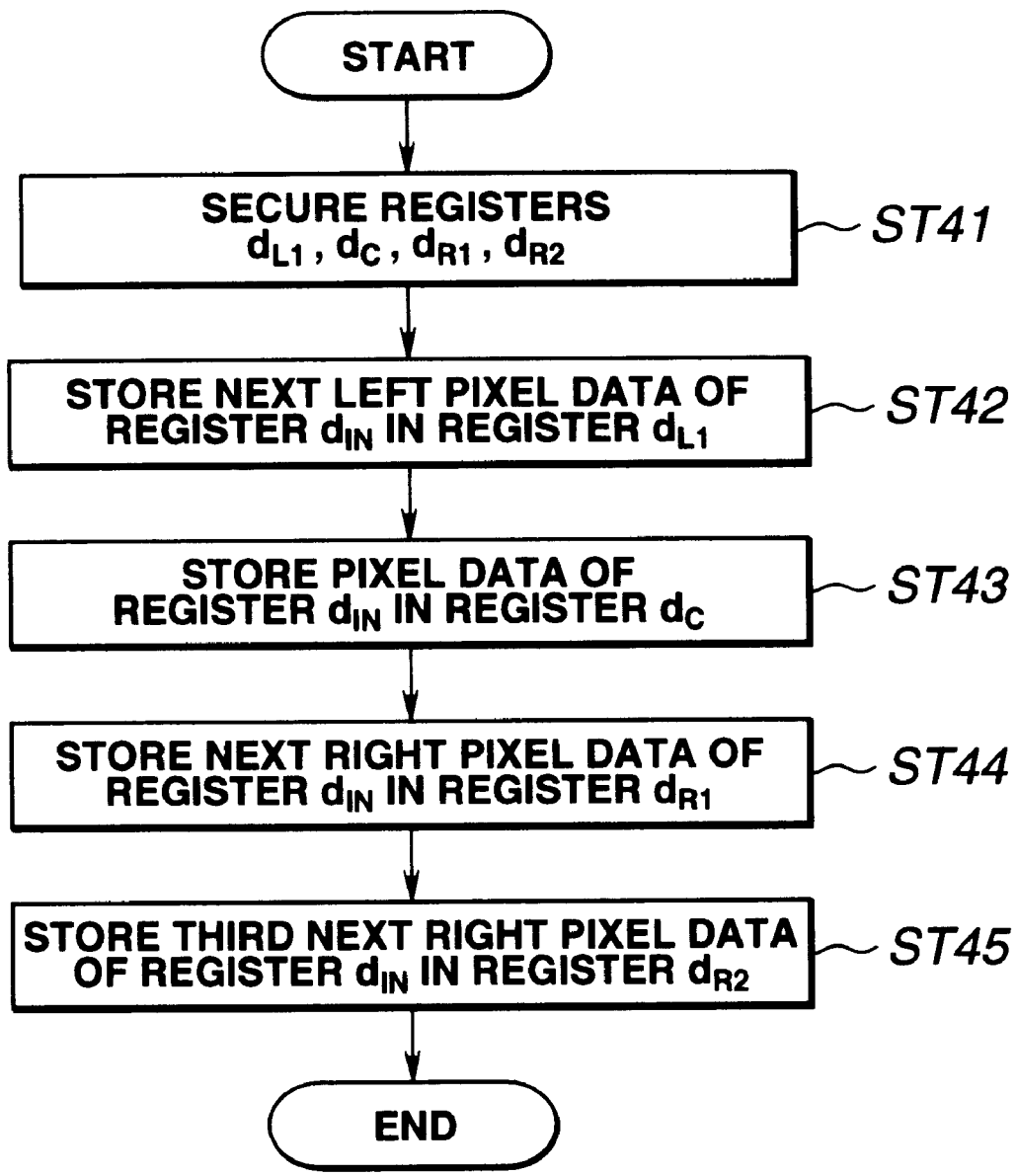
FIG. 56 is a flowchart illustrating the loading sequence of near-by pixel data at the time of contracting conversion of the number of pixels by 3:2.

In FIG. 56, the above registers dL1, dc, dR1 and dR2 are secured at step ST41 on the local memory 15 of each element processor 10.

At the next step ST42, pixel data of the register dIN, that is next left pixel data of the input pixel (input pixel data of the next left pixel data) are stored in the register dL1.

At the next step ST43, pixel data of the register dIN is stored in the register dc. At step ST44, next right pixel data of the pixel data of the register dIN (input pixel data of the next right element processor 10) is stored in the register dR1.

At step ST45, third next right pixel data of the pixel data in the register dIN (input pixel data of the third next right element processor 10) is stored.

The processing is then terminated.

By the above processing, cubic coefficients and four near-by pixel data are obtained on the local memory 15. These are used to perform convolution calculations shown by the equation (8) to find interpolated pixel data. The interpolated pixel data read out from the local memory 15 are discretely stored in the output register 13 and outputted based on the pixel skip information stored in the output skip register 14. Similarly to FIG. 51, FIG. 55 shows the above-described data distribution on the local memory 15.

If, in the above-described linear array type multi-parallel processor embodying the present invention, the data outputting rate is controlled independently at the input and the output, not only the conversion of the number of pixels but the conversion processing for the number of scanning lines becomes feasible. The processing for conversion of the number of pixels and that for conversion processing for the number of scanning lines belong to the same technique. The conversion of the number of pixels increases or decreases the number of sampling points in the horizontal direction of the picture signals. When viewed in the vertical direction, this conversion is tantamount to conversion processing for the number of scanning lines. That is, the same concept can be applied by substituting the scanning lines for the pixels. This applies for other embodiments to be explained subsequently.

In the above-described first embodiment of the present invention, format conversion between different picture signal formats, such as NTSC signals or VGA signals, that is optional conversion of the number of pixels, enlargement or contraction of the picture signals to an optional ratio or conversion of sampling frequency of the picture signals to a different sampling frequency, can be realized by solely the software processing using the SIMD-controlled linear array type multi-parallel processor. By constructing the system by software, not only the conversion of the number of pixels at an optional ratio, which it has been difficult to implement in the conventional hardware structure, such as ASIC, but also change of the bit fineness after completion of designing or addition of new specifications of thee new format can be flexibly coped with. Moreover, there is no necessity of changing the hardware such that the period can be shortened significantly as compared to that in the conventional practice to enable product making suited to market needs.

In the above-described embodiment of the present invention, generation of the phase information number or re-arraying of the cubic coefficients is carried out during, for example, the blanking period within the linear array type multi-parallel processor. However, in the present embodiment, the following may arise depending on the manner of the processing.

(A) If it is desired to change the number of pixels from field to field, the operation of a series of pixel attribute information numbering operations, referred to herein as numbering, such as the phase information numbering, as described above, needs to be necessarily completed within the blanking period. However, if there are many pixels, as in the high definition TV, or the blanking period is shorter in duration, there are occasions where the numbering is not completed.

(B) Because of the numbering operations, a redundant local memory capacity, such as the above-mentioned working area, or a program area for storage of a program for the above-mentioned numbering, becomes necessary, thus placing constraint on the memory capacity allocated to practical signal processing of a processor. These memory sizes are directly reflected on cost.

(C) Due to SIMD control, regular patterns, that is patterns in which the enlarging or reducing ratio remains constant anywhere during one scanning period, can be prepared easily. However, if the ratio differs from one area to another, the above-mentioned numbering is not possible.

These difficulties can be coped with in a modified embodiment of the present invention. The structure and the operation of the modification is hereinafter explained.

Figure 57:
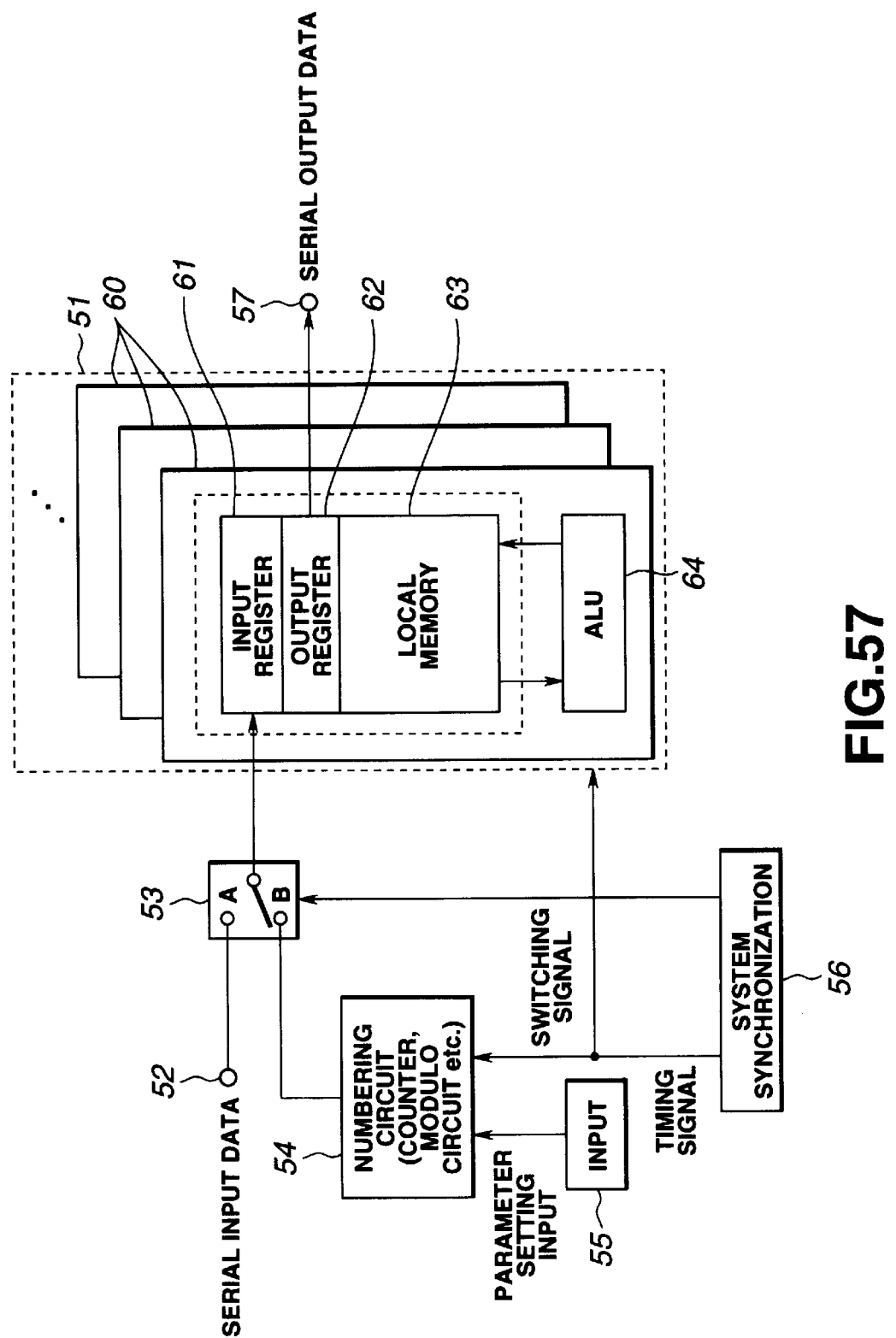
FIG. 57 is a schematic block circuit diagram showing a linear array type multi-parallel processor according to a second embodiment of the present invention.

FIG. 57 schematically shows the structure of the preset modification. Although the structure of FIG. 57 is basically controlled by SIMD as in FIG. 16, only essential portions are shown in FIG. 57 for simplicity.

In the linear array type multi-parallel processor 51, shown in FIG. 57, a number of element processors 60 for a line, each associated with a pixel, as in the previous embodiment, are arrayed one-dimensionally for line-based parallel processing. Each element processor 60 includes an input register 61, an output register 62, a local memory 63 and an arithmetic-logical unit 65. The linear array type multi-parallel processor 60, shown in FIG. 57, also includes, as external auxiliary circuits, a numbering circuit 54, an input unit 55, a system synchronization circuit 56 and a selector 53.

In FIG. 57, serial input data SID, as the above-mentioned time-domain input picture data, are supplied to an input terminal 52. This serial input data is sent to a fixed terminal A of a selector 53, the other fixed terminal B of which is fed with output data of the numbering circuit 54.

The numbering circuit 54 generates and outputs the above-mentioned phase information number and the pixel skip information. The numbering circuit 54 is specifically a so-called sequencing circuit having a 4-bit counter 70 and an AND gate 71. It is constructed by a modulo-circuit comprised of the combination of logical units, such as AND or OR gates and counters. This numbering circuit 54 generates and outputs the above-mentioned phase information number and the pixel skip information based on parameters from the input unit 55.

The input unit 55 is provided for parameter setting and inputting. The parameters set by the input unit 55 include initial counter values, setting of the cycle widths or the number of times of the repetitive operations.

A system synchronization circuit 56 generates timing signals for system synchronization. These timing signals are exemplified by synchronization signals, such as horizontal synchronization pulses and vertical synchronization pulses.

The selector 53 is responsive to timing signals from the system synchronization circuit 56 to be switched from the fixed terminal A to the fixed terminal B during an arbitrary scanning time of the blanking period. Thus, the selector 53 is responsive to the above timing signals to output the input pixel data from the input terminal 52, phase information number generated by the numbering circuit 54 or the pixel skip information. The input pixel data outputted by the selector 53 or the phase information and the pixel skip information enter each element processor 10 of the linear array type multi-parallel processor 51. That is, the input pixel data, the phase information number and the pixel skip information are supplied at a different timing to each element processor 60.

The phase information number and the pixel skip information are transferred, via input register 61 of each element processor 60, to the local memory 63 for storage therein. That is, the processor 51 of the second embodiment stores the phase information number and the pixel skip information in the local memory 63. Since the pixel skip information is of small data volume, there is no risk of vitally consuming the capacity of the local memory 63.

The pixel skip information stored in the local memory 63 represents the information for discretely storing the input pixel data supplied to the input register 61 at the time of the enlarging conversion processing for the number of pixels for transferring the data to the local memory 63 and for continuously storing and outputting the pixel data from the local memory 63 supplied to the output register 62. The pixel skip information stored in the local memory 63 also represents the information for storing the input pixel data supplied to the input register 61 at the time of contracting conversion of the number of pixels for transfer to the local memory 63 and for discretely storing the pixel data read out from the local memory 63 for outputting the stored data. The same applies for the phase information number stored in the local memory 63.

The conversion of the number of pixels of the linear array type multi-parallel processor 51 in the above-described embodiment is hereinafter explained. For simplicity, the enlarging conversion processing for the number of pixels with a fixed ratio is explained.

Figure 58:
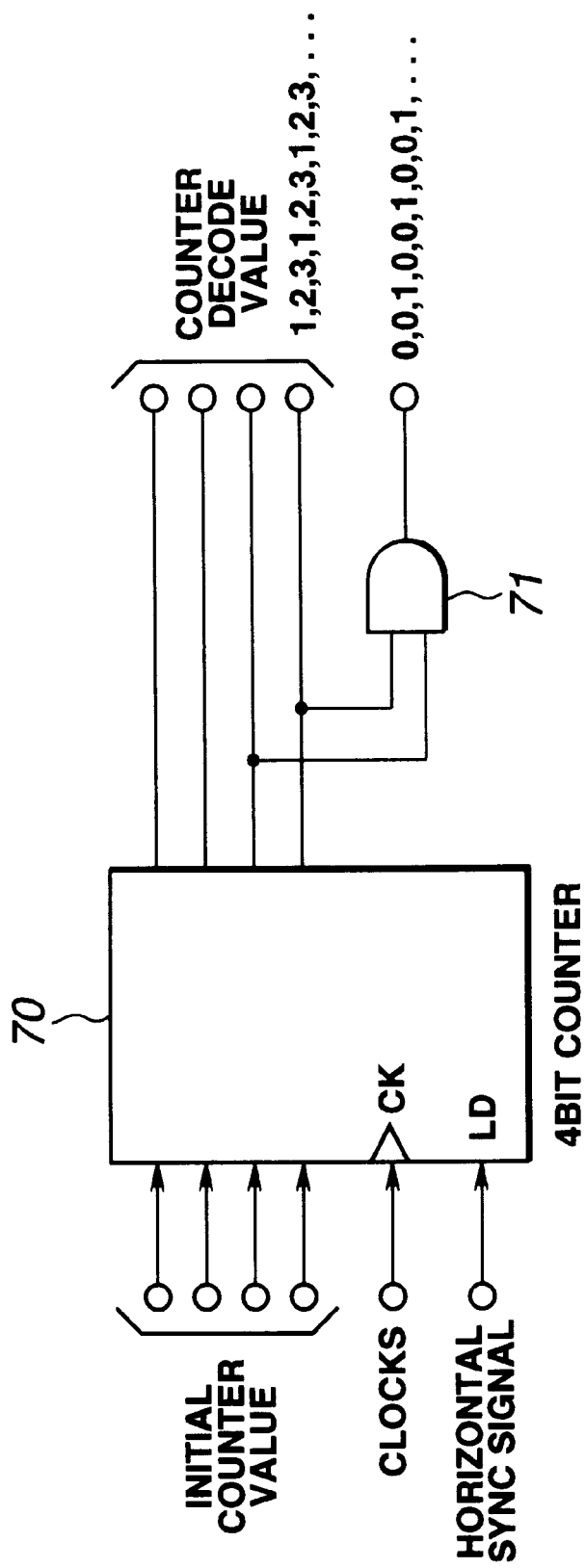
FIG. 58 is a schematic block circuit diagram showing a numbering circuit at the time of contracting conversion of the number of pixels by 2:3.

In the case of the 2:3 enlarging conversion processing for the number of pixels, the numbering circuit 54 of FIG. 58 outputs values of 1, 2, 3, 1, 2, 3, . . . , by a 4-bit counter 70, using the horizontal synchronization signals as trigger signals. Since the operation is 2:3 enlarging operation, input pixels need to be skipped at a rate of one to three input pixels. This pixel skip information is generated and outputted by the AND gate 71 of the numbering circuit 54 simultaneously with the phase information number.

At this time, the selector 53 is set, during one scanning line time of the blanking period, to the fixed terminal B, by the timing signal, whereby the numbering data made up of the phase information number and the pixel skip information from the numbering data 54 is sent to the input register 61 of the element processor 10 of the linear array type multi-parallel processor 51. The numbering data per se is transferred to the local memory 63 in the element processor 60.

The selector 53 is then set to the fixed terminal A. This causes usual pixel data to enter each element processor 60. The numbering data stored in the local memory 63 of the element processor 60 is used, as the phase information number or the pixel skip information as described above, for selecting the cubic coefficients for the FIR filter by the linear array type multi-parallel processor 51.

Although the foregoing description is directed to enlarging conversion processing for the number of pixels, the same basically applies for the above-described contracting conversion of the number of pixels. That is, the contracting conversion of the number of pixels is similar in the basic sequence of operations to the enlarging conversion processing for the number of pixels except that the input pixel data are directly entered at the inputting time and in that interpolated pixel data are discretely outputted at the outputting time.

Although the numbering operation is carried out by a logic circuit for simplifying the circuit structure, arithmetic-logic means, such as CPU, may, of course, be used.

Although the conversion of the number of pixels has been explained solely with reference to conversion in the horizontal direction, the same may be said of the conversion in the vertical direction, which corresponds to the conversion processing for the number of scanning lines.

In the above-described linear array type multi-parallel processor 51 of the present invention, similarly to the first embodiment, conversion of the number of pixels at an optional ratio can be realized solely by software using a SIMD-controlled linear array type multi-parallel processor. By constructing the system by software, not only the conversion of the number of pixels at an optional ratio, which it has been difficult to implement in the conventional hardware structure, such as ASIC, but also change of the bit fineness after completion of designing or addition of new specifications of thee new format, can be flexibly coped with. Moreover, there is no necessity of changing the hardware such that the period can be shortened significantly as compared to that in the conventional practice to enable product making suited to market needs. Also, the linear array type multi-parallel processor 51 has a simplified selector 53 and an external hardware circuit for numbering and is responsive to the timing signal to switch the selector 53 to feed the phase information number and the pixel skip information from the numbering circuit 54 into the inside of each element processor 60 before the start of the image period during one scanning period to effect conversion of the number of pixels based on the phase information number and the pixel skip information. This enables conversion of the number of pixels without consuming redundant program area or the working area. Moreover, conversion of the number of pixels or high definition TV with different conversion ratio dependent on variable horizontal position in one scanning line can be flexibly coped with. Specifically, since the generation of the pixel attribute information number (numbering) in the conversion of the number of pixels changing the number of pixels from field to field is taken charge of by a small-scale additional circuit (logic circuit) outside the processor 51, the above-mentioned numbering can be performed even if the number of pixels is large or the blanking period is of short duration, as in HDTV, such that redundant local memories or program memory areas become redundant, thus enabling the chip cost to be lowered, while the numbering becomes possible even the ratio of enlargement or contraction, that is regular patterns for SIMD control, is not constant throughout a scanning line thus causing the ratio to be changed from area to area. Therefore, conversion of the number of pixels for a HDTV with a large number of pixels or conversion of the number of pixels in which the ratio of enlargement or contraction is varied with the horizontal positions of the scanning lines becomes possible.

According to the present invention, conversion of the number of pixels or scanning lines at an optional ratio can be realized by software processing using a SIMD-controlled linear array type multi-parallel processor. Also, pixel skip information generating means and the pixel attribute information generating means are provided and the pixel skip information and the pixel attribute information are alternately sent to the element processors for enabling conversion of the number of pixels with the same or different conversion ratio depending on the horizontal position on the scanning line without redundant consumption of a program area or a working memory area.

A further embodiment of the present invention is now explained. Before this explanation, a technique of effecting interpolation using the cubic coefficients as later explained is explained as an example of the filter switching interpolation method.

First, conversion processing for the number of scanning lines for a non-interlaced picture is explained. The non-interlaced picture is produced by frame-based processing and, after conversion processing for the number of scanning lines, there is no necessity of dividing the processing between the first and second fields. Thus, the processing is simpler than that for interlaced pictures. Since the outline of the concept has been explained in the above embodiments, the conversion processing for the number of scanning lines for interlaced signals is explained.

In the above-mentioned 2:3 enlarging conversion processing for the number of scanning lines, the equation for interpolation for the first field is the same as the equation (3). In the interlaced signals, the first field and the second field need to be phase-offset by ½, that is the line of the second field needs to exist at the center between the first and second fields. This relation is apparent on checking a first field input line signal 121 and a second field input line signal 123 and also checking a first field output line signal 122 and a second field output line signal. Thus, in the second field of the 2:3 enlarging conversion processing for the number of scanning lines. The phase information of each interpolated line is P4, P5 and P6 in FIG. 59, with the corresponding phase information being 5/7, ½ and 1/7. Thus, the interpolated values of the respective lines may be shown by the following equation (18) similar to the equation (3);

$$\begin{aligned}
Q_j &= \text{Cub}(-12/7) * Rj - 2 + \text{Cub}(-5/7) * Rj - 1 + \\
&\quad \text{Cub}(2/7) * Rj + \text{Cub}(9/7) * Rj + 1 \\
Q_{j+1} &= \text{Cub}(-3/2) * Rj - 1 + \text{Cub}(-1/2) * Rj + \\
&\quad \text{Cub}(1/2) * Rj + 1 + \text{Cub}(3/2) * Rj + 2 \\
Q_{j-2} &= \text{Cub}(-8/7) * Rj + \text{Cub}(-1/7) * Rj + 1 + \\
&\quad \text{Cub}(6/7) * Rj + 2 + \text{Cub}(13/7) * Rj + 3
\end{aligned} \quad (18)$$

In the above equation, the suffix j denotes the second field for distinction from the suffix i for the first field. As may be seen from this equation, the cubic coefficients and the line necessary for interpolation for the first field are not related with those for the second field, so that it becomes necessary to effect separate calculations on the interlaced picture signals.

Figure 60:
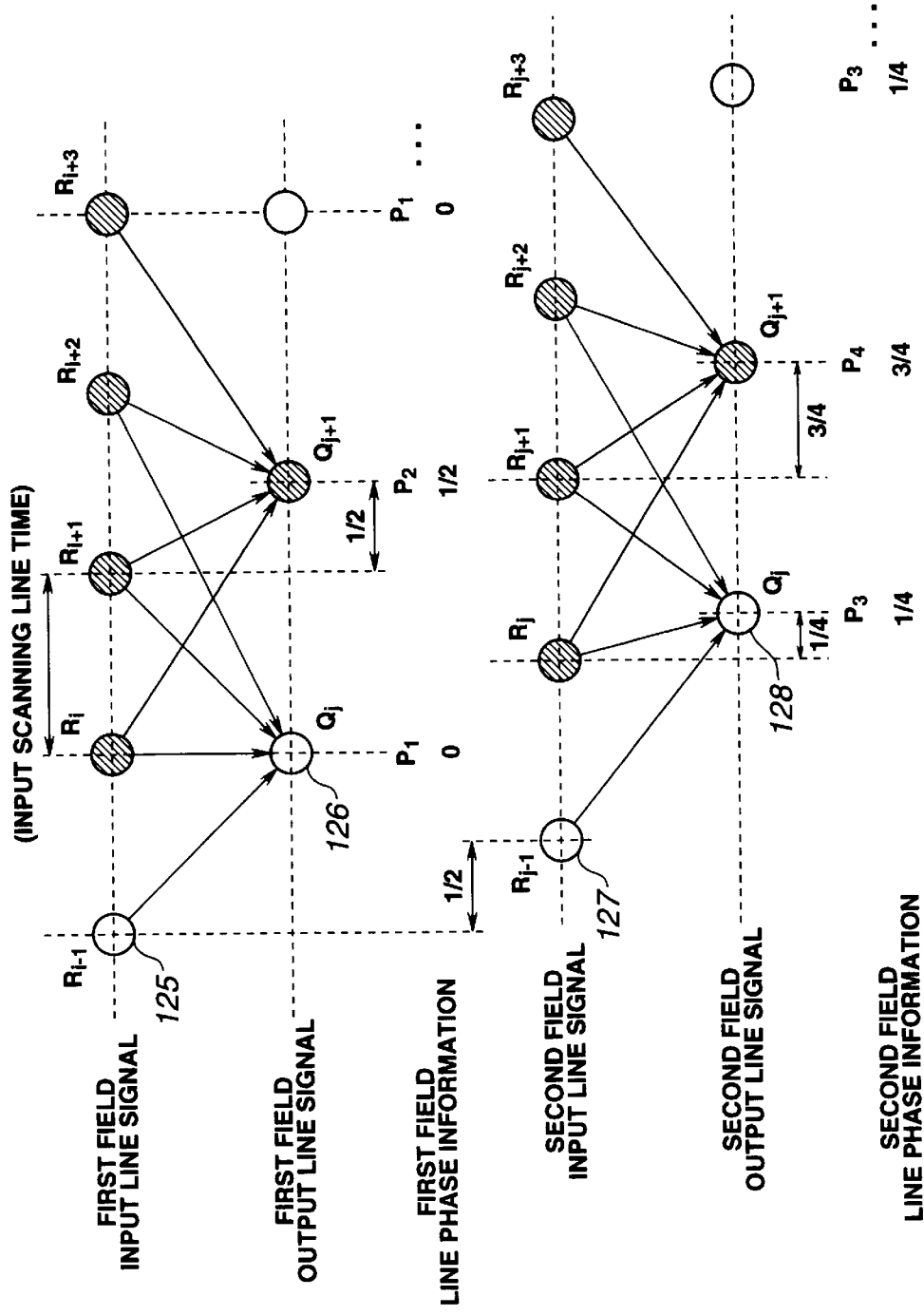
FIG. 60 illustrates the principle of contracting conversion of the number of lines by 2:3 for interlaced signals.

Similarly, for the 3:2 contracting conversion of the number of scanning lines, the equation for interpolation for the first field is the same as the equation (6). Referring to FIG. 60, the equation for interpolation for the first field is the same as the equation (3). In the interlaced signals, the first field and the second field need to be phase-offset by ½, that is the line of the second field needs to exist at the center between the first and second fields. This relation is shown by checking a first field input line signal 125 and a second field input line signal 127 and also by checking a first field output line signal 126 and a second field output line signal 128. Thus, in the second field of the 3:2 enlarging conversion processing for the number of scanning lines, the phase information of each interpolated line is P3 and P4 in FIG. 60, with the corresponding phase information being ¼ and ¾. Thus, the interpolated values of the respective lines may be shown by the following equation (19);

$$Q_j = \text{Cub}(-5/4)*Rj-1 + \text{Cub}(-1/4)*Rj + \text{Cub}(3/4)*Rj-1 + \text{Cub}(7/4)*Rj+2$$
$$Q_{j+1} = \text{Cub}(-7/4)*Rj + \text{Cub}(-3/4)*Rj+1 + \text{Cub}(1/4)*Rj-2 + \text{Cub}(5/4)*Rj-3$$
(19)

In this case, the cubic coefficient sets for the second field differ completely from those for the first field thus necessitating separate calculations.

The conversion processing for the number of scanning lines has so far been realized using a fast product-sum circuit, such as the above-mentioned application specific integrated circuit (ASIC).

With the scanning line number conversion, the interpolation coefficients or the skip lines differ completely depending on whether the input signal is an interlaced signal or a non-interlaced signal, while also differing from field to field if the signal is an interlaced signal. For implementing by ASIC the interpolation calculations from multi-tap coefficients as in the present cubic interpolation, the system that can be used is necessarily limited, due to circuit scale, to such a system in which a fixed conversion ratio with lower freedom degree, or in which a conversion ratio is selected from several conversion ratios at most.

For coping with different ratios, r with different format sorts, or in respect of flexibility such as bit fineness change after designing or change of ratio changing algorithm, the above interpolation calculations cannot be carried out with ease by hardware, such as ASIC.

In addition, it may be said t be virtually impossible to change the horizontal and vertical switching on the real-time basis on the ASIC by the above-described filter switching interpolation method which is complex in view of circuit structure.

In conversion processing for the number of scanning lines, an external field memory for storing picture signals is required. Unless a fixed conversion ratio is used, it is difficult, in achieving timing synchronization with the external memory control, to read/write only necessary data for interpolation in each field from the field memory from field to field, take out data in phase with the line to be interpolated and to effect convolution thereof with corresponding interpolation coefficients. Morever, if the input signal is an interlaced signal, it is difficult to match the phase of outputs of the first and second field depending on the conversion ratio.

A further embodiment of the present invention for overcoming the above problem is hereinafter explained with reference to the drawings.

There are a variety of formats for the digital picture signals, such as the so-called 4:4:4, 4:2:2 or 4:1:1 formats. Since the same processing can be made for the luminance signals and the chroma signals insofar as conversion processing for the number of scanning lines is concerned, the following description is made taking luminance signals as an example. Meanwhile, in conversion of the number of pixels, the processing for the luminance signals differs from that for the chroma signals depending on the formats.

For overcoming the above-mentioned problems in digital signal processing for conversion processing for the number of scanning lines by the hardware structure, the digital signal processing is realized in the picture signal processing device of the present embodiment by a software program employing digital signal processing (DSP) instead of by the hard-wired structure such as ASIC.

By executing the digital signal processing by a software program, it becomes possible to cope with changes in the specifications and to execute various different signal processing operations by simply re-writing the software program. In addition, since there is no necessity of changing the hardware in changing the specifications, the so-called time-axis transform system (TAT) period can be shortened significantly.

The internal structure and the basic operation of a so-called linear array type multi-parallel processor, as a DSP for realizing the conversion processing for the number of scanning lines of the non-interlaced or interlaced signals by a software program, will now be explained.

Figure 61:
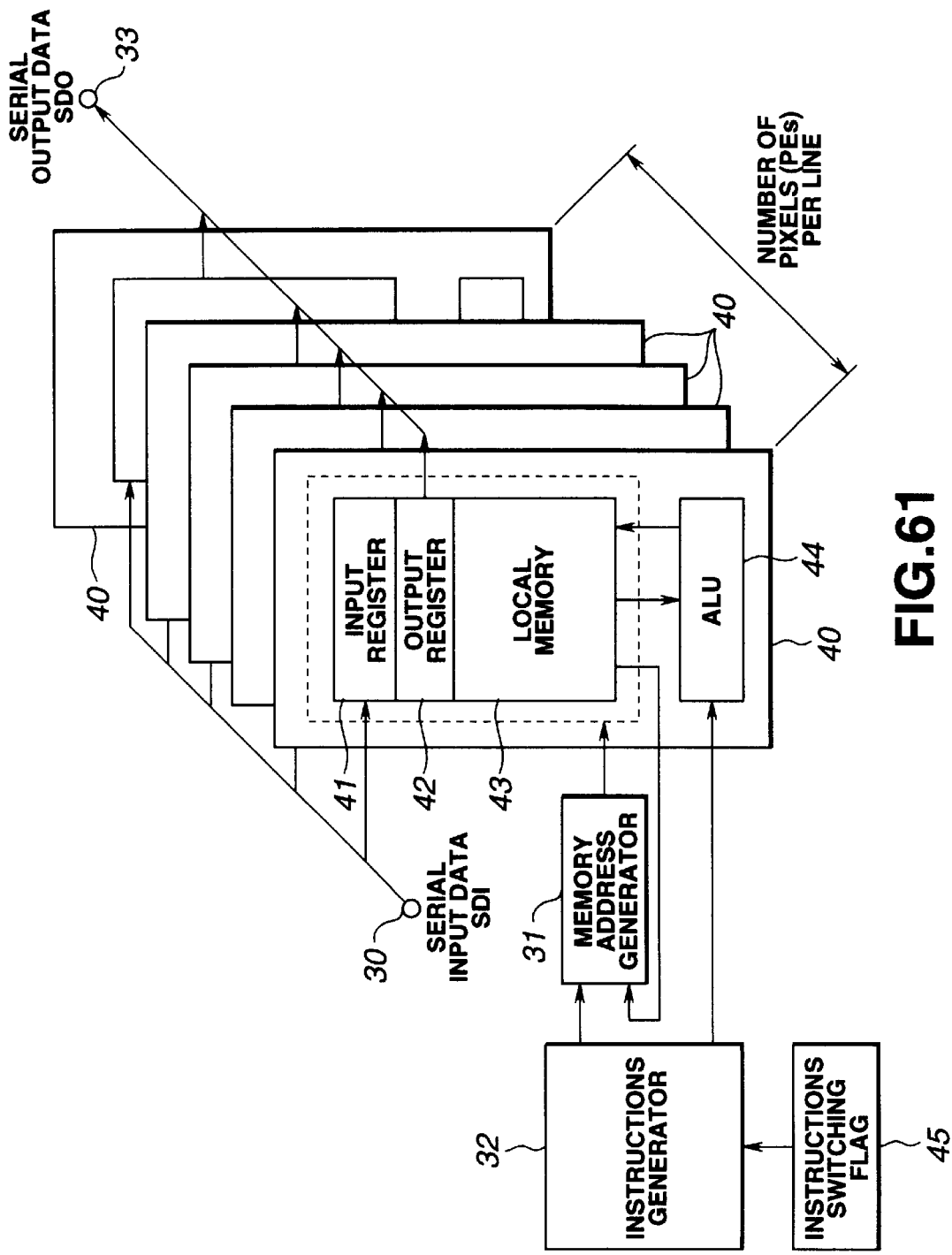
FIG. 61 is a schematic block circuit diagram showing the basic structure of a linear array type multi-parallel processor.

The linear array type multi-parallel processor, shown for example in FIG. 61, includes a one-dimensional array of element processors 40, each corresponding to an input pixel, to form a pixel array corresponding to a scanning line and to effect parallel processing from one scanning line to another.

In FIG. 61, serial input data SID, as time-domain input pixel data supplied to an input terminal 30, is transferred to a local memory 43 designed to temporarily store the data. A memory address generator 31 for generating memory addresses for the local memory 43 and an instruction generator 32 perform control common to all element processors 40, that is so-called single instruction multiple data stream (SIMD) control.

As characteristic of the linear array type multi-parallel processor, data taken into the inside of the linear array type multi-parallel processor (DSP) is processed in the same manner for all element processors corresponding to one scanning line. Specifically, the data transferred to the local memory 43 of each element processor 40 is processed with the calculations necessary for interpolation by data exchange with the arithmetic-logic unit 44. The processed data is sent to an output register 42 so as to be ultimately outputted at each output register 42 of each element processor 40. This causes interpolated pixel data for one scanning line to be outputted from the linear array type multi-parallel processor as output pixel data (serial output data SOD).

Each of the element processors 40 corresponds to each pixel of a scanning line, with each element processor 40 being configured for accessing data in the local memory 43 of each of left and right or neighboring element processors 40. By having this structure, it is possible for the linear array type multi-parallel processor 40 to load left, right or neighboring data to pixel data written in the local memory 43 of each element processor 40 to constitute one scanning line pixel data on the whole. A so-called horizontal FIR filter (non-recursive filter) can also be realized by exchanging these data with each arithmetic-logic unit 44.

With the linear array type multi-parallel processor, pixel data of a scanning line on the whole can be discretely stored in the local memory 43 of each element processor 40 so that pixel data can be stored in every second element processor 10 at the inputting time. It is similarly possible for the linear array type multi-parallel processor to discretely output pixel data corresponding to a scanning line on the whole from the local memory 43 of each element processor 40.

With the conversion processing for the number of scanning lines, embodying the present invention, real-time conversion processing for the number of scanning lines, as characteristic of the present invention, is also possible. In this case, the input/output skip function can be adjusted by an external field FIFO memory. The control signal can be found simultaneously with the calculations of the line attribute information based on the line attribute information.

The arithmetic-logic operations can be performed as the same processing without it being necessary to make distinctions between luminance signals and chroma signals. The line to be interpolated is calculated by the convolution calculations of 4-line data in the neighborhood of an input line with cubic coefficients from the line phase information. In the conversion processing for the number of scanning lines, the input skip line information, output skip line information and the line phase information are calculated from line to line. For the line phase information, there are provided two registers for two sorts of the phase information, that is the phase information for enlargement and that for contraction. By having these two sorts of the line phase information, that is that for enlargement and that for contraction, conversion with an arbitrary conversion ratio from contraction to enlargement becomes possible. The processing program for the linear array type multi-parallel processor itself and the external field memory is controlled by the input skip line control signal and the output skip line control signal as found from these two sorts of the phase information, while the program can be switched from one input line to another by a flag from an instruction switching flag generator 45.

Figure 62:
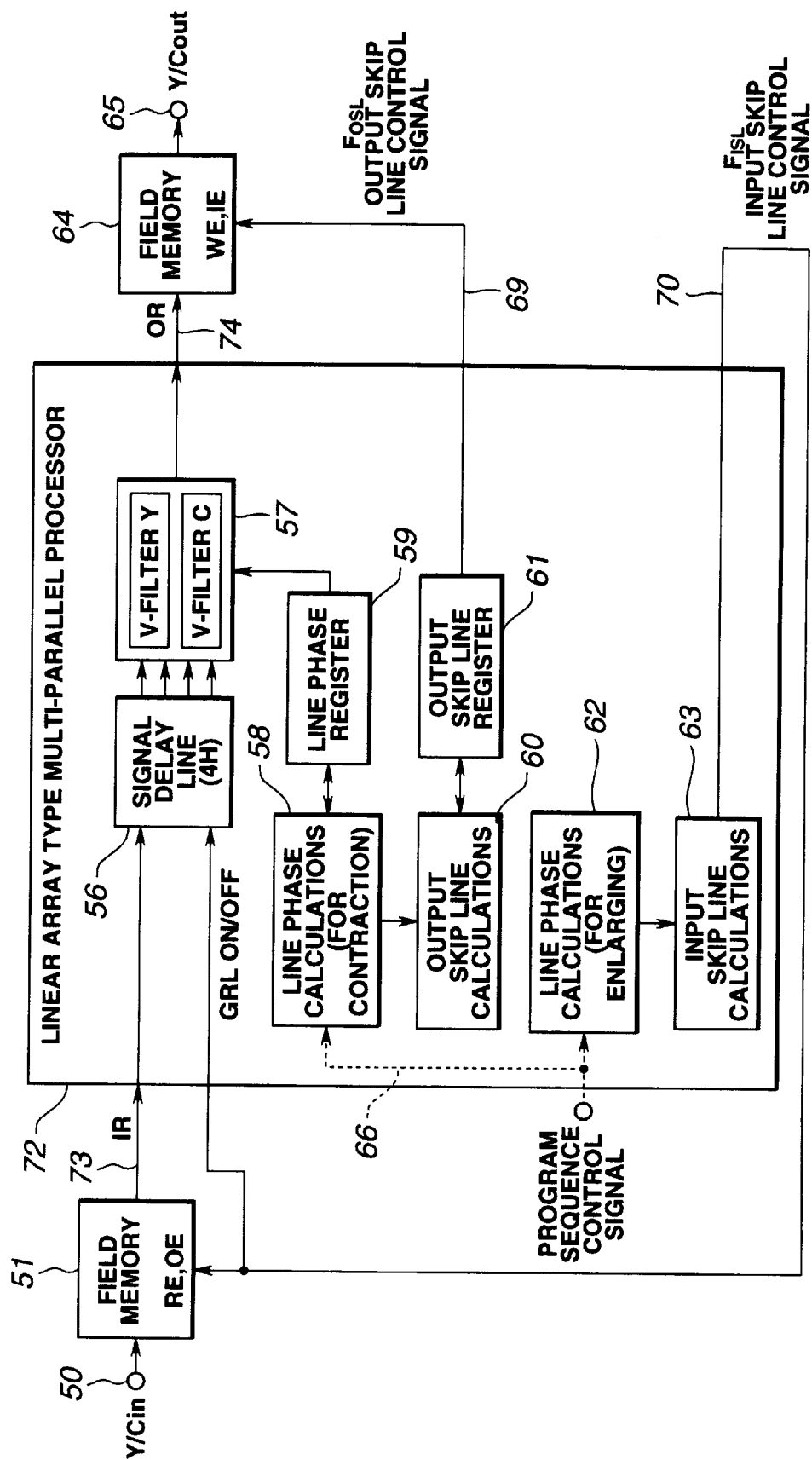
FIG. 62 illustrates a structure for carrying out conversion processing of the number of scanning lines at an optional ratio and the blocked processing in the inside of the linear array type multi-parallel processor.

FIG. 62 shows the configuration in which processing for conversion processing for the number of scanning lines is carried out using the above-described linear array type multi-parallel processor. The linear array type multi-parallel processor inherently is constructed by software instead of by hardware so that the practical method for implementing the processing differs. However, if the internal signal processing is divided into blocks, the configuration is as shown in FIG. 62. An example of implementation is now explained with reference to conversion processing for the number of scanning lines.

The technique of implementing the conversion processing for the number of scanning lines is explained. With the system of conversion processing for the number of scanning lines according to the present invention, the interpolation processing may be the same no matter whether the input signal is an interlaced or non-interlaced signal, with the difference being simply the manner of how the initial value is given the line phase information and the manner of controlling the program switching.

That is, if the signal is a non-interlaced signal, the frame line phase information is initialized once at the beginning of each frame. This initial value is set to zero. If the signal is an interlaced signal, the line phase information is initialized once at the beginning of each field. However, this initial value is set to different values for the first and second fields.

The conversion ratio for conversion processing for the number of scanning lines is set to N:M, where N and M are positive integers and M>N specifies enlarging conversion processing for the number of lines while M<N specifies contracting conversion of the number of lines. M=N denotes isomultiple conversion. The initial line phase information of the first field Phinit_odd and the initial line phase information of the second field Phinit_even for the interlaced signal is:

Phinit_odd=0

Phinit_even=N/2

(for N≦M, that is for enlarging and isomultiple conversion)

Phinit_even=(N−M)/2

(for M>N, that is for contracting conversion) (20)

For the non-interlaced signal, the initial line phase information Phinit_frm is given by the following equation (21):

Phinit_frm=0 (21)

Figure 64:
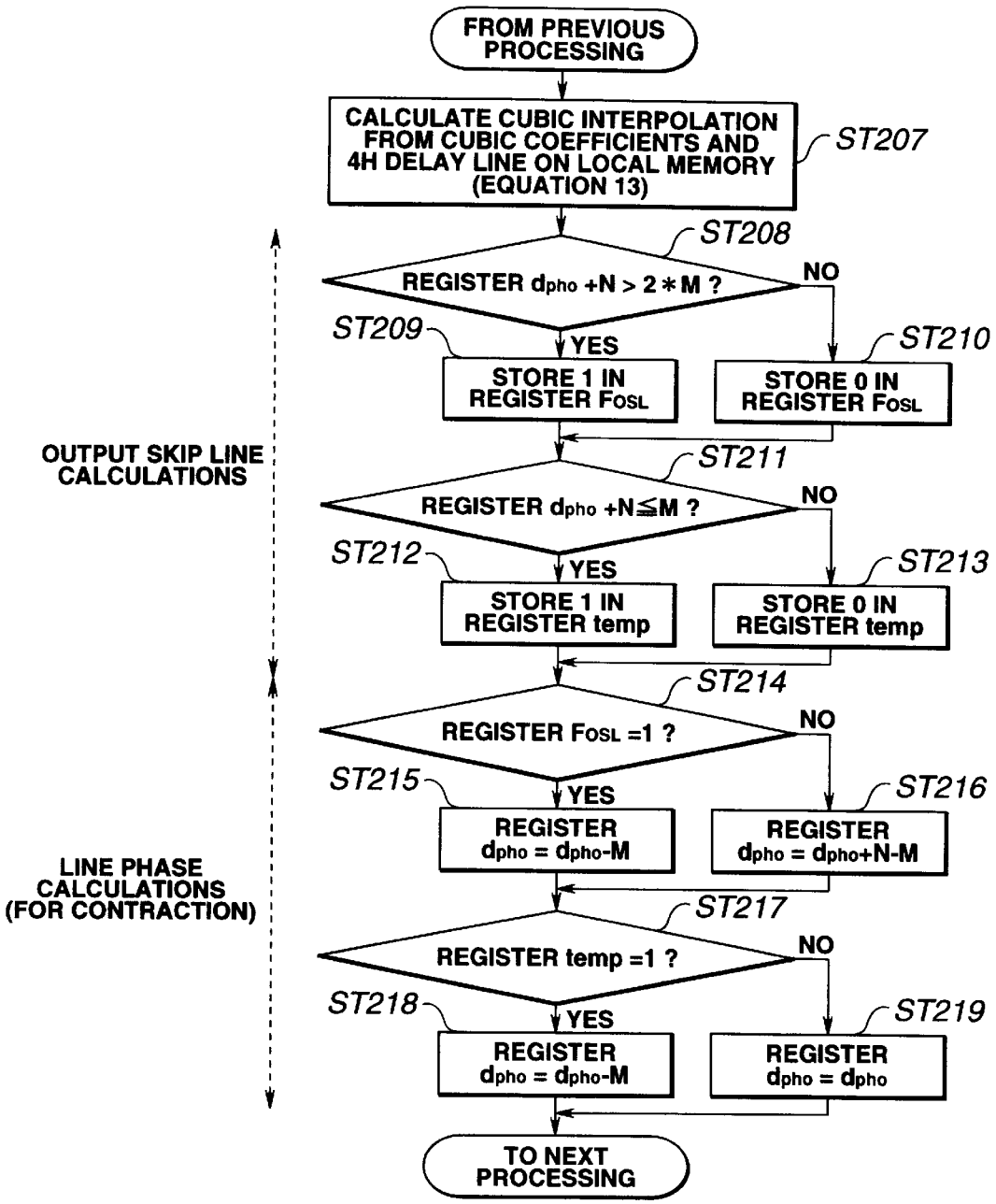
FIG. 64 shows a portion (²⁄₄) of a flowchart for converting the number of scanning lines in the interlaced signal.
Figure 65:
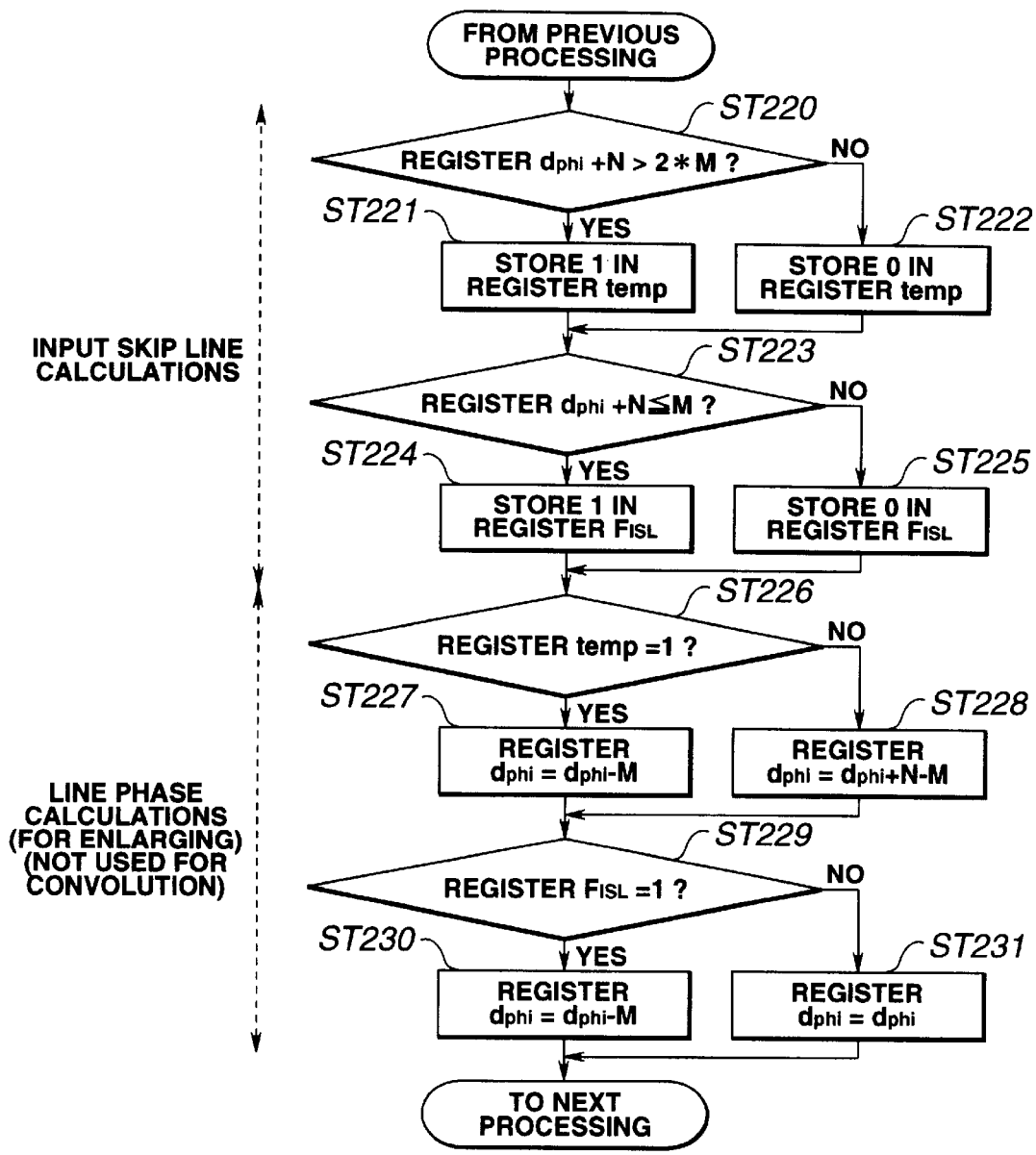
FIG. 65 shows a portion (¾) of a flowchart for converting the number of scanning lines in the interlaced signal.
Figure 66:
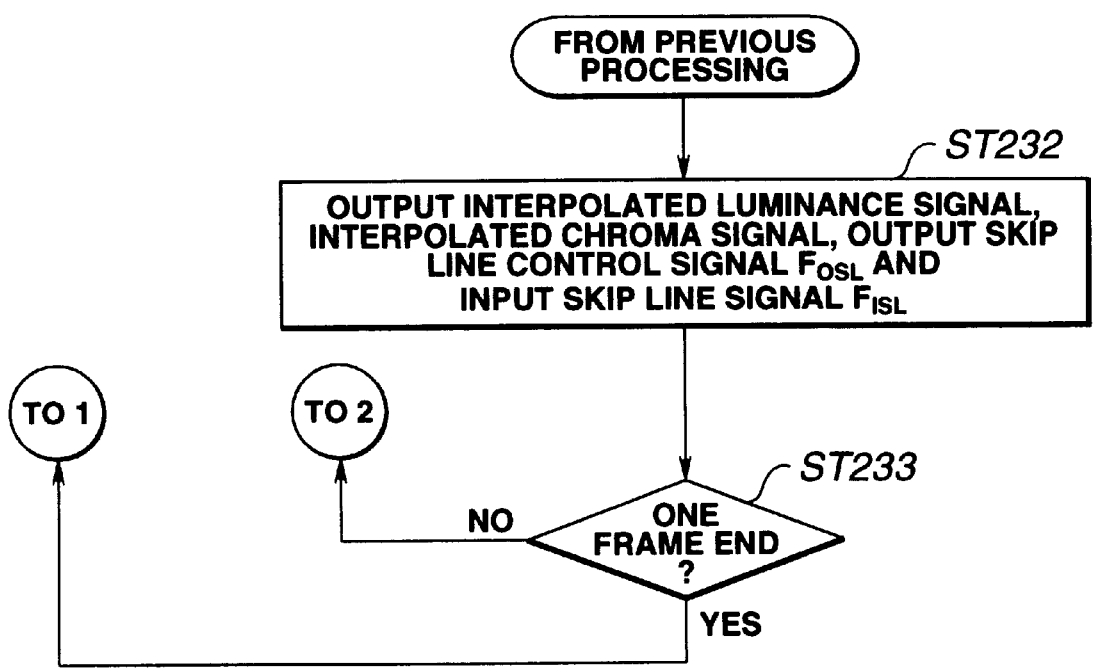
FIG. 66 shows a portion (⁴⁄₄) of a flowchart for converting the number of scanning lines in the interlaced signal.

In light of the above, FIGS. 64, 65 and 66 show a detailed flowchart for conversion processing for the number of scanning lines in the SIMD linear array type multi-parallel processor DSP for a non-interlaced signal.

Figure 63:
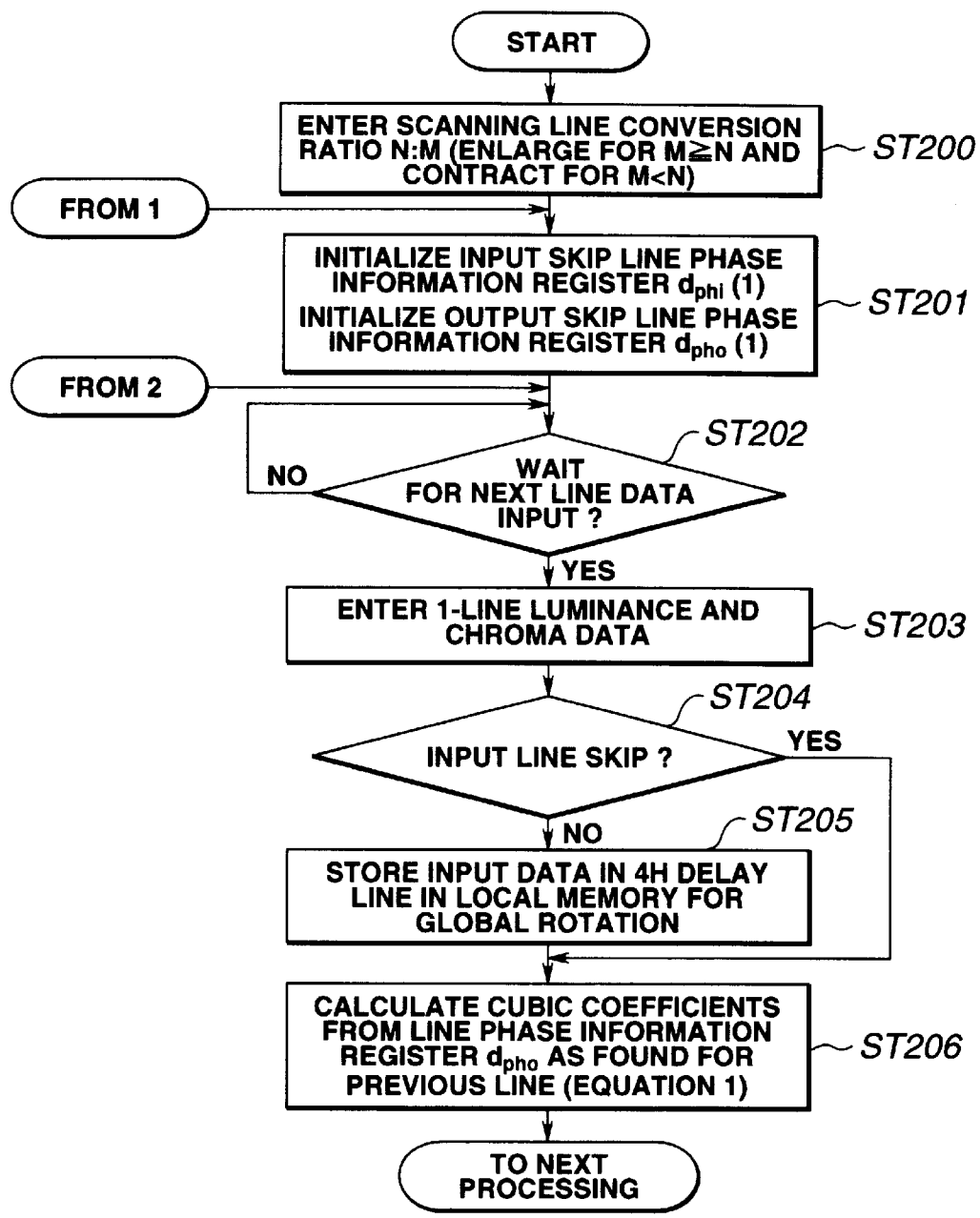
FIG. 63 shows a portion (¼) of a flowchart for converting the number of scanning lines in the interlaced signal.

Referring to FIG. 63, the conversion ratio N:M for the conversion processing for the number of scanning lines is set at step ST200, where N and M are positive integers and M≧N specifies enlarging conversion processing for the number of lines while M<N specifies contracting conversion of the number of lines. The isomultiple conversion of 1:1 is included in the enlarging conversion.

At the next step ST201, the initial line of a picture frame is processed. Here, the values of the line phase information register dphi used for calculating the input skip line and the line phase information register dpho used for calculating the input skip line are initialized. However, since there is processing time delay in the linear array type multi-parallel processor, the value of the line phase information register dpho is set to 0, while the line phase information register dphi is given an offset phase corresponding to the delay time, for compensating the delay. That is, for enlarging conversion, the linear array type multi-parallel processor calculates whether or not an input is to be made from the field memory 51 placed at an input to the linear array type multi-parallel processor 72. This decision needs to be pre-set prior to cubic interpolation calculations. Since there is signal time delay in the linear array type multi-parallel processor 72, whether or not input is to be skipped is first determined and interpolation follows suit in order to give effective future prediction. This delay time is corrected in advance so that there appears no delay in the linear array type multi-parallel processor 72. The processing step ST201 will be explained later in detail. This 'delay' is determined uniquely if the program is set.

At step ST202, it is judged whether or not pixel data for the next line is possible. This decision is repeated until inputting of the pixel data of the next line becomes possible. If the inputting of the pixel data of the next line becomes possible at step ST202, one-line pixel data is entered at the next step ST203.

At step ST204, the input skip line control signal FISL as later explained is referred to so that, if the value of the signal FISL is 0, one-line data 73 entered at step ST203 is stored at step ST205 in a 4 h signal delay line 56 on the local memory in which is stored interpolating data (originating point of interpolation). If the value of the signal FISL is 1, this line is deemed to be unnecessary and is discarded without being stored in the 4H signal delay line 56. Then, processing transfers to step ST206.

Figure 67:
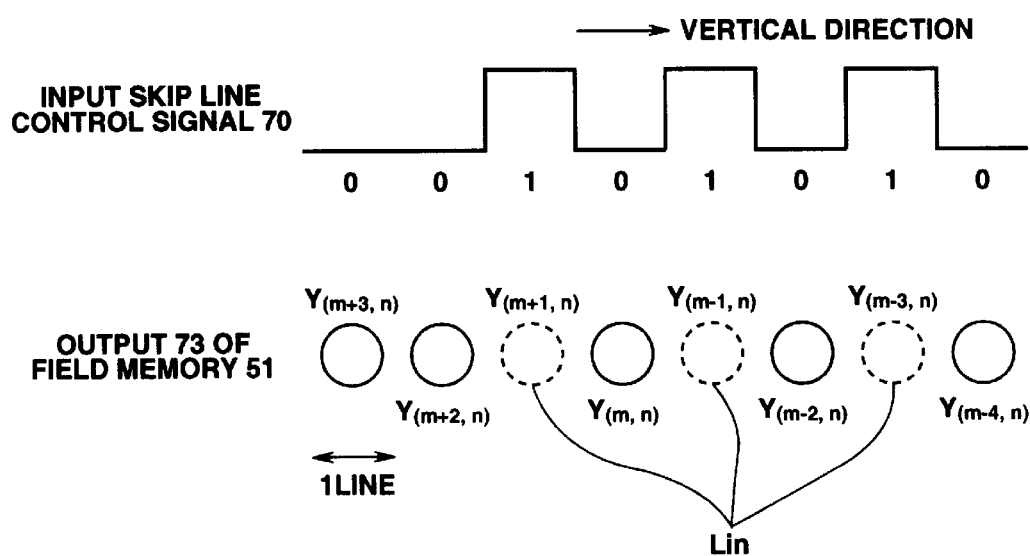
FIG. 67 illustrates the operation for enlarging conversion of scanning lines.

This input skip line control signal FISL becomes meaningful at the time of enlarging conversion processing for the number of scanning lines. FIG. 67 shows the relation between the input skip line control signal FISL and data of the field memory 51 at the time of enlarging conversion. In FIG. 67, Lin denotes a skipped line. Specifically, if the input skip line control signal FISL is 1, the field memory 51 ceases to output data and refrains from taking in data, whereas, if the input skip line control signal FISL is 0, data from the memory 51 is taken in and stored in a 4H delay line 56 required for interpolation. Although the polarity of the input skip line control signal FISL of 1 and 0 denote skip and non-skip, respectively, this needs to be reversed if the control signal to the field memory 51 is of opposite polarity.

In FIG. 62, the control signal GRL of the 4H delay line 56 specifies the so-called global rotation. Specifically, the control signal GRL equal to 1 or 0 denotes delaying or not delaying the respective line data by one line. Since the processing is line-based and data in the local memory is shifted in the DSP so that instructions as small as tens of steps suffices.

Figure 68:
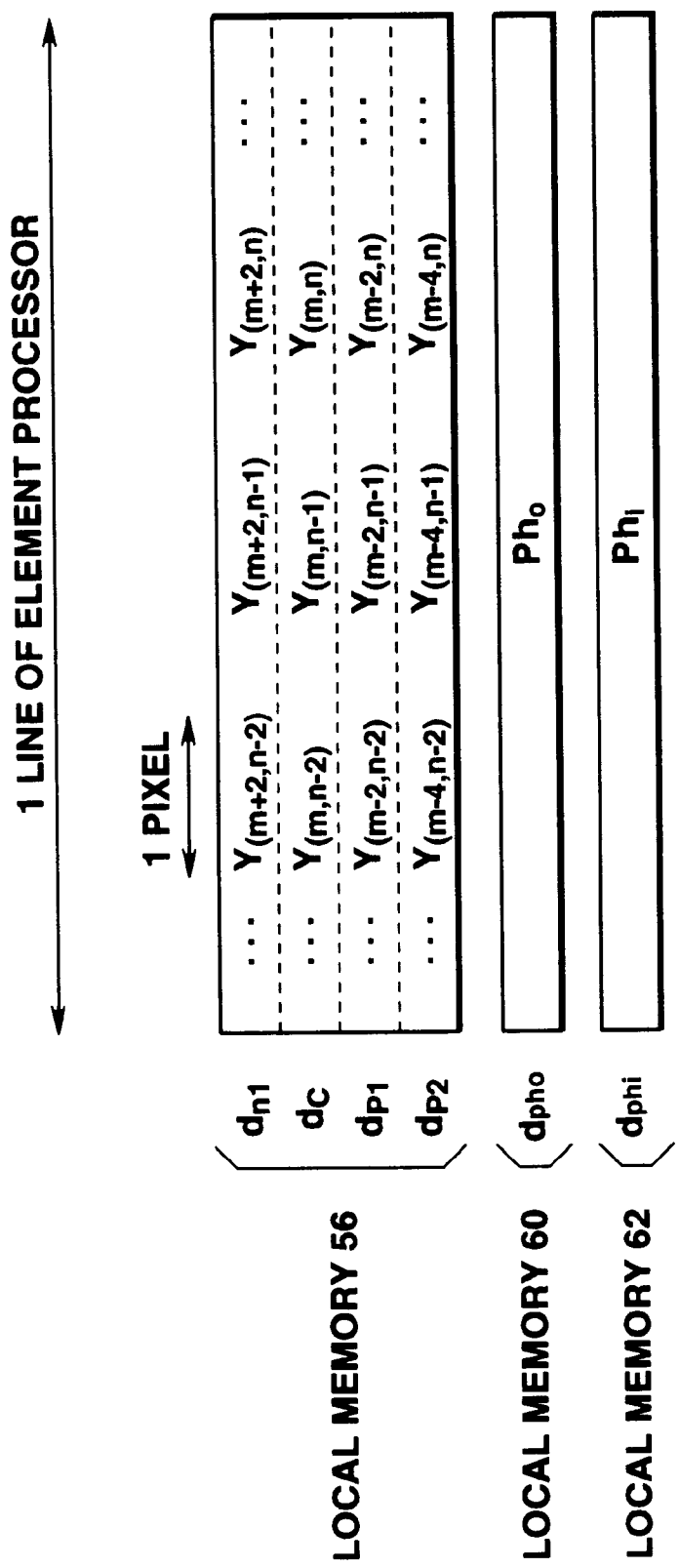
FIG. 68 illustrates the contents of a local memory in the illustration of the operation of enlarging conversion of the number of scanning lines.

By the above processing, 4-line data necessary for cubic interpolation is obtained in the signal delay line 56. In FIG. 67, for example, the line shown in FIG. 68 is stored in the local memory 56, that is in the signal delay line 56 of FIG. 62. FIG. 68 also shows the contents of the other local memory 60 at the time of enlarging conversion processing for the number of scanning lines (that is the register provided in the output skip line calculating unit 60 of FIG. 62) and the local memory 62 (register provided in the line phase calculating unit 62 of FIG. 62).

Figure 69:
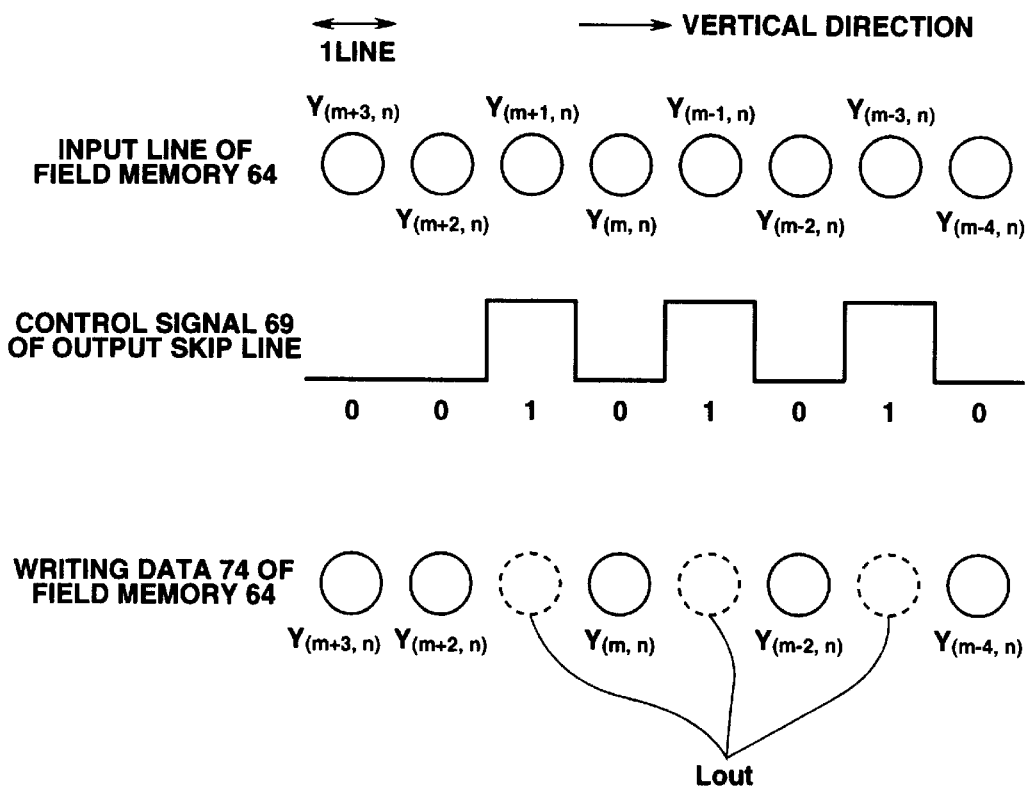
FIG. 69 illustrates the operation for contracting conversion of the number of scanning lines.
Figure 70:
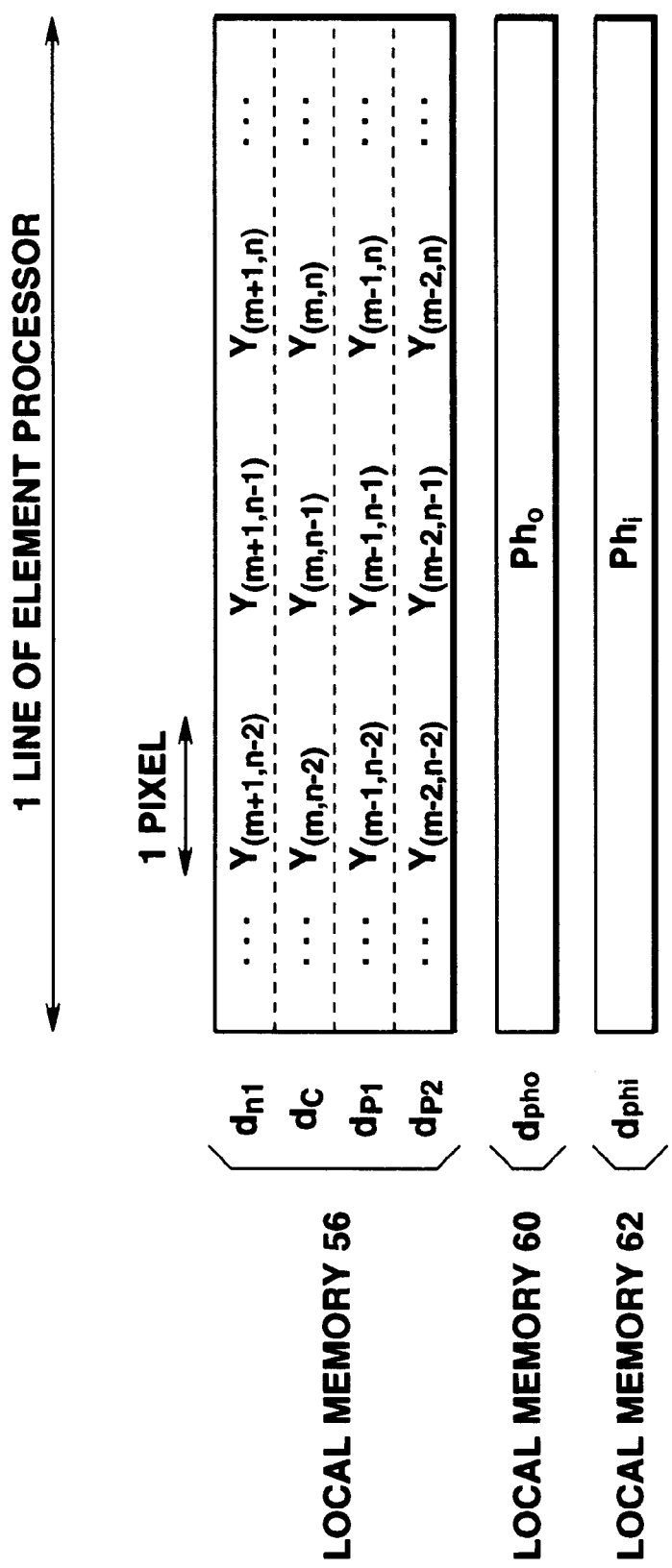
FIG. 70 illustrates the contents of a local memory in the illustration of the operation of contracting conversion of the number of scanning lines.

This output skip line control signal FOSL becomes meaningful at the time of reducing conversion processing for the number of scanning lines. FIG. 49 shows the relation between the output skip line control signal FOSL and data of the field memory 51 at the time of reducing conversion. In FIG. 69, Lout denotes a skipped line. Specifically, if the output skip line control signal FOSL is 1, the field memory 64 refrains from taking in data, whereas, if the output skip line control signal FOSL is 0, the field memory 64 takes in data of the output signal 74. Although the polarity of the output skip line control signal FOSL of 1 and 0 denote skip and non-skip, respectively, this needs to be reversed if the control signal of the field memory 64 is of opposite polarity. FIG. 70 shows the contents of the local memory at this time. FIG. 70 also shows the contents of the local memory 56 at the time of reducing conversion processing for the number of scanning lines (that is the signal delay line 56 of FIG. 62), local memory 60 (that is the register provided in the output skip line calculating unit 60 of FIG. 62) and the local memory 62 (register provided in the line phase calculating unit 62 of FIG. 62).

At step ST206, the cubic coefficients are computed from the output skip line phase information dpho using the equation (1). Not only the value stored in the output skip line phase information dpho but also the value stored in the skip line phase information dphi denotes the line phase information. The input skip line phase information dphi is, however, not used for actual interpolation calculations but is used for determining the input skip line as later explained. Thus, there are two sorts of the line phase information, namely dphi and dpho. However, by using only output skip line phase information dpho for actual interpolation calculations, it becomes possible to realize conversion at an optional ratio from reduction to enlargement.

At step ST207, the cubic coefficients as found by step ST206 are convolved with pixel data of the four neighboring lines. A line Qv interpolated by convolution calculations of the cubic coefficients as found at step ST206 and pixel data of the four near-by lines is represented by the following equation (18):

$$Qv = C_1((M+dpho)/M)*dp2 + C_2(dpho/M)*dp1 + C_2(M-dpho)/M)*dc + C1((2M-dpho)/K)*dn-1 \qquad (22)$$

where $C1(x) = -|x|^3 + 5|x|^2 - 8|x| + 4$
$C2(x) = |x|^3 + 2|x|^2 + 1$

The output skip line phase information dpho denotes the register 60 having stored therein the output skip line phase information dpho of the previous line (register of the output skip line calculating unit 60), as will be explained subsequently. Meanwhile, dp2, dp1, dc and dn1 denote input lines delayed by 3 H, 2 H, 1H and 0 H, respectively. It is noted that dpho, dp2, dp1, dc and dn1 are associated with registers. The output skip line phase information dpho (value of the output skip line phase information register dpho) is constant for any pixel in the scanning line.

At steps ST208 to 219, the output skip line and the pine phase information for cubic processing are calculated.

At steps ST208 to 210, it is judged whether or not the next line is the output skip line of the next line. Specifically, the value stored in the output skip line phase register dpho of the previous line is added to with N. If the resulting value is larger than M times 2, '1' is stored in the 1-bit register FOSL to skip the output line. If otherwise, '0' is stored in the register FOSL so as not to skip the output line.

At steps ST211 to 213, it is judged whether or not the next line is the input skip line. The results of judgment are stored in a working register temp. Specifically, the value stored in the output skip line phase register dph0 of the previous line is added to with N. If the resulting value is equal to or smaller than M, '1' is stored in the 1-bit working register temp. If otherwise, '0' is stored in the 1-bit working register temp.

At the next steps ST214 to 216, the value of the output skip line phase register dph0 of the next line is calculated in accordance with the register FOSL specifying the output skip line. If the register FOSL as calculated at steps ST209 and ST210 is 1, the output skip line phase register dpho is set to the output skip line phase register dpho of the current line dpho less M and, if otherwise, it is set to the output skip line phase register dpho of the current line dph0 plus (N−M).

At the next steps ST217 to ST219, the value of the output skip line phase information register dpho of the next line is calculated in accordance with the value of the working register temp. If the value of the working register temp is 1, the input skip line is set at the next steps ST220 to ST231.

At steps ST220 to 221, it is judged whether or not the next line is the output skip line of the next line. Specifically, the value stored in the input skip line phase register dphi of the previous line is added to with N. If the resulting value is larger than M times 2, '1' is stored in the 1-bit register FOSL to skip the output line. If otherwise, '0' is stored in the register FOSL so as not to skip the output line.

At steps ST223 to 225, it is judged whether or not the next line is the input skip line. The results of judgment are stored in a working register FISL. Specifically, the value stored in the input skip line phase register dphi of the previous line is added to with N. If the resulting value is equal to or smaller than M, '1' is stored in the 1-bit working register FISL. If otherwise, '0' is stored in the 1-bit working register FISL. The input line is not skipped.

At the next steps ST226 to 228, the value of the input skip line phase register dphi of the next line is calculated in accordance with the working register temp specifying the output skip line. If the register temp as calculated at steps ST221 and ST223 is 1, the input skip line phase register dphi is set to the input skip line phase register dphi of the current line dphO less M and, if otherwise, it is set to the input skip line phase register dphi of the current line dphi plus (N−M).

At the next steps St229 to ST231, the value of the input skip line phase information register dphi of the next line is calculated in accordance with the value of the register FISL. If the value of the register FISL is 1, the value of the input skip line phase information register dphi of the next line is set so as to be equal to the value of the input skip line position information register dphi of the current line less M and, if otherwise, the prevailing register value is kept.

At step ST232, data obtained by the above cubic interpolation calculations, output skip line control signal FOSL and the input skip line control signal FISL are outputted.

The processing up to step ST233, representing one-line calculations, is repeated for one frame duration. That is, it is judged at step ST222 whether or not one frame has come to a close. If the result is YES, processing jumps to step ST201 and, if otherwise, processing jumps to step to step ST202.

Figure 71:
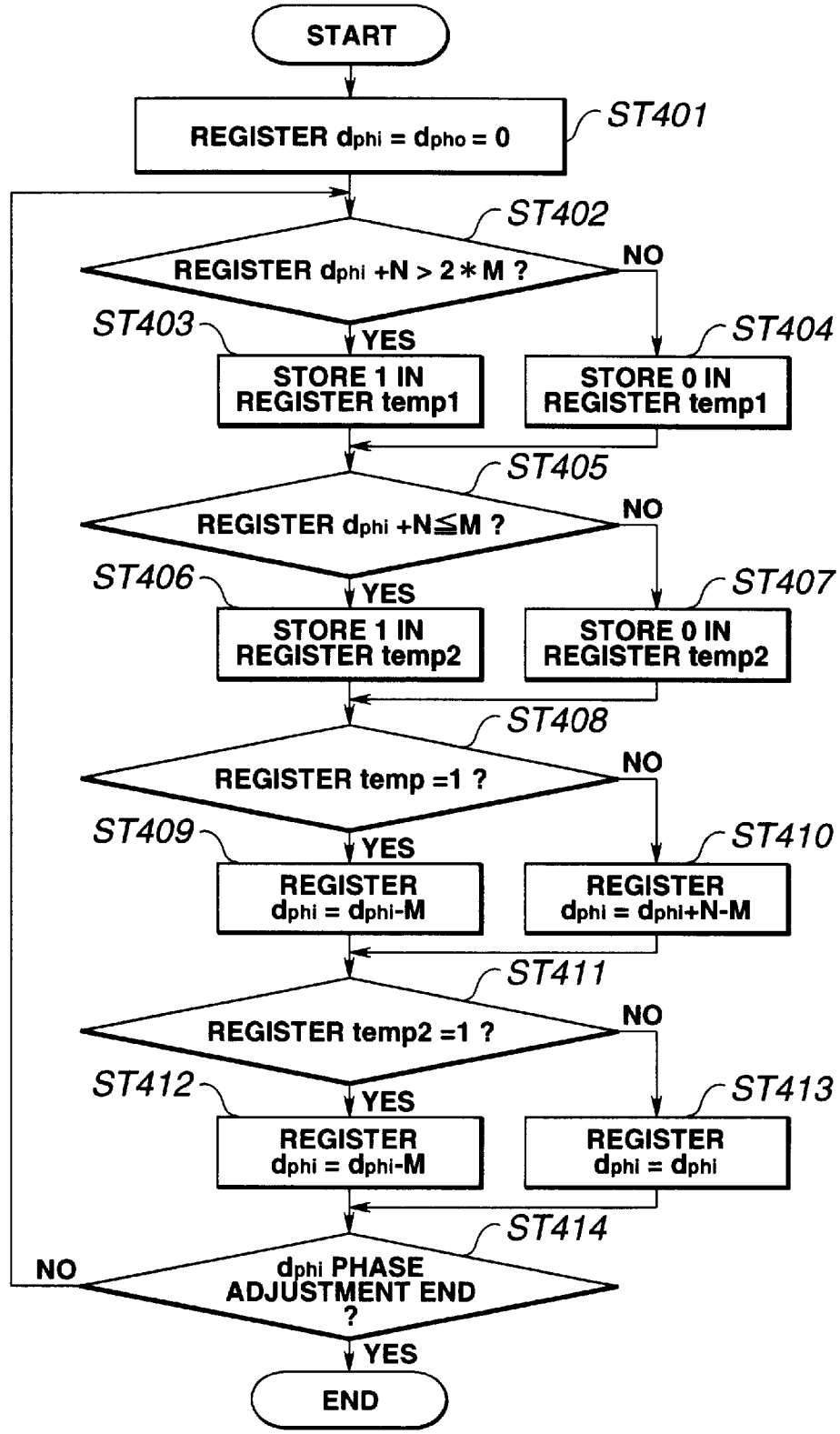
FIG. 71 is a detailed flowchart for illustrating steps ST201 and ST302.
Figure 72:
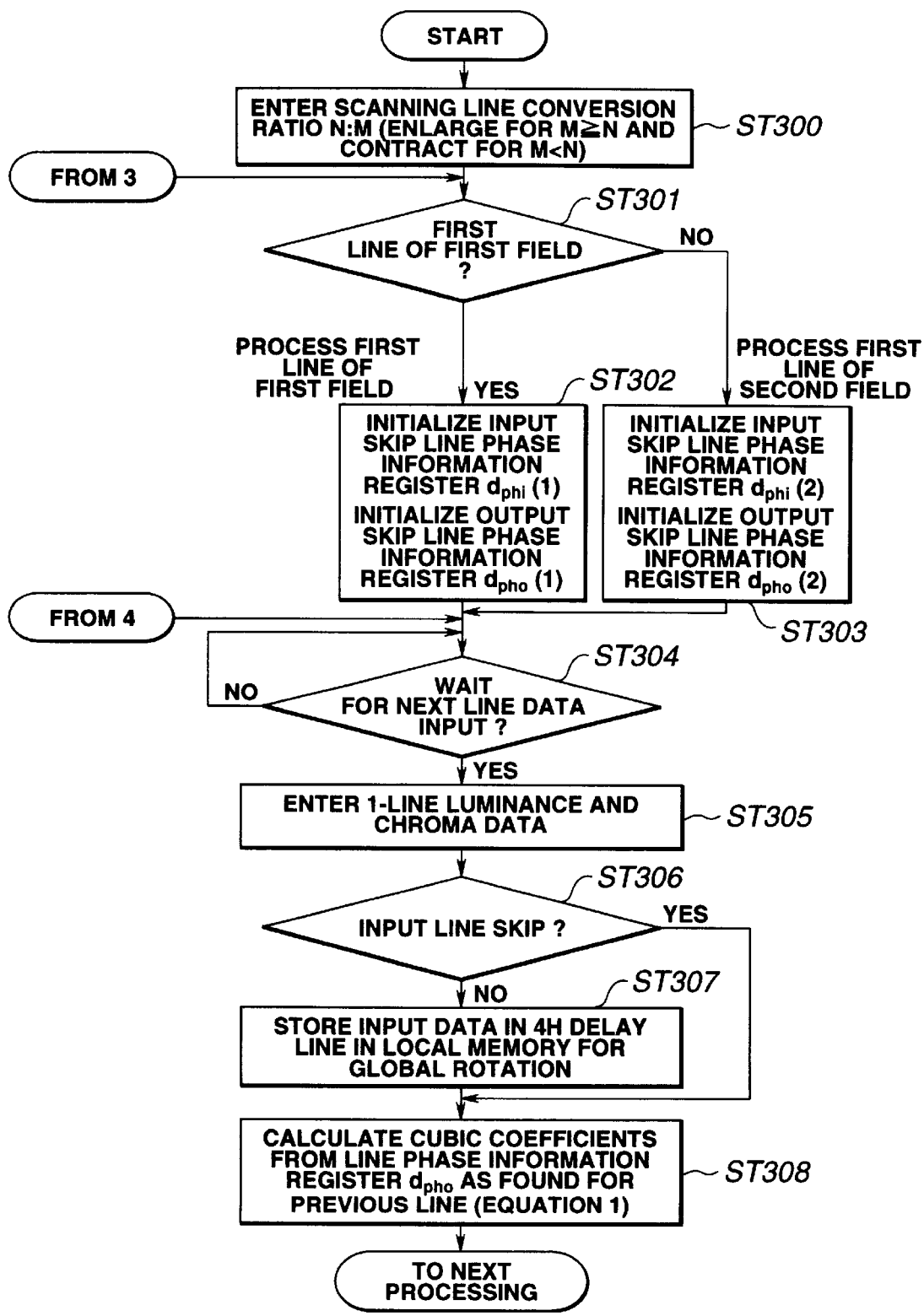
FIG. 72 illustrates a portion (¼) of the flowchart for conversion processing of the number of scanning lines for interlaced signals.
Figure 73:
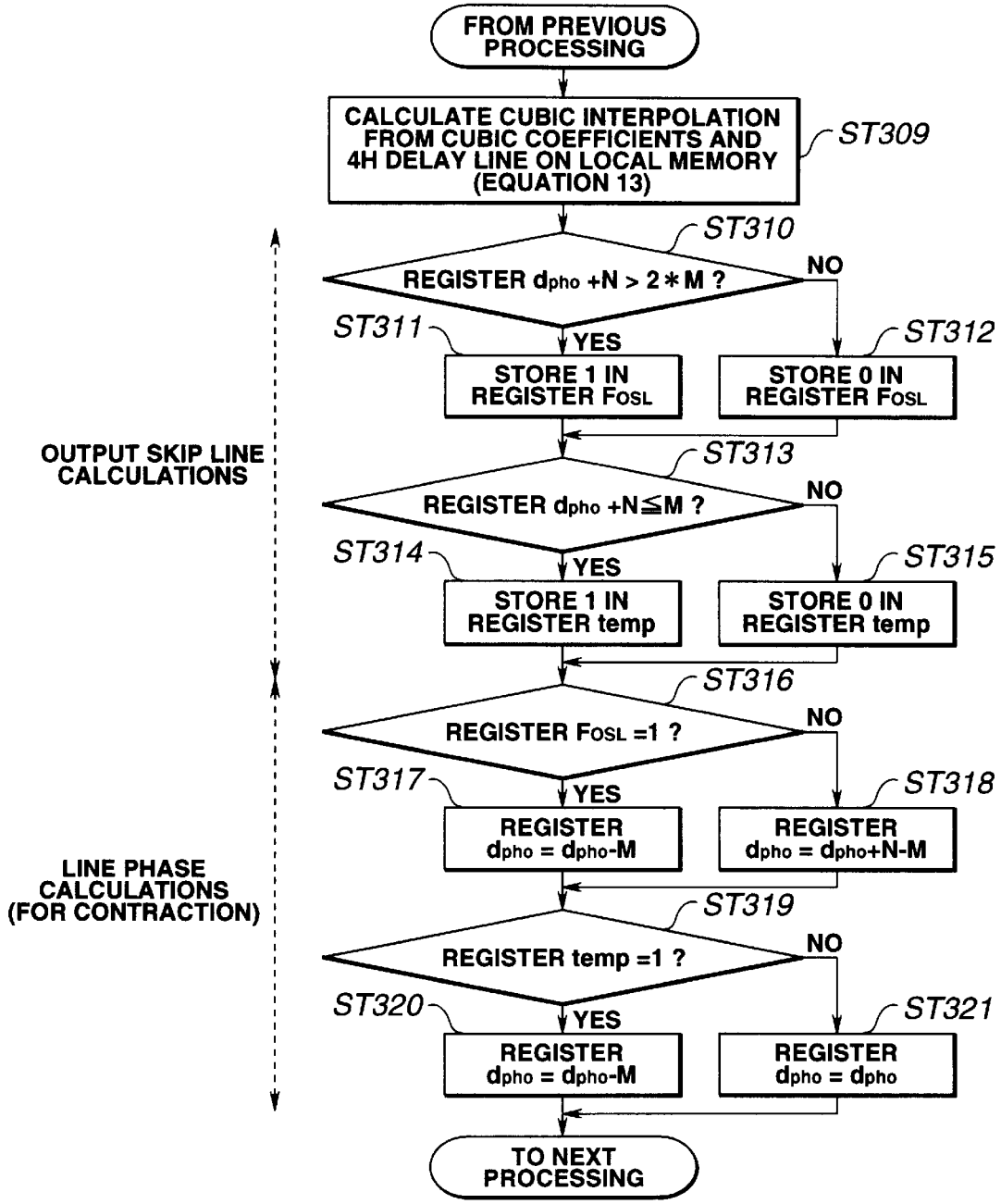
FIG. 73 illustrates a portion (²⁄₄) of the flowchart for conversion processing of the number of scanning lines for interlaced signals.
Figure 74:
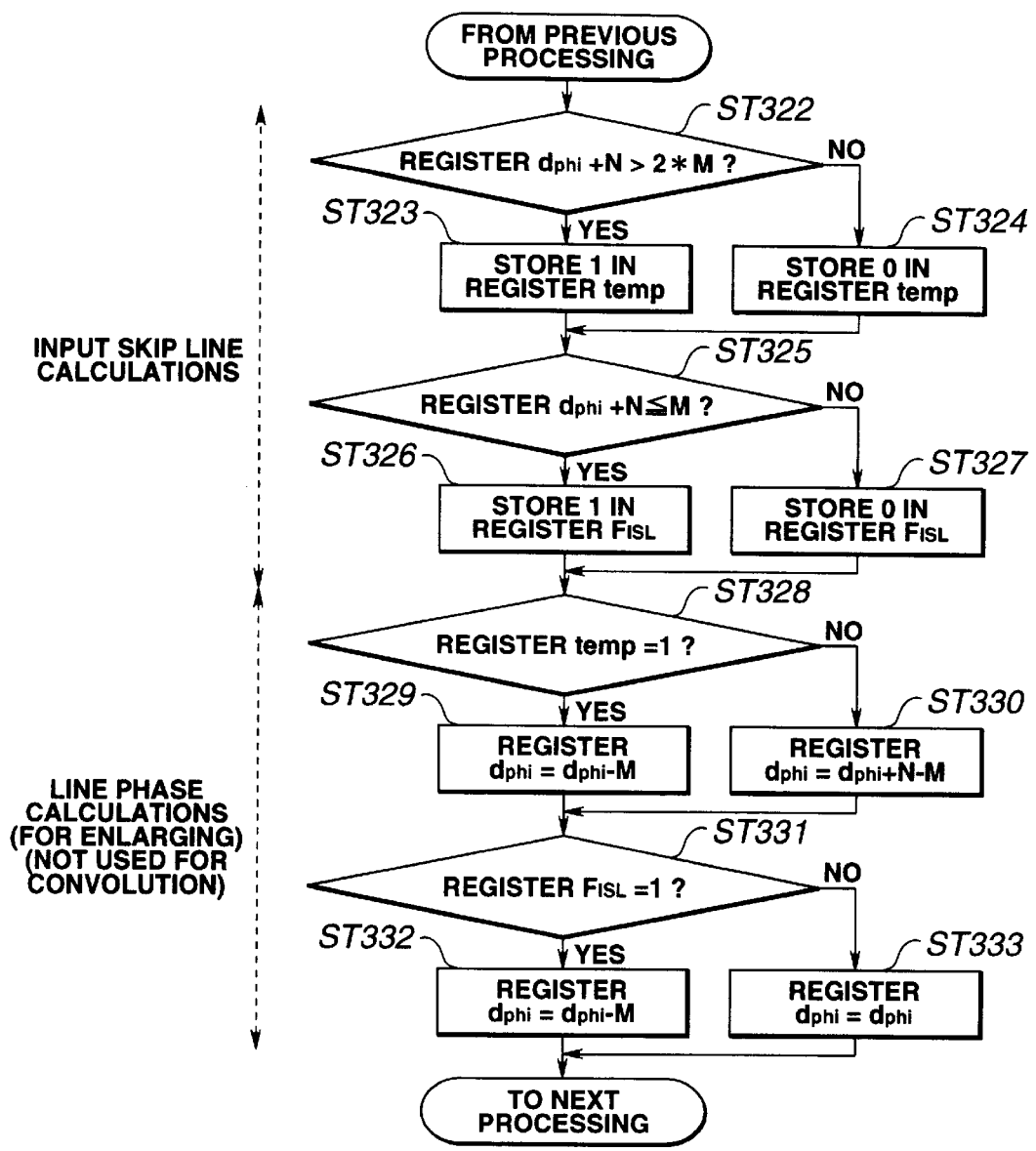
FIG. 74 illustrates a portion (¾) of the flowchart for conversion processing of the number of scanning lines for interlaced signals.
Figure 75:
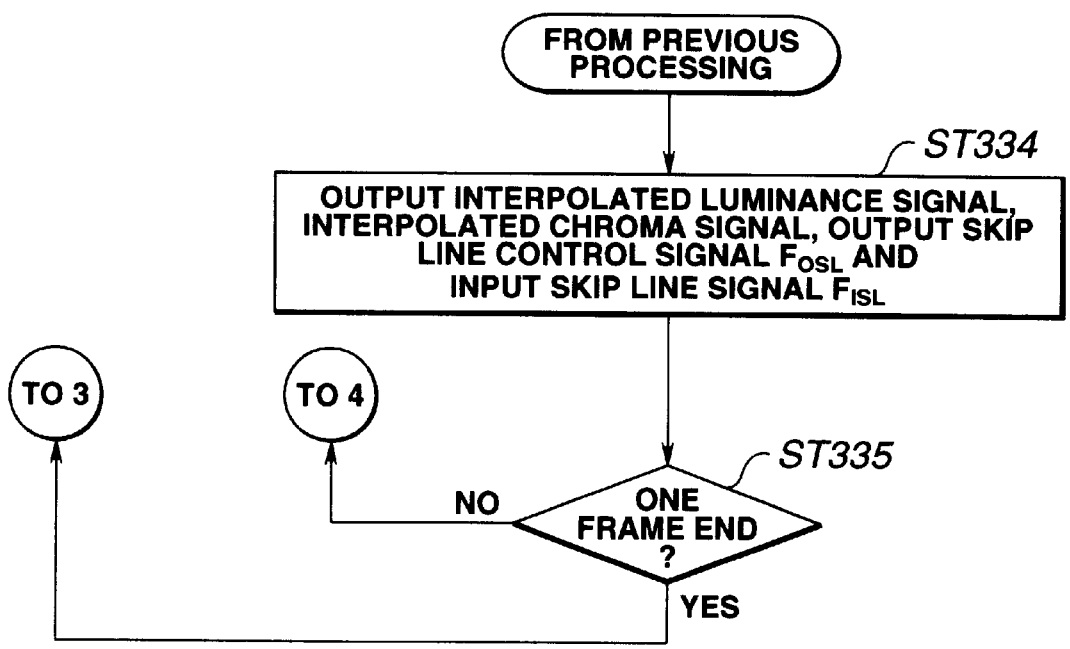
FIG. 75 illustrates a portion (⁴⁄₄) of the flowchart for conversion processing of the number of scanning lines for interlaced signals.

The detailed processing at step ST201, omitted in the foregoing explanation, is shown in the flowchart of FIG. 71, and is now explained.

At step ST401, the input skip line phase information register dphi and the output skip line phase information register dpho are initialized to zero.

At steps ST402 to 404, it is judged whether or not the next line is the output skip line of the next line. The result of decision is stored in a working register temp1. Specifically, the value stored in the output skip line phase register dph0 of the previous line is added to with N. If the resulting value is larger than M times 2, '1' is stored in a working register temp2. If otherwise, '0' is stored in the register FOSL.

At steps ST405 to ST407, it is judged whether or not the next line is the input skip line. The result of decision is stored in a working register temp2. Specifically, the value stored in the output skip line phase register dphl of the previous line is added to with N. If the resulting value is equal to or smaller than M, '1' is stored in the 1-bit working register temp2. If otherwise, '0' is stored in the 1-bit working register temp2.

At the next steps ST408 to ST410, the value of the input skip line phase register dphl of the next line is calculated in accordance with the working register temp1. If the value of the working register temp1 is 1, the output skip line phase register dpho is set to the output skip line phase register dpho of the current line dph0 less M and, if otherwise, it is set to the output skip line phase register dpho of the current line dph0 plus N−M).

If the value of the working register temp2 is 1, the value of the input skip line phase register dph1 of the next line is set so as to be equal to the value of the input skip line phase register dphl of the current line less M and, if otherwise, it is set s as to be equal to the dphi value plus (N−M).

At the next steps ST411 to ST413, the value of the input skip line phase information register dphi of the next line is computed in accordance with the working register temp2. If the value of the working register temp2 is 1, the value of the input skip line phase register dph1 of the next line is set so as to be equal to the value of the input skip line phase register dph1 of the current line less M and, if otherwise, it is unchanged.

The processing of the steps ST402 to ST413 is carried out a desired number of times. This number of times depends on the internal delay time of the linear array type multi-parallel processor (DSP) which in turn depends on the program formulation and hence cannot be determined uniquely. However, it is determined uniquely if the processing in the DSP is set.

The foregoing refers to the conversion processing for the number of scanning lines for non-interlaced signals. The processing for interlaced signals is now explained.

FIGS. 72 to 75 show a flowchart of processing on the interlaced signals. The difference from the processing for non-interlaced signals resides in the method of initializing the input skip line phase information register dphi and the output skip line phase information register dpho after inputting the scanning line conversion ratio. Therefore, only this point is explained, while the remaining portions are not explained. This corresponds to the steps ST303 and ST335.

At step ST301, it is judged whether or not the field to be processed is the first field or the second field. Depending on the result, the initial values of the line phase information are switched. With the linear array type multi-parallel processor 72, the program can be switched by the instruction switching flag from the instruction switching flag generator 45 of FIG. 61, so that processing can be switched to step ST302 and to step ST303 at the first line of the first field and at the first line of the second field, respectively.

If the processing is switched to step ST302, the processing explained in FIG. 71 is carried out by the same processing as the processing for initializing the skip line phase information register for the non-interlaced signal. This is not explained since it has already been explained with reference to FIG. 71.

Figure 76:
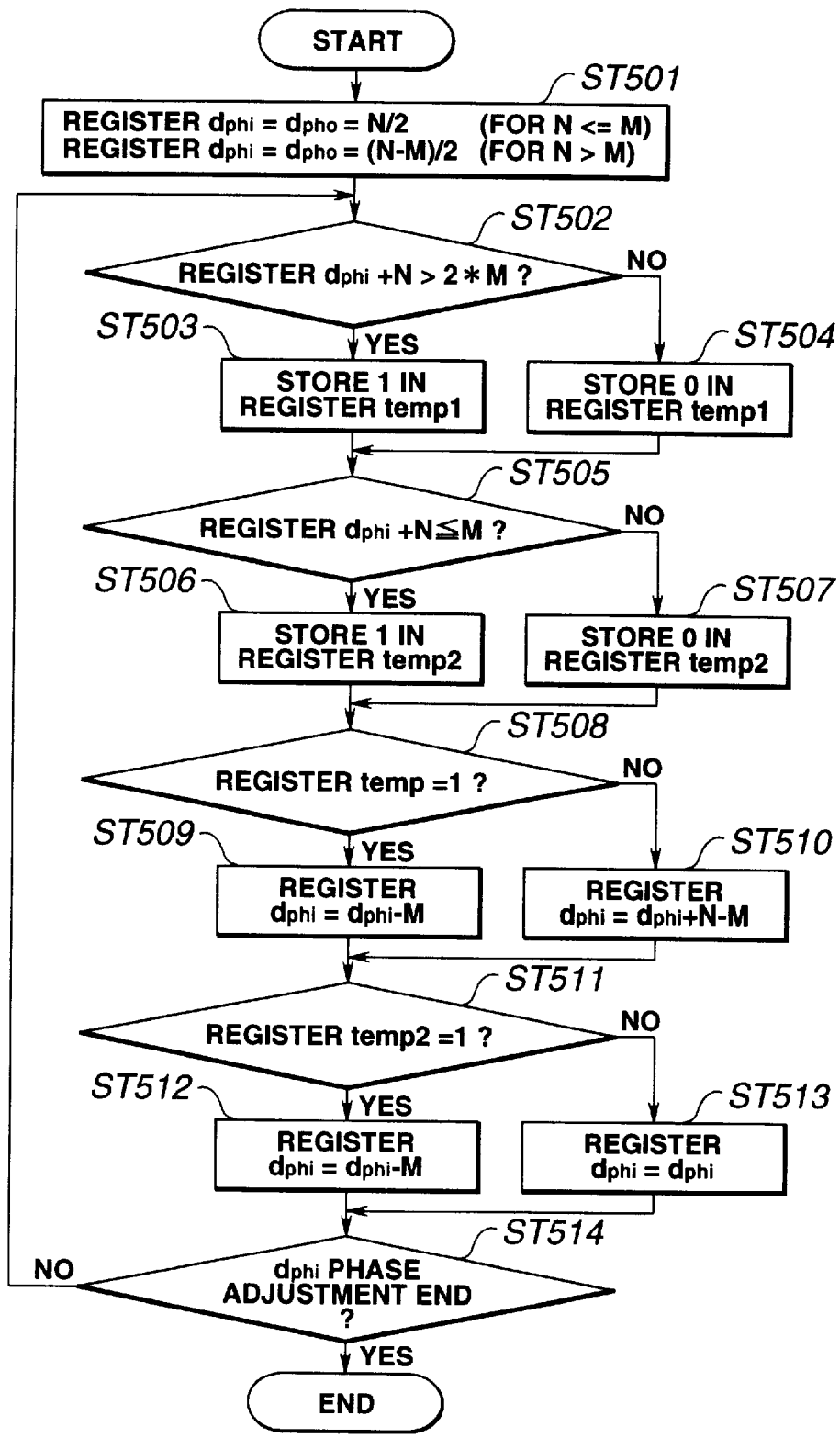
FIG. 76 is a detailed flowchart for illustrating step ST303.

The processing at step ST303 is the processing of initializing the line phase information register dphi in the second field and is shown in detail in FIG. 76. The processing of FIG. 76 is similar to that of FIG. 71, with the sole difference being different initial values of the input skip line phase information register dphi and the output skip line phase information register dpho directly after starting. This is the processing at step ST501. If the conversion ratio is set to N:M, the register dphi=dpho=N/2 for the enlarging conversion processing for the number of scanning lines (N≦M)., while the register dphi=dpho=(N−M)/2 for the reducing scanning line number conversion. The processing as from step ST502 is the same as that as from step ST402.

Figure 59:
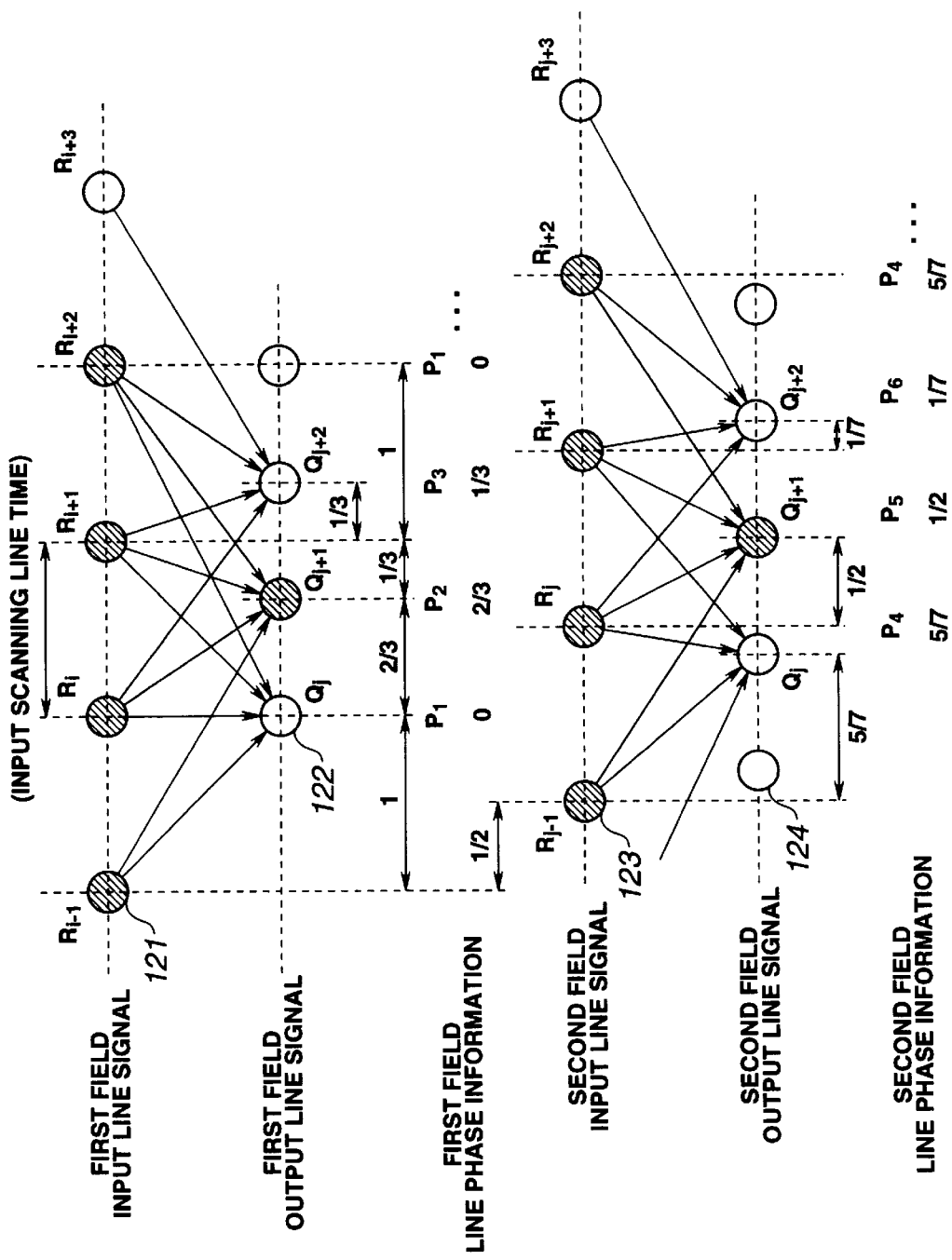
FIG. 59 illustrates the principle of enlarging conversion of the number of lines by 2:3 for interlaced signals.

The reason the line phase information is offset for the first and second field is that the scanning line structure is of the nested structure for the interlaced signals shown in FIGS. 59 and 60.

Of course, these offset values result from arithmetic operations of the conversion ratios of M and N and hence can be easily found by the linear array type multi-parallel processor 72.

The processing at steps ST304 to 335 is the same as that at steps ST202 to ST233 and hence the explanation therefor is omitted for brevity.

However, in the processing for the interlaced signals, since the initial values of the phase information registers are switched from field to field, the end of one field is checked at step ST335. If the field has come to a close, processing reverts to step ST301 to carry out the processing of the next field. If otherwise, processing reverts to step ST304 to continue processing of the next line.

In the above-described embodiment of the present invention, the filter switching interpolation system (cubic interpolation system) difficult to implement in hardware because of the circuit scale and complexity in structure is used such that the conversion processing for the number of scanning lines at an optional ratio can be realized solely by software processing using a SIMD-controlled linear array type multi-parallel processor DSP on program switching.

Moreover, with the present embodiments, the number of scanning lines can be changed on the real-time basis.

Although the luminance signals (Y) and the chroma signals (Cr and Cb) are taken as examples in the above-described embodiments similar effects can be realized for pixel data of Y (luminance), U, V (chroma), or R (red component), G (green component) or B (blue component). That is, the techniques of the present invention can be applied to pixel data from a solid-state imaging devices (CCDs) or R, G or B pixel data, provided that these pixel data are arranged in a raster scanning system.

According to the present invention, digital signal processing for conversion processing for the number of scanning lines at an optional ratio can be realized solely by software processing using the SIMD-controlled linear array type multi-parallel processor. The scanning line conversion ratio can be set on the real-time basis. The control signal of a field memory provided outside can be calculated by the linear array type multi-parallel processor to render a remote-controlled circuit redundant.

The present invention can be modified widely within the scope thereof and hence the above-described embodiments are given merely for illustration and are not intended to limit the invention.

What is claimed is:

1. A picture signal processing device having a plurality of element processors and a controller for performing common control of said element processors, said element processors being arrayed in association with pixels arrayed in a one-dimensional direction of a digitized two-dimensional picture, said pixels arrayed in the one-dimensional direction being chronologically sequentially entered to said element processors, each of said element processors comprising:

a local memory for transiently storing pixel data of luminance and chroma;

an input register for storing the input pixel data of luminance and chroma for transfer to said transient memory;

at least one skip pixel register for storing pixel skip information for skipping pixels of luminance and chroma;

an arithmetic-logic unit for carrying out pre-set calculations using the input pixel data of luminance and chroma or pixel data of luminance and chroma of nearby element processors based on pixel attribute information supplied to said arithmetic-logic unit, the pixel attribute information representing at least an attribute of luminance pixels; and an output register for storing and outputting the pixel data of luminance and chroma taken out from said local memory.

2. The picture signal processing device as claimed in claim 1 wherein each of said element processors performs the same processing for luminance and chroma pixel data of the 4:4:4 format.

3. The picture signal processing device as claimed in claim 1 wherein said arithmetic-logic device performs interpolation calculations using values of near-by four pixels on the luminance pixel data of the 4:2:2 format, while performing linear interpolation calculations on the chroma pixel data using the values of the near-by pixels.

4. The picture signal processing device as claimed in claim 1 wherein each of the element processors includes format conversion means for converting the chroma pixel data from the 4:2:2 format to the 4:4:4 format;

each of said element processors performing the same processing on the pixel data of luminance and chroma of the 4:4:4 format.

5. The picture signal processing device as claimed in claim 1 wherein each of the element processors includes format conversion means for converting the chroma pixel data from the 4:1:1 format to the 4:2:2 format, and wherein said arithmetic-logic device performs interpolation calculations using values of near-by four pixels on the luminance pixel data of the 4:2:2 format, while performing linear interpolation calculations on the chroma pixel data using the values of the near-by pixels.

6. The picture signal processing device as claimed in claim 1 wherein each of the element processors includes format conversion means for converting the chroma pixel data from the 4:1:1 format to the 4:4:4 format;

each of said element processors performing the same processing on the pixel data of luminance and chroma of the 4:4:4 format.

7. The picture signal processing device as claimed in claim 1 wherein said input pixel data memory discretely or continuously stores the input pixel data based on the pixel skip information stored in said pixel skip information memory.

8. The picture signal processing device as claimed in claim 1 wherein said output pixel data memory discretely or continuously stores the input pixel data from said transient memory based on the pixel skip information stored in said pixel skip information memory.

9. The picture signal processing device as claimed in claim 1 wherein said controller controls the rate of the pixel data outputted by said output pixel data memory independently of the rate of the pixel data entering said input pixel data memory.

10. The picture signal processing device as claimed in claim 1 wherein each of said element processors includes pixel attribute information generating means for generating said pixel attribute information.

11. A picture signal processing device having a plurality of element processors and a controller for performing common control of said element processors, said element processors being arrayed in association with pixels arrayed in a one-dimensional direction of a digitized two-dimensional picture, said pixels arrayed in the one-dimensional direction being chronologically sequentially entered to said element processors, comprising:

a field memory for storing said two-dimensional picture data at an input and/or an output for the one-dimensionally arrayed element processors, each of said element processors including:

a local memory for transiently storing pixel data of luminance and chroma from one scanning line to another;

an input register for storing input scanning line data of luminance and chroma for transfer to said local memory;

a skip line register for storing scanning line skip information for skipping scanning line data;

an arithmetic-logic unit for carrying out pre-set calculations using the input scanning line data or scanning line data of luminance and chroma of nearby element processors based on scanning line attribute information supplied to said arithmetic-logic unit; and an output register for storing and outputting the scanning line data taken out from said local memory, wherein the data storage or data removal in said field memory is controlled based on said scanning line skip information for enlarging or reducing the number of scanning lines.

12. The picture signal processing device as claimed in claim 11, wherein each of said element processors further comprises:

skip scanning line calculating means for calculating the skip scanning line information for controlling data storage and data removal in said field memory based on the scanning line attribute information sent to said arithmetic logic unit.

13. The picture signal processing device as claimed in claim 11 wherein said scanning line skip information memory stores the scanning line skip information independently for enlarging or reducing the number of the scanning lines and wherein said scanning line attribute information memory stores the scanning line attribute information independently for enlarging or reducing the number of the scanning lines.

14. The picture signal processing device as claimed in claim 11 wherein said element processor also includes a transient pixel data memory for storing pixel data of luminance and chroma for transiently holding the data;

an input pixel data memory for storing input pixel data of luminance and chroma for transfer to said transient pixel data memory;

a pixel attribute information memory for storing the pixel attribute information representing the attribute of at least the luminance;

a pixel skip information memory for storing the input picture skip information for skipping the input pixel data of luminance and chroma;

a horizontal direction arithmetic-logic unit for carrying out pre-set arithmetic-logic operations using input pixel data of luminance and chroma or pixel data of luminance and chroma of near-by element processors based on the pixel attribute information; and output pixel data memory for storing and outputting pixel data of luminance and chroma taken out from said transient pixel data memory;

wherein the number of pixels is increased or decreased.

15. The picture signal processing device as claimed in claim 14 wherein the pixel attribute information, input pixel skip information and the output pixel skip information are set from one scanning time to another for converting the number of pixels in the increasing or decreasing direction on the real-time basis.

16. The picture signal processing device as claimed in claim 14 wherein said controller controls switching of the element processors between conversion processing for the number of scanning lines and conversion of the number of pixels from one scanning line of an input picture to another.

17. The picture signal processing device as claimed in claim 14 wherein the pixel attribute information, pixel skip information and the scanning line skip information are set independently of one another for independent enlarging conversion or contracting conversion in the horizontal and vertical directions.

18. The picture signal processing device as claimed in claim 11 wherein the input picture data rate of a two-dimensional picture data memory arranged in an input unit of said element processor is controlled independently of an output picture data rate of a two-dimensional picture data memory arranged in an input unit of said element processor.

19. The picture signal processing device as claimed in claim 14 wherein each of said element processors performs the same processing for luminance and chroma pixel data of the 4:4:4 format.

20. The picture signal processing device as claimed in claim 14 wherein said horizontal direction arithmetic-logic unit performs interpolation calculations using values of near-by four pixels on the luminance pixel data of the 4:2:2 format, while performing linear interpolation calculations on the chroma pixel data using the values of the near-by pixels, or applying the values of the near-by pixels directly for interpolation.

21. The picture signal processing device as claimed in claim 14 wherein said vertical direction arithmetic-logic unit performs interpolation calculations using values of near-by four pixels on the luminance pixel data of the 4:2:2 format, while performing linear interpolation calculations on the chroma pixel data using the values of the near-by pixels, or applying the values of the near-by pixels directly for interpolation.

22. The picture signal processing device as claimed in claim 14 wherein each of the element processors includes format conversion means for converting the chroma pixel data from the 4:2:2 format to the 4:4:4 format;

each of said element processors performing the same processing on the pixel data of luminance and chroma of the 4:4:4 format.

23. The picture signal processing device as claimed in claim 14 wherein each of the element processors includes format conversion means for converting the chroma pixel data from the 4:1:1 format to the 4:2:2 format, and wherein said horizontal-direction arithmetic-logic device performs interpolation calculations using values of near-by four pixels on the luminance pixel data of the 4:2:2 format, while performing linear interpolation calculations on the chroma pixel data using the values of the near-by pixels, or directly applying the values of the near-by pixels.

24. The picture signal processing device as claimed in claim 14 wherein said input pixel data memory discretely or continuously stores the input pixel data based on the pixel skip information stored in said pixel skip information memory.

25. The picture signal processing device as claimed in claim 14 wherein said controller controls the rate of a picture outputted by said output pixel data memory independently from the rate of the pixel data entering said input pixel data memory.

26. The picture signal processing device as claimed in claim 14 wherein each of said element processors includes pixel attribute information generating means for generating said pixel attribute information and scanning line attribute information generating means for generating said scanning line attribute information.

27. A picture signal processing device having a plurality of element processors and a controller for performing common control of said element processors, said element processors being arrayed in association with pixels arrayed in a one-dimensional direction of a digitized two-dimensional picture, said pixels arrayed in the one-dimensional direction being chronologically sequentially entered to said element processors, each of said element processors comprising:

a local memory for transiently storing pixel data;

an input register for storing the input pixel data for transfer to said local memory;

at least one skip pixel register for storing pixel skip information for skipping pixel data;

an arithmetic-logic unit for carrying out pre-set calculations using the input pixel data or pixel data of nearby element processors based on pixel attribute information supplied to said arithmetic-logic unit; and an output register for storing and outputting the pixel data taken out from said local memory.

28. The picture signal processing device as claimed in claim 27 wherein said input pixel data memory of each element processor discretely or continuously stores the input pixel data based on the pixel skip information stored in said pixel skip information memory.

29. The picture signal processing device as claimed in claim 27 wherein said output pixel data memory of each element processor discretely or continuously stores the input pixel data from said transient memory based on the pixel skip information stored in said pixel skip information memory.

30. The picture signal processing device as claimed in claim 27 wherein said controller controls the rate of the pixel data outputted by said output pixel data memory independently of the rate of the pixel data entering said input pixel data memory.

31. The picture signal processing device as claimed in claim 27 wherein each of said element processors includes pixel attribute information generating means for generating said pixel attribute information.

32. The picture signal processing device as claimed in claim 27 comprising:
 a pixel skip information generator for generating the pixel skip information;
 a pixel attribute information generator for generating the pixel attribute information;
 an input switching unit for switching between the input pixel data, pixel skip information and the pixel attribute information for entering the selected information to each element processor; and
 a switching controller for switchingly controlling said input switching unit at a pre-set timing.

33. The picture signal processing device as claimed in claim 32 wherein said pixel skip information generator and the pixel attribute information generator each comprise a sequencing arithmetic-logic device.

34. The picture signal processing device as claimed in claim 32 wherein said switching controller generates a switching timing signal for the input switching unit to switch between the pixel skip information and the pixel attribute information to enter the selected information to each element processor during an arbitrary scanning period of the blanking period.

35. A picture signal processing device having a plurality of element processors and a controller for performing common control of said element processors, said element processors being arrayed in association with pixels arrayed in a one-dimensional direction of a digitized two-dimensional picture, said pixels arrayed in the one-dimensional direction being chronologically sequentially entered to said element processors, comprising:
 data storage means for storing said two-dimensional picture data at an input and/or an output for the one-dimensionally arrayed element processors, each of said element processors including:
 a local memory for transiently storing input pixel data of luminance and chroma from one scanning line to another;
 an input register for storing input scanning line data of luminance and chroma for transfer to said local memory;
 an input register for storing the scanning line readout skip information from the data storage means placed in front of the input register;
 an output register for storing the scanning line data to the data storage means placed behind said output register;
 an arithmetic-logic unit for determining the input or output skip scanning line based on scanning line attribute information supplied to said arithmetic-logic unit and for carrying out pre-set calculations employing the input scanning line data or nearby scanning line data based on the scanning line attribute information, said scanning line attribute information representing the scanning line attribute of pixel data of luminance and chroma to be interpolated or decimated;
 an output resister for storing and outputting the scanning line data of luminance and chroma taken out from said local memory; and
 a data storage controller for generating a control signal for storage or takeout of said two-dimensional picture data and for switching the processing from one scanning line of the input picture to another.

36. The picture signal processing device as claimed in claim 35 wherein said scanning line attribute information has an initial value for the first field from that for the second field.

37. The picture signal processing device as claimed in claim 35 wherein said scanning line attribute information has an initial value for each frame for the non-interlaced picture signals.

38. The picture signal processing device as claimed in claim 35 wherein the input skip scanning line information, output skip scanning line information, scanning line attribute information for enlarging the number of scanning lines and the scanning line attribute information for reducing the number of scanning lines are separately provided for effecting real-time conversion processing for the number of scanning lines from reducing conversion to enlarging conversion.

39. The picture signal processing device as claimed in claim 35 wherein the control signal for the data memory is calculated from the scanning line attribute information for enlarging the number of scanning lines and the scanning line attribute information for reducing the number of scanning lines for effecting conversion processing for the number of scanning lines from reducing conversion to enlarging conversion.

40. The picture signal processing device as claimed in claim 35 wherein said element processor and the controller switch processing from one scanning line of the input picture to another.

41. The picture signal processing device as claimed in claim 35 wherein the input skip scanning line information and the output skip scanning line information are calculated based on the scanning line attribute information.

42. The picture signal processing device as claimed in claim 35 wherein the input picture rate to the data memory placed ahead of said input unit is controlled independently of that of the output picture rate of the data memory placed at back of said output unit.

43. The picture signal processing device as claimed in claim 35 wherein each element processor performs the same processing on luminance and chroma pixel data.

44. The picture signal processing device as claimed in claim 35 wherein each element processor performs the same processing on Y, U and V pixel data and on R, G and B pixel data.

45. The picture signal processing device as claimed in claim 35 wherein each element processor has a scanning line information generating unit for generating the scanning line attribute information.

* * * * *

UNITED STATES PATENT AND TRADEMARK OFFICE
CERTIFICATE OF CORRECTION

PATENT NO. : 6,088,062
DATED : July 11, 2000
INVENTOR(S) : KANOU et al.

It is certified that error appears in the above-identified patent and that said Letters Patent is hereby corrected as shown below:

Column 59, line 26, claim 1, line 12, change "said transient memory" to - -said local memory- -.

Column 60, line 35, claim 11, line 9, after storing delete "said"

Column 60, line 51, claim 11, line 25, after the phrase "arithmetic logic unit;" insert - -the scanning line attribute information representing at least an attribute of luminance data- -

Column 62, line 56, claim 27, line 17, after the phrase "arithmetic logic unit;" insert - -the pixel attribute information representing at least an attribute of luminance pixels- -

Signed and Sealed this

First Day of May, 2001

Attest:

NICHOLAS P. GODICI

Attesting Officer     Acting Director of the United States Patent and Trademark Office